US012764135B2

(12) United States Patent
Whalen et al.

(10) Patent No.: US 12,764,135 B2
(45) **Date of Patent: *Oct. 13, 2026**

(54) SYSTEMS AND METHODS FOR AUTOMATICALLY CREATING NORMALIZED SECURITY EVENTS IN A CYBERSECURITY THREAT DETECTION AND MITIGATION PLATFORM

(71) Applicant: Expel, Inc., Herndon, VA (US)

(72) Inventors: Dan Whalen, Herndon, VA (US); Patrick Edgett, Westminster, CO (US)

(73) Assignee: Expel, Inc., Herndon, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/265,219

(22) Filed: Jul. 10, 2025

(65) Prior Publication Data

US 2026/0019431 A1 Jan. 15, 2026

Related U.S. Application Data

(63) Continuation of application No. 19/054,568, filed on Feb. 14, 2025, now Pat. No. 12,381,897, which is a (Continued)

(51) Int. Cl.

| | |
|---|---|
| ***H04L 9/40*** | (2022.01) |
| ***G06F 3/0482*** | (2013.01) |
| ***G06F 9/451*** | (2018.01) |

(52) U.S. Cl.

CPC ........ *H04L 63/1416* (2013.01); *G06F 3/0482* (2013.01); *G06F 9/451* (2018.02); *H04L 63/1441* (2013.01)

(58) Field of Classification Search

CPC ............. H04L 63/1416; H04L 63/1441; G06F 3/0482; G06F 9/451; G06F 3/04842; (Continued)

(56) References Cited

U.S. PATENT DOCUMENTS

| | | | | |
|---|---|---|---|---|
| 8,402,002 | B2 | 3/2013 | Adam | |
| 10,305,922 | B2 * | 5/2019 | Devi Reddy | ....... H04L 63/1425 |

(Continued)

FOREIGN PATENT DOCUMENTS

| | | | |
|---|---|---|---|
| CN | 111782727 | A | 10/2020 |
| CN | 118101352 | A | 5/2024 |

(Continued)

*Primary Examiner* — Christopher A Revak

(74) *Attorney, Agent, or Firm* — Padowithz Alce; Chandler Scheitlin; Alce PLLC

(57) ABSTRACT

A system, method, and computer-program product includes obtaining raw event data associated with a subscriber, automatically selecting an automated event ingestion instruction of a plurality of distinct automated event ingestion instructions for processing the raw event data, automatically generating a pre-normalized security event that includes the raw event data in a first structured data object in response to executing the automated event ingestion instruction, automatically transforming the pre-normalized security event to at least one normalized security event, automatically assessing a corpus of computer-executable detection instructions against the at least one normalized security event, generating a security alert based on the at least one normalized security event satisfying a set of alerting conditions of a subject computer-executable detection instruction of the corpus of computer-executable detection instructions, and executing a threat mitigation response that mitigates a security threat associated with the security alert.

20 Claims, 72 Drawing Sheets

Related U.S. Application Data continuation-in-part of application No. 18/793,483, filed on Aug. 2, 2024, now Pat. No. 12,346,447, which is a continuation-in-part of application No. 18/749,222, filed on Jun. 20, 2024, now Pat. No. 12,335,283.

(60) Provisional application No. 63/555,853, filed on Feb. 20, 2024, provisional application No. 63/533,238, filed on Aug. 17, 2023, provisional application No. 63/521,968, filed on Jun. 20, 2023.

(58) Field of Classification Search
CPC ............. G06F 2221/034; G06F 21/566; G06F 21/577; G06F 21/554
See application file for complete search history.

(56) References Cited

U.S. PATENT DOCUMENTS

| | | | |
|---|---|---|---|
| 10,678,928 B1 | 6/2020 | Bush, Jr. | |
| 11,343,142 B1 | 5/2022 | Wang | |
| 12,026,255 B1 * | 7/2024 | Burns | G06F 21/554 |
| 12,381,897 B2 * | 8/2025 | Whalen | G06F 21/554 |
| 2018/0240322 A1 * | 8/2018 | Potucek | E04H 4/14 |
| 2019/0391977 A1 * | 12/2019 | Taylor | G06F 16/24556 |
| 2020/0356676 A1 | 11/2020 | Gorlamandala | |
| 2021/0117868 A1 | 4/2021 | Shiharsha | |
| 2021/0209653 A1 * | 7/2021 | Homan | G06Q 30/0271 |
| 2021/0374886 A1 | 12/2021 | Reitz | |
| 2022/0070182 A1 * | 3/2022 | Bowditch | H04L 63/1425 |
| 2022/0103577 A1 * | 3/2022 | Shah | H04L 63/1416 |
| 2023/0289696 A1 * | 9/2023 | Narechania | G06F 16/215 |
| 2023/0418831 A1 * | 12/2023 | Vadlamani | G06Q 30/0202 |
| 2024/0289766 A1 | 8/2024 | Dubois | |
| 2024/0406195 A1 | 12/2024 | Sansom | |
| 2025/0097244 A1 | 3/2025 | White | |
| 2025/0103948 A1 | 3/2025 | Xu | |

FOREIGN PATENT DOCUMENTS

| | | | |
|---|---|---|---|
| WO | WO-2017018926 A1 * | 2/2017 | G06F 18/24147 |
| WO | WO-2021044370 A1 * | 3/2021 | G06F 17/40 |

* cited by examiner expel Refractor Alert Taxonomy ▿ Signal From Anywhere ▿ Legacy Engine ▿ Logout Signal From Anywhere / Signal Types Common Signals +

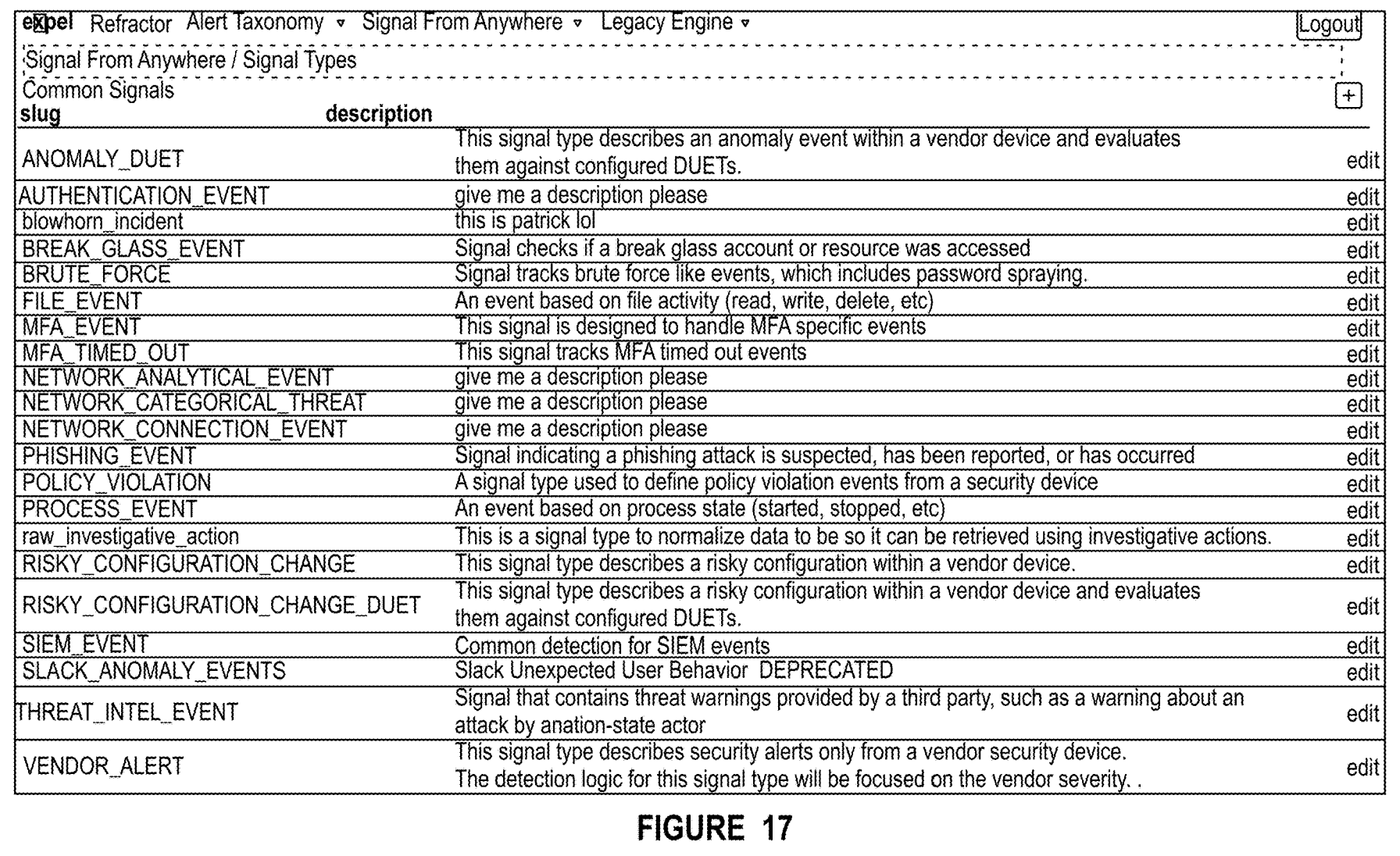

| slug | description | |
|---|---|---|
| ANOMALY_DUET | This signal type describes an anomaly event within a vendor device and evaluates them against configured DUETs. | edit |
| AUTHENTICATION_EVENT | give me a description please | edit |
| blowhorn_incident | this is patrick lol | edit |
| BREAK_GLASS_EVENT | Signal checks if a break glass account or resource was accessed | edit |
| BRUTE_FORCE | Signal tracks brute force like events, which includes password spraying. | edit |
| FILE_EVENT | An event based on file activity (read, write, delete, etc) | edit |
| MFA_EVENT | This signal is designed to handle MFA specific events | edit |
| MFA_TIMED_OUT | This signal tracks MFA timed out events | edit |
| NETWORK_ANALYTICAL_EVENT | give me a description please | edit |
| NETWORK_CATEGORICAL_THREAT | give me a description please | edit |
| NETWORK_CONNECTION_EVENT | give me a description please | edit |
| PHISHING_EVENT | Signal indicating a phishing attack is suspected, has been reported, or has occurred | edit |
| POLICY_VIOLATION | A signal type used to define policy violation events from a security device | edit |
| PROCESS_EVENT | An event based on process state (started, stopped, etc) | edit |
| raw_investigative_action | This is a signal type to normalize data to be so it can be retrieved using investigative actions. | edit |
| RISKY_CONFIGURATION_CHANGE | This signal type describes a risky configuration within a vendor device. | edit |
| RISKY_CONFIGURATION_CHANGE_DUET | This signal type describes a risky configuration within a vendor device and evaluates them against configured DUETs. | edit |
| SIEM_EVENT | Common detection for SIEM events | edit |
| SLACK_ANOMALY_EVENTS | Slack Unexpected User Behavior DEPRECATED | edit |
| THREAT_INTEL_EVENT | Signal that contains threat warnings provided by a third party, such as a warning about an attack by anation-state actor | edit |
| VENDOR_ALERT | This signal type describes security alerts only from a vendor security device. The detection logic for this signal type will be focused on the vendor severity. . | edit |

FIGURE 17

Integrations

Filter integrations...

| Name ⊕ | Description | Source Model | Organization Scope | |
|---|---|---|---|---|
| AWS Cloudtrail | AWS Cloudtrail integation | | all | edit |
| Active Directory | Active Directory | | all | edit |
| Apex One | Trend Micro Apex One | | all | edit |
| Armis | Armis | | all | edit |
| Auth0 | Auth0 | | all | edit |
| Avi Vantage | Avi Vantage | | all | edit |
| Azure Sentinel | Azure Sentinel SIEM | | all | edit |
| Blowdown Playground | Blowdown Playground | | all | edit |
| Check Point | Check Point | | all | edit |
| Cisco ASA | Cisco ASA | | all | edit |
| Cisco Firepower | Cisco Firepower | Network Security | all | edit |
| Cisco Meraki | Cisco Meraki Direct | | all | edit |
| Cisco Umbrella | Cisco Umbrella | | General Electric | edit |
| Cloudflare | Cloudflare WAF integration | | all | edit |
| Corelight | Corelight via Collector | | Expel Test Customer | edit |
| CrowdStrike | Falcon IDP | | all | edit |
| CrowdStrike Logscale (formerly Humio) Collector | CrowdStrike Logscale (formerly Humio) Collector | | all | edit |
| Datadog | Surfaces SIEM alerts from Datadog | | all | edit |
| EDR Sample Integration | Sample EDR integration to lay out example of robustnormalization and detection strategy | | all | edit |
| Extrahop | Extrahop | | all | edit |
| Fortinalyzer | Fortinalyzer direct | | all | edit |
| Github | Github | | all | edit |
| Gitlab | Gitlab | | all | edit |
| Google Chronicle (Spotify AB) | Google Chronicle | | Spotify AB | edit |

FIGURE 25

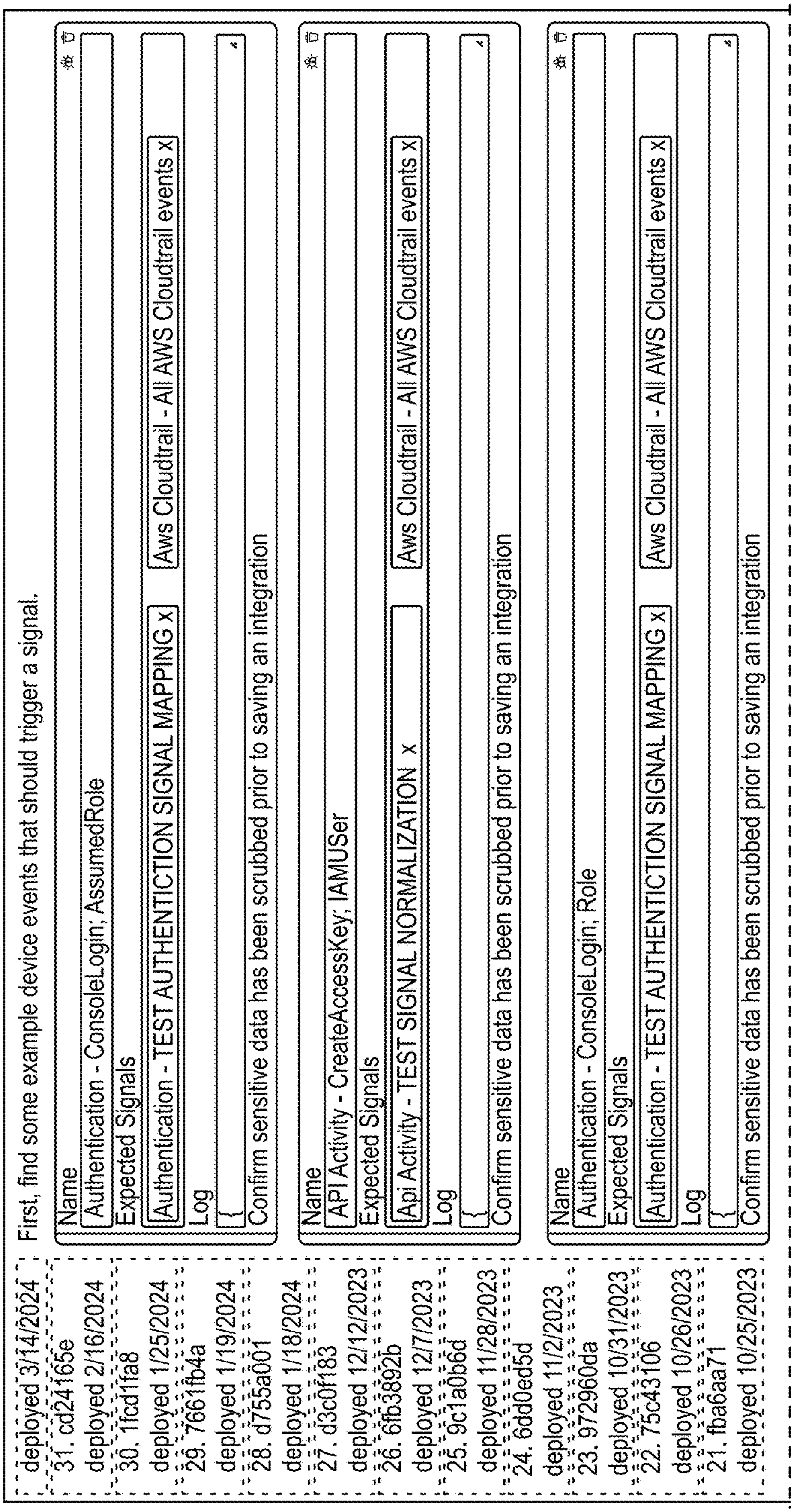
FIGURE 28(Cont..)

| Signal Type | Alert Name | Categories |
|---|---|---|
| Vendor Event | API event from a suspicious location | Suspicious User Activity |
| Anomaly Duet | Anomaly Alert | |
| Authentication Event | Suspicious authentication activity | Suspicious Authentication |
| Authentication Event | Suspicious authentication | Suspicious Authentication |
| Break Glass Event | Breakglass Account Alert | Suspicious User Activity |
| Risky Configuration change Duet | Configuration Change Alert- {{evidence"messages"}} | |
| Risky Configuration change Duet | Configuration Change Alert from suspicious IP - {{evidence"messages"}} | |
| Vendor Alert | {{evidence"event_types"}} | Suspicious User Activity |
| Mfa Event | Multiple Failed or Rejected MFA Events | Suspicious Authentication |
| Vendor Alert | {{evidence"event_types"}} | Suspicious User Activity |
| Kubemetes Control Plane Event | Kubernates Port Forwarding to Pod | Suspicious User Activity |

FIGURE 43 (Cont...)

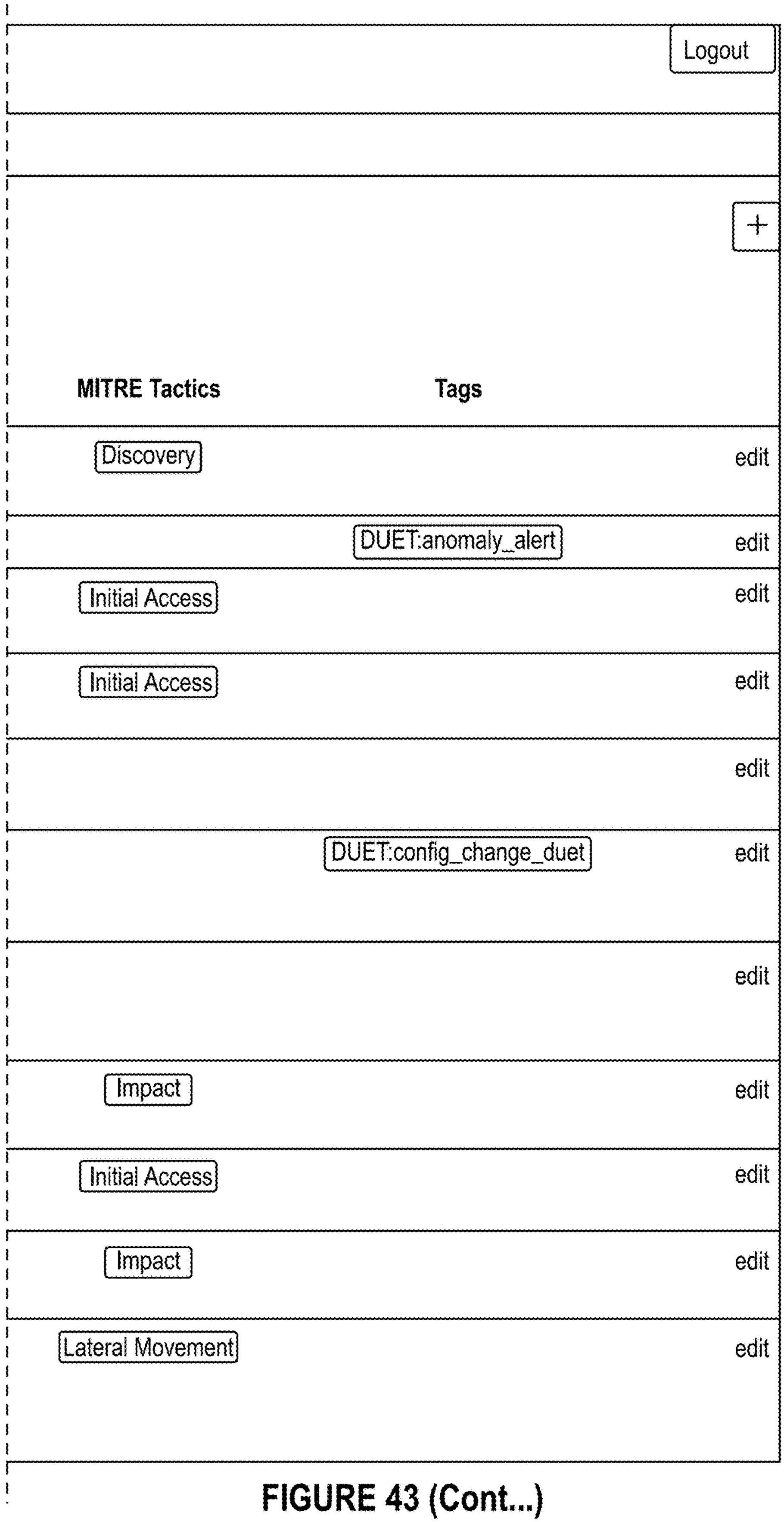
FIGURE 43 (Cont...)

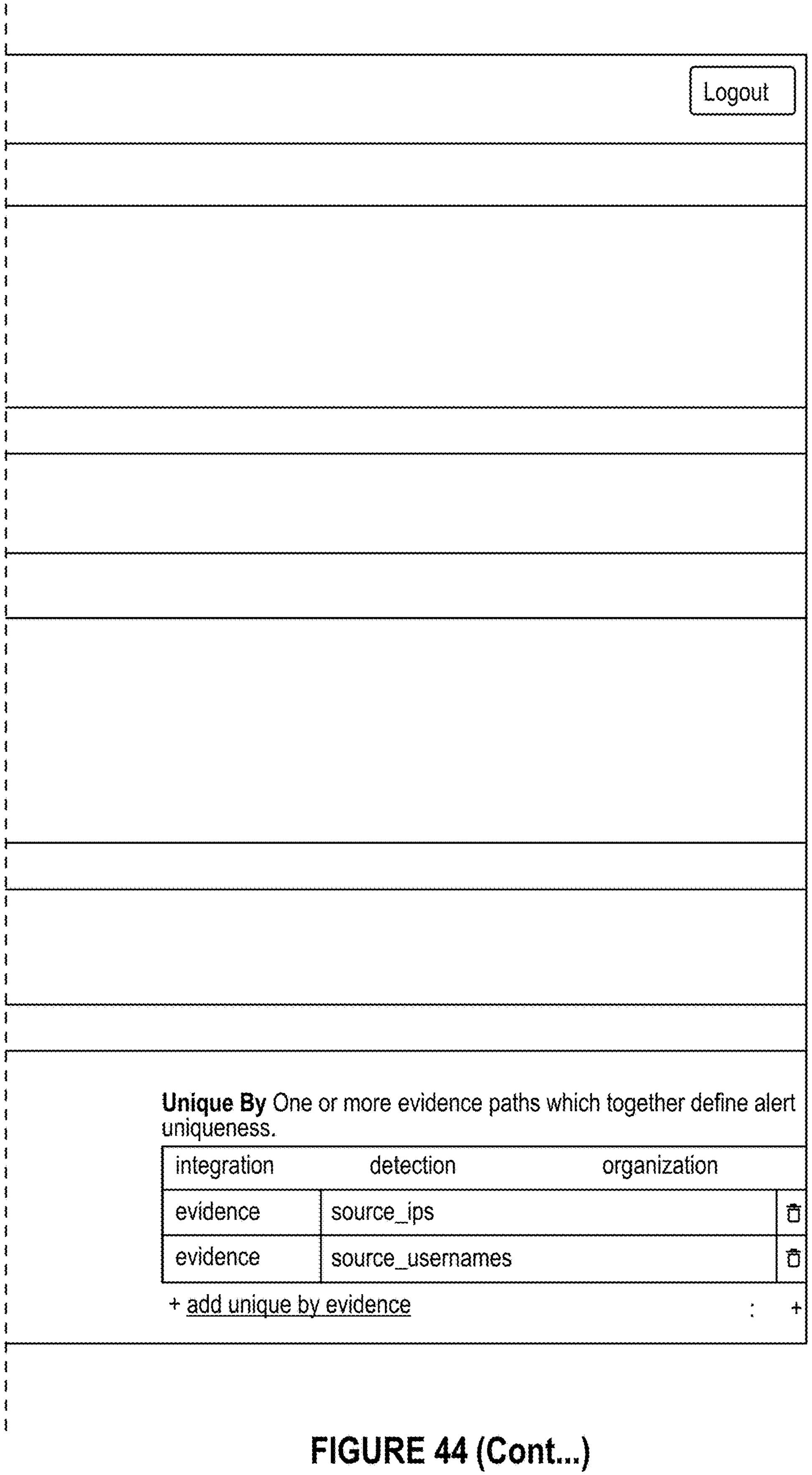
FIGURE 44 (Cont...)

Devices

Filter detections...

| Name | Last Touched By | Last Deployed | Severity | Alert Taxonomy |
|---|---|---|---|---|
| API Activity with suspicious user agent | John Carfaro | 9/21/2023, 12:32:24PM | LOW | Suspicious User Activity |
| AWS Access Key Enumeration | Ian Cooper | 5/20/2024, 2:45:48 PM | TESTING | - |
| AWS CloudTrail bucket modification | Daniel Bolton | 10/25/2023, 3:13:36 PM | LOW | Suspicious User Activity |
| AWS Cloudtrail-AWS Lambda backdoor tracker | John Carfaro | 9/6/2023, 11:48:41 AM | TESTING | - |
| AWS Cloudtrail-Access Key Generated | John Carfaro | ... | TESTING | Suspicious Authentication |
| AWS Cloudtrail Downgrade | John Carfaro | 10/12/2023, 11:28:45 AM | MEDIUM | - |
| AWS Cognito unauthenticated logins enabled | Daniel Bolton | 10/18/2023, 2:06:55 PM | MEDIUM | Suspicious User Activity |
| AWS Detector deleted or disabled | Jim Thavisouk | 10/12/2023, 9:52:39 AM | TUNING | Suspicious User Activity |
| AWS ECR image tags set to mutable | Daniel Bolton | 10/17/2023, 1:05:05 PM | LOW | Suspicious User Activity |
| AWS Highly Privileged Role Assumption | Daniel Bolton | ... | TUNING | Suspicious User Activity |
| AWS Instance Limits Enumerated via GameLift | John Carfaro | 10/2/2023, 8:39:08 PM | MEDIUM | Suspicious User Activity |
| AWS KMS key deletion | Daniel Bolton | 10/11/2023, 11:44:03 AM | TUNING | Suspicious User Activity |
| AWS Metal Instance Created | John Carfaro | 10/5/2023, 2:51:28 PM | MEDIUM | Suspicious User Activity |

FIGURE 49

Normalizers Signals Detections

| Signal Type | Alert Name | Categories | MITRE Tactics |
|---|---|---|---|
| Api Activity | SFA-API Activity with suspicious user agent | Suspicious User Activity | Intial Access |
| Api Activity | SFA-AWS Access Key Enumeration | Suspicious User Activity | Discovery |
| Api Activity | SFA-AWS CloudTrail bucket modification | Suspicious User Activity | Defense Evasion |
| Api Activity | SFA-Potential Lambda function backdoor | Suspicious User Activity | Execution, Persistance, Resource Development |
| Authentication | SFA-Workbench Suppression Test | Suspicious Authentication | |
| Api Activity | SFA-AWS CloudTrail Downgrade | Suspicious User Activity | Defense Evasion |
| Api Activity | SFA-AWS Cognito unauthenticated logins enabled | Suspicious User Activity | Discovery |
| Api Activity | SFA-AWS Detector deleted or disabled | Suspicious User Activity | Defense Evasion |
| Api Activity | SFA-AWS ECR Image tags set to mutable | Suspicious User Activity | Persistance |
| Authentication | SFA-AWS Highly Privileged Role Assumption | Suspicious User Activity | Privilege Escatation |
| Api Activity. Api Activity | SFA-AWS Instance Limits Enumerated via Gamelift | Suspicious User Activity | Impact |
| Api Activity | SFA-AWS KMS key detection | Suspicious User Activity | Privilege Escatation |
| Api Activity | SFA-AWS Metal Instance Created | Suspicious User Activity | Persistance |

FIGURE 49 (Cont...)

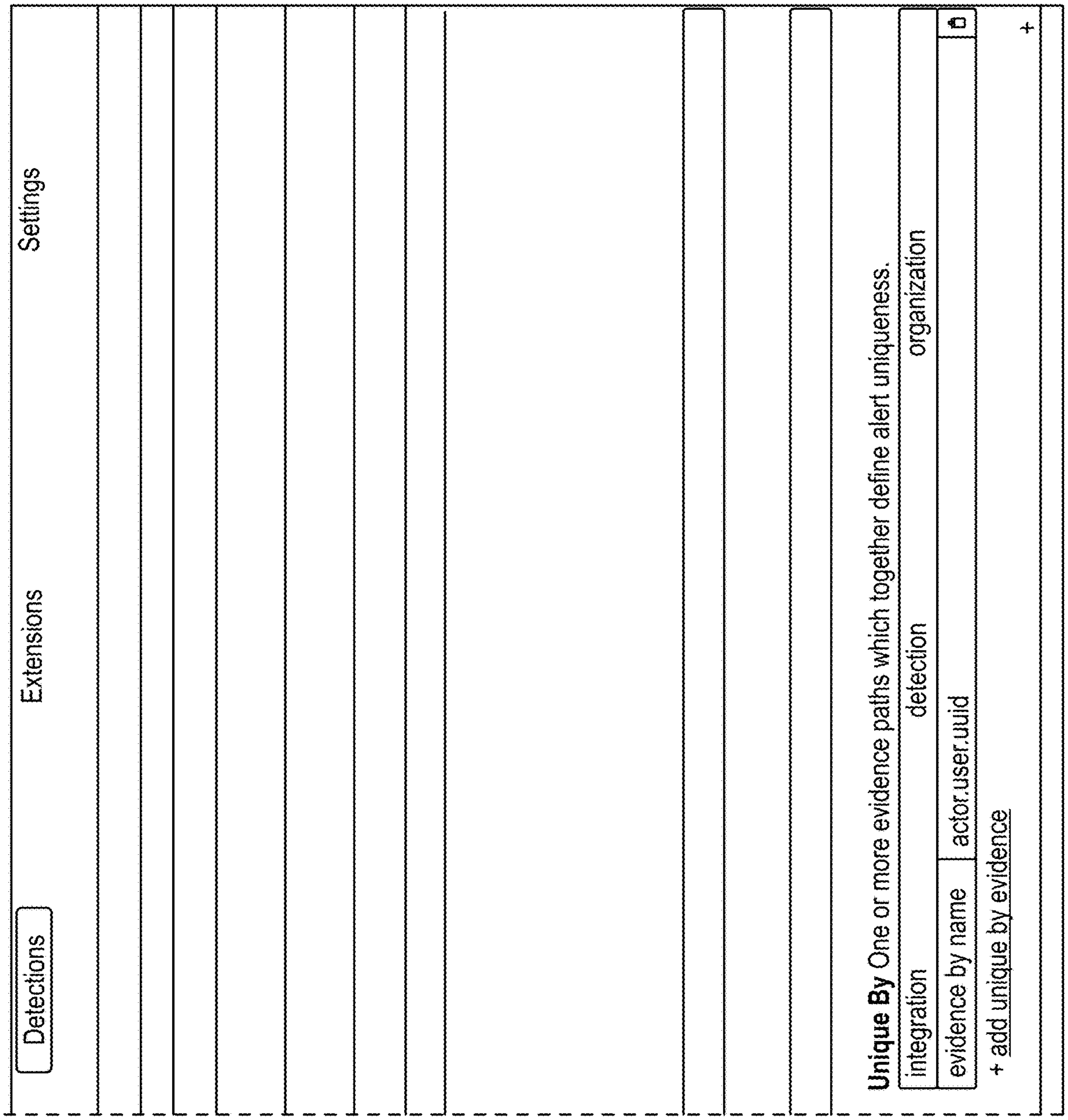
FIGURE 50 (Cont...)

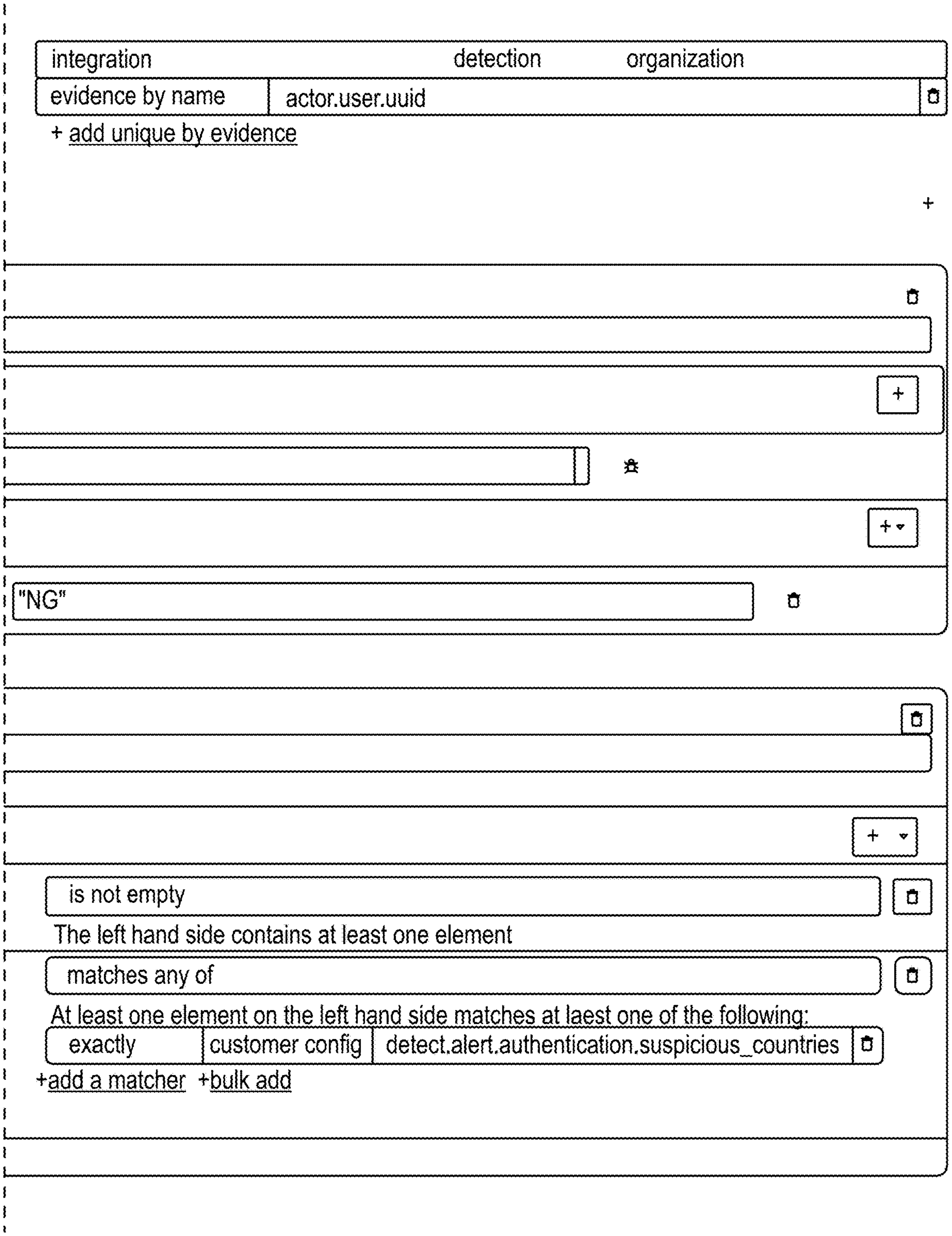
FIGURE 51 (Cont...)

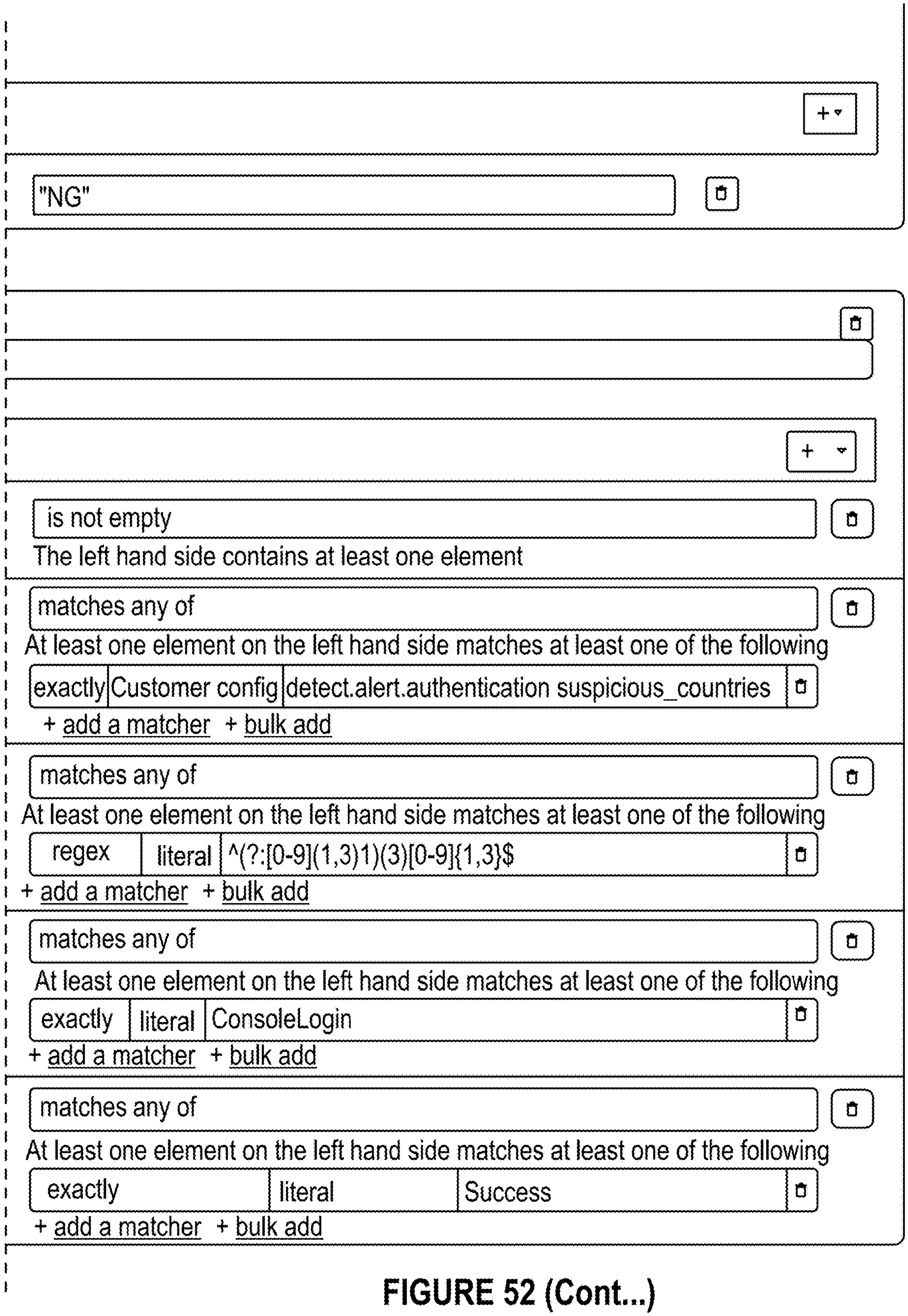
FIGURE 52 (Cont...)

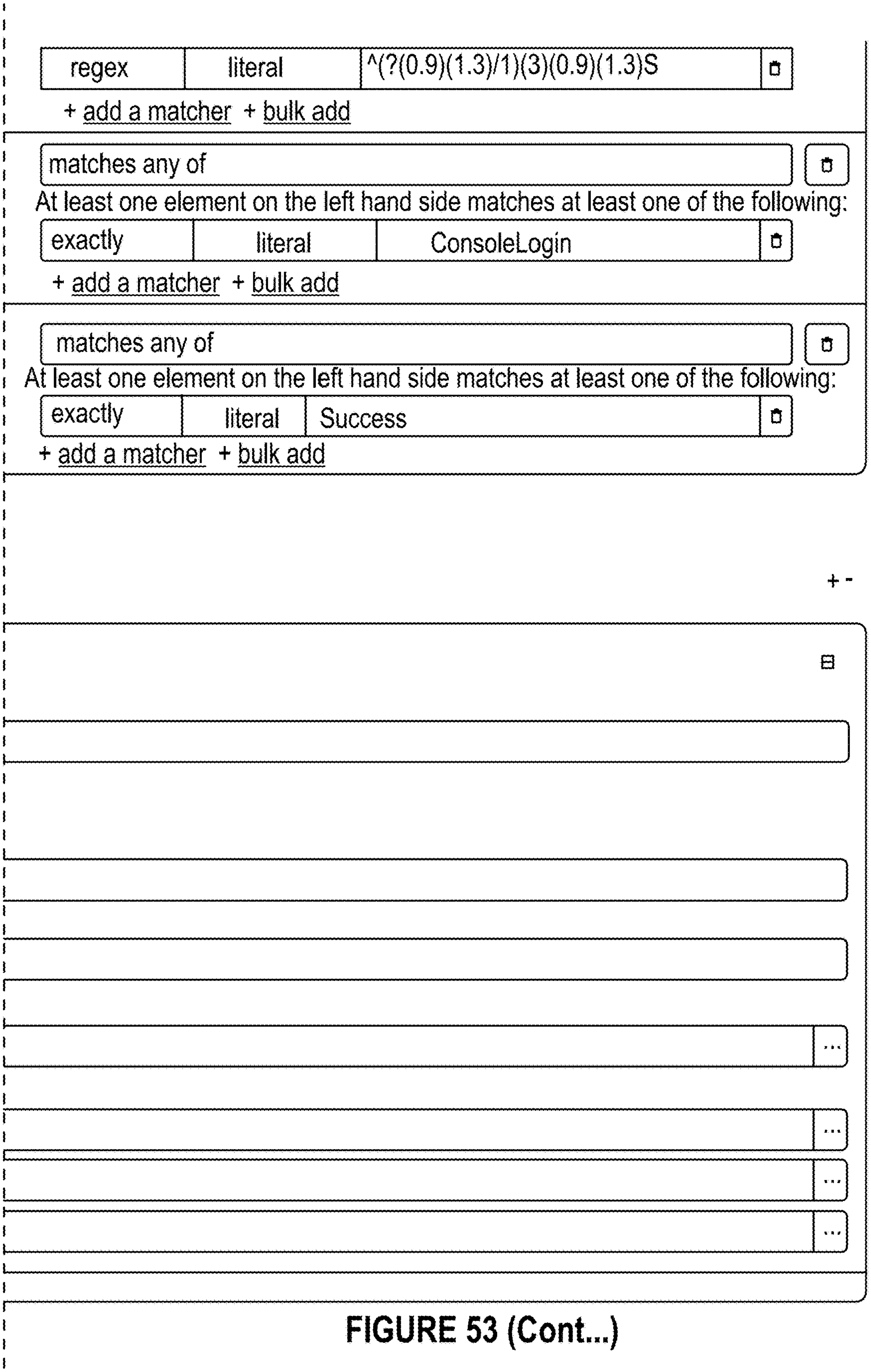
FIGURE 53 (Cont...)

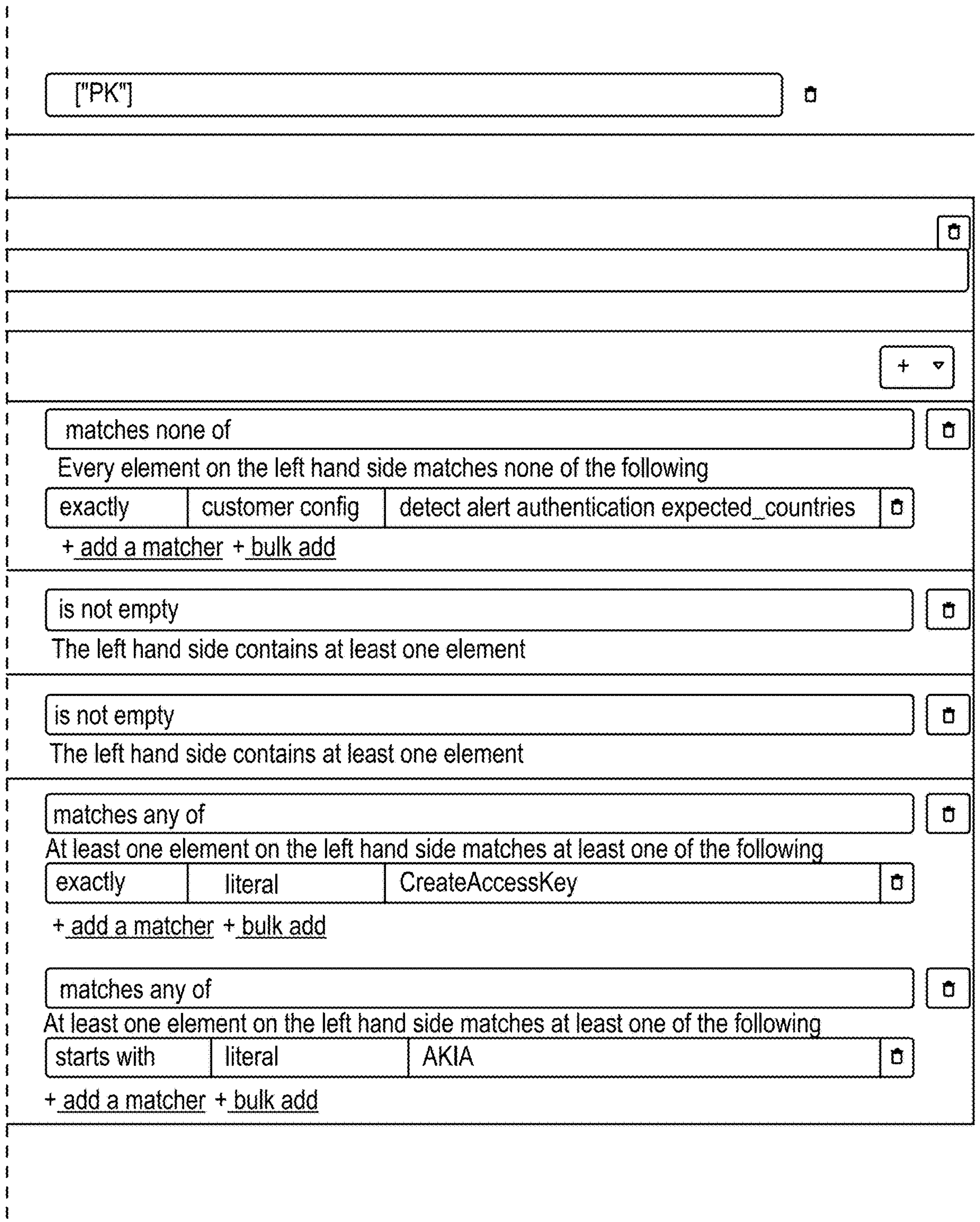
FIGURE 54 (Cont...)

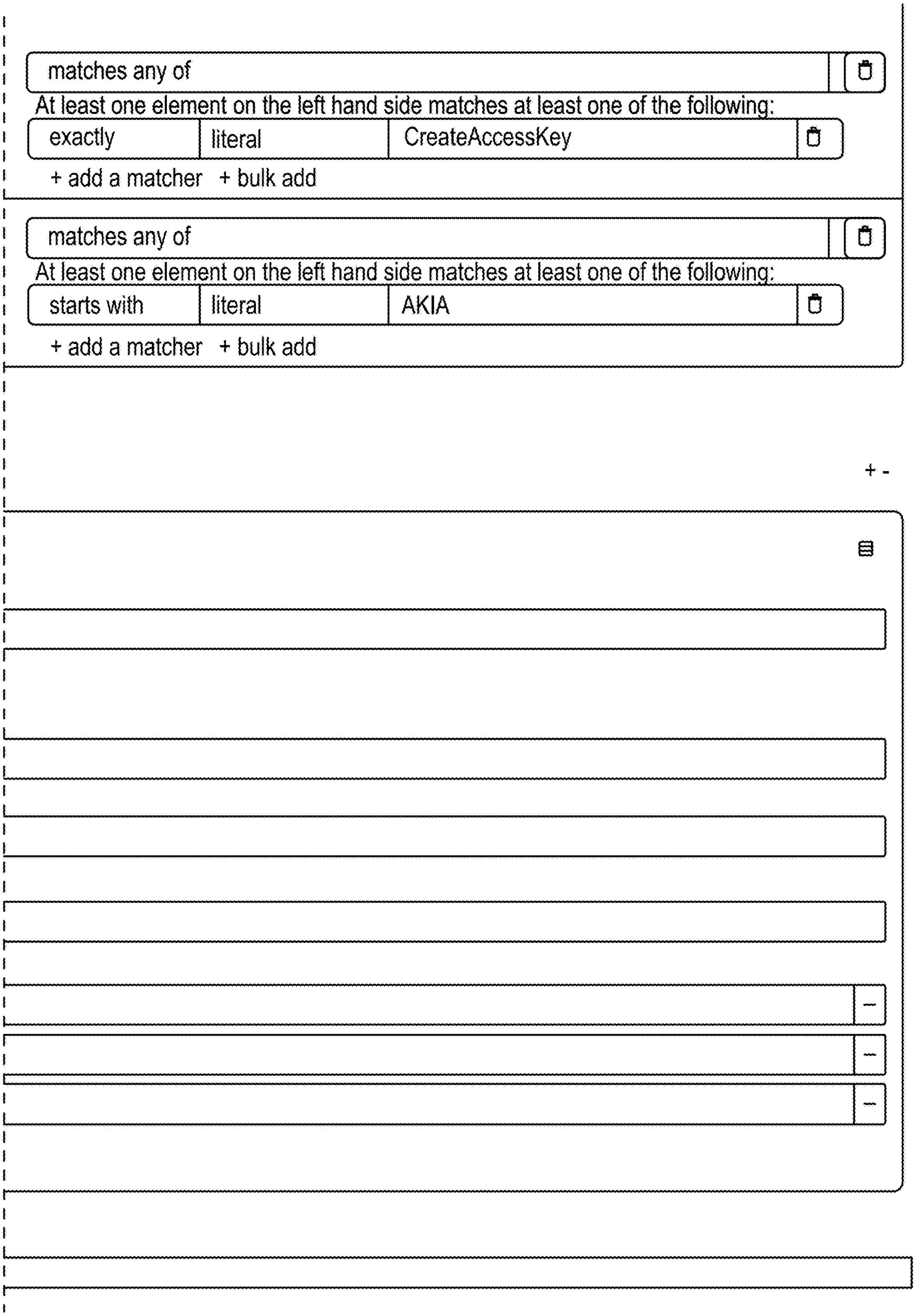
FIGURE 55 (Cont...)

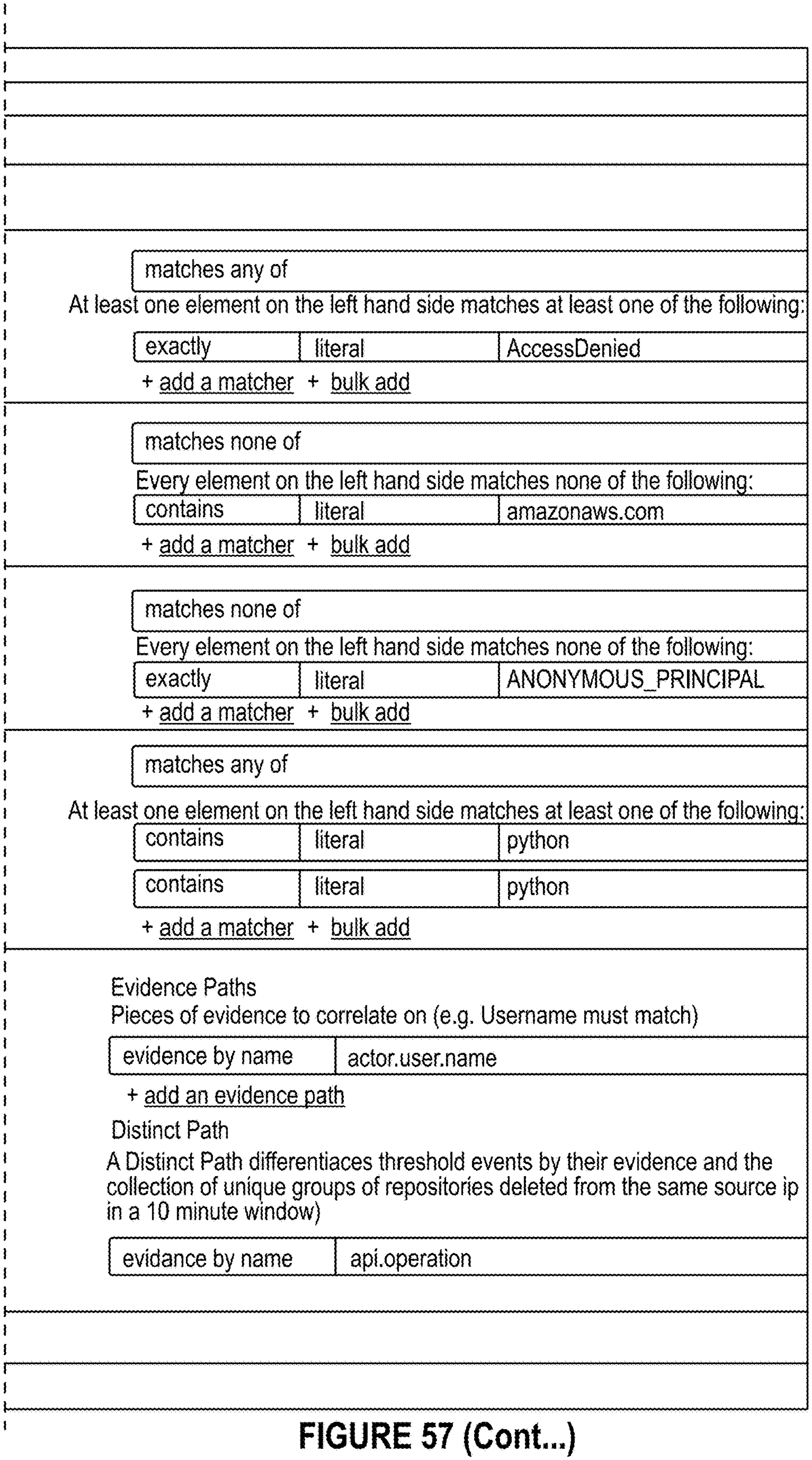
FIGURE 57 (Cont...)

SYSTEMS AND METHODS FOR AUTOMATICALLY CREATING NORMALIZED SECURITY EVENTS IN A CYBERSECURITY THREAT DETECTION AND MITIGATION PLATFORM

CROSS-REFERENCE TO RELATED APPLICATIONS

This application is a continuation of U.S. application Ser. No. 19/054,568, which claims the benefit of U.S. Provisional Application No. 63/555,853, filed 20 Feb. 2024, and is a continuation-in-part of U.S. patent application Ser. No. 18/793,483, filed 2 Aug. 2024, which claims the benefit of U.S. Provisional Application No. 63/533,238, filed 17 Aug. 2023, which are incorporated in their entireties by this reference. U.S. patent application Ser. No. 18/793,483 is a continuation-in-part of U.S. patent application Ser. No. 18/749,222, filed 20 Jun. 2024, which claims the benefit of U.S. Provisional Application No. 63/521,968, filed 20 Jun. 2023, which are incorporated in their entireties by this reference.

TECHNICAL FIELD

This invention relates generally to the cybersecurity field, and more specifically to new and useful cyber threat detection and mitigation systems and methods in the cybersecurity field.

BACKGROUND

Modern computing and organizational security have been evolving to include a variety of security operation services that can often abstract a responsibility for monitoring and detecting threats in computing and organizational resources of an organizational entity to professionally managed security service providers outside of the organizational entity. As many of these organizational entities continue to migrate their computing resources and computing requirements to cloud-based services, the security threats posed by malicious actors appear to grow at an incalculable rate because cloud-based services may be accessed through any suitable Internet or web-based medium or device throughout the world.

Thus, security operation services may be tasked with mirroring the growth of these security threats and correspondingly, scaling their security services to adequately protect the computing and other digital assets of a subscribing organizational entity. However, because the volume of security threats may be great, it may present one or more technical challenges in scaling security operations services without resulting in a number of technical inefficiencies that may prevent or slow down the detection of security threats and efficiently responding to detected security threats.

Thus, there is a need in the cybersecurity field to create improved systems and methods for intelligently scaling threat detection capabilities of a security operations service while improving its technical capabilities to efficiently respond to an increasingly large volume of security threats to computing and organizational computing assets. The embodiments of the present application described herein provide technical solutions that address, at least the need described above.

BRIEF SUMMARY OF THE INVENTION(S)

In one embodiment, a computer-implemented method for accelerating a detection of a cybersecurity threat includes at a cybersecurity service implemented by a network of distributed computers: obtaining, via one or more computers, raw event data from a third-party security device of a subscriber; automatically selecting, via the one or more computers, an automated event ingestion instruction of a plurality of distinct automated event ingestion instructions for processing the raw event data by evaluating one or more characteristics of the raw event data against predetermined event ingestion criteria; automatically generating a pre-normalized security event that includes the raw event data in a first structured data object that is interpretable by the cybersecurity service in response to executing the automated event ingestion instruction, wherein: the pre-normalized security event includes a set of un-normalized evidence data fields extracted from the raw event data, the set of un-normalized evidence data fields extracted from the raw event data are encoded in a data format native to the third-party security device, and each un-normalized evidence data field of the set of un-normalized evidence data fields is paired with a corresponding evidence data value as recorded by the third-party security device; automatically transforming the pre-normalized security event to at least one normalized security event, wherein automatically transforming the pre-normalized security event to the at least one normalized security event includes: obtaining, from a computer database of the cybersecurity service, a set of computer-executable data mapping instructions of a security data integration defined for the third party-security device, extracting, from the pre-normalized security event, the set of un-normalized evidence data fields in response to executing the set of computer-executable data mapping instructions against the pre-normalized security event, converting the set of un-normalized evidence data fields extracted from the pre-normalized security event to a set of normalized evidence data fields native to the cybersecurity service in response to executing the set of computer-executable data mapping instructions against the pre-normalized security event, and generating the at least one normalized security event that includes the set of normalized evidence data fields and the corresponding evidence data value in a second structured data object that is interpretable by the cybersecurity service; automatically assessing, via the one or more computers, a corpus of computer-executable detection instructions against the at least one normalized security event; and generating, via the one or more computers, a security alert based on the at least one normalized security event satisfying a set of alerting conditions of a subject computer-executable detection instruction of the corpus of computer-executable detection instructions; and executing, in real-time or near real-time, a threat mitigation response that mitigates a security threat associated with the security alert.

In one embodiment, the plurality of distinct automated event ingestion instructions includes a first automated event ingestion instruction that is configured to translate the raw event data obtained from the third-party security device to the pre-normalized security event when the raw event data is of a first raw event data type, a second automated event ingestion instruction that is configured to translate the raw event data obtained from the third-party security device to the pre-normalized security event when the raw event data is of a second raw event data type, and a third automated event ingestion instruction that is configured to translate the raw event data obtained from the third-party security device to the pre-normalized security event when the raw event data is of a third raw event data type, wherein the first raw event data type, the second raw event data type, and the third raw event data type are different raw event data types.

In one embodiment, the subject computer-executable detection instruction is constructed using a detection-building graphical user interface, wherein constructing the subject computer-executable detection instruction includes: instantiating, via the one or more computers, the detection-building graphical user interface based on receiving a request from a user, wherein the detection-building graphical user interface includes: a plurality of detection-identifying user interface input elements configured to receive, from the user, one or more strings of text that characterize the subject computer-executable detection instruction, and a set of user interface buttons, that when operated, is configured to control whether the subject computer-executable detection instruction is used for only the subscriber or across all subscribers subscribing to the cybersecurity service.

In one embodiment, the detection-building graphical user interface further includes an automated investigations control button that, when selected, is configured to display a drop-down menu element of a plurality of alert taxonomies, the automated investigations control button is configured to receive a selection, from the user, of one of the plurality of alert taxonomies, and the subject computer-executable detection instruction, when executed, is configured to execute a set of automated investigation workflows digitally mapped to the one of the plurality of alert taxonomies based on receiving the selection of the one of the plurality of alert taxonomies from the user.

In one embodiment, instantiating the detection-building graphical user interface further includes instantiating a detection instruction simulation container on the detection-building graphical user interface based on receiving an input, from the user, selecting a detection simulation addition control button of the detection-building graphical user interface, wherein the detection instruction simulation container is configured to receive, from the user, input of a historical raw event generated by the third-party security device for validating that the subject computer-executable detection instruction is executed correctly in response to normalizing the historical raw event and providing a normalized representation of the historical raw event to the subject computer-executable detection instruction.

In one embodiment, instantiating the detection-building graphical user interface further includes instantiating a detection instruction execution container on the detection-building graphical user interface based on receiving an input, from the user, selecting a detection instruction execution control button of the detection-building graphical user interface, wherein: the detection instruction execution container includes a signal type user interface element that, when selected, displays a drop-down menu element of a plurality of technology source-agnostic event signal types provided by the cybersecurity service, and one or more condition-setting user interface elements being configured to receive inputs of characters that define one or more alert generation conditions that must be satisfied prior to generating the security alert using the subject computer-executable detection instruction.

In one embodiment, instantiating the detection-building graphical user interface further includes instantiating a detection instruction response container on the detection-building graphical user interface based on receiving an input, from the user, selecting a detection instruction response control button of the detection-building graphical user interface, wherein the detection instruction response container includes: a set of user interface input elements configured to receive user input specifying alert attributes, wherein the set of user interface input elements includes: a first user interface input element configured to receive an input of an alert name that is assigned to the security alert when the one or more alert generation conditions are satisfied, a second user interface input element configured to receive an input of a degree of threat severity that is assigned to the security alert when the one or more alert generation conditions are satisfied, and a third user interface input element configured to receive an input of a security threat classification or attack strategy that is assigned to the security alert when the one or more alert generation conditions are satisfied.

In one embodiment, the security data integration is constructed using a data integration building user interface, wherein the data integration building user interface includes: a plurality of integration-identifying user interface input elements configured to receive one or more strings of text for specifying a set of integration identification parameters that characterize the security data integration, a signal-specific data mapping container configured to receive inputs of characters to create the set of computer-executable data mapping instructions by mapping technology-specific data attributes of the third-party security device to technology source-agnostic data attributes required by a target technology source-agnostic event signal type; and a raw event simulation container configured to receive input of: a historical raw event generated by the third-party security device, and an expected technology source-agnostic event signal type for validating that the security data integration accurately translates the historical raw event to a corresponding normalized security event of the expected technology source-agnostic event signal type using the set of computer-executable data mapping instructions specified by the signal-specific data mapping container.

In one embodiment, the computer-implemented method further includes installing, via the one or more computers, the set of computer-executable data mapping instructions of the security data integration into the computer database of the cybersecurity service in response to receiving an input from a user selecting an integration deployment control element displayed on the data integration building user interface.

In one embodiment, the signal-specific data mapping container includes a signal type user interface element that, when operated, displays a drop-down menu element of a plurality of predetermined technology source-agnostic event signal types provided by the cybersecurity service, and the computer-implemented method further includes: dynamically instantiating, within the signal-specific data mapping container, a plurality of source-to-target data mapping user interface elements based on receiving a selection of the target technology source-agnostic event signal type from the drop-down menu element of the plurality of predetermined technology source-agnostic event signal types.

In one embodiment, each distinct source-to-target data mapping user interface element of the plurality of source-to-target data mapping user interface elements includes: a target data attribute user interface element that indicates a technology source-agnostic data attribute required by the target technology source-agnostic event signal type, and a source data attribute user interface input element configured to receive an input of a technology-specific data attribute of the third-party security device that corresponds to the technology source-agnostic data attribute.

In one embodiment, in response to providing the raw event simulation container with the historical raw event, automatically executing a computer-based simulation that outputs an indication on whether the security data integration accurately translates the historical raw event to the corresponding normalized security event of the expected technology source-agnostic event signal type using the set of computer-executable data mapping instructions specified by the signal-specific data mapping container.

In one embodiment, the signal-specific data mapping container includes a signal type user interface element that, when selected, displays a drop-down menu element of a plurality of technology source-agnostic event signal types provided by the cybersecurity service, the signal-specific data mapping container further includes a version-controlled user interface element that, when selected, displays a drop-down menu element of a plurality of distinct signal versions that correspond to a respective technology source-agnostic event signal type.

In one embodiment, the computer-implemented method further includes: receiving, from a user, a selection of the target technology source-agnostic event signal type from the drop-down menu element of the plurality of technology source-agnostic event signal types; receiving, from the user, a selection of a target signal version of the target technology source-agnostic event signal type from the drop-down menu element of the plurality of distinct signal versions; and dynamically instantiating, within the signal-specific data mapping container, a plurality of source-to-target data mapping user interface elements that corresponds to the selection of the target technology source-agnostic event signal type and the selection of the target signal version of the target technology source-agnostic event signal type.

In one embodiment, the computer-implemented method further includes: obtaining, from one or more data sources external to the cybersecurity service, one or more additional pieces of evidence based on metadata extracted from the raw event data, wherein: the one or more additional pieces of evidence were absent or not included in the raw event data, and the pre-normalized security event and the at least one normalized security event further includes the one or more additional pieces of evidence.

In one embodiment, the raw event data includes a network host of the subscriber, the security alert includes the network host, and executing the threat mitigation response that mitigates the security threat associated with the security alert includes automatically terminating existing network connections on the network host and preventing new network connections from digitally communicating with the network host of the subscriber in response to detecting the network host of the subscriber as compromised.

In one embodiment, the raw event data includes a user account of the subscriber, the security alert includes the user account, and executing the threat mitigation response that mitigates the security threat associated with the security alert includes automatically disabling the user account to temporarily prevent or permanently prevent unauthorized access to a target environment of the subscriber in response to detecting the user account of the subscriber as compromised.

In one embodiment, the raw event data relates to a cloud computing environment of the subscriber, the security alert includes information associated with the cloud computing environment, and executing the threat mitigation response that mitigates the security threat associated with the security alert includes automatically terminating the cloud computing environment of the target subscriber to automatically suspend or automatically cease digital events from occurring on the cloud computing environment of the subscriber in response to detecting the cloud computing environment of the subscriber as compromised.

In one embodiment, the raw event data includes a cloud access key of the subscriber, the security alert includes the cloud access key, and executing the threat mitigation response that mitigates the security threat associated with the security alert includes automatically disabling or automatically modifying the cloud access key of the subscriber in response to detecting the cloud access key of the subscriber as compromised.

In one embodiment, the raw event data indicates that an application with a respective hash signature was executed, the security alert includes the information associated with the application and the respective hash signature, and executing the threat mitigation response that mitigates the security threat associated with the security alert includes automatically blocking the respective hash signature to prevent the application associated with the respective hash signature from being re-executed in a digital environment of the subscriber in response to detecting the respective hash signature as malicious.

In one embodiment, each distinct normalized security event of the at least one normalized security event corresponds to a same technology source-agnostic event signal type, the same technology source-agnostic event signal type is associated with a plurality of distinct signal versions, each distinct signal version of the plurality of signal versions of the same technology source-agnostic event signal type defines a distinct schema or data structure for transforming the pre-normalized security event to a respective normalized security event of the same technology source-agnostic event signal type, and automatically transforming the pre-normalized security event to the at least one normalized security event includes generating a distinct normalized security event for each signal version of the plurality of signal versions digitally mapped to the same technology source-agnostic event signal type.

In one embodiment, the at least one normalized security event includes a plurality of normalized security events that corresponds to a plurality of distinct signal versions of the same technology source-agnostic event signal type, each distinct normalized security event of the at least one normalized security event is assessed against the corpus of computer-executable detection instructions, a first subset of the plurality of normalized security events does not satisfy any alerting conditions specified by any computer-executable detection instruction of the corpus of computer-executable detection instructions, a second subset of the plurality of normalized security events satisfies the set of alerting conditions of the subject computer-executable detection instruction of the corpus of computer-executable detection instructions, and in response to determining that the second subset of the plurality of normalized security events satisfies the set of alerting conditions of the subject computer-executable detection, generating the security alert based on the second subset of the plurality of distinct normalized security events.

In one embodiment, the at least one normalized security event includes a plurality of normalized security events of a plurality of distinct signal versions of the same technology source-agnostic event signal type, each distinct normalized security event of the plurality of normalized security events is assessed against the corpus of computer-executable detection instructions to determine whether a respective normalized security event satisfies any alerting conditions specified by any computer-executable detection instruction of the corpus of computer-executable detection instructions, generating the security alert is further based on identifying that at least a predetermined number of normalized security events of the plurality of normalized security events satisfies the alerting conditions of the corpus of computer-executable detection instructions.

In one embodiment, the at least one normalized security event includes a plurality of normalized security events of a plurality of distinct signal versions of the same technology source-agnostic event signal type, each distinct normalized security event of the plurality of normalized security events is assessed against the corpus of computer-executable detection instructions to determine whether a respective normalized security event satisfies any alerting conditions specified by any computer-executable detection instruction of the corpus of computer-executable detection instructions, and generating the security alert is further based on: determining a total count of normalized security events of the plurality of normalized security events that satisfy the alerting conditions associated with the corpus of computer-executable detection instructions, and generating the security alert only if the total count meets or exceeds a predetermined minimum count threshold value.

In one embodiment, the predetermined minimum count threshold value is dynamically adjustable based on the total number of security alerts received by the cybersecurity service in the past hour, the predetermined minimum count threshold value increases if the total number of security alerts received in the past hour exceeds a predefined alert volume threshold, and the predetermined minimum count threshold value decreases if the total number of security alerts received in the past hour is below the predefined alert volume threshold.

In one embodiment, the computer-implemented method further includes detecting, via the one or more computers, an event creation error when executing the set of computer-executable data mapping instructions of the security data integration against the pre-normalized security event to transform the pre-normalized security event into the at least one normalized security event of a current signal version of a target technology source-agnostic event signal type; in response to detecting the event creation error, re-executing the set of computer-executable data mapping instructions against the pre-normalized security event to transform the pre-normalized security event into the at least one normalized security event of a previous signal version of the target technology source-agnostic event signal type, wherein the re-execution successfully generates the at least one normalized security event based on using the previous signal version of the target technology source-agnostic event signal type.

In one embodiment, the computer-implemented method further includes detecting, via the one or more computers, an event creation error when executing the set of computer-executable data mapping instructions of the security data integration against the pre-normalized security event to transform the pre-normalized security event into the at least one normalized security event of a current signal version of a target technology source-agnostic event signal type; in response to detecting the event creation error, iteratively re-executing the set of computer-executable data mapping instructions against the pre-normalized security event using the most recent previous signal version of the target technology source-agnostic event signal type preceding the current signal version of the target technology source-agnostic event signal type until the transformation of the pre-normalized security event to the at least one normalized security event of the target technology source-agnostic event signal type is successful; and the at least one normalized security event is generated based on the first successfully executed previous signal version of the target technology source-agnostic event signal type.

In one embodiment, the computer-implemented method further includes detecting, via the one or more computers, an event creation error when executing the set of computer-executable data mapping instructions of the security data integration against the pre-normalized security event to transform the pre-normalized security event into the at least one normalized security event of a current signal version of a target technology source-agnostic event signal type; in response to detecting the event creation error, sequentially re-executing the set of computer-executable data mapping instructions against the pre-normalized security event using progressively earlier signal versions of the target technology source-agnostic event signal type until the pre-normalized security event is successfully transformed to the at least one normalized security event of the target technology source-agnostic event signal type; and the at least one normalized security event is generated based on the earliest previous signal of the target technology source-agnostic event signal type that executes successfully without error.

In one embodiment, a computer-program product comprising a non-transitory machine-readable storage medium storing computer instructions that, when executed by one or more processors, perform operations comprising: at a cybersecurity service implemented by a network of distributed computers: obtaining, via one or more computers, raw event data from a third-party security device of a subscriber; automatically selecting, via the one or more computers, an automated event ingestion instruction of a plurality of distinct automated event ingestion instructions for processing the raw event data by evaluating one or more characteristics of the raw event data against predetermined event ingestion criteria; automatically generating a pre-normalized security event that includes the raw event data in a first structured data object that is interpretable by the cybersecurity service in response to executing the automated event ingestion instruction, wherein: the pre-normalized security event includes a set of un-normalized evidence data fields extracted from the raw event data, the set of un-normalized evidence data fields extracted from the raw event data are encoded in a data format native to the third-party security device, and each un-normalized evidence data field of the set of un-normalized evidence data fields is paired with a corresponding evidence data value as recorded by the third-party security device; automatically transforming the pre-normalized security event to at least one normalized security event, wherein automatically transforming the pre-normalized security event to the at least one normalized security event includes: obtaining, from a computer database of the cybersecurity service, a set of computer-executable data mapping instructions of a security data integration defined for the third party-security device, extracting, from the pre-normalized security event, the set of un-normalized evidence data fields in response to executing the set of computer-executable data mapping instructions against the pre-normalized security event, converting the set of un-normalized evidence data fields extracted from the pre-normalized security event to a set of normalized evidence data fields native to the cybersecurity service in response to executing the set of computer-executable data mapping instructions against the pre-normalized security event, and generating the at least one normalized security event that includes the set of normalized evidence data fields and the corresponding evidence data value in a second structured data object that is interpretable by the cybersecurity service; automatically assessing, via the one or more computers, a corpus of computer-executable detection instructions against the at least one normalized security event; and generating, via the one or more computers, a security alert based on the at least one normalized security event satisfying a set of alerting conditions of a subject computer-executable detection instruction of the corpus of computer-executable detection instructions; and executing, in real-time or near real-time, a threat mitigation response that mitigates a security threat associated with the security alert.

BRIEF DESCRIPTION OF THE FIGURES

FIGS. 10-39 illustrate example graphical user interfaces for constructing and deploying a data integration within a web-accessible integration platform, according to some embodiments of the present application;

DESCRIPTION OF THE PREFERRED EMBODIMENTS

Figure 1:
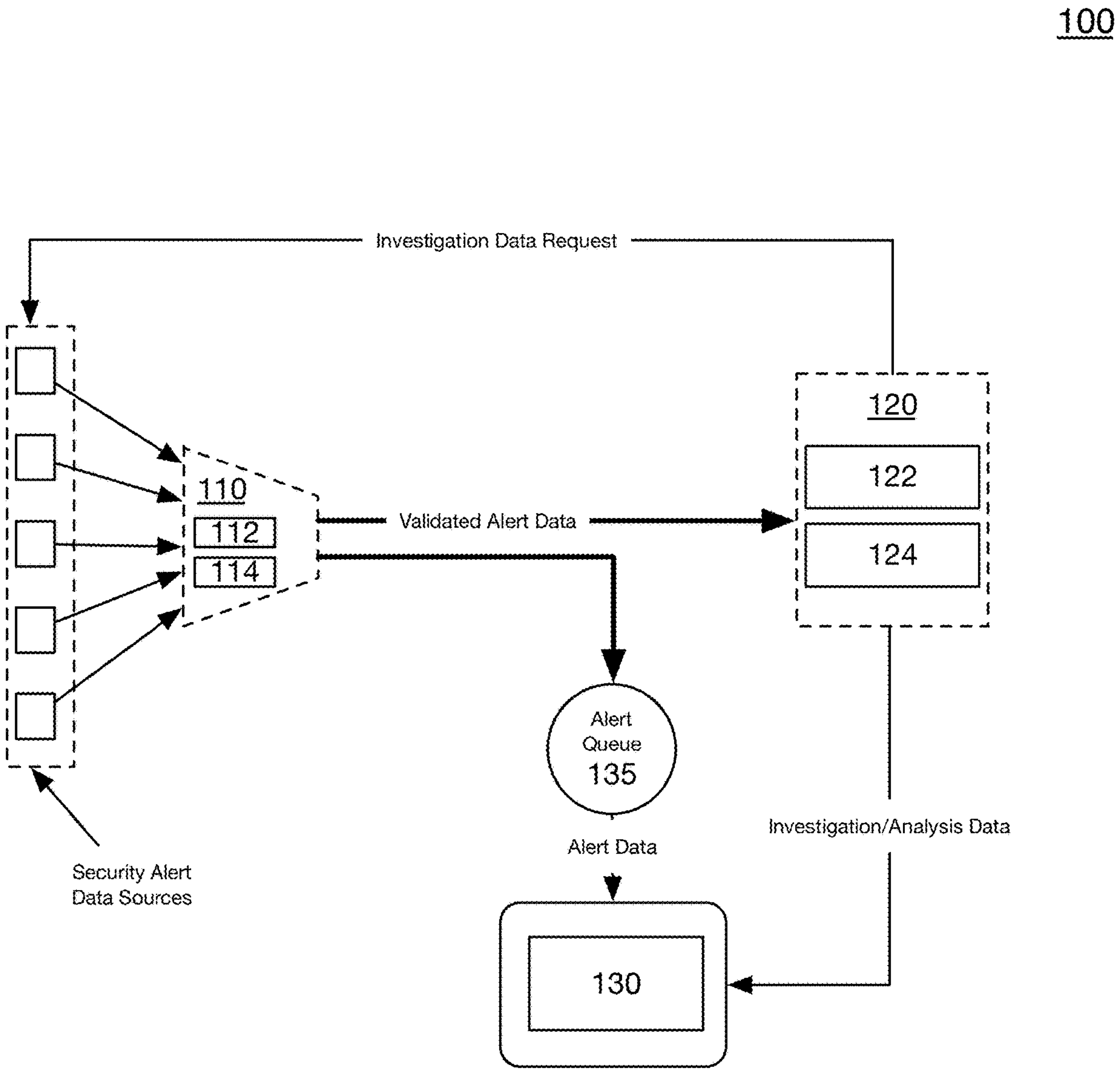
FIG. 1 illustrates a schematic representation of a system 100 in accordance with one or more embodiments of the present application.

The following description of the preferred embodiments of the inventions are not intended to limit the inventions to these preferred embodiments, but rather to enable any person skilled in the art to make and use these inventions.

The systems, methods, and embodiments described herein may be used in a variety of technology areas where security threats pose significant risks to computing infrastructure, data integrity, and operational continuity. This includes, but is not limited to, cloud computing, big data analytics, high-performance computing environments, Internet of Things (IoT) infrastructure, distributed computing systems, and any other suitable system, service or application that requires security threats to be identified and mitigated in real-time or near real-time.

Furthermore, as described in more detail herein, the systems, methods, and embodiments may intelligently detect and respond to security threats involving one or more computing or digital assets of a subscriber in real-time or near real-time. Using such systems, methods, and embodiments may provide many technical benefits and advantages.

For instance, the systems, methods, and embodiments described herein, may obtain raw event data from a third-party security device, third-party security service, or third-party application, automatically select a single automated event ingestion instruction of a plurality of distinct automated event ingestion instructions based on one or more characteristics of the raw event data, and execute the selected automated event ingestion instruction to generate a pre-normalized security event. By intelligently selecting the most appropriate automated event ingestion instruction of the plurality of distinct automated event ingestion instructions, the systems, methods, and embodiments may eliminate redundant processing of the raw event data and avoid unnecessary execution of computer instructions that do not apply to the raw event data. Accordingly, at least one technical advantage of such systems, methods, and embodiments may reduce the amount of compute resources (e.g., central processing units, memory, etc.) and compute time needed to generate the pre-normalized security event as only the most relevant automated event ingestion instruction of the plurality of distinct automated event ingestion instructions is executed.

The systems, methods, and embodiments described herein may further function to transform the pre-normalized security event to at least one normalized security event by executing a set of computer-executable data mapping instructions against the pre-normalized security event. To create the at least one normalized security event, in some of the systems, methods, and embodiments described herein, the set of computer-executable data mapping instructions may only extract a subset of evidence data and/or evidence data fields (e.g., the subset is less than the total number of available evidence data fields and available evidence data within the raw event data and/or the pre-normalized security event) from the pre-normalized security event that is required for downstream threat assessment and detection. By creating the at least one normalized security event with only the necessary subset of evidence data and evidence data fields, the systems, methods, and embodiments described herein may reduce unnecessary data mappings, data processing, optimize memory and storage usage, and improve computational efficiency. Furthermore, because the normalized security event may include a reduced subset of evidence data, the systems, methods, and embodiments may assess the normalized security event faster and subsequently execute a threat mitigation action more quickly to mitigate detected security threats in real-time or near real-time, minimizing potential damage to the subscriber and reducing threat response latency.

Additionally, in some of the systems, methods, and embodiments described herein, the systems, methods, and embodiments may further function to execute (e.g., in real-time or near real-time) a threat mitigation response that mitigates a security threat associated with a security alert. In such systems, methods, and embodiments, the threat mitigation response may be automatically identified based on one or more characteristics of the security alert and/or the type of compromised asset. By executing targeted threat mitigation actions (e.g., automated threat mitigation actions, semi-automated threat mitigation actions, etc.) based on a detected security threat, the systems, methods, and embodiments may ensure rapid containment, reduce the potential impact of security breaches, and prevent further propagation of the detected security threat by minimizing the window of opportunity for threat actors to exploit.

Additionally, in some of the systems, methods, and embodiments described herein, the systems, methods, and embodiments may further function to monitor, investigate, or report security threats in real-time via a user interface that is accessible to a subscribing entity. By continuously analyzing security event data and correlating detected security threats, the systems, methods, and embodiments may provide real-time visibility into potential security incidents, enabling proactive threat management. The user interface, in some of the systems, methods, and embodiments, may display detailed threat intelligence data, including alert severity, affected assets, and recommended mitigation actions, allowing security teams to quickly assess and respond to emerging threats.

Additionally, in some of the systems, methods, and embodiments described herein, the systems, methods, and embodiments may further function to perform automated investigations to assess whether a generated security alert represents a true security threat. In such systems, methods, and embodiments, an automated investigation workflow may be selected and executed based on a classification of the security alert, wherein each automated investigation workflow executes a predefined sequence of investigative tasks designed to gather additional security intelligence data relevant to the specific alert type (e.g., alert classification or the like). Such automated investigative tasks may include automatically generating API calls to external security data sources (e.g., third-party security services, third-party security applications, third-party security devices, etc.), querying internal security logs, cross-referencing threat intelligence feeds, and/or extracting relevant evidence from historical event data. By automatically executing such tasks, the systems, methods, and embodiments may create a corpus of investigative data, which may then be manually or automatically assessed to determine whether the security alert constitutes a legitimate cybersecurity threat. Such systems, methods, and embodiments may increase accuracy, reduce the time required for threat validation, minimize manual intervention, and enable real-time or near real-time assessment and mitigation of security threats.

1. System for Remote Cyber Security Operations & Automated Investigations

As shown in FIG. 1, a system 100 for implementing remote cybersecurity operations includes a security alert engine 110, an automated security investigations engine 120, and a security threat mitigation user interface 130. The system 100 may sometimes be referred to herein as a cybersecurity threat detection and threat mitigation system 100 or a cybersecurity event detection and response service.

The system 100 may function to enable real-time cybersecurity threat detection, agile, and intelligent threat response for mitigating detected security threats. It shall be recognized that, in one or more embodiments, the cybersecurity service may be implemented by a network of distributed computers.

1.1 Security Alert Engine

The security alert aggregation and identification module 110, sometimes referred to herein as the "security alert engine 110" may be in operable communication with a plurality of distinct sources of cyber security alert data. In one or more embodiments, the module 110 may be implemented by an alert application programming interface (API) that may be programmatically integrated with one or more APIs of the plurality of distinct sources of cyber security alert data and/or native APIs of a subscriber to a security service implementing the system 100.

In one or more embodiments, the security alert engine 110 may include a security threat detection logic module 112 that may function to assess inbound security alert data using predetermined security detection logic that may validate or substantiate a subset of the inbound alerts as security threats requiring an escalation, an investigation, and/or a threat mitigation response by the system 100 and/or by a subscriber to the system 100.

Additionally, or alternatively, the security alert engine 100 may function as a normalization layer for inbound security alerts from the plurality of distinct sources of security alert data by normalizing all alerts into a predetermined alert format.

1.1.1 Security Alert Machine Learning Classifier

Optionally, or additionally, the security alert engine 110 may include a security alert machine learning system 114 that may function to classify inbound security alerts as validated or not validated security alerts, as described in more detail herein.

The security alert machine learning system 114 may implement a single machine learning algorithm or an ensemble of machine learning algorithms. Additionally, the security alert machine learning system 114 may be implemented by the one or more computing servers, computer processors, and the like of the artificial intelligence virtual assistance platform 110.

The machine learning models and/or the ensemble of machine learning models of the security alert machine learning system 114 may employ any suitable machine learning including one or more of: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and any other suitable learning style. Each module of the plurality can implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and any suitable form of machine learning algorithm. Each processing portion of the system 100 can additionally or alternatively leverage: a probabilistic module, heuristic module, deterministic module, or any other suitable module leveraging any other suitable computation method, machine learning method or combination thereof. However, any suitable machine learning approach can otherwise be incorporated in the system 100. Further, any suitable model (e.g., machine learning, non-machine learning, etc.) may be used in implementing the security alert machine learning system 114 and/or other components of the system 100.

1.2 Automated Investigations Engine

The automated security investigations engine 120, which may be sometimes referred to herein as the "investigations engine 120", preferably functions to automatically perform investigative tasks for addressing a security task and/or additionally, resolve a security alert. In one or more embodiments, the investigations engine 120 may function to automatically resolve a security alert based on results of the investigative tasks.

In one or more embodiments, the investigations engine 120 may include an automated investigation workflows module 122 comprising a plurality of distinct automated investigation workflows that may be specifically configured for handling distinct security alert types or distinct security events. Each of the automated investigation workflows preferably includes a sequence of distinct investigative and/or security data production tasks that may support decisioning on or a disposal of a validated security alert. In one or more embodiments, the investigations engine 120 may function to select or activate a given automated investigation workflow from among the plurality of distinct automated investigation workflows based on an input of one or more of validated security alert data and a security alert classification label.

Additionally, or alternatively, the investigations engine 120 may include an investigations instructions repository 124 that includes a plurality of distinct investigation instructions/scripts or investigation rules that inform or define specific investigation actions and security data production actions for resolving and/or addressing a given validated security alert. In one or more embodiments, the investigations instructions repository 124 may be dynamically updated to include additional or to remove one or more of the plurality of distinct investigation instructions/scripts or investigation rules.

1.3 Security Threat Mitigation User Interface

The security mitigation user interface 130 (e.g., Workbench) may function to enable an analyst or an administrator to perform, in a parallel manner, monitoring, investigations, and reporting of security incidents and resolutions to subscribers to the system 100 and/or service implementing the system 100. In some embodiments, an operation of the security user interface 130 may be transparently accessible to subscribers, such that one or more actions in monitoring, investigation, and reporting security threats or security incidents may be surfaced in real-time to a user interface accessible to a subscribing entity.

Accordingly, in or more embodiments, a system user (e.g., an analyst) or an administrator implementing the security mitigation user interface 130 may function to make requests for investigation data, make requests for automated investigations to the automated investigations engine 120, obtain security incident status data, observe or update configuration data for automated investigations, generate investigation reports, and/or interface with any component of the system 100 as well as interface with one or more systems of a subscriber.

Additionally, or alternatively, in one or more embodiments, the security mitigation user interface 130 may include and/or may be in digital communication with a security alert queue 135 that stores and prioritizes validated security alerts.

2. Method for Automatically Creating Normalized Security Events

Figure 2:
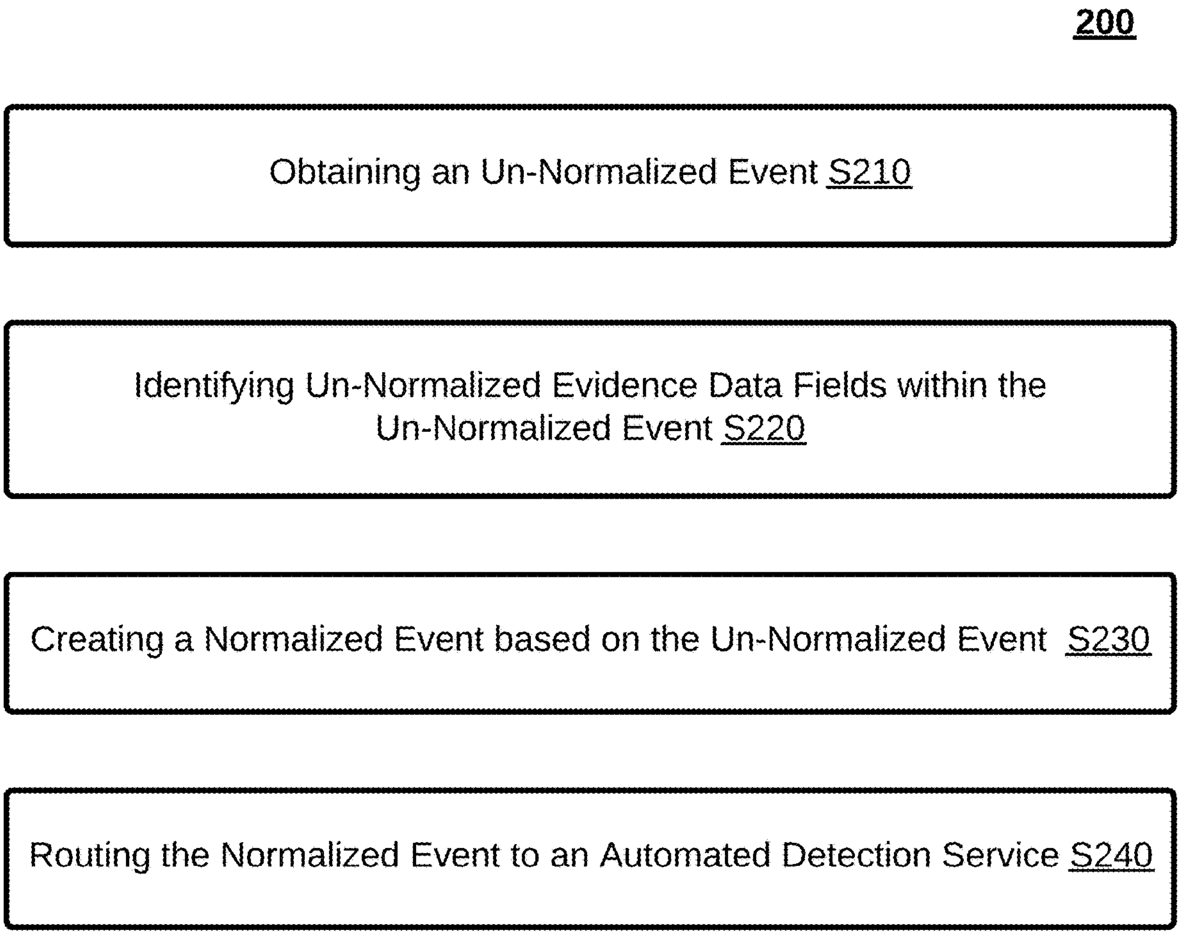
FIG. 2 illustrates an example method 200 in accordance with one or more embodiments of the present application.

As shown in FIG. 2, a method 200 for automatically creating normalized events in a cybersecurity threat detection and mitigation platform may include obtaining an un-normalized event S210, identifying un-normalized evidence data fields within the un-normalized event S220, creating a normalized event based on the un-normalized event S230, and routing the normalized event to an automated detection service S240.

Additionally, in one or more embodiments, a system or service implementing method 200 may function to instantiate a detection-building graphical user interface to enables users to construct and deploy one or more computer-executable detection instructions. Furthermore, in one or more embodiments, the system or service implementing method 200 may function to instantiate a data integration building user interface to enable users to construct and deploy one or more security data integrations.

2.10 Obtaining Un-Normalized Events

S210, which includes obtaining un-normalized events, may function to collect or receive un-normalized events from one or more technology data sources in operable communication with a system or service implementing method 200. A technology data source, as generally referred to herein, preferably relates to a third-party security device, a third-party security service, a third-party security application, and/or the like that may be implemented by and/or provided as a service to a target subscriber of the system or service implementing method 200 (i.e., the cybersecurity event detection and response service). It shall be recognized that the phrase "un-normalized events" may also be referred to herein as "raw security events", "raw event data", "un-normalized security events" or the like.

In one or more embodiments, each subscriber to the cybersecurity event detection and response service may function to digitally connect (or register) one or more security devices to the cybersecurity event detection and response service as part of a subscriber onboarding or enrollment process. In such embodiments, a subject subscriber may use a web-based user interface (of the cybersecurity event detection and response service) to digitally connect one or more target security devices (e.g., third-party security devices or the like) used by the subject subscriber. For instance, in a non-limiting example, the web-based user interface may include one or more user interface objects that may provide a capability for a subject subscriber to intelligently connect one or more security devices such as, but not limited to, 1Password®, Active Directory®, Apex One®, Amiss®, Autho®, Avi Vantage®, Blowhorn Playground®, Check Point®, Cisco ASA®, Cisco Umbrella®, Cloudflare®, Kubernetes®, Crowdstrike™, Microsoft Advanced Threat Protection™, SentinelOne®, Carbon Black Cloud™, Palo Alto XDR™, Office365™, Okta™, Amazon Web Services™, and/or the like.

Accordingly, in such embodiments, based on or in response to digitally connecting one or more security devices of a subject subscriber to the cybersecurity event detection and response service, the cybersecurity event detection and response service may be configured to automatically obtain, source and/or collect, from the one or more security devices, un-normalized events (i.e., raw logs, raw event data, raw events, raw alerts, raw security alerts, raw security events, etc.) that correspond to the subject subscriber. The un-normalized events obtained, sourced and/or collected by S210 may involve one or more digital assets, one or more computing assets, one or more computing resources, one or more computer network resources, one or more cloud-based resources, one or more data resources, and/or one or more computer accessible digital entities or devices of the subject subscriber. That is, in some embodiments, the un-normalized events obtained by S210 may relate to third-party alerts, third-party events, event logs, security policy alerts, and/or activity occurring at, within, and/or involving internal computing networks or computing assets of the subject subscriber.

Stated another way, in one or more embodiments, S210 may function to obtain a plurality of un-normalized events (i.e., raw event data, raw events or the like) from one or more security devices of a subject subscriber in real-time or near real-time. For instance, in a non-limiting example, S210 may function to obtain a first plurality of un-normalized events (i.e., raw events or the like) from a cloud-based security device that may be configured to protect cloud-based infrastructure of the subject subscriber, as shown generally by way of example in FIG. 3.

Figure 3:
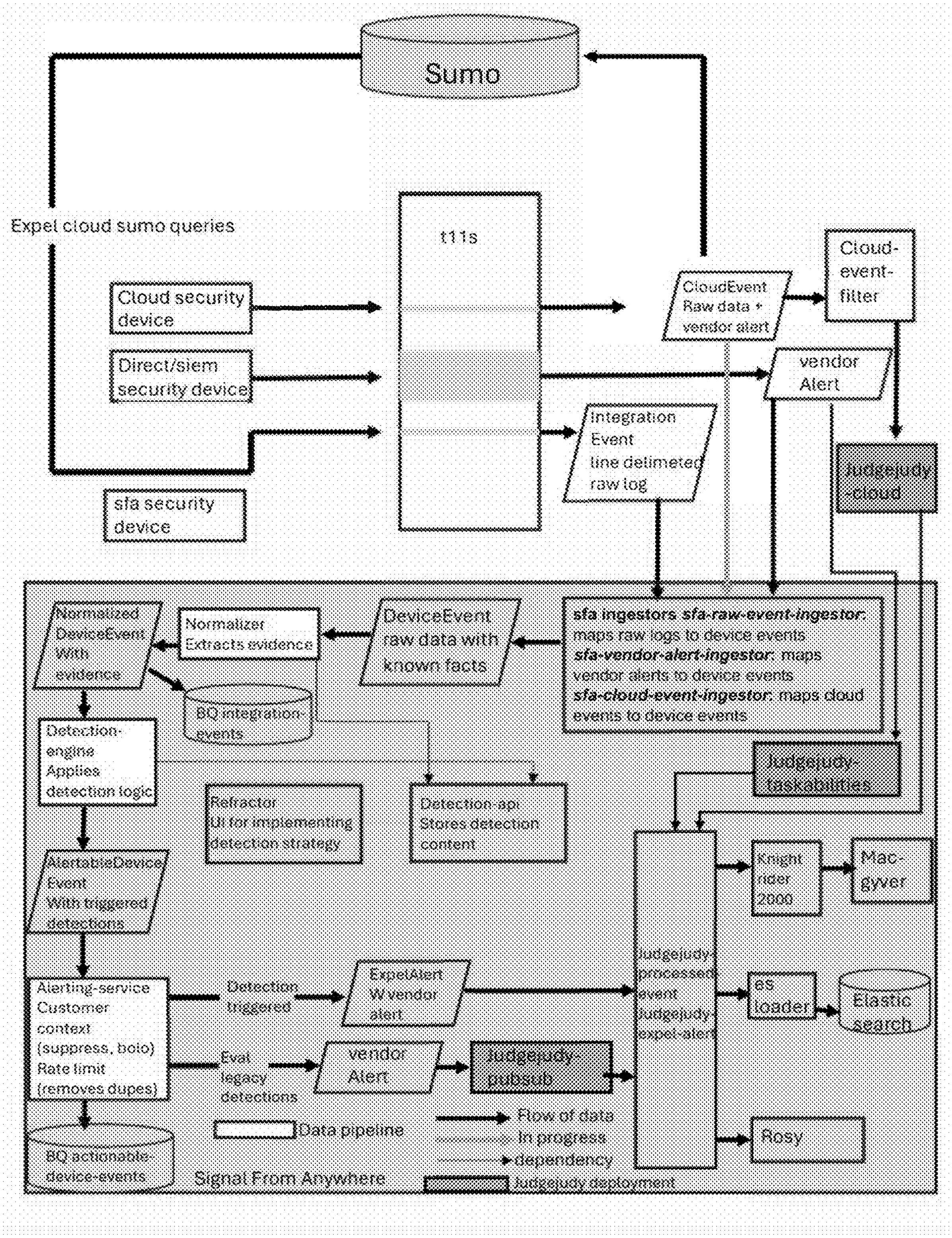
FIG. 3 illustrates an example schematic of a system or service implementing method 200 in accordance with one or more embodiments of the present application.

Additionally, or alternatively, in another non-limiting example, S210 may function to obtain a second plurality of un-normalized events (i.e., raw event data, raw events or the like) from a security information and event management (SIEM) security device that may function to collect and analyze event data occurring at or within a digital environment of the subject subscriber, as shown generally by way of example in FIG. 3.

Additionally, or alternatively, in another non-limiting example, S210 may function to obtain a third plurality of un-normalized events (i.e., raw event data, raw events or the like) from a third-party technology data source or third-party security device that may be capable of providing real-time monitoring of digital assets of the subject subscriber, as shown generally by way of example in FIG. 3.

At least one technical advantage of obtaining un-normalized events may enable the cybersecurity event detection and response service to assess and mitigate, in real-time or near real-time, a likely cybersecurity threat of a subject un-normalized event, as described in more detail herein.

2.20 Identifying Un-Normalized Evidence Data Fields

S220, which includes identifying un-normalized evidence data fields, may function to identify each un-normalized evidence data field included in a subject un-normalized event obtained by S210. An un-normalized evidence data field, as generally referred to herein, may define a distinct evidence data category or may serve as a distinct predefined evidence label within a subject un-normalized event. It shall be recognized that the phrase "un-normalized evidence data field" may also be referred to herein as an "un-normalized data field", an "un-normalized data tag" or the like.

Figure 4:
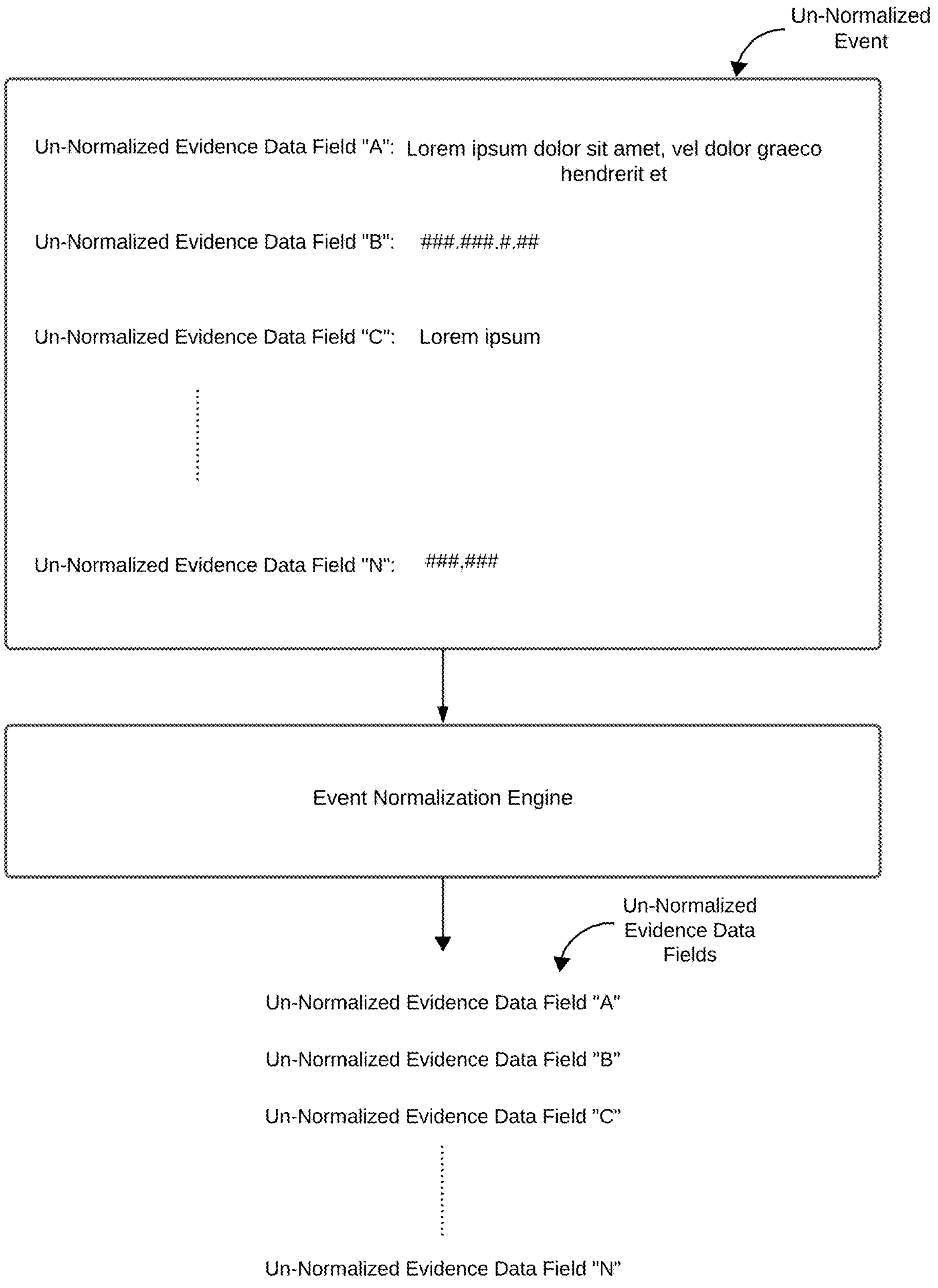
FIG. 4 illustrates an example schematic of identifying un-normalized evidence data fields in accordance with one or more embodiments of the present application.

In one or more embodiments, each un-normalized event obtained by S210 may typically be in a JavaScript Object Notation-like structure (JSON). Accordingly, in such embodiments, S220 may function to use an event normalization engine (i.e., an event normalization service, an event normalization algorithm, or the like) to identify each un-normalized evidence data field included in a subject un-normalized event, as shown generally by way of example in FIG. 4. For instance, in a non-limiting example, S210 may function to obtain an un-normalized event that includes fifteen un-normalized evidence data fields (i.e., a time evidence data field, a category evidence data field, a resource identifier evidence data field, a tenant identifier evidence data field, a subscription identifier evidence data field, a resource group evidence data field, a cluster name evidence data field, a storage account name evidence data field, a message kind evidence data field, an API evidence data field, a message level evidence data field, an audit identifier evidence data field, a message stage evidence data field, a request URI evidence data field, a verb evidence data field, etc.) and, in turn, S220 may function to identify, using one or more computers, each of the fifteen (15) un-normalized evidence data fields.

Stated differently, in one or more embodiments, each un-normalized event obtained by S210 may typically be in one of a plurality of data interchange formats. In such embodiments, S220 may function to use an event normalization engine (i.e., an event normalization service, or the like) to parse and extract each un-normalized evidence data field included in a subject un-normalized event.

It shall be recognized that, in one or more embodiments, each un-normalized evidence data field included in a subject un-normalized event may have a corresponding data value. In other words, each un-normalized event obtained by S210 may include a plurality of name-value pairs (i.e., attribute-value pairs, field-value pairs, or the like).

It shall be recognized that, in some embodiments, S220 may not need to identify and/or extract each un-normalized evidence data field contained within an un-normalized event (e.g., pre-normalized security event or the like). For instance, in a non-limiting example, based on S210 obtaining a subject un-normalized event, S220 may function to identify an event origination source of the subject un-normalized event and, in turn, identify a data integration of a plurality of distinct service-defined data integrations that corresponds to the event origination source. The data integration, in some embodiments, may define a comprehensive set of evidence data fields that may be needed to convert any one of a plurality of un-normalized event types generatable by the event origination source to one or more normalized event types defined by the cybersecurity event detection and response service, as described in more detail herein. Accordingly, in response to assessing the comprehensive set of evidence data fields, S220 may function to selectively identify a relevant (i.e., probative) subset of evidence data fields, which may be less than the full set of un-normalized evidence data fields available within the subject un-normalized event.

One technical advantage of the aforementioned process is its computational efficiency, which may result in expedited event normalization and accelerated assessment and mitigation of cybersecurity threats.

Stated another way, in one or more embodiments, a system or service implementing method 200 (e.g., a cybersecurity service implemented by a network of distributed computers) may function to obtain, in real-time or near real-time, raw event data from a third-party security device of a subscriber, as shown generally by way of example in FIG. 3 and, in turn, the system or service implementing method 200 may function to automatically select an automated event ingestion instruction of a plurality of distinct automated event ingestion instructions for processing the raw event data by evaluating one or more characteristics of the raw event data against predetermined event ingestion criteria. The plurality of distinct automated event ingestion instructions, in some embodiments, may include a first automated event ingestion instruction that is configured to translate raw event data obtained from S210 to a corresponding pre-normalized security event when the raw event data is of a first raw event data type (e.g., a raw log, line-delimited raw log, etc.), a second automated event ingestion instruction that is configured to translate the raw event data obtained from S210 to a corresponding pre-normalized security event when the raw event data is of a second raw event data type (e.g., a vendor alert), and a third automated event ingestion instruction that is configured to translate the raw event data obtained from S210 to a corresponding pre-normalized security event when the raw event data is of a third raw event data type (e.g., a cloud event). It shall be recognized that, in such an embodiment, the first raw event data type, the second raw event data type, and the third raw event data type are different raw event data types.

For instance, in a non-limiting example, if the raw event data obtained by S210 corresponds to raw logs, the system or service implementing method 200 may function to automatically select the first automated event ingestion instruction based on the raw event data including one or more raw logs. Accordingly, in such a non-limiting example, the system or service implementing method 200 may function to execute the first automated event ingestion instruction against the raw event data obtained by S210 to automatically generate a pre-normalized security event that includes the raw event data (or a subset of the raw event data) in a first structured data object that is interpretable by the system or service implementing method 200. Stated another way, in one or more embodiments, the system or service implementing method 200 may function to automatically generate the pre-normalized security event that includes the raw event data in a first structured data object in response to executing the first automated event ingestion instruction.

In another non-limiting example, if the raw event data obtained by S210 corresponds to a vendor alert (e.g., an alert generated by a third-party security device), the system or service implementing method 200 may function to automatically select the second automated event ingestion instruction based on the raw event data corresponding to a vendor alert. Accordingly, in such a non-limiting example, the system or service implementing method 200 may function to execute the second automated event ingestion instruction against the raw event data obtained by S210 to automatically generate a pre-normalized security event that includes the raw event data (or a subset of the raw event data) in a first structured data object that is interpretable by the system or service implementing method 200. Stated another way, in one or more embodiments, the system or service implementing method 200 may function to automatically generate the pre-normalized security event that includes the raw event data in a first structured data object in response to executing the second automated event ingestion instruction.

In another non-limiting example, if the raw event data obtained by S210 corresponds to a cloud event (e.g., an event generated by a cloud service or cloud provider), the system or service implementing method 200 may function to automatically select the third automated event ingestion instruction based on the raw event data corresponding to a cloud event. Accordingly, in such a non-limiting example, the system or service implementing method 200 may function to execute the third automated event ingestion instruction against the raw event data obtained by S210 to automatically generate a pre-normalized security event that includes the raw event data (or a subset of the raw event data) in a first structured data object that is interpretable by the system or service implementing method 200. Stated another way, in one or more embodiments, the system or service implementing method 200 may function to automatically generate the pre-normalized security event that includes the raw event data in a first structured data object in response to executing the third automated event ingestion instruction.

An automated event ingestion instruction, as generally referred to herein, may be a predefined set of computer executable instructions that is specifically designed to process raw event data of a particular type.

A pre-normalized security event, as generally referred to herein, may include the raw event data (or a subset of the raw event data) structured in a predefined data model or predefined data object while retaining the original data included in the raw event data. In other words, the pre-normalized security event may serve as a structured container that organizes the raw event data without altering the original format or content of the raw event data.

For instance, in a non-limiting example, based on S210 obtaining raw event data or the like from a third-party security device, the system or service, executing one of the plurality of automated event ingestion instructions, may function to generate a pre-normalized security event based on the raw event data. In such a non-limiting example, the pre-normalized security event may include a set of un-normalized evidence data fields extracted from the raw event data that are encoded in a data format native to the third-party security device, and each un-normalized evidence data field of the set of un-normalized evidence data fields may be paired with a corresponding evidence data value as recorded by the third-party security device. At least one technical advantage of the system or service generating the pre-normalized security event in such a manner may include preserving the original raw event data while structuring the raw event data in a way that facilitates subsequent processing, normalization, and analysis without losing fidelity or context, as described in more detail herein.

Additionally, in some embodiments, before the generation of the pre-normalized security event or during the generation of the pre-normalized security event, the system or service implementing method 200 may function to query one or more data sources internal or external to the system or service implementing method 200 using one or more pieces of metadata extracted from the raw event data as search or query parameters. Accordingly, in one or more embodiments, in response to querying the one or more data sources, the system or service implementing method 200 may obtain one or more additional pieces of evidence that were absent or not included in the raw event data obtained by S210. The pre-normalized security event and one or more normalized security event (described in more detail herein) may include the one or more additional pieces of evidence obtained from the one or more data sources. At least one technical advantage of such process may allow for more comprehensive event evaluation, enabling better-informed security decisions and improving the overall effectiveness of threat detection and response.

It shall be recognized that, in one or more embodiments, the one or more additional pieces of evidence data obtained from the one or more data sources may include one or more threat intelligence indicators (e.g., indicators of compromise (IoCs), malicious IP addresses, domain reputation scores, known attack signatures, malware hashes, phishing URLs, command-and-control (C2) infrastructure details, or blacklisted email addresses, etc.), historical event data (e.g., prior security events or alerts related to the same entity (e.g., IP address, user, or device) to identify patterns or recurring threats), geolocation data (e.g., geographic origin of network activity, unexpected access attempts from high-risk regions, inconsistencies between usual login locations and current access points, signs of VPN/Tor usage to obscure true location, etc.), user and entity behavior data (e.g., deviations from baseline activity, unusual login times, excessive file access, anomalous privilege escalation attempts, abnormal data transfers, or lateral movement across the network that may indicate insider threats or compromised accounts, etc.), device and system context (e.g., host attributes, operating system version, installed security patches, running processes, system configurations, asset classification, unauthorized software installations, or known vulnerabilities that may expose the system to exploitation, etc.), network traffic insights (e.g., source and destination of traffic flows, protocol anomalies, repeated connection attempts to unauthorized services, unexpected outbound data transfers, or signs of behavior indicative of malware communication with an external threat actor, etc.), authentication and access log data (e.g., successful and failed authentication attempts, session durations, multi-factor authentication (MFA) usage, unauthorized access attempts, role-based access control (RBAC) policy violations, and indications of potential credential compromise or brute-force attacks, etc.), file and process data (e.g., cryptographic hash signature comparisons against known malware databases, detection of suspicious executable behaviors such as privilege escalation attempts or process injection techniques, etc.), DNS and URL analysis (e.g., domain reputation scores, associations with known phishing campaigns, identification of domains used for C2 communications, DNS behavior data, and identification of suspicious or newly registered domains that may indicate malicious intent), and external security reports and reputation scores (e.g., aggregated intelligence from third-party vulnerability databases, risk ratings from security vendors, real-time threat intelligence feeds, etc.).

2.30 Creating Normalized Events

S230, which includes creating normalized events, may function to automatically create one or more normalized events based on a target un-normalized event (e.g., pre-normalized security event or the like). A normalized event, as generally referred to herein, may be a transformed representation of an un-normalized event (obtained by S210) that is in a form understandable and/or processable by the cybersecurity event detection and response service irrespective of a security device (or technology data source) that observed the un-normalized event. It shall be recognized that the phrase "normalized event" may also be interchangeably referred to herein as a "technology source-agnostic security event signal", a "service-specific event signal", or the like.

Figure 7:
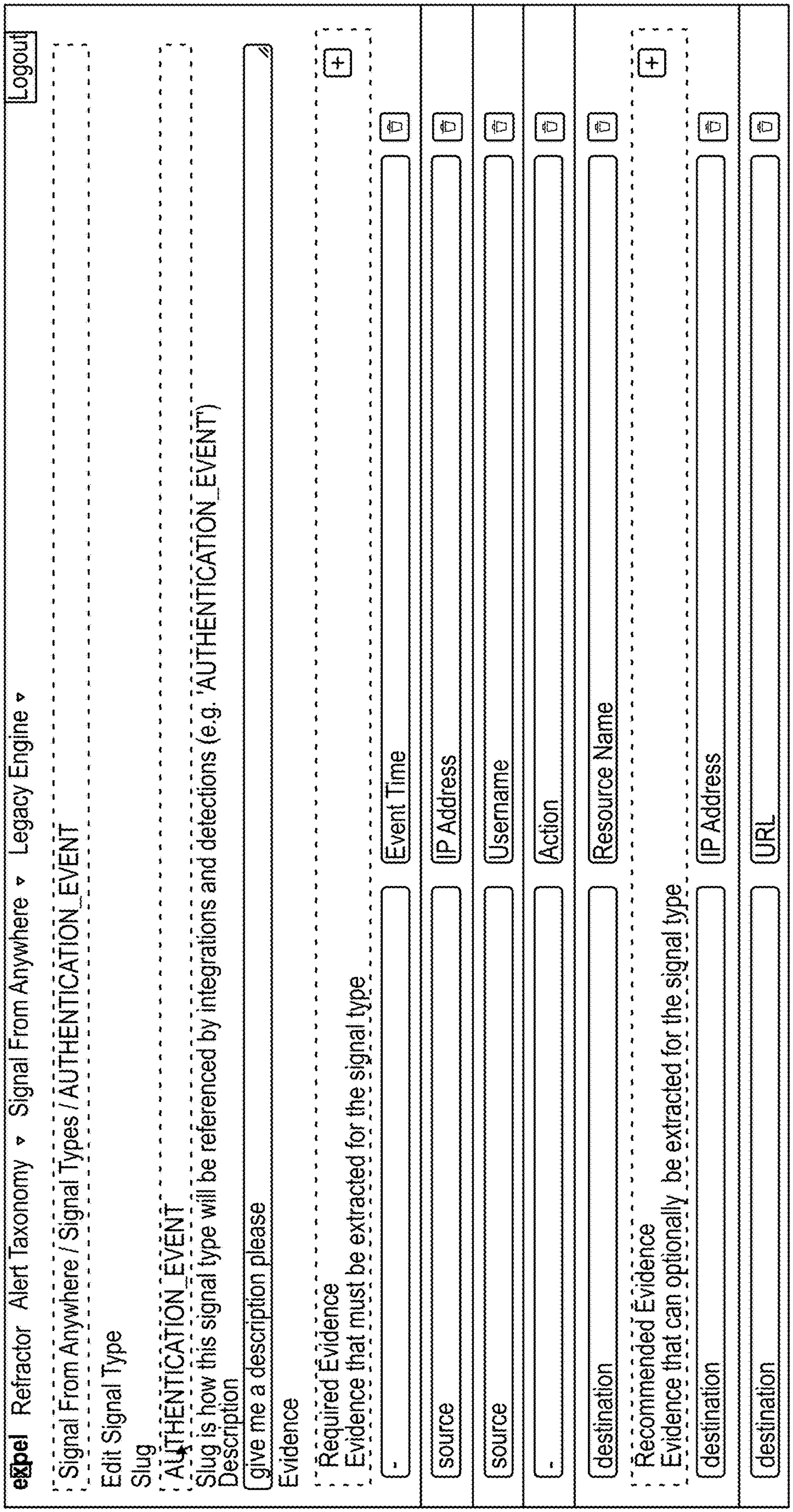
FIG. 7 illustrates an example of a normalized event signal type in accordance with one or more embodiments of the present application.
Figure 8:
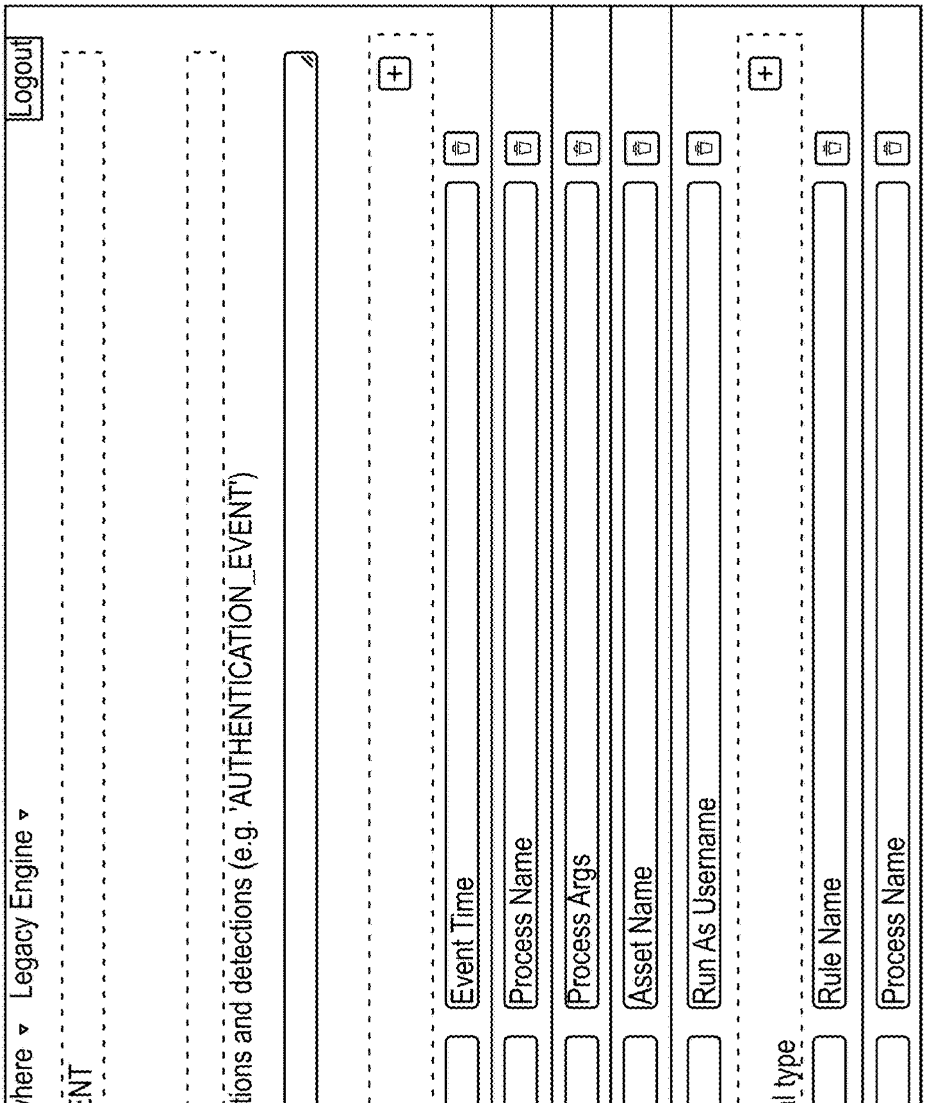
FIG. 8 illustrates another example of a normalized event signal type in accordance with one or more embodiments of the present application.

In one or more embodiments, the cybersecurity event detection and response service may define a plurality of distinct normalized event signal types (e.g., a plurality of distinct technology source-agnostic security event signal types or the like). Each distinct normalized event signal type, in one or more embodiments, may define a first set of evidence data fields (or evidence data value types) required by a subject normalized event signal type for signal activation and a second set of evidence data fields (or evidence data value types) not required (i.e., optional, recommended, etc.) by the subject normalized event signal type, as shown generally way of example in FIG. 7 and FIG. 8. For instance, in a non-limiting example, the cybersecurity event detection and response service may define a normalized event signal type for authentication-type security events, a normalized event signal type for phishing-type security events, a normalized event signal type for file-type security events, a normalized event signal type for policy violation-type security events, or any other suitable type of security event.

In one or more embodiments, using an event normalization engine (e.g., an event normalization service or the like), S230 may function to create, in real-time or near real-time, one or more normalized events based on a subject un-normalized event obtained by S210 or a pre-normalized security event generated by the system or service implementing method 200. Stated another way, each un-normalized event obtained by the cybersecurity event detection and response service (or each pre-normalized security event generated by the system or service implementing method 200) may be processed through an event normalization layer that, in turn, transforms a subject un-normalized event or a subject pre-normalized security event into a corresponding normalized event (e.g., normalized security event), as shown generally by way of example in FIG. 5 and FIG. 6. It shall be recognized that the steps and/or processes of creating a normalized event based on a subject un-normalized event may include using one or more algorithms to automatically perform a series of operations that facilitate the transformation of the subject un-normalized event to the normalized event.

Figure 9:
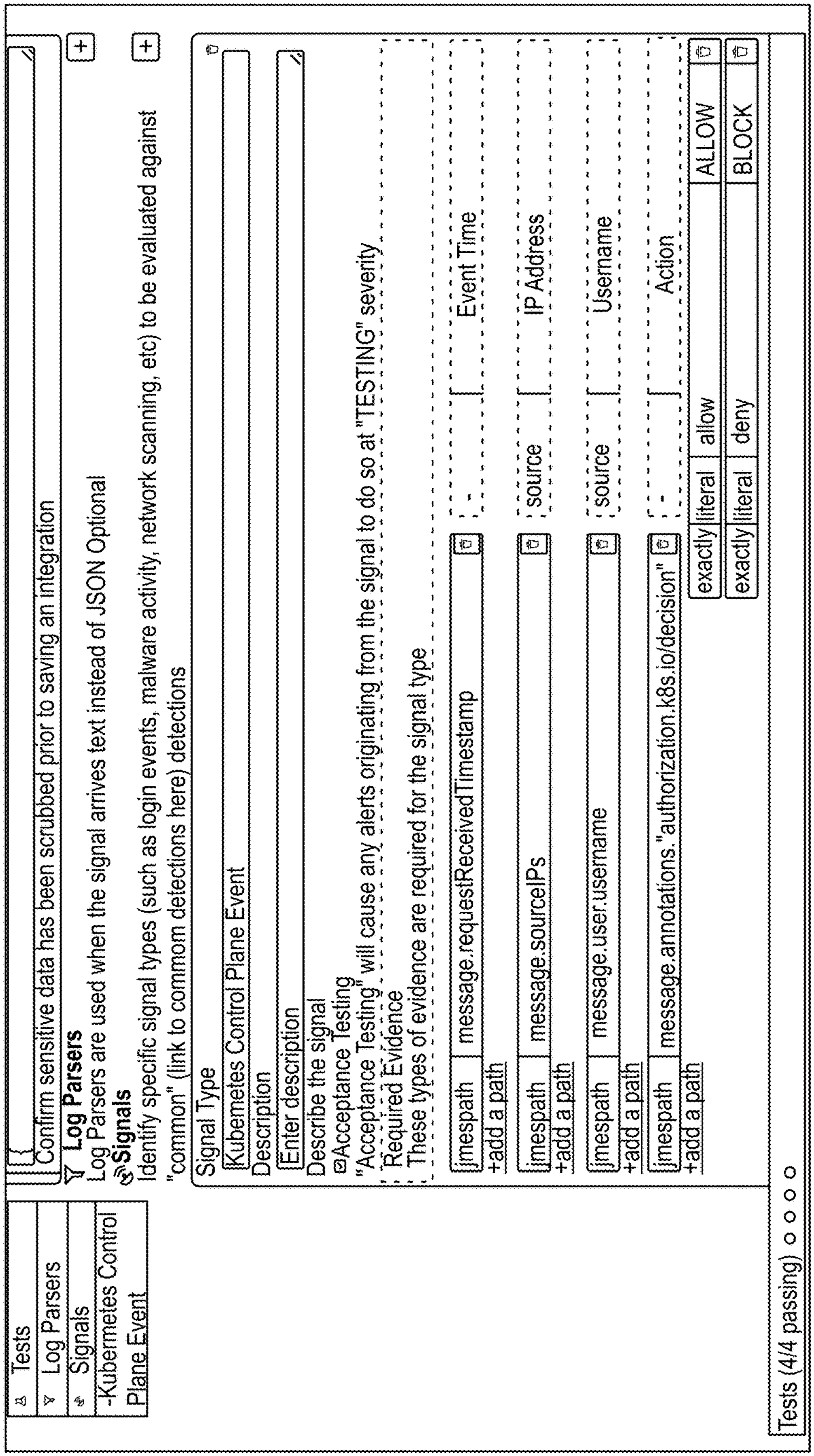
FIG. 9 illustrates an example representation of data integration instructions in accordance with one or more embodiments of the present application.

Accordingly, in one or more embodiments, based on extracting a set of un-normalized evidence data fields associated with a subject un-normalized event (e.g., pre-normalized security event) as described in S220, S230 may function to identify an event origination source (i.e., Crowdstrike™, Microsoft Advanced Threat Protection™, SentinelOne®, Carbon Black Cloud™, Amazon Web Services™, etc.) that corresponds to the subject un-normalized event (e.g., pre-normalized security event). At least one technical benefit of identifying the event origination source may enable S230 to use a set of data integration instructions and protocols (e.g., computer-executable data mapping instructions) defined for the event origination source, as shown generally by way of example in FIG. 9. For instance, in a non-limiting example, if the cybersecurity event detection and response service obtained an un-normalized event from Kubernetes®, S230 may identify a set of data integration instructions and protocols defined for Kubernetes® (e.g., third-party security device), as described in U.S. patent application Ser. No. 18/749,222, titled SYSTEMS, METHODS, AND GRAPHICAL USER INTERFACES FOR ACCELERATING A CONSTRUCTION OF A DATA INTEGRATION FOR A NON-INTEGRATED TECHNOLOGY DATA SOURCE, which is incorporated in its entirety by this reference. In another non-limiting example, if the cybersecurity event detection and response service obtained an un-normalized event from Amazon Web Services™, S230 may identify a set of data integration instructions and protocols defined for Amazon Web Services™.

The set of data integration instructions, in one or more embodiments, may include a data integration matrix, a data integration mapping, or any suitable data structure that includes at least one digital link or pairwise association between an un-normalized evidence data field and a normalized evidence data field. It shall be noted that, in operation, a subject set of data integration instructions may include a plurality of distinct digital links or digital pairwise associations in which each distinct digital link or pairwise association establishes a connection and/or nexus between an un-normalized evidence data field and a normalized evidence data field.

Additionally, in such embodiments, based on identifying a set of data integration instructions that correspond to an event origination source of a subject un-normalized event (e.g., pre-normalized security event), S230 may function to use the data integration instructions (e.g., computer-executable data mapping instructions) to identify a normalized evidence data field for each un-normalized evidence data field identified by S220. It shall be recognized that, in some embodiments, the set of data integration instructions may not define a normalized evidence data field that corresponds to a subject un-normalized evidence data field. Accordingly, in such embodiments, S230 may bypass including the subject un-normalized evidence data field (or an equivalent thereof) when creating a normalized event. In other words, S230 may function to search or look-up within a data integration matrix, a data integration mapping, or any suitable data structure to identify a set of normalized evidence data fields that correspond to the set of un-normalized evidence data fields.

Additionally, in such embodiments, after obtaining the set of normalized evidence data fields that correspond to the un-normalized evidence data fields of a subject un-normalized event, S230 may function to evaluate the set of normalized evidence data fields against each of a plurality of pre-defined normalized event signal types of the cybersecurity event detection and response service. Accordingly, in one or more embodiments, the evaluation may include assessing the set of normalized evidence data fields against the evidence data fields required by each distinct normalized event signal type. Accordingly, when each evidence data field required by a subject normalized event signal type is present and/or accounted for within the normalized set of evidence data fields, a normalized event signal creation process may be commenced. For instance, in a non-limiting example, S230 may function to commence a normalized event signal creation process for creating a phishing-type normalized event signal when each evidence data field required by the phishing-type normalized event signal is present and/or accounted for within a target set of normalized evidence data fields that correspond to a subject un-normalized event signal. In another non-limiting example, S230 may function to commence a normalized event signal creation process for creating a policy violation-type normalized event signal when each evidence data field required by the policy violation-type normalized event signal is present and/or accounted for within a target set of normalized evidence data fields that correspond to a subject un-normalized event signal.

Additionally, in such embodiments, after commencing a normalized event signal creation process, S230 may function to instantiate an event normalization data model that corresponds to a target normalized event signal. For instance, in a non-limiting example, S230 may function to instantiate a normalized event data model associated with a phishing-type normalized event signal when each evidence data field required by the phishing-type normalized event signal is present and/or accounted for within a normalized set of evidence data fields of a subject un-normalized event signal. The normalized event data model, in such a non-limiting example, may include multiple distinct normalized evidence data fields required by the phishing-type normalized event signal, along with a corresponding data value entry field for each of these fields. The data value entry fields may facilitate the dynamic mapping or translation of un-normalized event data to its normalized counterpart.

It shall be noted that, in one or more embodiments, the normalized event data model may act as a transformative intermediary that facilitates the seamless transition (or transformation) of evidence data values from un-normalized events into their appropriate destinations within the normalized evidence data model using the defined data integration instructions (i.e., data field mapping instructions) described above. Accordingly, in such embodiments, once all evidence data from a subject un-normalized event is successfully transferred to (or installed into) the normalized event data model, a normalized event is created.

In one or more embodiments, in response to a cybersecurity service obtaining raw event data from a third-party security service (e.g., third-party security application, third-party security device, etc.), the cybersecurity service may function to automatically generate, using one or more computers, a pre-normalized security event that includes the raw event data in a first structured data object that is interpretable by the cybersecurity service. In such an embodiment, the cybersecurity service may function to automatically transform the pre-normalized security event to at least one normalized security event (e.g., one or more distinct normalized security events, two or more distinct normalized security events, three or more distinct normalized security events, etc.).

It shall be recognized that, in one or more embodiments, automatically transforming the pre-normalized security event to the at least one normalized security event may include obtaining, from a computer database of the cybersecurity service, a set of computer-executable data mapping instructions of a security data integration defined for the third-party security service (e.g., third-party security application, third-party security device, etc.). In other words, in some embodiments, the cybersecurity service may use a predefined set of transformation rules, schemas, or mappings for the third-party security service that define how the raw event data, as structured in the pre-normalized security event, should be processed, re-structured, and/or formatted into one or more normalized security events. Such computer-executable data mapping instructions may specify instructions to translate un-normalized evidence data fields from the pre-normalized security event to standardized (or normalized) security event attributes used by the cybersecurity service.

It shall be recognized that, in one or more embodiments, the cybersecurity service may function to obtain the set of computer-executable data mapping instructions of the security data integration defined for the third-party security service by querying a data integration retrieval application programming interface (API), which may be configured to search the computer database and retrieve a target set of computer-executable data mapping instructions. For instance, in a non-limiting example, querying the data integration retrieval application programming interface (API) may include automatically constructing, via one or more computers, an API call that includes the third-party security service as a search parameter and, in turn, the cybersecurity service may receive the set of computer-executable data mapping instructions of the security data integration digitally mapped to the third-party security service.

It shall be further recognized that, in one or more embodiments, in response to obtaining the set of computer-executable data mapping instructions digitally mapped to the third-party security service, the cybersecurity service may function to automatically extract, from the pre-normalized security event, the set of un-normalized evidence data fields (e.g., each un-normalized evidence data field included in the pre-normalized security event) in response to executing the set of computer-executable data mapping instructions against the pre-normalized security event. For instance, in a non-limiting example, the pre-normalized security event may include a first un-normalized evidence data field (e.g., Timestamp), a second un-normalized evidence data field (e.g., SourceIP), and a third un-normalized evidence data field (User-Username) and, in turn, the cybersecurity service may function to extract the first un-normalized evidence data field (e.g., Timestamp), the second un-normalized evidence data field (e.g., SourceIP), and the third un-normalized evidence data field (User-Username) in response to executing the set of computer-executable data mapping instructions against the pre-normalized security event, as shown generally by way of example in FIG. 4.

Additionally, in one or more embodiments, in response to extracting the set of un-normalized evidence data fields (e.g., the first un-normalized evidence data field, the second un-normalized evidence data field, and the third un-normalized evidence data field) from the pre-normalized security event using the set of computer-executable data mapping instructions, the cybersecurity service may function to convert the set of un-normalized evidence data fields to a set of normalized evidence data fields in response to executing the set of computer-executable data mapping instructions against the pre-normalized security event. For instance, with continued reference to the above non-limiting example, the cybersecurity service executing the set of computer-executable data mapping instructions may function to automatically convert the first un-normalized evidence data field (e.g., Timestamp) to a normalized evidence data field (e.g., Event Time) that is in a standardized date-time format (e.g., notation) used by the cybersecurity service, the second un-normalized evidence data field (e.g., SourceIP) to a normalized evidence data field (e.g., IP address) that is in a standardized IP address data format (e.g., notation) used by the cybersecurity service, and a third un-normalized evidence data field (e.g., User-Username) to a normalized evidence data field (e.g., Username) that conforms to a standardized user identity format used by the cybersecurity service, as shown generally by way of example in FIG. 5 and FIG. 6. In other words, the cybersecurity service may execute the set of computer-executable data mapping instructions to systematically transform or convert un-normalized evidence data fields from their original, third-party-specific formats into a standardized schema of the cybersecurity service.

Figure 5:
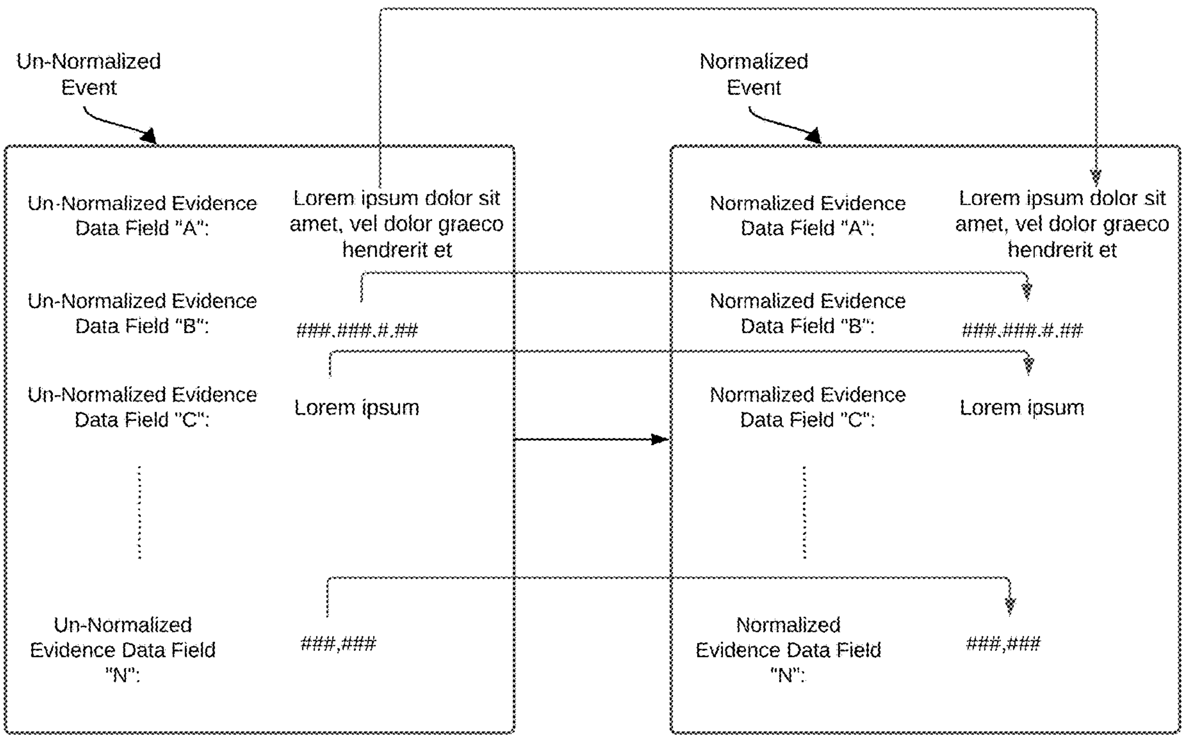
FIG. 5 illustrates an example representation of creating a normalized event in accordance with one or more embodiments of the present application.
Figure 6:
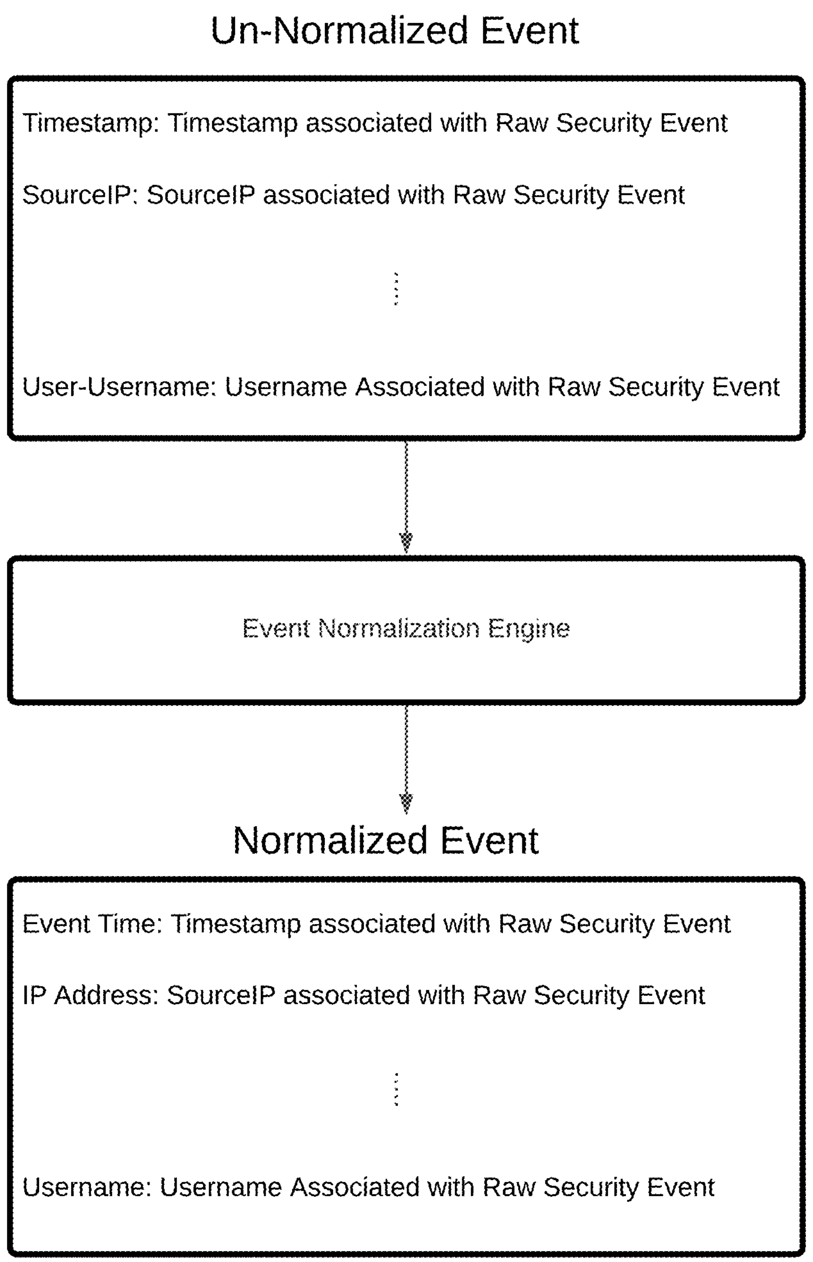
FIG. 6 illustrates another example of creating a normalized event in accordance with one or more embodiments of the present application.

Additionally, in one or more embodiments, in response to converting the set of un-normalized evidence data fields extracted from the pre-normalized security event to the set of normalized evidence data fields native to the cybersecurity service, the cybersecurity service may function to generate at least one normalized security event that includes the set of normalized evidence data fields and the corresponding evidence data values, as shown generally by way of example in FIG. 5 and FIG. 6. It shall be noted that, in one or more embodiments, the corresponding evidence data values may be extracted from the pre-normalized security event. It shall be further noted that, in one or more embodiments, the at least one normalized security event may be in the form a second structured data object that is interpretable by the cybersecurity service.

In one or more embodiments, in response to executing the set of computer-executable data mapping instructions, the cybersecurity service may function to generate at least one normalized security event that includes the set of normalized evidence data fields and the corresponding evidence data values as recorded by the third-party security device in a second structured data object that is different from the structured data object of the pre-normalized security event. A normalized security event, as generally referred to herein, may be a machine-readable data object that is in one of a plurality standardized schemas understandable by the cybersecurity service.

Additionally, or alternatively, in some embodiments, the cybersecurity service may function to generate at least one normalized security event (e.g., one or more normalized security events, two or more normalized security events, three or more normalized security events, twenty or more normalized security events, etc.). Each distinct normalized security event of the at least one normalized security event, in one or more embodiments, may correspond to a same technology source-agnostic event signal type (e.g., all normalized security events are of a first technology source-agnostic event signal type (e.g., technology source-agnostic phishing event signal type), all normalized security events are of a second technology source-agnostic event signal type (e.g., technology source-agnostic file event signal type), all normalized security events are of a third technology source-agnostic event signal type (e.g., technology source-agnostic policy violation event signal type), etc.). Furthermore, in such an embodiment, the same technology source-agnostic event signal type may be associated with a plurality of distinct signal versions, wherein each distinct signal version of the plurality of signal versions of the same technology source-agnostic event signal type may define a distinct schema or data structure for transforming a given un-normalized security event (e.g., pre-normalized security event) to a respective normalized security event of the same technology source-agnostic event signal type (e.g., a first signal version of the technology source-agnostic file event signal type may define a data model having only a first plurality of evidence data fields, a second signal version of the technology source-agnostic file event signal type may define a data model having only the first plurality of evidence data fields and a second additional plurality of evidence data fields, a third signal version of the technology source-agnostic file event signal type may define a data model having only the first plurality of evidence data fields, the second additional plurality of evidence data fields, and a third additional plurality of evidence data fields, etc.).

Accordingly, in such an embodiment, based on or in response to the cybersecurity service identifying that a subject pre-normalized security event (e.g., un-normalized security event or the like) corresponds to a target technology source-agnostic event signal type that is digitally associated with a plurality of signal versions, the cybersecurity service may function to automatically transform the subject pre-normalized security event to a plurality of normalized security events by generating a distinct normalized security event for each signal version of the plurality of signal versions digitally mapped to the target technology source-agnostic event signal type. For instance, with continued reference to the above non-limiting example, if the cybersecurity service identifies that a subject pre-normalized security event corresponds to a technology source-agnostic file event signal type that is digitally mapped to multiple signal versions, the cybersecurity service may automatically transform the pre-normalized security event to the at least one normalized security event by generating multiple distinct normalized security events, each distinct normalized security event corresponding to a different signal version of the technology source-agnostic file event signal type (e.g., the cybersecurity service may generate a first normalized security event based on the first signal version of the technology source-agnostic file event signal type that includes only the first plurality of evidence data fields (e.g., FileName, FilePath, FileHash, EventTimestamp), a second normalized security event based on the second signal version of the technology source-agnostic file event signal type that extends the first schema by incorporating a second additional plurality of evidence data fields (e.g., FileSize, UserInitiatedAction, FileOwner), and a third normalized security event based on the third signal version of the technology source-agnostic file event signal type that further expands the schema by adding a third additional plurality of evidence data fields (e.g., FileOrigin, ThreatClassification, AssociatedProcess, ExecutionContext).

At least one technical advantage of generating multiple distinct normalized security events corresponding to different signal versions of the same technology source-agnostic event signal type may enable enables seamless interoperability between cybersecurity systems that rely on different signal versions.

Accordingly, in one or more embodiments, when the cybersecurity service transforms the subject pre-normalized security event to the plurality of normalized security events of a plurality of distinct signal versions of the same technology source-agnostic event signal type, each distinct normalized security event of the plurality of normalized security events may be assessed against a corpus of computer-executable detection instructions or the like, as described in more detail herein. In such an embodiment, a first subset of the plurality of normalized security events may not satisfy any alerting conditions specified by any computer-executable detection instruction of the corpus of computer-executable detection instructions, however, a second subset of the plurality of distinct normalized security events may satisfy a set of alerting conditions of one or more computer-executable detection instructions of the corpus of computer-executable detection instructions. Accordingly, in one or more embodiments, in response to determining that the second subset of the plurality of distinct normalized security events satisfies the set of alerting conditions of one or more computer-executable detection instructions, the cybersecurity service may function to automatically generate the security alert (e.g., service-validated security alert) based on the second subset of the plurality of distinct normalized security events and, in turn, route the security alert appropriately.

At least one technical advantage of transforming a subject pre-normalized security event into a plurality of normalized security events of a plurality of distinct signal versions of the same technology source-agnostic event signal type and assessing each normalized security event against a corpus of computer-executable detection instructions may ensure a comprehensive threat detection by allowing different signal versions to be evaluated independently, thereby accounting for variations in schema definitions, detection logic, and evidence data availability, which means that while some versions may not trigger an alert, others may satisfy alerting conditions, ensuring that no potential security threat is overlooked due to schema limitations or version discrepancies. In other words, by normalizing the same pre-normalized security event into multiple schema versions and evaluating each against defined detection rules, the cybersecurity service can maximize detection coverage, reduce the risk of false negatives (e.g., malicious activity is present but is not detected), and ensure that potential security threats are identified even if they are only detectable in certain signal versions due to differences in schema structure, available evidence data, or evolving detection logic, thereby enhancing the overall accuracy, reliability, and completeness of the threat detection and alerting process.

Additionally, or alternatively, in some embodiments, when the at least one normalized security event includes a plurality of normalized security events of a plurality of distinct signal versions of the same technology source-agnostic event signal type (e.g., all normalized security events are of the technology source-agnostic file event signal type), the cybersecurity service may function to assess each distinct normalized security event of the plurality of normalized security events against the corpus of computer-executable detection instructions digitally mapped to the same technology source-agnostic event signal type (e.g., the technology source-agnostic file event signal type) to determine whether a respective normalized security event satisfies any alerting conditions specified by any computer-executable detection instruction included within the corpus of computer-executable detection instructions. Accordingly, in one or more embodiments, the cybersecurity service may function to generate a security alert in response to identifying that at least a predetermined number of normalized security events (e.g., two, five, ten, fifteen, twenty, etc.) of the plurality of normalized security events satisfies the alerting conditions of the corpus of computer-executable detection instructions.

Additionally, or alternatively, in some embodiments, when the at least one normalized security event includes a plurality of normalized security events of a plurality of distinct signal versions of the same technology source-agnostic event signal type (e.g., all normalized security events are of the technology source-agnostic file event signal type), the cybersecurity service may function to assess each distinct normalized security event of the plurality of normalized security events against the corpus of computer-executable detection instructions digitally mapped to the same technology source-agnostic event signal type (e.g., the technology source-agnostic file event signal type) to determine whether a respective normalized security event satisfies any alerting conditions specified by any computer-executable detection instruction included within the corpus of computer-executable detection instructions. Accordingly, in one or more embodiments, the cybersecurity service may function to determine a total count of normalized security events of the plurality of normalized security events that satisfy the alerting conditions associated with the corpus of computer-executable detection instructions and, in turn, generate a corresponding security alert only if the total count meets or exceeds a predetermined minimum count threshold value (e.g., at least two, six, or any other suitable number normalized security events satisfying the alerting conditions), thereby ensuring that security alerts are generated based on a corroborated set of normalized security event signals rather than isolated to a single version. This may enhance the reliability and accuracy of security threat identification by leveraging multiple distinct signal versions to validate the presence of an actual security threat, reducing the likelihood of false positives and false negatives. In other words, by requiring a predetermined minimum count threshold to be met before generating a security alert, the cybersecurity service may minimize unnecessary alerts caused by minor anomalies while a consistent security threat observed across multiple signal versions is properly handled and/or escalated.

It shall be recognized that, in some embodiments, the predetermined minimum count threshold value may be dynamically or automatically adjustable by the cybersecurity service based on a total number of security alerts received by the cybersecurity service in a predetermined timespan (e.g., past hour, etc.). For instance, in a non-limiting example, the predetermined minimum count threshold value may be increased above a default count value if the total number of security alerts received in the predetermined timespan exceeds a predefined minimum alert volume threshold. In another non-limiting example, the predetermined minimum count threshold value may be decreased below the default count value if the total number of security alerts received in the predetermined timespan is below the predefined minimum alert volume threshold.

It shall be recognized that, in one or more embodiments, the cybersecurity service may function to automatically detect, via one or more computers, an event creation error while executing a set of computer-executable data mapping instructions against a pre-normalized security event to transform the pre-normalized security event into at least one normalized security event of a current signal version (e.g., most recently created signal version) of a target technology source-agnostic event signal type. In response to detecting the event creation error, the cybersecurity service may determine that the current signal version of the target technology source-agnostic event signal type is incompatible or insufficient for transforming the pre-normalized security event into the at least one normalized security event of the current signal version of the target technology source-agnostic event signal type. Accordingly, in one or more embodiments, in response to detecting the event creation error, the cybersecurity service may function to re-execute the set of computer-executable data mapping instructions against the pre-normalized security event to transform the pre-normalized security event into the at least one normalized security event of a previous signal version of the target technology source-agnostic event signal type. In such embodiment, the re-execution may successfully generate the at least one normalized security event based on using the previous signal version of the target technology source-agnostic event signal type rather than the current signal version of the target technology source-agnostic event signal type. In other words, in some embodiments, when the cybersecurity service encounters an event creation error while attempting to transform a pre-normalized security event using the current signal version of a target technology source-agnostic event signal type, the cybersecurity service may dynamically revert to a previous signal version to complete the transformation successfully. Such process may ensure that security event normalization remains resilient to schema changes, version incompatibilities, or missing data fields that may arise in the most recent signal version. By leveraging a previous signal version, the cybersecurity service may ensure that threat detection processes are not disrupted due to versioning inconsistencies.

Additionally, or alternatively, in one or more embodiments, the cybersecurity service may function to automatically detect, via one or more computers, an event creation error when executing a set of computer-executable data mapping instructions against a pre-normalized security event to transform the pre-normalized security event into at least one normalized security event of a current signal version (e.g., most recently created signal version) of a target technology source-agnostic event signal type. In one or more embodiments, in response to detecting the event creation error, the cybersecurity service may determine that the current signal version of the target technology source-agnostic event signal type is incompatible or insufficient for transforming the pre-normalized security event into the at least one normalized security event of the current signal version of the target technology source-agnostic event signal type. Accordingly, in one or more embodiments, in response to detecting the event creation error, the cybersecurity service may function to iteratively re-execute the set of computer-executable data mapping instructions against the pre-normalized security event using the most recent previous signal version of the target technology source-agnostic event signal type until the transformation of the pre-normalized security event to the normalized security event of the target technology source-agnostic event signal type is successful. In such an embodiment, the at least one normalized security event may be generated based on the first successfully executed transformation using the most recent previous signal version of the target technology source-agnostic event signal type that does not result in an event creation error.

For instance, in a non-limiting example, if the cybersecurity service attempts to transform a pre-normalized security event using the current signal version of a target technology source-agnostic event signal type and encounters an event creation error—such as missing required evidence data fields, an incompatible schema structure, or a processing failure—the cybersecurity service may dynamically revert to the most recent previous signal version of the target technology source-agnostic event signal type and reattempt the transformation. If the transformation remains unsuccessful, the cybersecurity service may continue iterating through progressively earlier signal versions of the target technology source-agnostic event signal type until a signal version is identified that allows for successful transformation without triggering an event creation error. In other words, if the transformation of the pre-normalized security event fails when using the current signal version of the target technology source-agnostic event signal type, the cybersecurity service systematically attempts the transformation using progressively earlier signal versions of the target technology source-agnostic event signal type until a valid normalized security event is successfully generated without encountering an event creation error.

Additionally, or alternatively in one or more embodiments, the cybersecurity service may function to automatically detect, via one or more computers, an event creation error when executing a set of computer-executable data mapping instructions against a pre-normalized security event to transform the pre-normalized security event into at least one normalized security event of a current signal version (e.g., most recently created signal version) of a target technology source-agnostic event signal type. In one or more embodiments, in response to detecting the event creation error, the cybersecurity service may determine that the current signal version of the target technology source-agnostic event signal type is incompatible or insufficient for transforming the pre-normalized security event into the at least one normalized security event of the current signal version of the target technology source-agnostic event signal type. Accordingly, in one or more embodiments, in response to detecting the event creation error, the cybersecurity service may function to sequentially re-execute the set of computer-executable data mapping instructions against the pre-normalized security event using progressively earlier signal versions of the target technology source-agnostic event signal type until the pre-normalized security event is successfully transformed to the at least one normalized security event of the target technology source-agnostic event signal type. In such an embodiment, the at least one normalized security event may be generated based on the first successfully executed transformation using the most recent previous signal version of the target technology source-agnostic event signal type that does not result in an event creation error.

2.40 Routing Normalized Events

S240, which includes routing normalized events, may function to automatically route a normalized event (e.g., normalized security event) created by the system or service implementing method 200 to an automated detection service.

In one or more embodiments, the automated detection service may function to evaluate a target normalized event against a corpus of automated detection decisioning workflows that corresponds to the type of the target normalized event (e.g., type of technology source-agnostic security event or the like). That is, in one or more embodiments, a plurality of distinct corpora of automated detection decisioning workflows may be mapped to a plurality of distinct normalized event signal types, respectively. In this way, event response logic (e.g., detection rules, computer-executable detection heuristics, detection instructions, and/or the like) may be digitally mapped to normalized event signal types rather than raw security events or raw security event data. Therefore, at least one technical benefit of implementing such mapping may enable the cybersecurity event detection and response service to apply a detection layer over normalized event signals rather than raw security alert/event data received from third-party security devices. Thereby, preventing detection logic (e.g., detection rules, computer-executable detection heuristics, automated detection decisioning workflows and/or the like) being constructed for each distinct third-party technology data source and/or security device to which the cybersecurity event detection and response service integrates therewith.

It shall be recognized that, each of the plurality of automated detection decisioning workflows digitally mapped to a subject normalized event signal type (i.e., phishing-type normalized event signal) may be specifically configured to process and/or evaluate a likely threat severity of normalized events that correspond to the subject normalized event signal type (i.e., phishing-type normalized event signal).

In one or more embodiments, based on a subject normalized event satisfying one or more alerting conditions of a subject automated detection decisioning workflow, the cybersecurity event detection and response service may function to generate a service-validated security alert, as described in U.S. patent application Ser. No. 18/793,483, titled SYSTEMS, METHODS, AND GRAPHICAL USER INTERFACES FOR CONFIGURING AND IMPLEMENTING COMPUTER-EXECUTABLE DETECTION INSTRUCTIONS IN A CYBERSECURITY THREAT DETECTION AND MITIGATION PLATFORM, which is incorporated in its entirety by this reference. In such embodiments, based on generating the service-validated security alert, the cybersecurity event detection and response service may function to route the service-validated security alert to one of an alert handling queue and an alert disposal queue.

Stated another way, in one or more embodiments, based on the cybersecurity event detection and response service, generating a service-validated security alert, the cybersecurity event detection and response service may function to assess the service-validated security alert against a corpus of computing environment-informative data of a target subscriber (e.g., a corpus of subscriber context data) to which the service-validated security alert corresponds. The corpus of computing environment-informative data may include alert suppression instructions associated with non-critical digital assets of the subscriber, alert escalation instructions associated with critical digital assets of the subscriber, etc., as described in U.S. patent application Ser. No. 18/095,754, titled SYSTEMS AND METHODS FOR INTELLIGENTLY GENERATING CYBERSECURITY CONTEXTUAL INTELLIGENCE AND GENERATING A CYBERSECURITY INTELLIGENCE INTERFACE and U.S. patent application Ser. No. 18/129,638, titled SYSTEMS AND METHODS FOR INTELLIGENT CONFIGURATION AND DEPLOYMENT OF ALERT SUPPRESSION PARAMETERS IN A CYBERSECURITY THREAT DETECTION AND MITIGATION PLATFORM, which are incorporated in their entities by this reference.

In one or more embodiments, the system or service implementing method 200 may function to automatically assess, via one or more computers, the at least one normalized security event generated by the system or service implementing method 200 against a corpus of computer-executable detection instructions digitally mapped to a type of the at least one normalized security event. In such an embodiment, a security alert may be generated based on the at least one normalized security event satisfying a set of alerting conditions of a subject computer-executable detection instruction of the corpus of computer-executable detection instructions. Accordingly, in one or more embodiments, the cybersecurity service may function to execute (e.g., in real-time or near real-time) a threat mitigation response that mitigates a security threat associated with the security alert in response generating the security alert.

For instance, in one or more embodiments, the raw event data obtained by S210 may include a user account associated with a subscriber, which may be extracted and included in a corresponding normalized security event. The cybersecurity service may then automatically assess the corresponding normalized security event against a corpus of computer-executable detection instructions to determine whether the corresponding normalized security event satisfies predefined alerting conditions defined by the corpus of computer-executable detection instructions. In one or more embodiments, if the corresponding normalized security event satisfies the predefined alerting conditions, the cybersecurity service may generate a security alert that includes the user account. In one or more embodiments, based on generating the security alert, the cybersecurity service may execute (e.g., in real-time or near real-time) a threat mitigation response that includes automatically disabling the user account to temporarily prevent or permanently prevent unauthorized access to one or more computing environments of the subscriber in response to detecting the user account of the subscriber as compromised. Such automated mitigation action may help minimize active security breaches, prevent potential security breaches, reduces the risk of account takeover, and/or the like.

In another non-limiting example, the raw event data obtained by S210 may include a user account associated with a subscriber, which may be extracted and included in a corresponding normalized security event. The cybersecurity service may then automatically assess the corresponding normalized security event against a corpus of computer-executable detection instructions to determine whether the corresponding normalized security event satisfies any predefined alerting conditions of the corpus of computer-executable detection instructions. If one or more computer-executable detection instructions of the corpus of computer-executable detection instructions identifies that the user account exhibits indicators of compromise—such as anomalous login activity, failed authentication attempts, or unauthorized access patterns—the cybersecurity service may generate a security alert that includes the user account. In response to generating the security alert, the cybersecurity service may execute a real-time or near real-time threat mitigation response by automatically disabling the user account to temporarily or permanently prevent unauthorized access to the subscriber's target digital assets.

In another non-limiting example, in one or more embodiments, the raw event data obtained by S210 may relate to a cloud computing environment of a subscriber, which may be extracted and included in a corresponding normalized security event. The cybersecurity service may then automatically assess the corresponding normalized security event against a corpus of computer-executable detection instructions to determine whether the corresponding normalized security event satisfies predefined alerting conditions defined by the corpus of computer-executable detection instructions. In one or more embodiments, if the corresponding normalized security event satisfies the predefined alerting conditions, the cybersecurity service may generate a security alert that includes information associated with the cloud computing environment. In one or more embodiments, based on generating the security alert, the cybersecurity service may execute (e.g., in real-time or near real-time) a threat mitigation response that includes automatically terminating the cloud computing environment of the subscriber to automatically suspend or automatically cease digital events from occurring on the cloud computing environment of the subscriber in response to detecting the cloud computing environment of the subscriber as compromised. Such an automated mitigation action may help prevent further unauthorized access, limit the spread of potential security threats, and ensure the security and integrity of the subscriber's cloud resources.

In another non-limiting example, the raw event data obtained by S210 may include a cloud access key associated with a subscriber, which may be extracted and included in a corresponding normalized security event. The cybersecurity service may then automatically assess the corresponding normalized security event against a corpus of computer-executable detection instructions to determine whether the corresponding normalized security event satisfies any predefined alerting conditions of the corpus of computer-executable detection instructions. If one or more computer-executable detection instructions of the corpus of computer-executable detection instructions identifies that the cloud access key exhibits indicators of compromise—such as unauthorized usage, abnormal access patterns, or suspected credential leakage—the cybersecurity service may generate a security alert that includes the cloud access key. In response to generating the security alert, the cybersecurity service may execute a (e.g., real-time or near real-time threat mitigation response) by automatically disabling or modifying the cloud access key to prevent further unauthorized access to the subscriber's cloud resources In another non-limiting example, the raw event data obtained by S210 may indicate that an application with a respective hash signature was executed in a digital environment of a subscriber, which may be extracted and included in a corresponding normalized security event. The cybersecurity service may then automatically assess the corresponding normalized security event against a corpus of computer-executable detection instructions to determine whether the corresponding normalized security event satisfies predefined alerting conditions defined by the computer-executable detection instructions. In one or more embodiments, if the corresponding normalized security event satisfies the predefined alerting conditions, the cybersecurity service may generate a security alert that includes information associated with the application and the respective hash signature. In one or more embodiments, based on generating the security alert, the cybersecurity service may execute (e.g., in real-time or near real-time) a threat mitigation response that includes automatically blocking the respective hash signature to prevent the application associated with the respective hash signature from being re-executed in the digital environment of the subscriber in response to detecting the respective hash signature as malicious. Such an automated mitigation action may help minimize active security breaches and reduce the risk of repeated execution of known threats, and/or enhance overall system security.

It shall be recognized that, in one or more embodiments, at least one technical advantage of evaluating service-validated security alerts (e.g., security alerts or the like) against one or more corpora of computing environment-informative data may prevent a display or surfacing of service-validated security alerts that may be deemed irrelevant (e.g., noise) by a subject subscriber to which the service-validated security alert corresponds.

Instantiating a Data Integration Building User Interface

In one or more embodiments, the method 200 may further include intelligently constructing a data integration for a non-integrated technology data source. In such an embodiment, the method may include identifying a non-integrated technology data source, obtaining a corpus of raw event data associated with the non-integrated technology data source, instantiating a technology integration user interface (e.g., data integration building user interface or the like), constructing and simulating a data integration for the non-integrated technology data source using the technology integration user interface, and deploying the data integration (e.g., security data integration).

In one or more embodiments, a system or service implementing method 200 may function to identify one or more technology data sources that may be in inoperable communication with the cybersecurity event detection and response service. A non-integrated technology data source, as generally referred to herein, may be a technology data source that is not integrated and/or in inoperable communication with the cybersecurity event detection and response service. It shall be noted that the phrase "technology data source" may be interchangeably referred to herein as a "security data source", a "security device", or the like.

In one or more embodiments, a system or service implementing method 200 may enable an accelerated construction of a data integration for a non-integrated technology data source (e.g., non-integrated security device or the like). In such embodiments, based on a construction of a data integration for the non-integrated technology data source (e.g., non-integrated security device), the system or service implementing method 200 may function to recognize and/or identify the non-integrated technology data source as an integrated technology data source (e.g., integrated security device). An integrated technology data source, as generally referred to herein, may enable the system or service implementing method 200 (e.g., the cybersecurity event detection and response service) to receive, obtain, and/or process security event/alert data from the integrated technology data source (e.g., integrated security device). Conversely, a non-integrated technology data source may prevent the cybersecurity event detection and response service from receiving, obtaining, and/or processing security event/alert data from the non-integrated technology data source.

Figure 10:
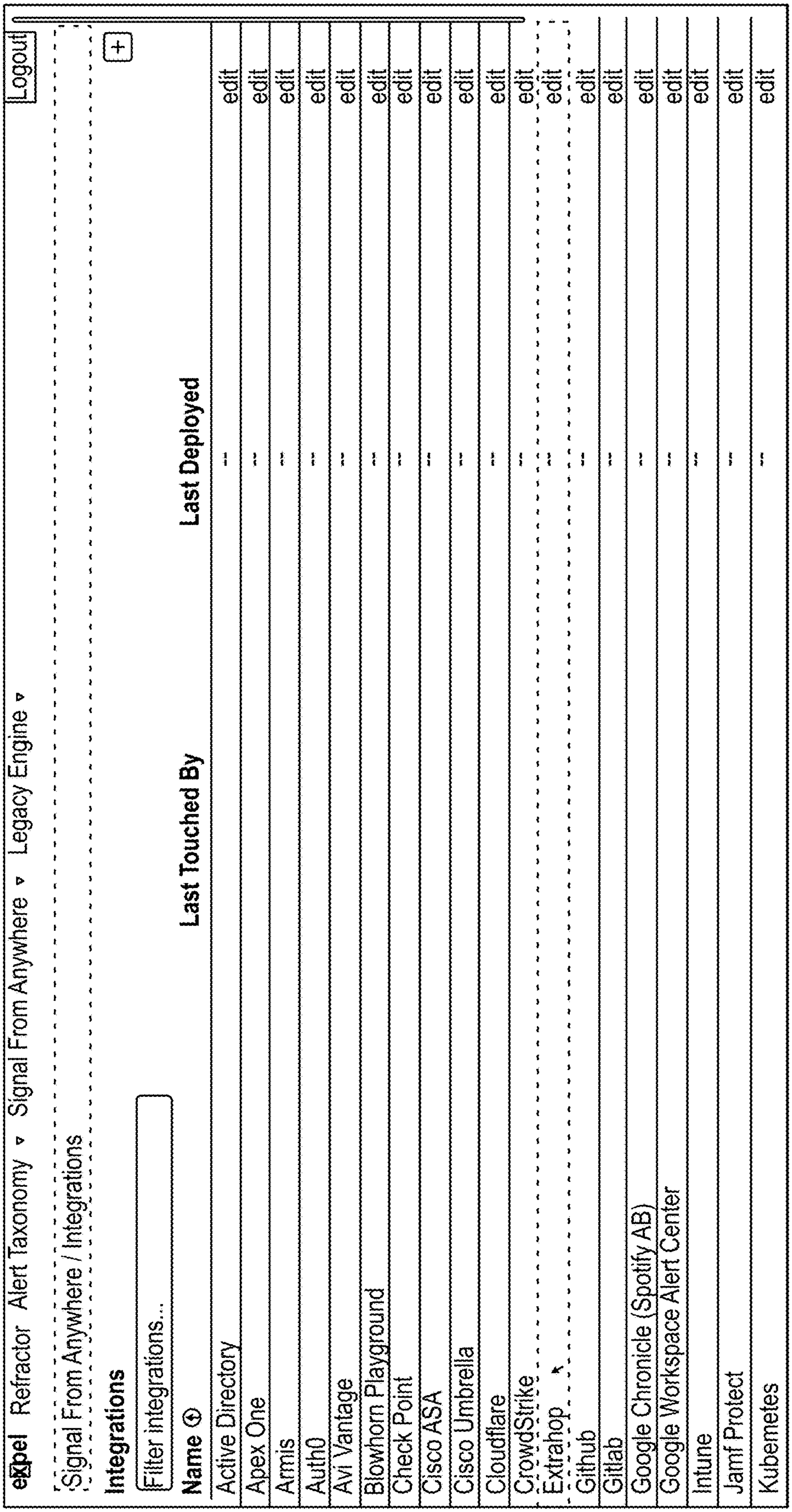
Figure 26:
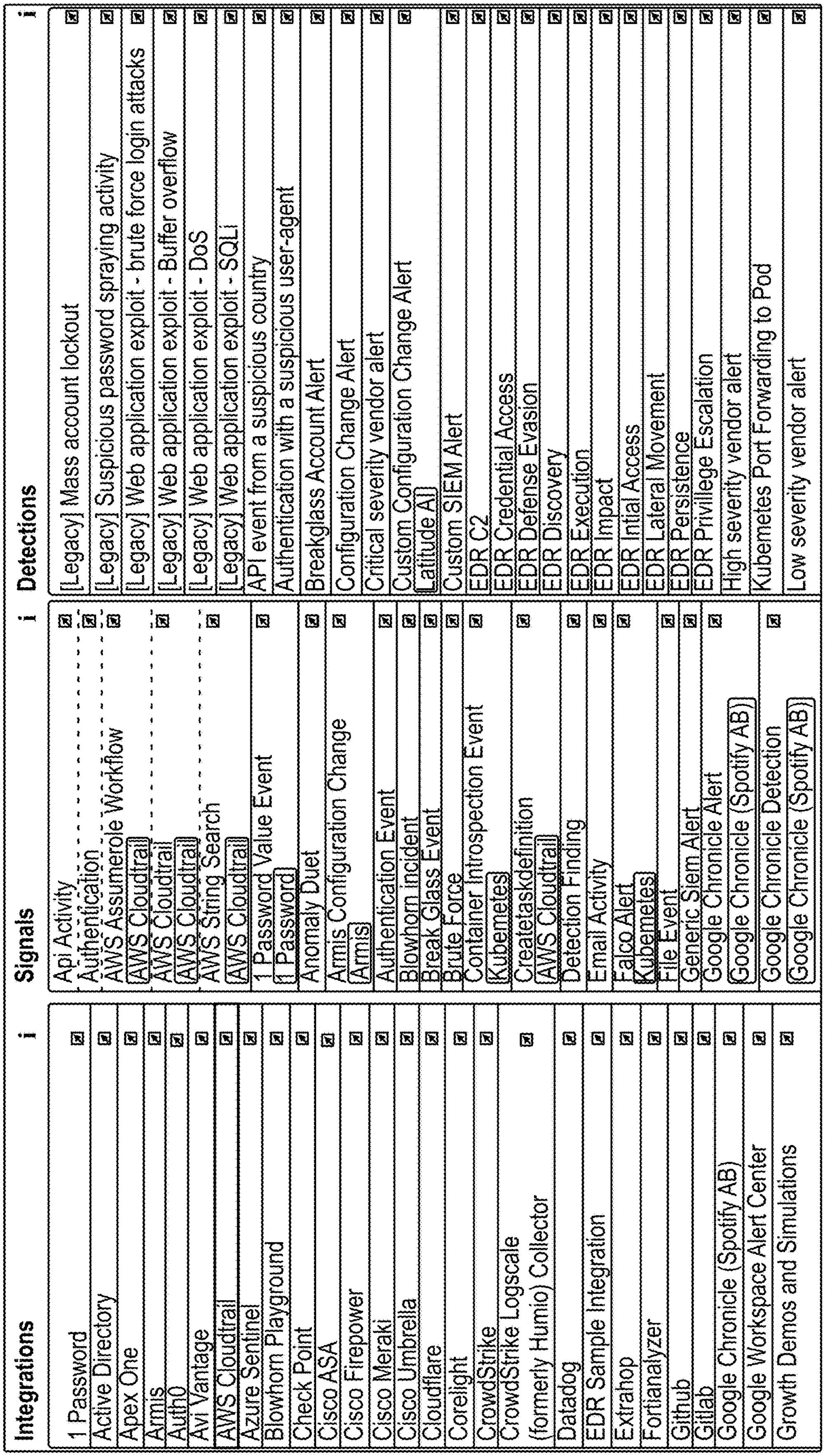

Accordingly, in one or more embodiments, the system or service implementing method 200 may function to implement a web-accessible integration platform that may include a graphical user interface that displays a current set of technology data sources integrated with the cybersecurity event detection and response service and, optionally, a user interface element that, when selected, provides one or more users a capability of constructing a data integration for a (e.g., target) non-integrated technology data source entirely within the web-accessible integration platform, as shown generally by way of example in FIG. 10, FIG. 25, and FIG. 26. In such embodiments, based on receiving one or more inputs or a sequence of inputs from a target user using the graphical user interface, the system or service implementing method 200 may function to identify (e.g., obtain, receive, etc.) a non-integrated technology data source that the target user prefers the cybersecurity event detection and response service to have a data integration (e.g., security data intergration) therewith.

Stated another way, in one or more embodiments, a system or service implementing method 200 may function to provide a data integration building platform or data integration building user interface that enables users to accelerate a creation of a data integration for a target security device (e.g., 1Password®, Amazon Web Services, Amazon Web Services Cloud Trail®, Azure Kubernetes Service®, Azure Monitor log Analytics®, Netskope Cloud Access Security Broker®, Sumo Logic Cloud SIEM®, CrowdStrike Falcon®, GitHub®, etc.) of a subscriber.

In one or more embodiments, a system or service implementing method 200 may function to collect and/or store one or more corpora of raw event data associated with a non-integrated technology data source. A corpus of raw event data associated with a non-integrated technology data source (e.g., non-integrated security device), as generally referred to herein, may include a plurality of distinct raw events occurring at, generated by, and/or processed by the non-integrated technology data source (e.g., non-integrated security device). It shall be noted that the system or service implementing method 200 may function to obtain the one or more corpora of raw event data in a variety of modes.

In one or more embodiments, the system or service implementing method 200 may function to obtain or receive a corpus of raw event data associated with a subject non-integrated technology data source based on a preferred data upload scheme of a target user, a target subscriber, and/or the system or service implementing the method 200.

In a first implementation, a target user may upload one or more documents (or files) that includes one or more corpora of raw event data via a data corpus upload graphical user interface or the like. Stated another way, a target user may upload one or more distinct corpora of raw event data via a web-accessible graphical user interface.

Additionally, or alternatively, in a second implementation, the system or service implementing method 200 may function to receive and/or obtain batches of raw event data using one or more application programming interfaces of the non-integrated technology data source. For instance, in a non-limiting example, via the one or more application programming interfaces of the non-integrated technology data source, the system or service implementing method 200 may function to receive or collect batches of raw event data from the non-integrated technology data source.

Figure 20:
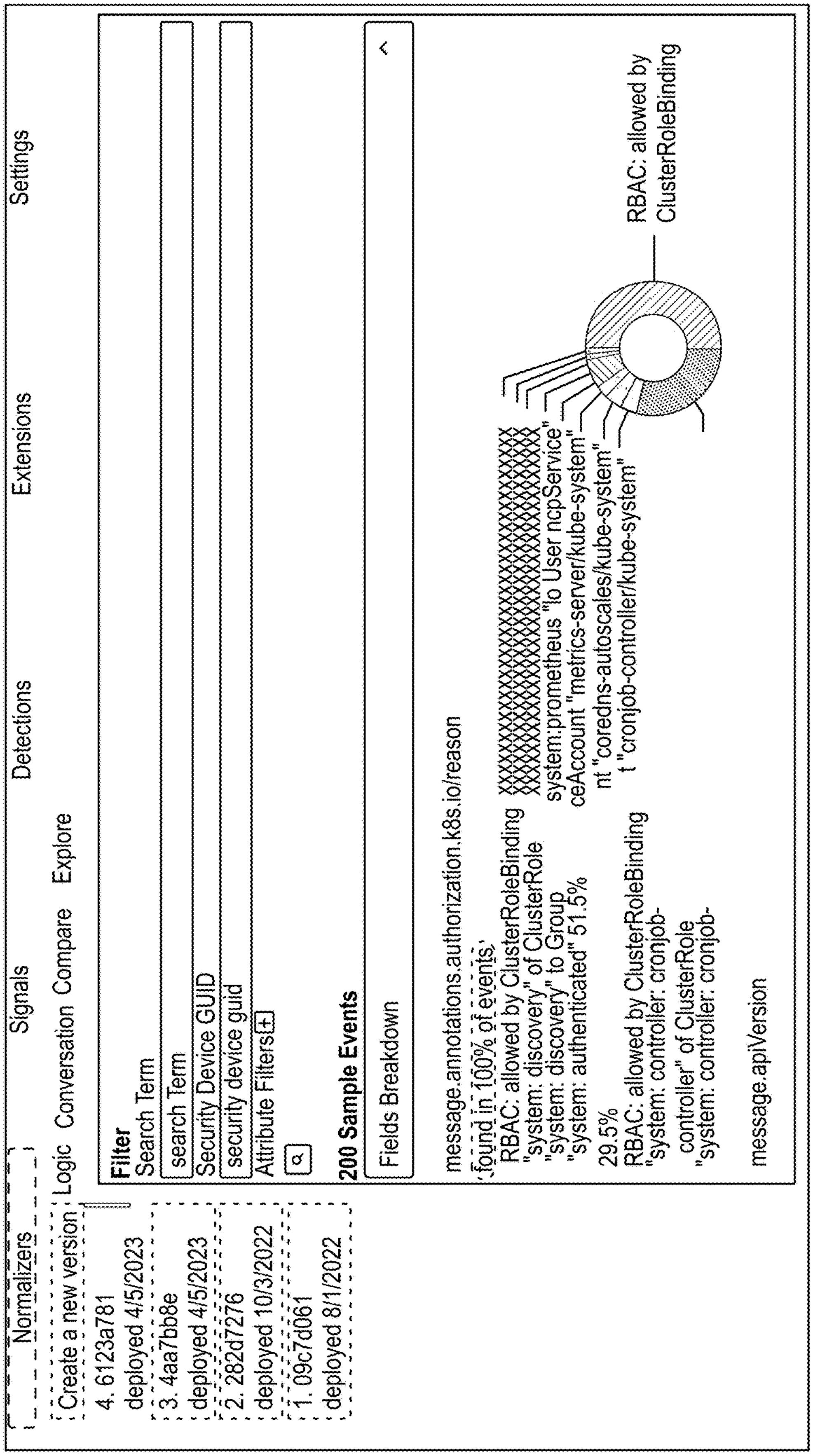

At least one technical benefit of obtaining the one or more corpora of raw event data may enable an accelerated assessment of raw event data included in the one or more corpora of raw event data, a sampling of raw events included in the one or more corpora of raw event data, and/or an automated exploratory data analysis of the one or more corpora of raw event data to surface, via a graphical user interface, probative cybersecurity-informative data fields included in the one or more corpora of raw event data that may aid in configuring an integration and/or downstream event detection logic, as shown generally by way of example in FIG. 20.

For instance, in a non-limiting example, based on obtaining one or more corpora of raw event data, the above-mentioned graphical user interface may function to indicate a frequency of fields included in the one or more corpora of raw event data. In such a non-limiting example, the above-mentioned graphical user interface may indicate that the 'message.annotations.authorization.k8s.io/reason' data field occurred in each piece of raw event data of the one or more corpora of raw event data. According, in one or more embodiments, a user may use this information when building or constructing a data integration for a non-integrated security device.

In one or more embodiments, a system or service implementing method 200 may function to instantiate a technology integration user interface (e.g., data integration building user interface) that may provide a capability of configuring and/or building a data integration (e.g., security data integration) within the web-accessible integration platform. In one or more embodiments, a structure or arrangement of the technology integration user interface may enable a target user, who may have limited-to-no experience in constructing data integrations, to intuitively construct one or more data integrations for one or more non-integrated technology data sources (e.g., a target third-party security device or the like), respectively. It shall be noted that the phrase "technology integration user interface" may also be referred to herein as an "integration configuration user interface" or the like.

Stated differently, another technical advantage of implementing the no-code, web-accessible integration platform includes eliminating the barrier for non-technical users to construct data integration and further eliminates the need for users to perform complex data integration and data manipulation tasks.

In one or more embodiments, a layout of the technology integration user interface may include a plurality of distinct regions and/or portions that collectively correspond to a plurality of distinct technology integration building stages. The distinct regions and/or portions of the technology integration user interface, in one or more embodiments, may enable target users or the like to intuitively configure a data integration for a non-integrated technology data source, simulate (e.g., test) the data integration configured for the non-integrated technology data source, and deploy the data integration into production. Stated another way, the technology integration user interface may intelligently include the user interface elements and/or operably communicate with the modules, engines, and/or components necessary to configure, simulate, and deploy a data integration for a subject non-integrated technology data source (e.g., non-integrated security device, target third-party security device, or the like). Thereby, reducing a likelihood that a target user may need to navigate to other integration platforms, integration data repositories, and/or integration user interfaces to configure, simulate, and/or deploy the data integration.

Figure 11:
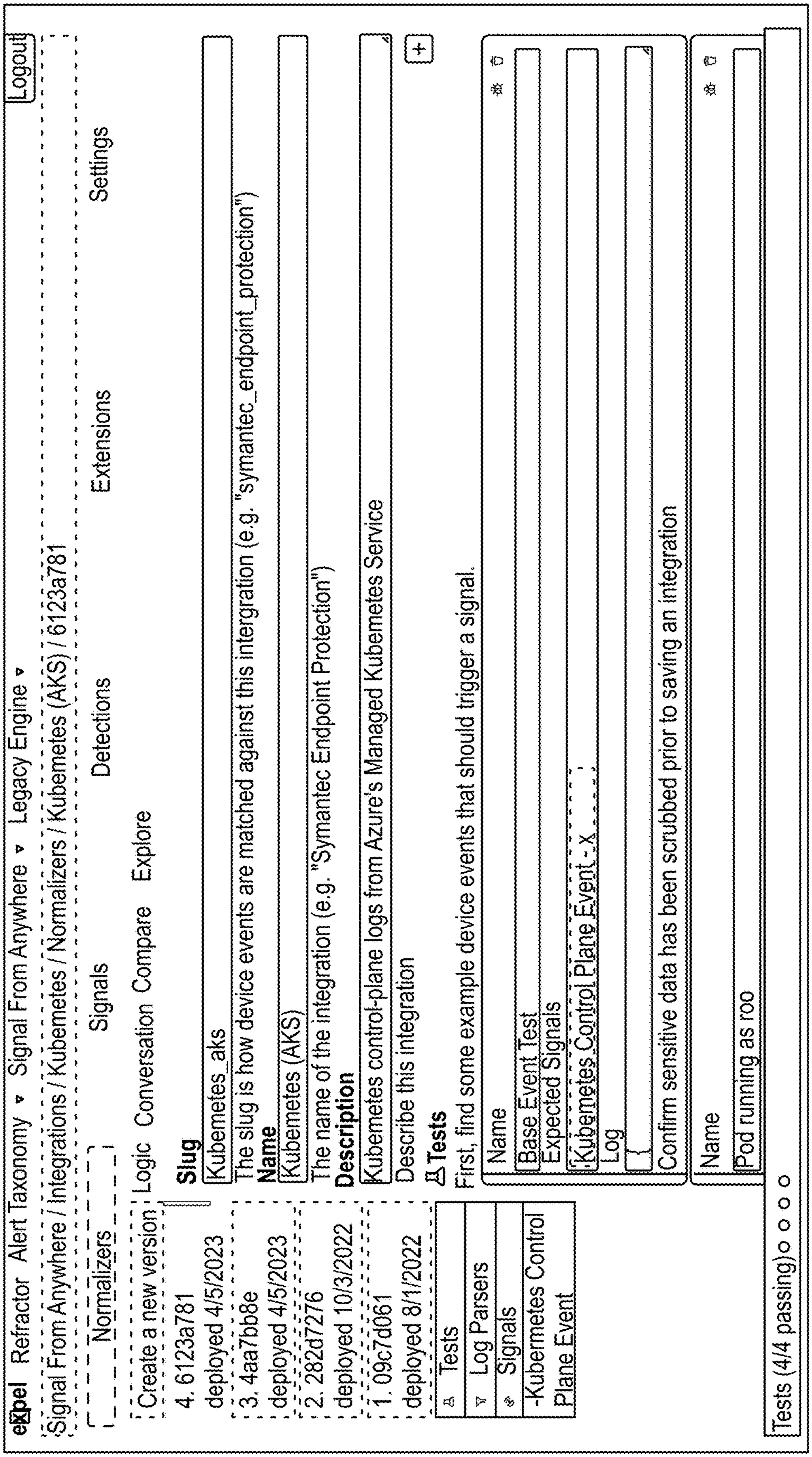
Figure 12:
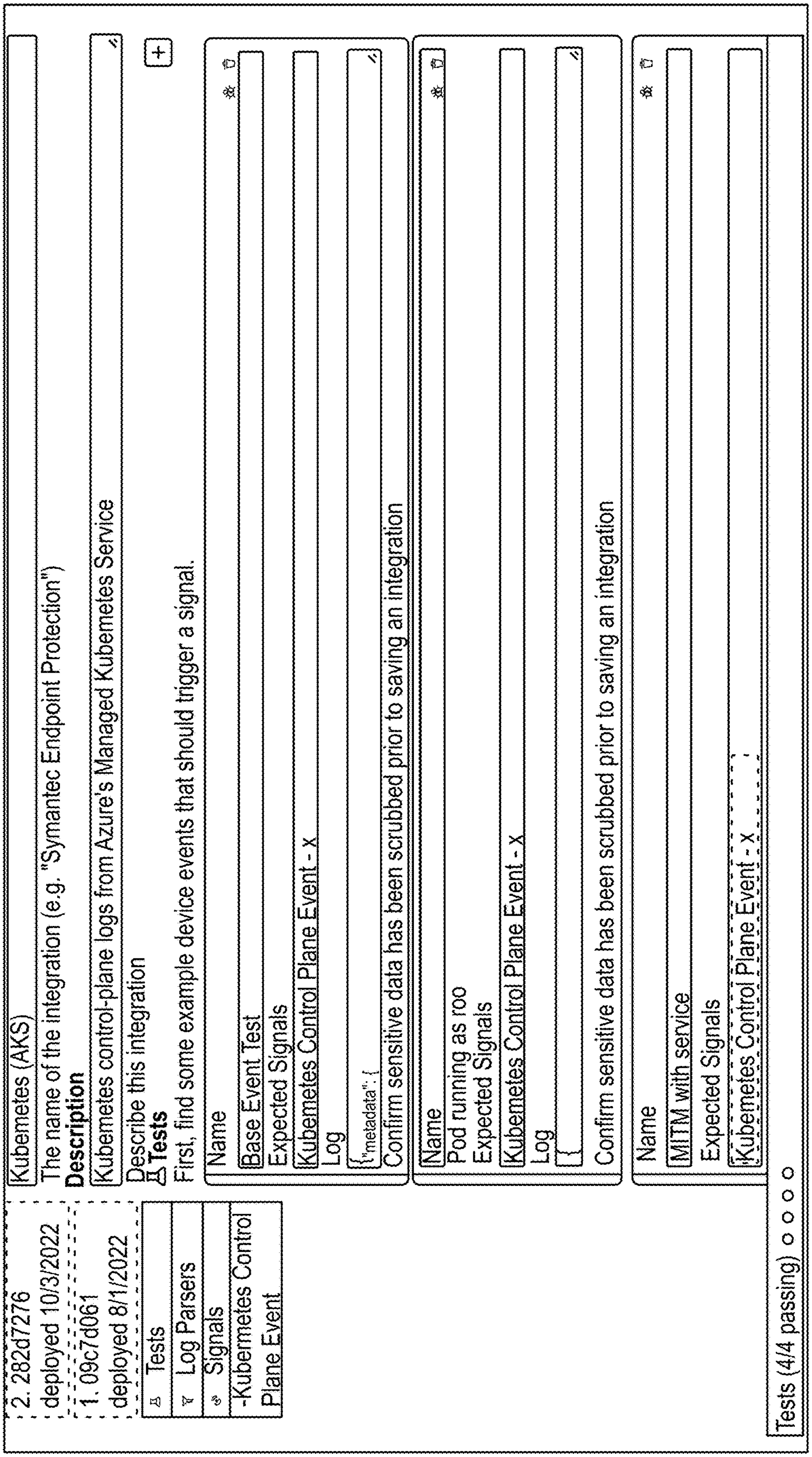
Figure 13:
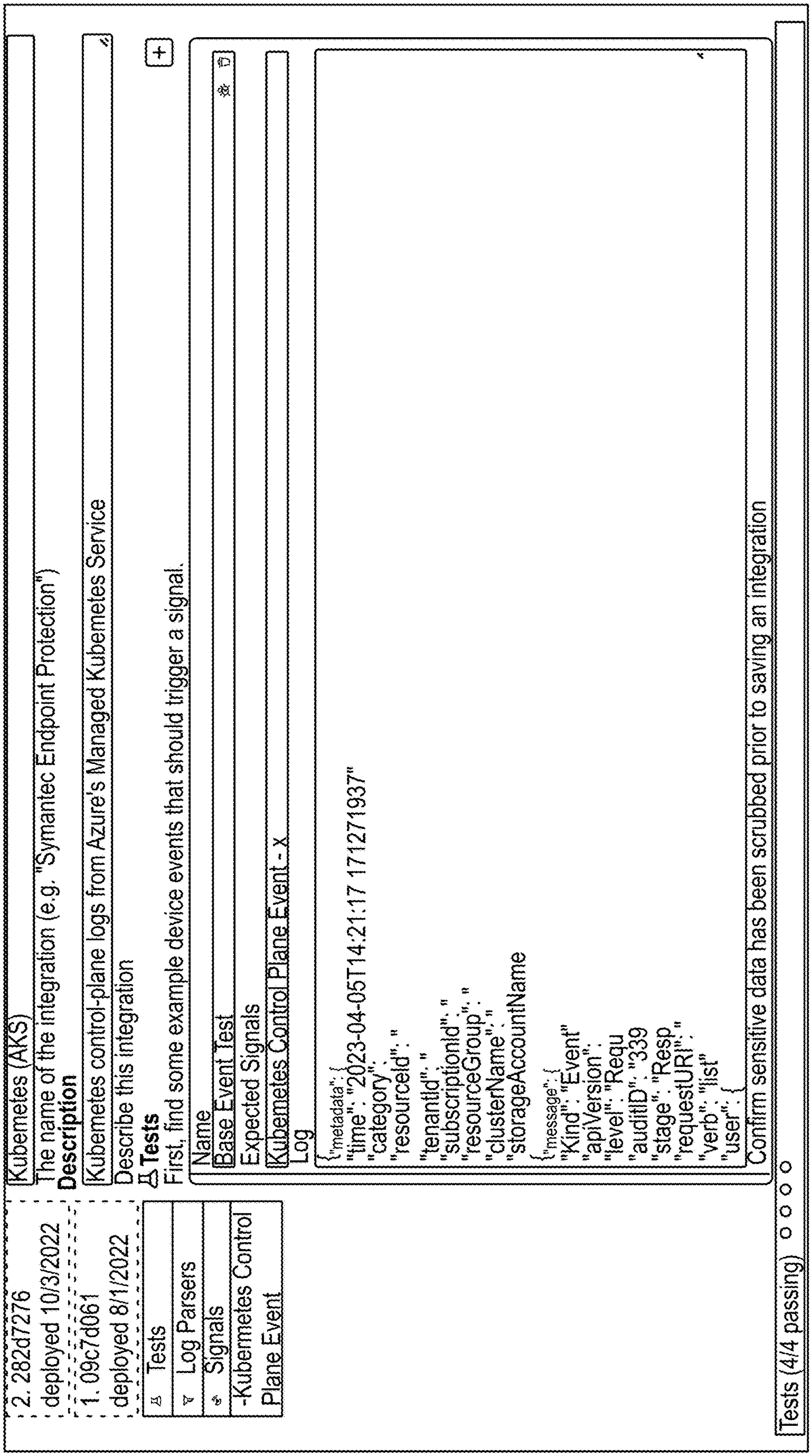
Figure 27:
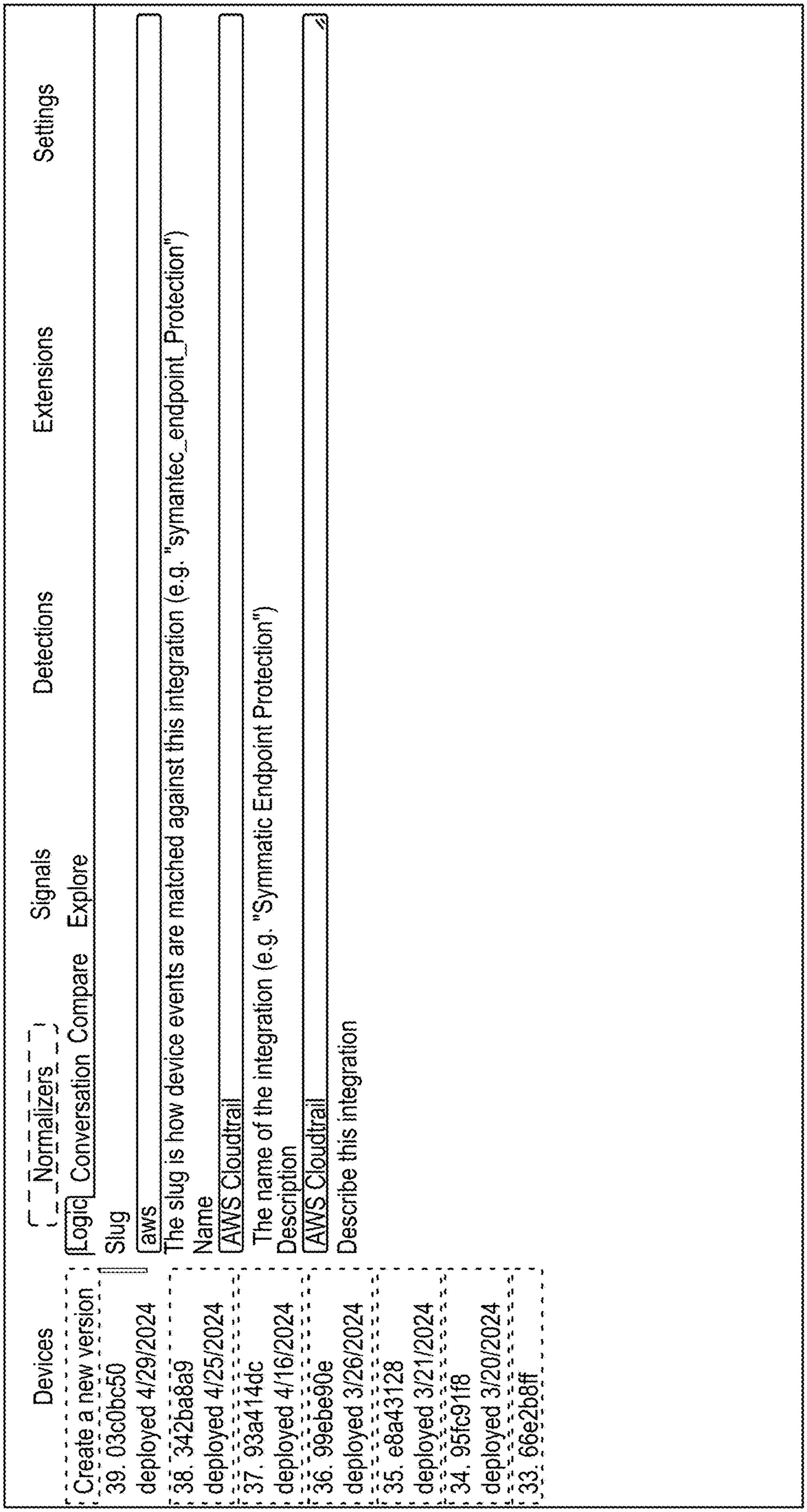

In one or more embodiments, the technology integration user interface may include an integration overview region, as shown generally by way of example in FIG. 11 and FIG. 27. The integration overview region, in one or more embodiments, may include one or more user interface elements that may provide a target user a capability of defining precursory integration data associated with the data integration.

For instance, in a non-limiting example, the integration overview region may include an integration title data field that may be configured to receive, as input, one or more text strings that may indicate a title of a subject data integration.

Additionally, or alternatively, in a non-limiting example, the integration overview region may include an integration description data field that may be configured to receive, as input, one or more text strings that may indicate a description of a subject data integration.

Additionally, or alternatively, in a non-limiting example, the integration overview region may include an integration slug data field that may be configured to receive, as input, one or more text strings that may indicate a slug of a subject data integration.

Stated another way, in one or more embodiments, the system or service implementing method 200 may function to instantiate a graphical user interface that includes a plurality of integration-identifying user interface input elements that may be configured to receive one or more strings of text for specifying a set of integration identification parameters that may characterize an in-development security integration for a third-party security service (e.g., third-party security device, third technology data source, or the like). In such embodiments, the plurality of integration-identifying user interface input elements may include a first integration-identifying user interface input element configured to receive an input of a title that corresponds to the in-development security integration. Additionally, or alternatively, in such embodiments, the plurality of integration-identifying user interface input elements may include a second integration-identifying user interface input element configured to receive an input of an integration description that corresponds to the in-development security integration. Additionally, or alternatively, in such embodiments, the plurality of integration-identifying user interface input elements may include a third integration-identifying user interface input element configured to receive an input of a slug that corresponds to the in-development security integration.

It shall also be noted that the integration overview region may include additional, fewer, or different integration data fields without departing from the scope of the present disclosure.

Figure 14:
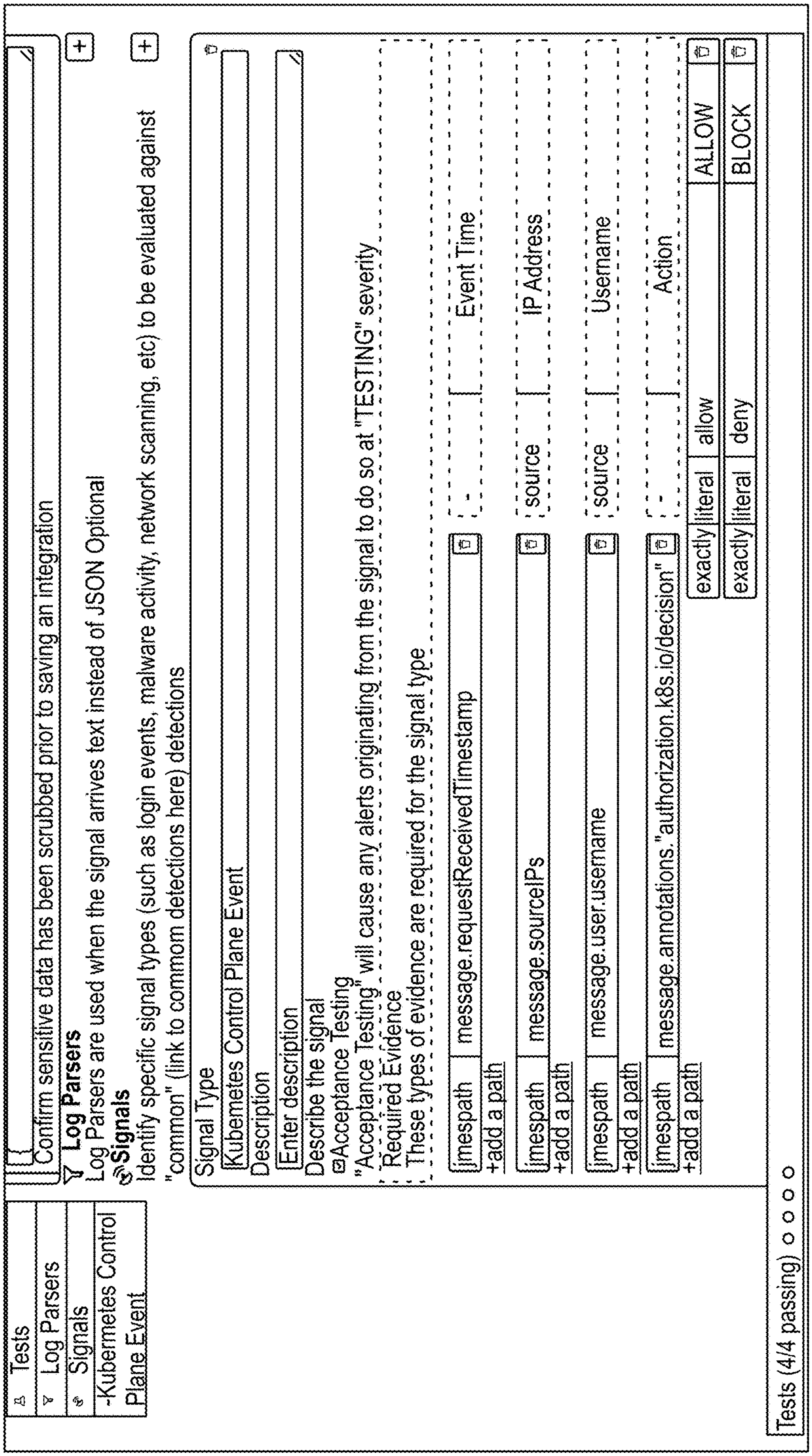
Figure 15:
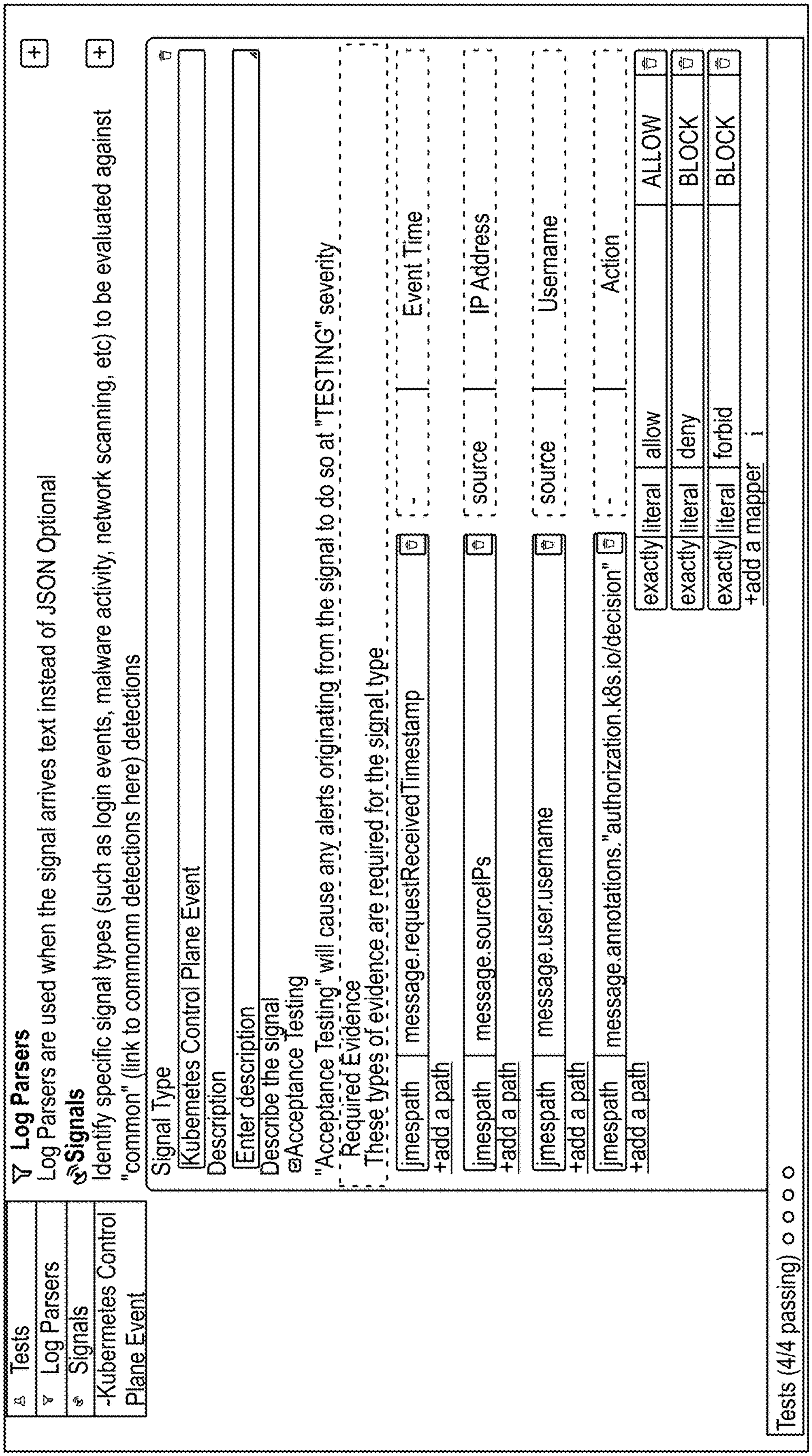
Figure 16:
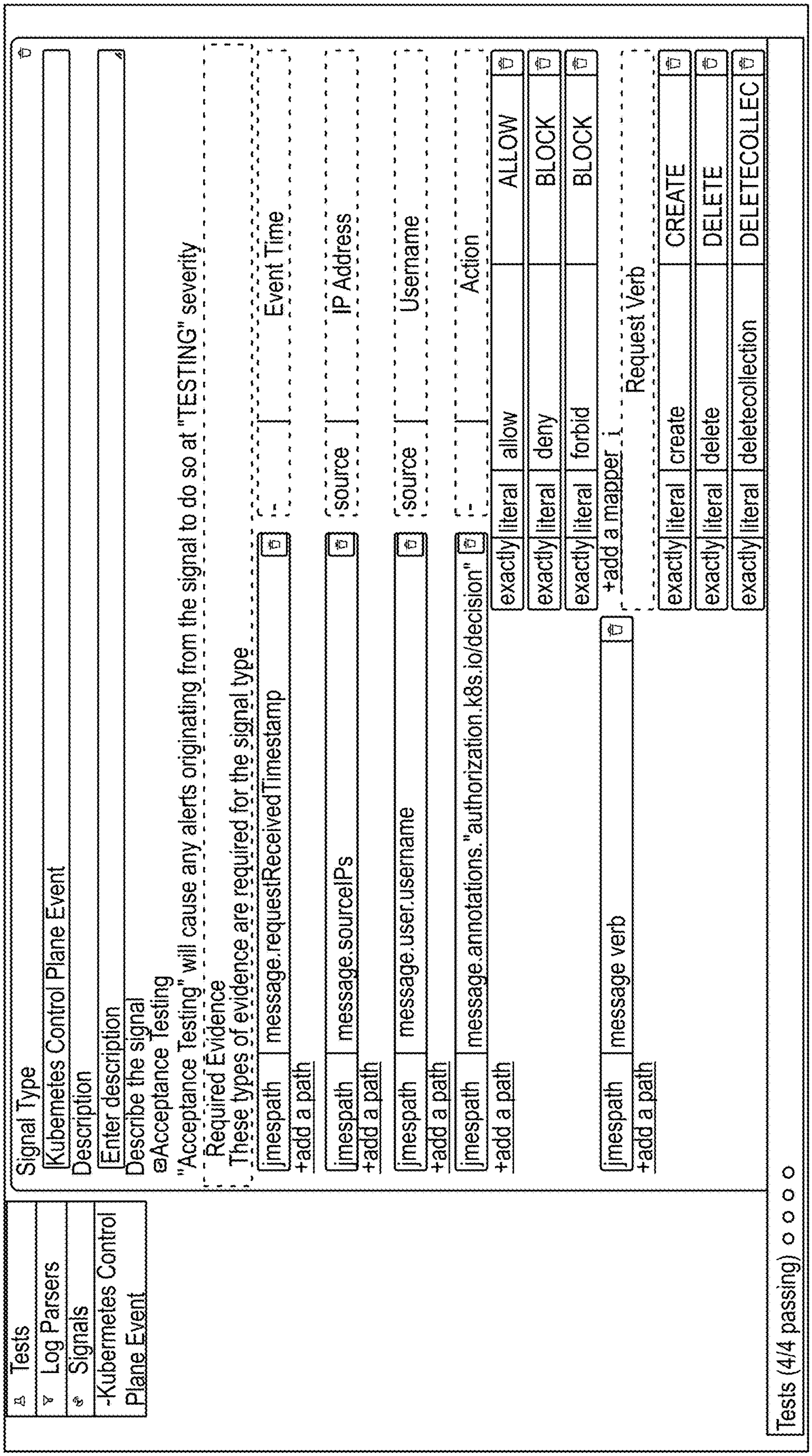

In one or more embodiments, the technology integration user interface may include an event data normalization region, as shown generally by way of example in FIG. 14, FIG. 15, and FIG. 16. The event data normalization region, in one or more embodiments, may enable a target user to define one or more data integration nexuses between a target non-integrated technology data source and the cybersecurity event detection and response service. In such embodiments, each distinct data integration nexus may correlate raw event data fields, raw event data labels, raw event data tags, raw event data, raw event data paths and/or the like of the non-integrated technology data source (e.g., third-party security device) to a distinct technology source-agnostic event signal of the cybersecurity event detection and response service, as described in more detail herein.

Figure 18:
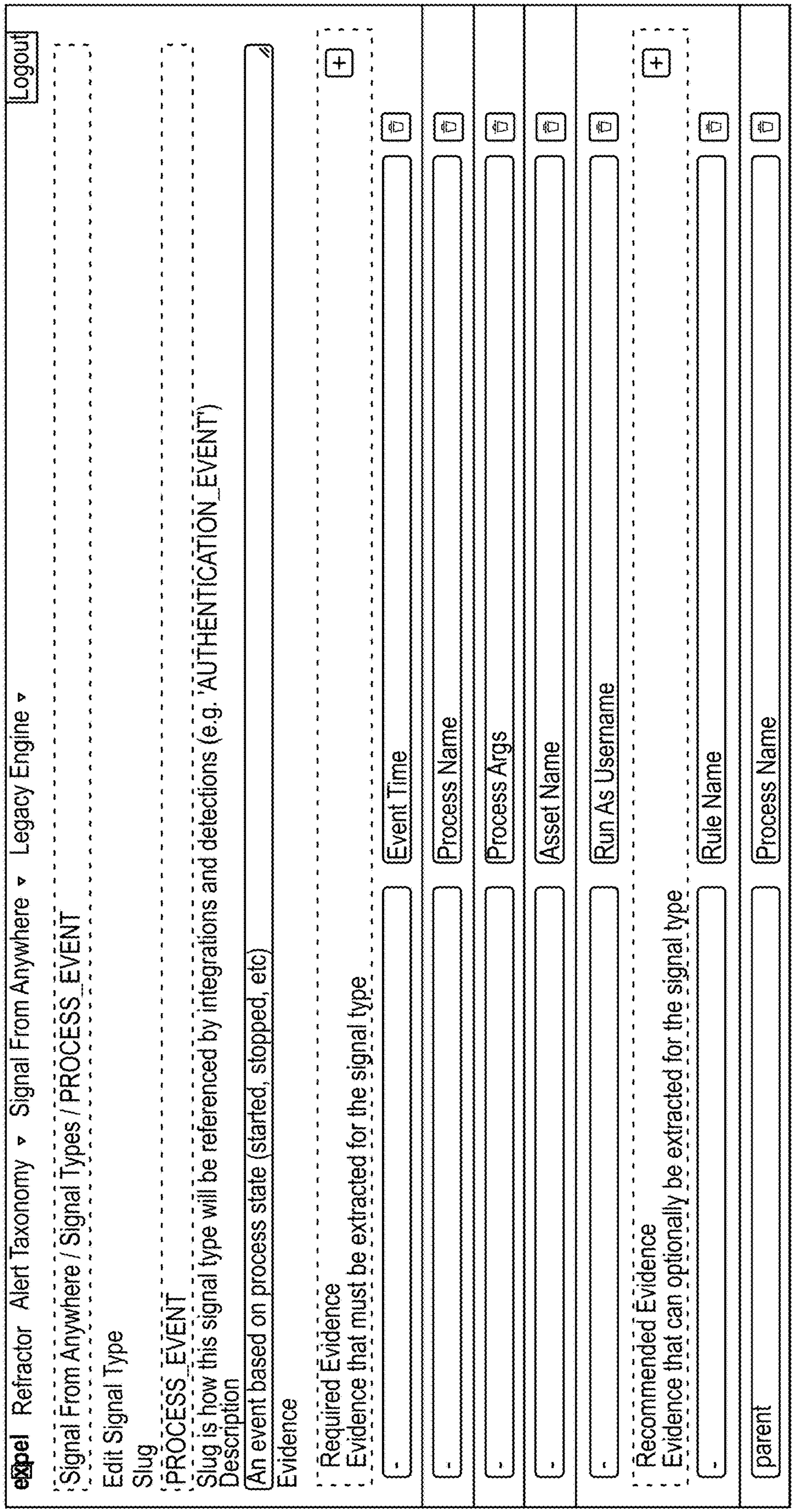
Figure 19:
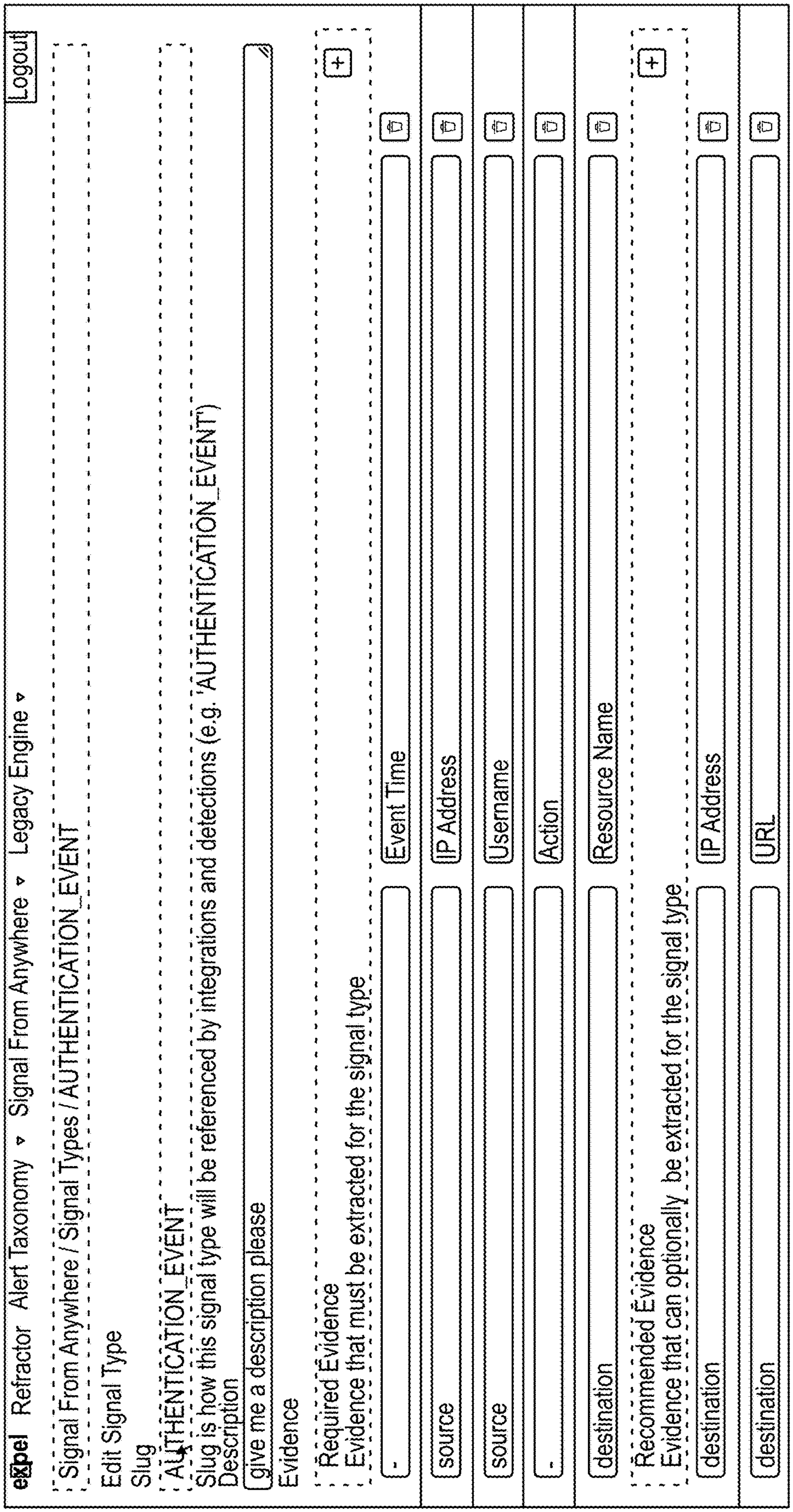

A distinct technology source-agnostic event signal, as generally referred to herein, may correspond to a distinct type of event signal and may include a data model comprising a first set of evidence data required by the distinct type of event signal and a second set of evidence data that is not required (e.g., optional, recommended, etc.) by the distinct type of event signal, as shown generally by way of example in FIG. 18. For instance, in a non-limiting example, one of a plurality of distinct technology source-agnostic event signals may correspond to an authentication-type event signal, as shown generally by way of example in FIG. 19.

It shall be noted that, in one or more embodiments, a system or service implementing method 200 may have a plurality of predetermined or predefined technology source-agnostic event signal types (e.g., normalized security event type) including, but not limited to, a technology source-agnostic authentication-type signal, a technology source-agnostic file event-type signal, a technology source-agnostic multi factor authentication-type signal, a technology source-agnostic detection finding-type signal, a technology source-agnostic policy violation-type signal, a technology source-agnostic break glass event-type signal, a technology source-agnostic threat intel event-type signal, a technology source-agnostic vendor alert-type signal, a technology source-agnostic anomaly duet-type signal, a technology source-agnostic security finding-type signal, a technology source-agnostic email activity-type signal, a technology source-agnostic brute force-type signal, a technology source-agnostic network categorical threat-type signal, a technology source-agnostic blowhorn incident-type signal, a technology source-agnostic API activity-type signal, a technology source-agnostic web application firewall event-type signal, a technology source-agnostic phishing event-type signal, a technology source-agnostic SIEM event-type signal, a technology source-agnostic vendor event-type signal, a technology source-agnostic network connection-type signal, and a technology source-agnostic process event-type signal, as shown generally by way of example in FIG. 17.

Accordingly, in one or more embodiments, using one or more user interface elements of the event data normalization region of the technology integration user interface (e.g., data integration building user interface), a target user may map (e.g., normalize, associate, translate, etc.) raw event data fields, raw event data labels, raw event data paths (e.g., JMESPath, etc.) and/or raw event data tags of a non-integrated technology data source to event data fields (e.g., required evidence data fields, recommended evidence data fields, etc.) of a target technology source-agnostic event signal and/or target technology source-agnostic event signal type that is understandable and/or processable by the cybersecurity event detection and response service, as shown generally by way of example in FIG. 29 and FIGS. 31-39.

In one or more embodiments, the technology integration user interface may include an integration simulation region, as shown generally by way of example in FIG. 12, FIG. 13, FIG. 18, and FIG. 30. The integration simulation region, in one or more embodiments, may enable a target user to simulate and/or test a data integration configured for a target technology data source. At least one technical benefit of simulating and/or testing the data integration may validate if the cybersecurity event detection and response service in conjunction with the data integration is normalizing and/or processing raw sample event data (e.g., log data, raw event data, etc.) of the target technology data source as expected. It shall be noted that the "integration simulation region" may also be referred to herein as "a signal testing region" or the like.

In one or more embodiments, the integration simulation region may enable the target user to configure one or more security event simulations (e.g., one or more security event tests or the like) based on receiving one or more user inputs and/or a sequence of user inputs associated with adding a security event simulation (e.g., security event test).

Additionally, or alternatively, in one or more embodiments, based on or in response to configuring the one or more security event simulations (e.g., the one or more security tests or the like), the one or more security event simulations may be automatically executed, via one or more processing devices of the cybersecurity event detection and response service, based on one or more event simulation execution criteria being satisfied. For instance, in a non-limiting example, the one or more security event simulations associated with a target data integration may be automatically executed, via one or more processing devices, based on detecting one or more algorithmic changes and/or programming logic changes associated with the target data integration to which the one or more security event simulations correspond. In another non-limiting example, the one or more security event simulations (e.g., tests) associated with a target data integration may be automatically executed, via one or more processing devices, based on instantiating a technology integration user interface that corresponds to the target data integration. In another non-limiting example, a target security event simulation (e.g., test) associated with a target data integration may be automatically executed, via one or more processing devices, based on receiving an input from a target user selecting a user interface object that, when selected, executes the target security event simulation.

Additionally, or alternatively, in one or more embodiments, the integration simulation region of the technology integration user interface may include a simulation results indicator that may graphically and/or textually provide findings data, result data, and/or outcome data associated with each of the one or more security event simulations configured for a target data integration. That is, in one or more embodiments, the simulation results indicator may include a distinct simulation findings user interface object for each distinct security event simulation. Accordingly, in one or more embodiments, the distinct simulation findings user interface object may visually and/or graphically indicate whether a result of a subject security event simulation was successful or not (e.g., pass, fail, etc.), as shown generally by way of example in FIG. 11, FIG. 12, and FIG. 13.

In one or more embodiments, a system or service implementing method 200 may function to may function to construct and simulate the data integration using the technology integration user interface. In one or more embodiments, based on or in response to instantiating the technology integration user interface (e.g., a data integration building user interface), a target user may use the technology integration user interface to configure (e.g., construct and simulate) a data integration for a non-integrated technology data source (e.g., non-integrated security device). It shall be noted that, in one or more embodiments, a distinct data integration may be configured using the technology integration user interface on a per-technology technology data source basis or the like.

For instance, in a non-limiting example, based on receiving one or more user inputs at the technology integration user interface, a target user may function to configure and simulate a first data integration associated with a first, distinct non-integrated technology data source. Additionally, in such a non-limiting example, after building the first data integration, the target user may function to configure and simulate a second data integration for a second, distinct non-integrated technology data source (e.g., non-integrated third-party security service).

In one or more embodiments, based on or in response to instantiating the technology integration user interface, the technology integration user interface may display the integration overview region that may be used, in part, to construct at least a portion of a data integration for a target non-integrated technology data source (e.g., currently non-integrated technology data source, currently non-integrated security device, currently non-integrated third-party security service, etc.). In such embodiments, the integration overview region may include a plurality of user interface objects and elements that may be configured to source, collect and/or obtain integration data (e.g., identifying integration information, precursory integration data, and/or the like) from a target user.

In one or more embodiments, the integration overview region may include an integration title data field that may be configured to receive, as input, one or more text strings that may indicate a title of a data integration. Stated another way, based on receiving one or more inputs at the integration title data field, the title of the data integration may be defined. For instance, in a non-limiting example, based on receiving one or more inputs from a target user at the integration title data field, the title of a data integration may be set as "Kubernetes (AKS)", as shown generally by way of example in FIG. 11.

Additionally, or alternatively, in one or more embodiments, the integration overview region may include an integration description data field that may be configured to receive, as input, one or more text strings that may indicate a description (e.g., summary or the like) of a data integration. Stated another way, based on receiving one or more inputs at the integration description data field, the description of the data integration may be defined. For instance, in a non-limiting example, based on receiving one or more inputs from a target user at the integration description data field, the description of the data integration may be set as "Kubernetes Control-Plane Logs from Azure's Managed Kubernetes Service", as shown generally by way of example in FIG. 11.

Additionally, or alternatively, in one or more embodiments, the integration overview region may include an integration slug data field that may be configured to receive, as input, one or more text strings that may indicate a slug (e.g., the slug is how device events are matched against the data integration). Stated another way, based on receiving one or more inputs at the integration slug data field, the slug of the data integration may be defined. For instance, in a non-limiting example, based on receiving one or more inputs from a target user at the integration slug data field, the slug of the data integration may be set as "Kubernetes_aks", as shown generally by way of example in FIG. 11.

Stated differently, in one or more embodiments, the graphical user interface (e.g., data integration building user interface, etc.) may include a plurality of integration-identifying user interface input elements that may be configured to receive one or more strings of text for specifying a set of integration identification parameters that may characterize an in-development security integration for a third-party security service (e.g., third-party security device, third technology data source, or the like). In such embodiments, the plurality of integration-identifying user interface input elements may include a first integration-identifying user interface input element configured to receive an input of a title that corresponds to the in-development security integration. Additionally, or alternatively, in such embodiments, the plurality of integration-identifying user interface input elements may include a second integration-identifying user interface input element configured to receive an input of an integration description that corresponds to the in-development security integration. Additionally, or alternatively, in such embodiments, the plurality of integration-identifying user interface input elements may include a third integration-identifying user interface input element configured to receive an input of a slug that corresponds to the in-development security integration.

In one or more embodiments, based on or in response to instantiating the technology integration user interface, the technology integration user interface may function to display the event data normalization region that may be used, in part, to construct at least a portion of a data integration for a target non-integrated technology data source (e.g., currently non-integrated technology data source). In such embodiments, the event data normalization region may include a selectable event normalization button that, when selected, may enable a user to add a target technology source-agnostic event signal data model of a plurality of distinct technology source-agnostic event signal data models within the event data normalization region of the technology integration user interface. It shall be noted that the "event data normalization region" may also be interchangeably referred to herein as a "signal transformation region" or the like.

In one or more embodiments, the event data normalization region of the technology integration user interface may be used to define one or more integration nexuses between a target non-integrated technology data source and a plurality of distinct technology source-agnostic event signal types of the cybersecurity event detection and response service. It shall be noted that each of the plurality of distinct technology source-agnostic event signal types may be configured to have a many-to-one relationship in which a plurality of technology data sources may have event normalization parameters and/or event transformation parameters defined for a subject technology source-agnostic event signal type (e.g., a first technology data source or security device may have a first set of signal transformation parameters defined for a first technology source-agnostic event signal type, a second technology data source or security device may have a second set of signal transformation parameters defined for the first technology source-agnostic event signal type, a third technology data source or security device may have a third set of signal transformation parameters defined for the first technology source-agnostic event signal type, etc.). Thereby, enabling the cybersecurity event detection and response service to configure and/or execute detection logic (e.g., computer-executable event signal handling heuristics or the like) on the technology source-agnostic event signals, when generated, versus directly handling security events (e.g., raw security event data) of the plurality of distinct technology data sources that may be in a plurality of different shapes.

In one or more embodiments, each of the plurality of distinct technology source-agnostic event signal data models may correspond to a distinct technology source-agnostic event signal type. For instance, a first technology source-agnostic event signal data model may correspond to a first technology source-agnostic event signal type, a second technology source-agnostic event signal data model may correspond to a second technology source-agnostic event signal type, a third technology source-agnostic event signal data model may correspond to a third technology source-agnostic event signal type, and n-number of technology source-agnostic event signal data models may correspond to n-number technology source-agnostic event signal types, respectively. In a non-limiting example, a technology source-agnostic authentication event signal data model may correspond to a technology source-agnostic authentication event signal type, a technology source-agnostic phishing event signal data model may correspond to a technology source-agnostic phishing event signal type, a technology source-agnostic file event signal data model may correspond to a technology source-agnostic file event signal type, and a technology source-agnostic policy violation event signal data model may correspond to a technology source-agnostic policy violation event signal type.

In one or more embodiments, based on selecting the selectable event normalization button, the system or service implementing method 200 may function to display a plurality of distinct selectable representations in which each distinct selectable representation corresponds to a distinct one of the plurality of technology source-agnostic event signal types defined by the cybersecurity event detection and response service. Accordingly, based on identifying an input from a target user selecting one of the plurality of technology source-agnostic event signal types, the system or service implementing method 200 may function to display, within the event data normalization region of the technology integration user interface, the technology source-agnostic event signal data model that corresponds to the selected one of the plurality of technology source-agnostic event signal types. It shall be noted that, in one or more embodiments, the technology source-agnostic event signal data model may include a first set of evidence data types required by the selected one of the plurality of technology source-agnostic event signal types and a second set of evidence data types that is not required (e.g., optional, recommended, etc.) by the selected one of the plurality of technology source-agnostic event signal types. It shall be further noted that, for each distinct evidence data type required by the selected one of the plurality of technology source-agnostic event types and/or for each distinct evidence data type not required by the selected one of the plurality of technology source-agnostic event types, the system or service implementing method 200 may function to display a distinct set of correlative user interface elements that is configured to correlate (e.g., translate, map, etc.) a technology-specific evidence data label (or technology-specific data path) to a technology source-agnostic event data label (or technology source-agnostic event data path).

For instance, in a non-limiting example, based on receiving and/or detecting an input from a target user or the like selecting a selectable representation that corresponds to a technology source-agnostic kubernetes control plane event signal type, the system or service implementing method 200 may function to display the technology source-agnostic event signal data model including the evidence data types required by the selected one of the plurality of technology source-agnostic event signal types and/or the evidence data signal types not required (e.g., optional, recommended, preferred, etc.) by the selected one of the plurality of technology source-agnostic event signal types within the event data normalization region of the technology integration user interface, as shown generally by way of example in FIG. 14, FIG. 15, and FIG. 17.

Accordingly, in such a non-limiting example, for each distinct evidence data type required by the technology source-agnostic kubernetes control plane event signal type and/or for each distinct evidence data type not required by the technology source-agnostic kubernetes control plane event signal type, the system or service implementing method 200 may function to display a distinct set of correlative user interface elements that is configured to correlate (e.g., translate, map, etc.) a technology-specific evidence data label (or type or category or path) to a technology source-agnostic event data label (or type or category or path). For instance, in such non-limiting example, one of the pieces of evidence required by the technology source-agnostic kubernetes control plane event signal type may be an event time, therefore, the system or service implementing method 200 may function to display a distinct set of correlative user interface elements that includes a first user interface element having an input data field that is configured to receive, as input, a location (e.g., a data path, JMESPath, or the like) to the event time attribute that may be identified within event data of the technology source-agnostic event data obtained by the system or service implementing method 200 and a second user interface element that indicates a target data label (e.g., Event Time) required by the technology source-agnostic kubernetes control plane event signal type to which the location (e.g., the path or the like) corresponds, as shown generally by way of example in FIG. 14. Additionally, or alternatively, in such non-limiting example, one of the pieces of evidence required by the technology source-agnostic kubernetes control plane event signal type may be a username, therefore, the system or service implementing method 200 may function to display a distinct set of correlative user interface elements that includes a first user interface element having an input data field that is configured to receive a location (e.g., a path, JMESPath, or the like) to the username attribute within the technology source-agnostic event data obtained by the system or service implementing method 200 (or a target third-party security service) and a second user interface element that indicates a target data label (e.g., Username) required by the technology source-agnostic kubernetes control plane event signal type to which the location (e.g., the path or the like) corresponds, as shown generally by way of example in FIG. 14. It shall be noted that, in one or more embodiments, the first user interface element may be in line with the second user interface element.

It shall be further noted that the event data normalization region of the technology integration user interface may include additional, fewer, or different technology source-agnostic event signal data models in analogous ways as described above.

Stated differently, in one or more embodiments, based on receiving a plurality of inputs selecting a signal mapping addition control button or the like, a system or service implementing method 200 may function to display, via the data integration building user interface, a plurality of signal-specific data mapping containers. In other words, the data integration building user interface may include a plurality of signal-specific data mapping containers that are instantiated based on receiving a plurality of inputs selecting a signal mapping addition control button of the graphical user interface. It shall be noted that, in one or more embodiments, each distinct signal-specific data mapping container of the plurality of signal-specific data mapping containers may be configured to receive input of characters to map technology-specific data attributes (e.g., JMESPath, data paths, etc.) of a target third-party security service to technology source-agnostic data attributes required by a distinct technology source-agnostic event signal type of a plurality of predetermined technology source-agnostic event signal types.

In other words, in a non-limiting example, based on receiving an input selecting a signal mapping addition control button or the like, a system or service implementing method 200 may function to display, via the data integration building user interface, a signal-specific data mapping container. The signal-specific data mapping container, in such a non-limiting example, may be configured to receive inputs of characters (e.g., JMESPath, data paths, etc.) associated with a target third-party security service (e.g., third-party security device or the like) to digitally map, digitally link, and/or digitally associate technology-specific data attributes of the target third-party security service to technology source-agnostic data attributes required by a target technology source-agnostic event signal type.

Additionally, in such a non-limiting example, the signal-specific data mapping container may include a signal type user interface element that, when operated, displays a drop-down menu element of the plurality of predetermined technology source-agnostic event signal types provided by the cybersecurity event detection and response service. Accordingly, in one or more embodiments, the signal-specific data mapping container may further include a plurality of source-to-target data mapping user interface elements (e.g., distinct sets of correlative user interface elements, distinct sets of source-to-target data mapping pairing user interface elements) that are dynamically instantiated based on receiving a selection of the target technology source-agnostic event signal type from the drop-down menu element of the plurality of predetermined technology source-agnostic event signal types.

It shall be recognized, in such embodiments, each distinct source-to-target data mapping user interface element of the plurality of source-to-target data mapping user interface elements may include a target data attribute user interface element that may indicate a technology source-agnostic data attribute required by the target technology source-agnostic event signal type and a source data attribute user interface input element that may be configured to receive an input of a corresponding technology-specific data attribute of the third-party security service that corresponds to the technology source-agnostic data attribute.

It shall be further recognized, in one or more embodiments, the signal-specific data mapping container may include a condition-setting user interface element that may be configured to receive an input of one or more conditions that must be satisfied prior to a generation or an extraction of a technology source-agnostic event signal (e.g., normalized security event) of the technology source-agnostic event signal type based on a given raw event that occurred at the third-party security service.

Additionally, or alternatively, in one or more embodiments, a system or service implementing method 200 may function to display, via the data integration building user interface, a signal-specific data mapping container that is configured to receive inputs of characters to map technology-specific data attributes of a target third-party security service (or third-party security device) to technology source-agnostic data attributes required by a target technology source-agnostic event signal type.

Figure 39:
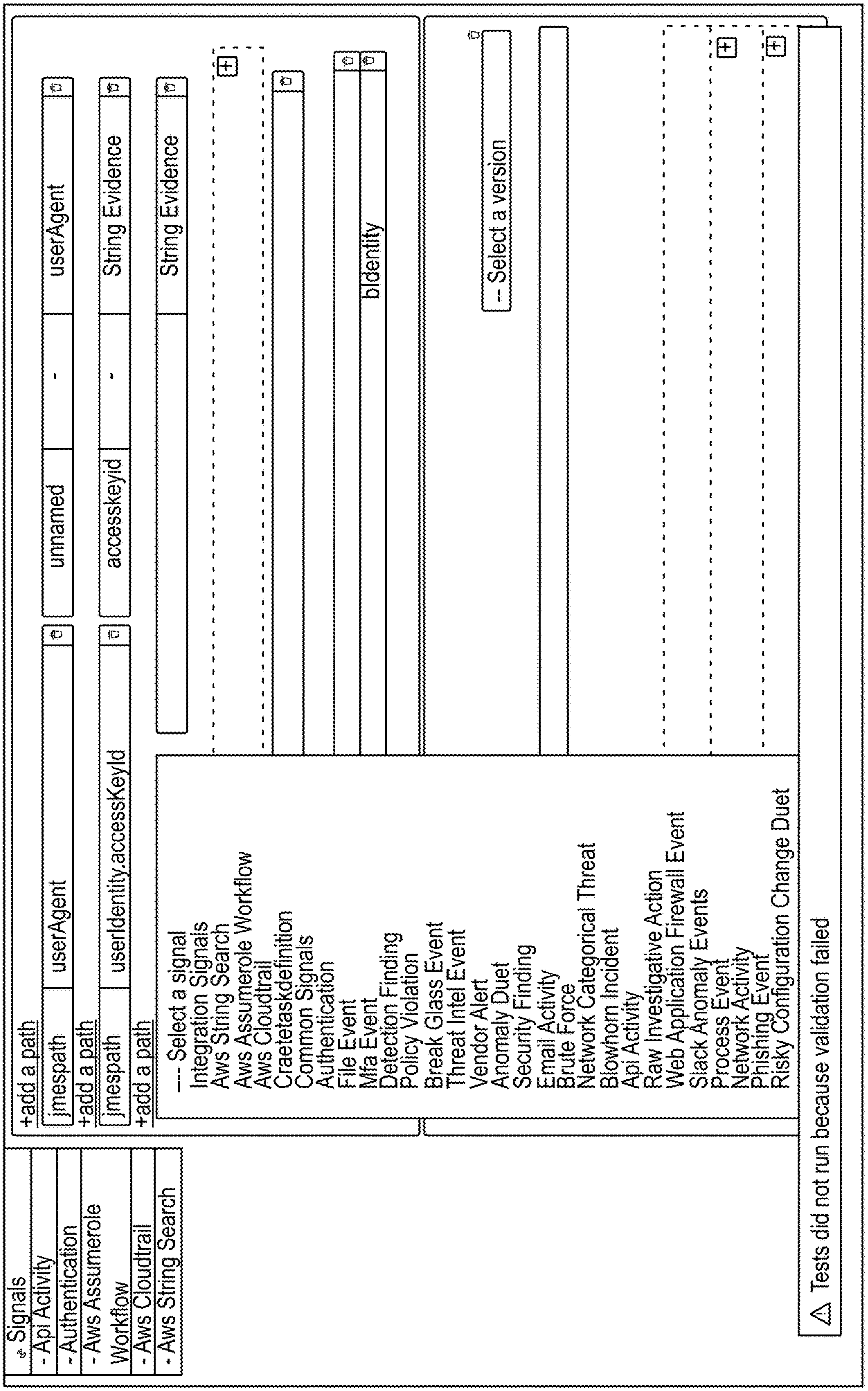
Figure 40:
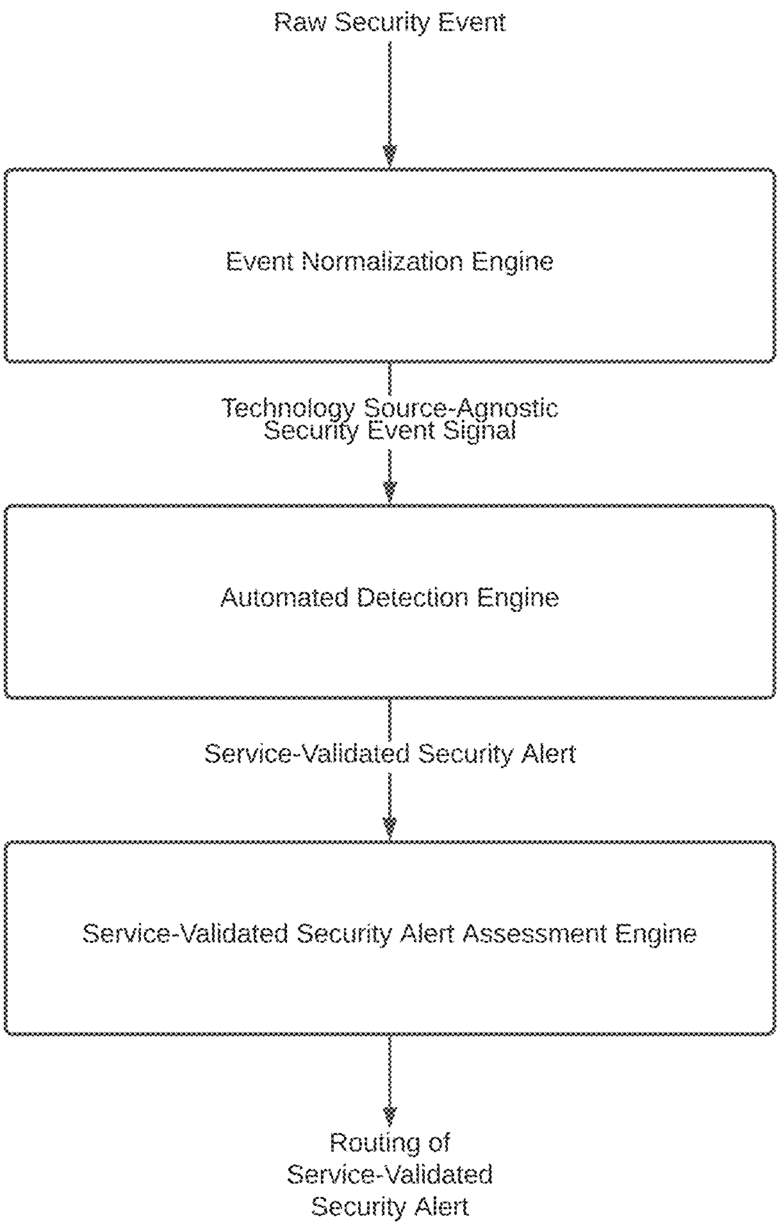
FIG. 40 illustrates an example schematic of a system or service implementing the example method 200 in accordance with one or more embodiments of the present application.
Figure 41:
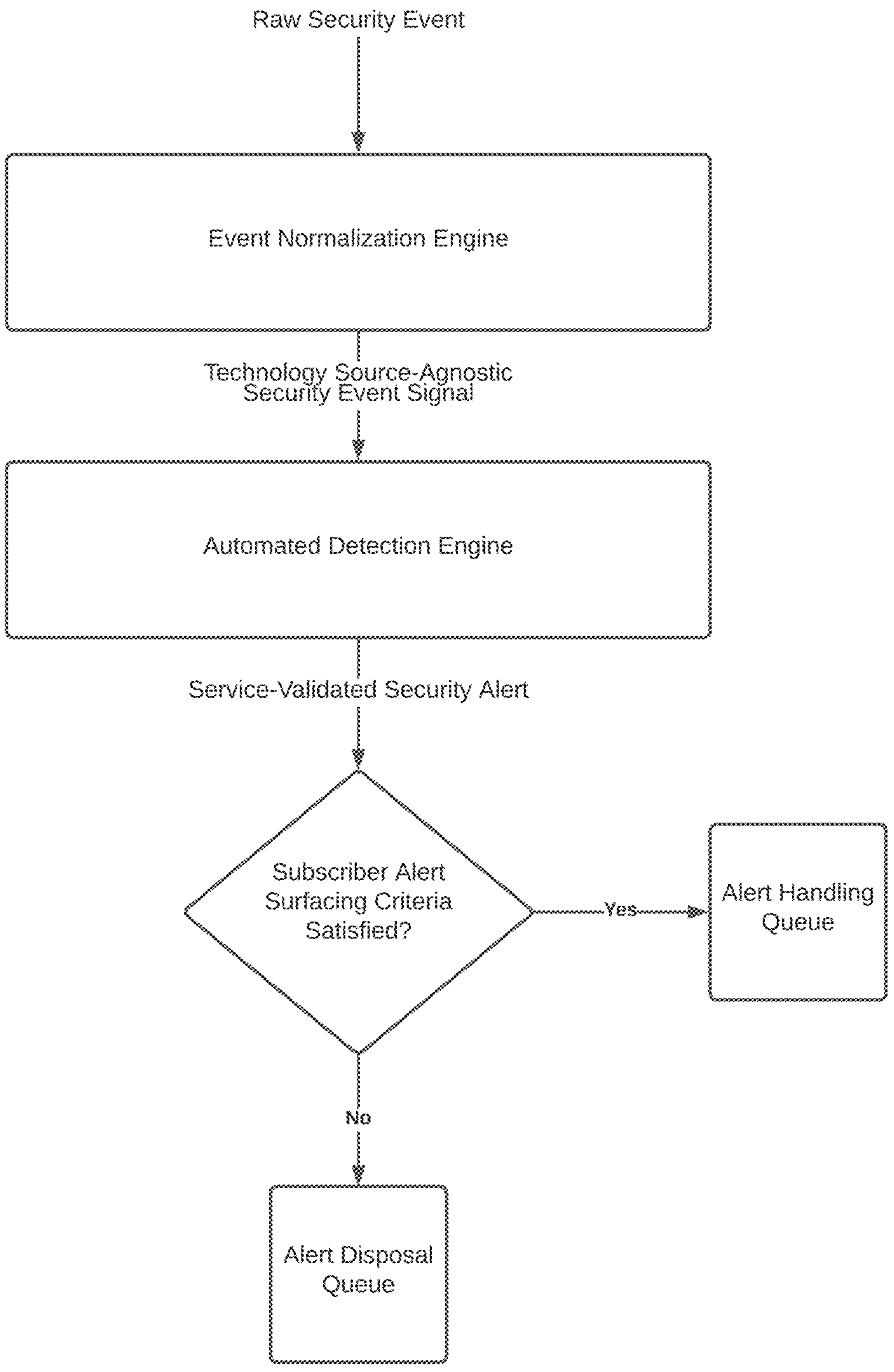
FIG. 41 illustrates an example schematic of routing a service-validated security alert in accordance with one or more embodiments of the present application.

In one or more implementations of such embodiments, the signal-specific data mapping container may include a signal type user interface element that, when selected, displays a drop-down menu element of a plurality of technology source-agnostic event signal types provided by the cybersecurity event detection and response service, as shown generally by way of example in FIG. 39. In such embodiments, based on or in response to receiving a selection of the target technology source-agnostic event signal type from the drop-down menu element of the plurality of technology source-agnostic event signal types, a plurality of source-to-target data mapping user interface elements that corresponds to the target technology source-agnostic event signal type (e.g., the data model of the target technology source-agnostic event signal type) may be dynamically instantiated within the signal-specific data mapping container.

It shall be further noted, in one or more embodiments, the target technology source-agnostic event signal type may be associated with a plurality of signal versions (e.g., each signal version of the plurality of signal versions may correspond to a distinct iteration of the target technology source-agnostic event signal type). For instance, in a non-limiting example, the target technology source-agnostic event signal type may have or be associated with at least a first signal version of the target technology source-agnostic event signal type, a second signal version of the target technology source-agnostic event signal type that is an adaptation of the first signal version, and a third signal version of the target technology source-agnostic event signal type that is an adaptation of the second signal version. In other words, each subsequent signal version of any given technology source-agnostic event signal type may be an adaptation of its predecessor, allowing for iterative improvements and modifications. Thereby, enabling a system or service to evolve over time while maintaining compatibility with various iterations of the same fundamental signal type.

Figure 33:
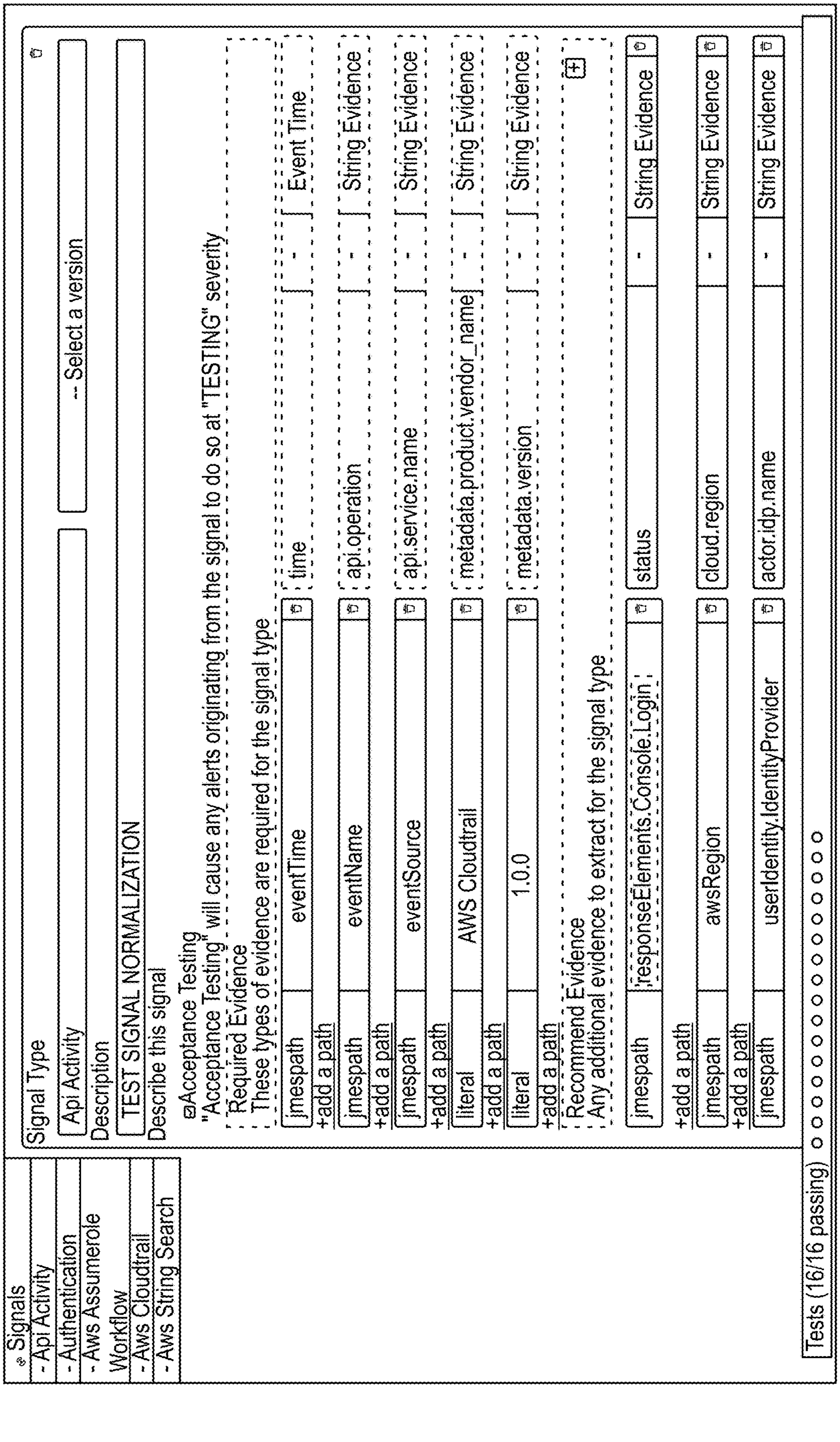
Figure 34:
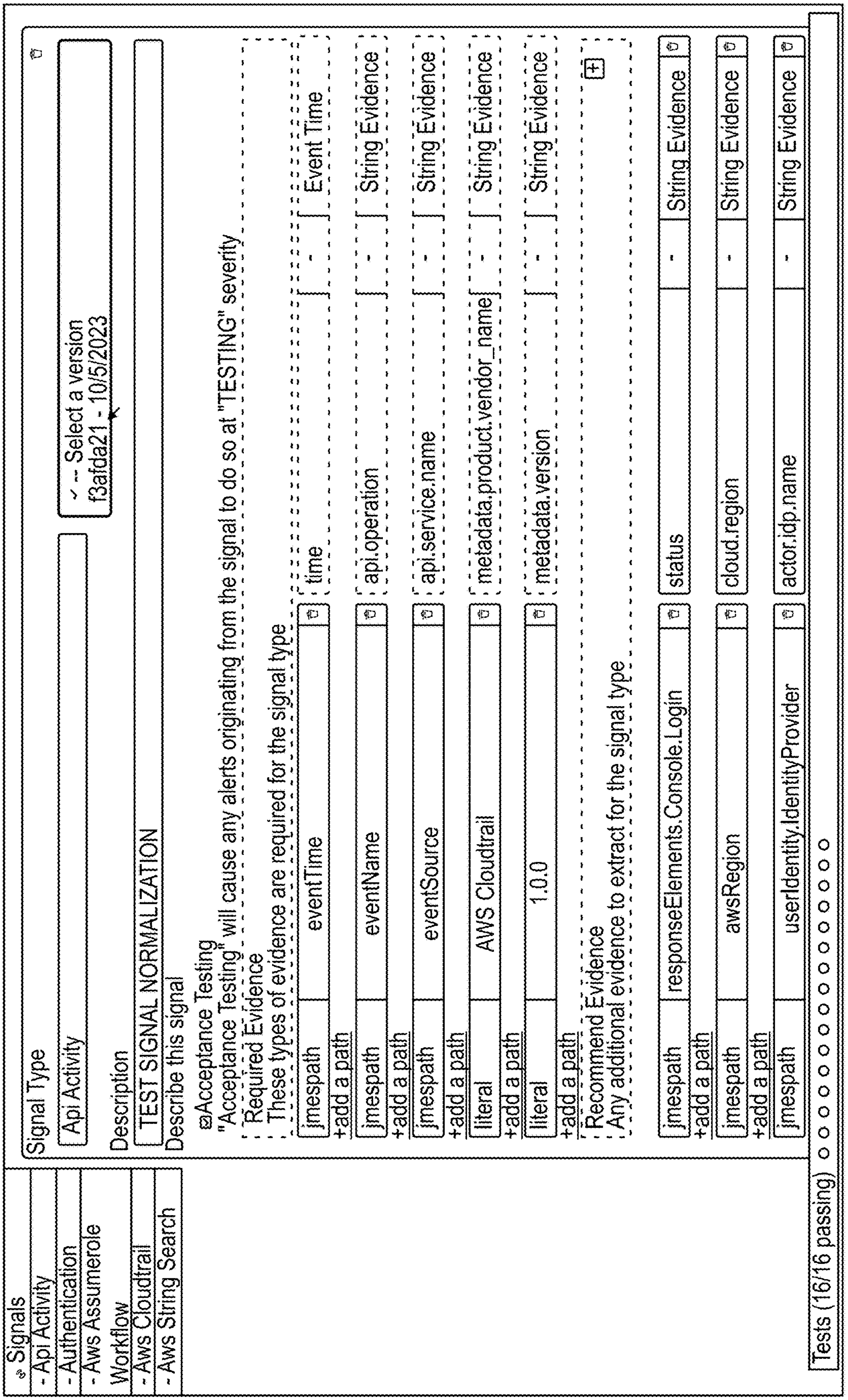
Figure 35:
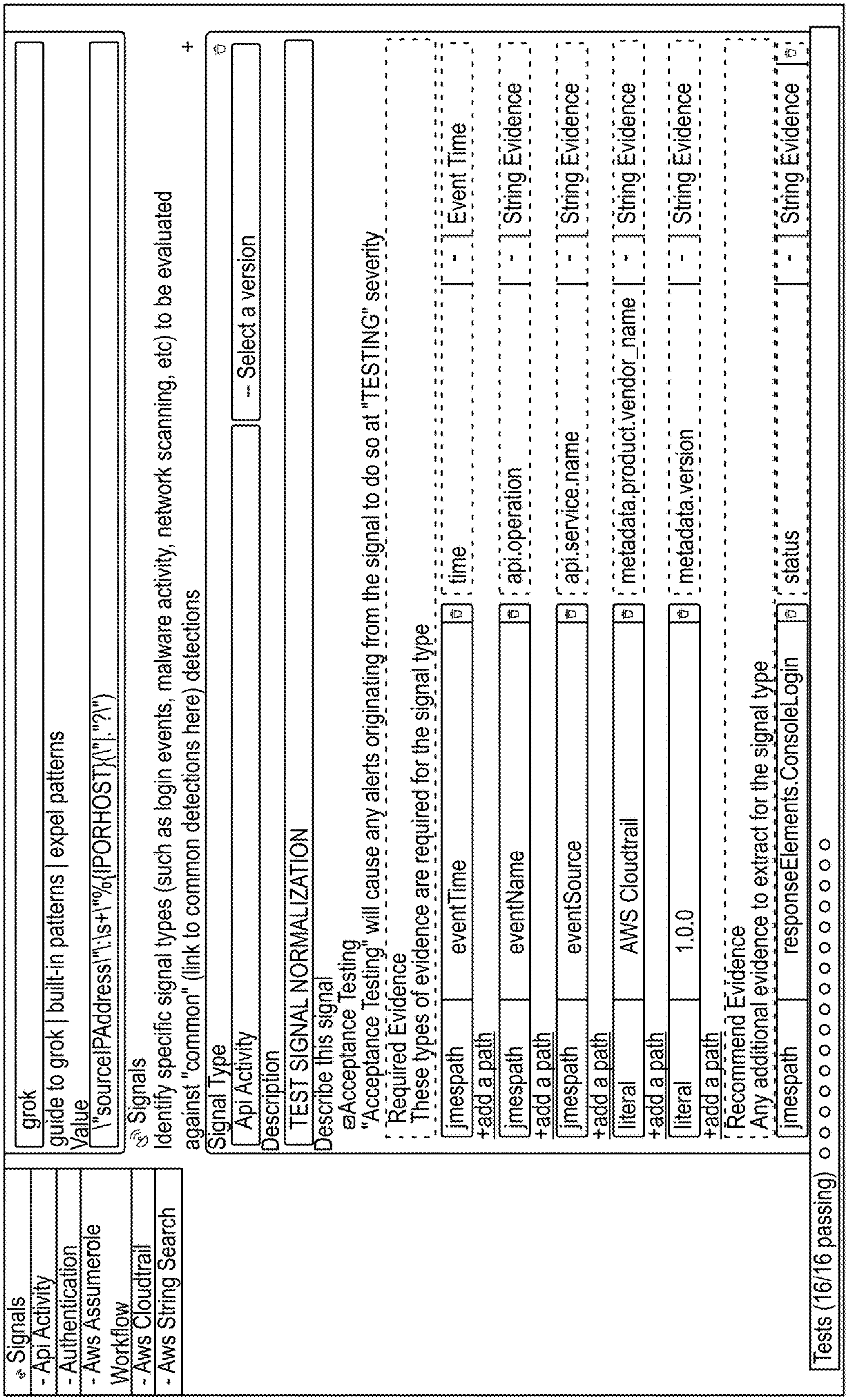
Figure 36:
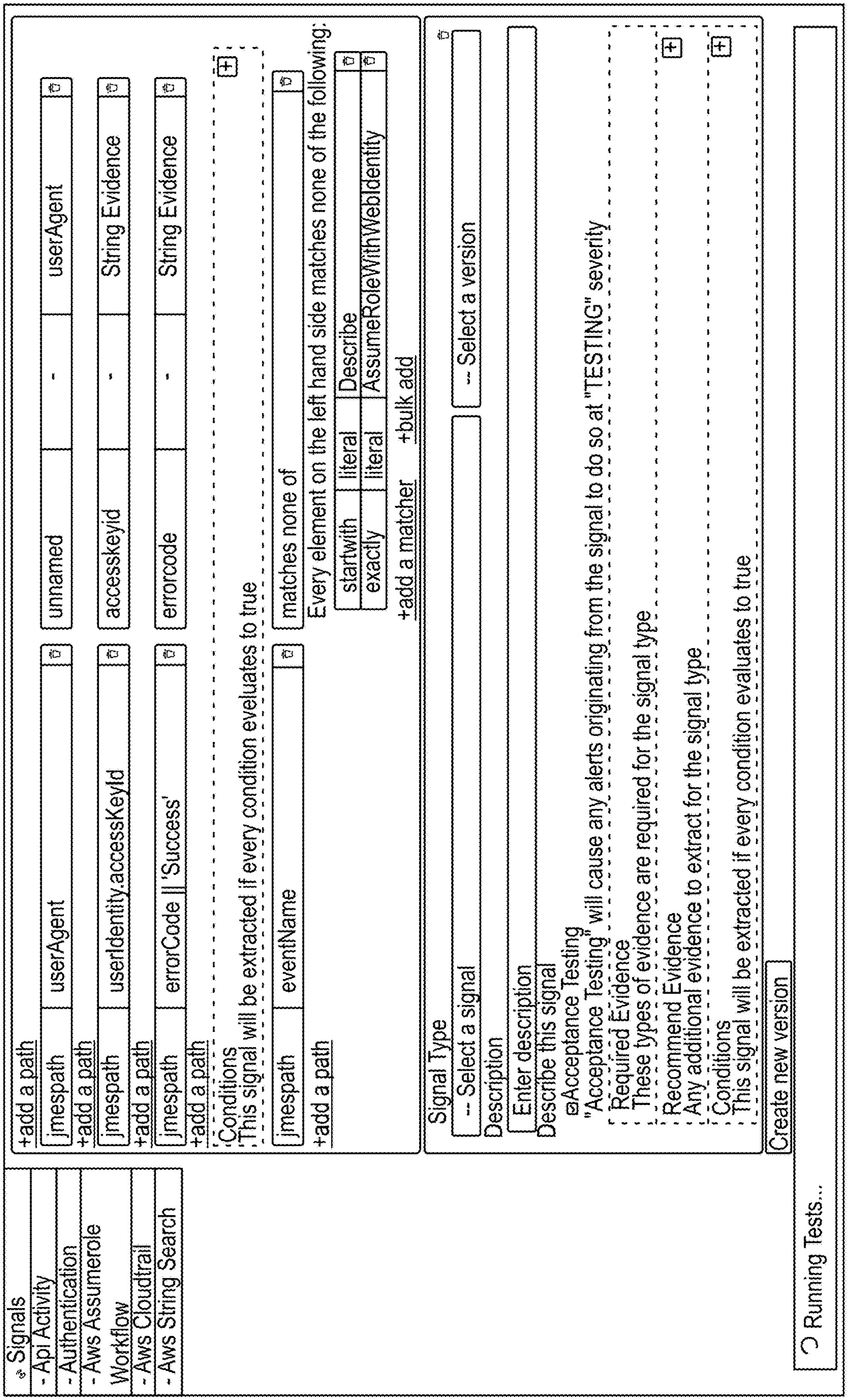
Figure 37:
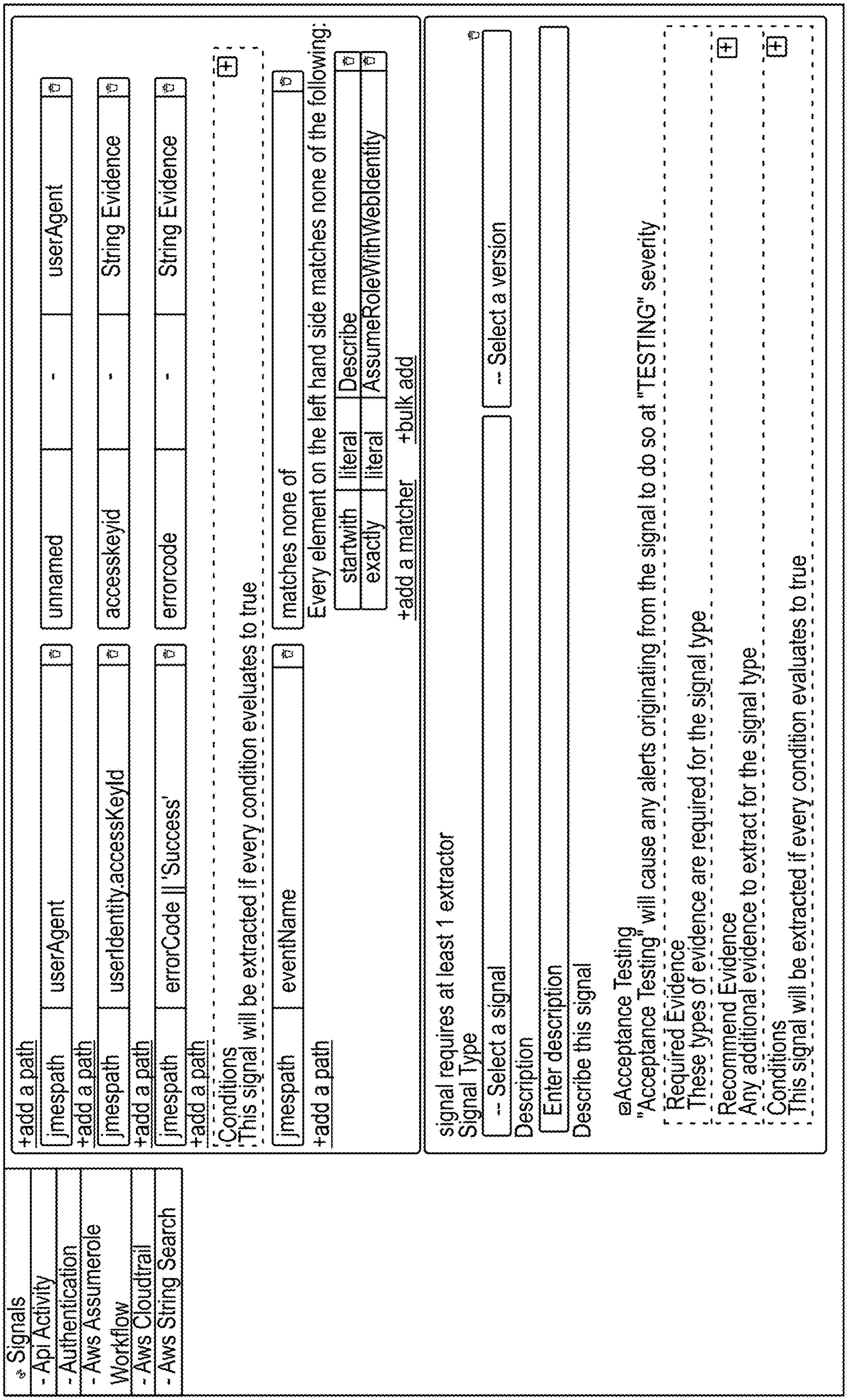
Figure 38:
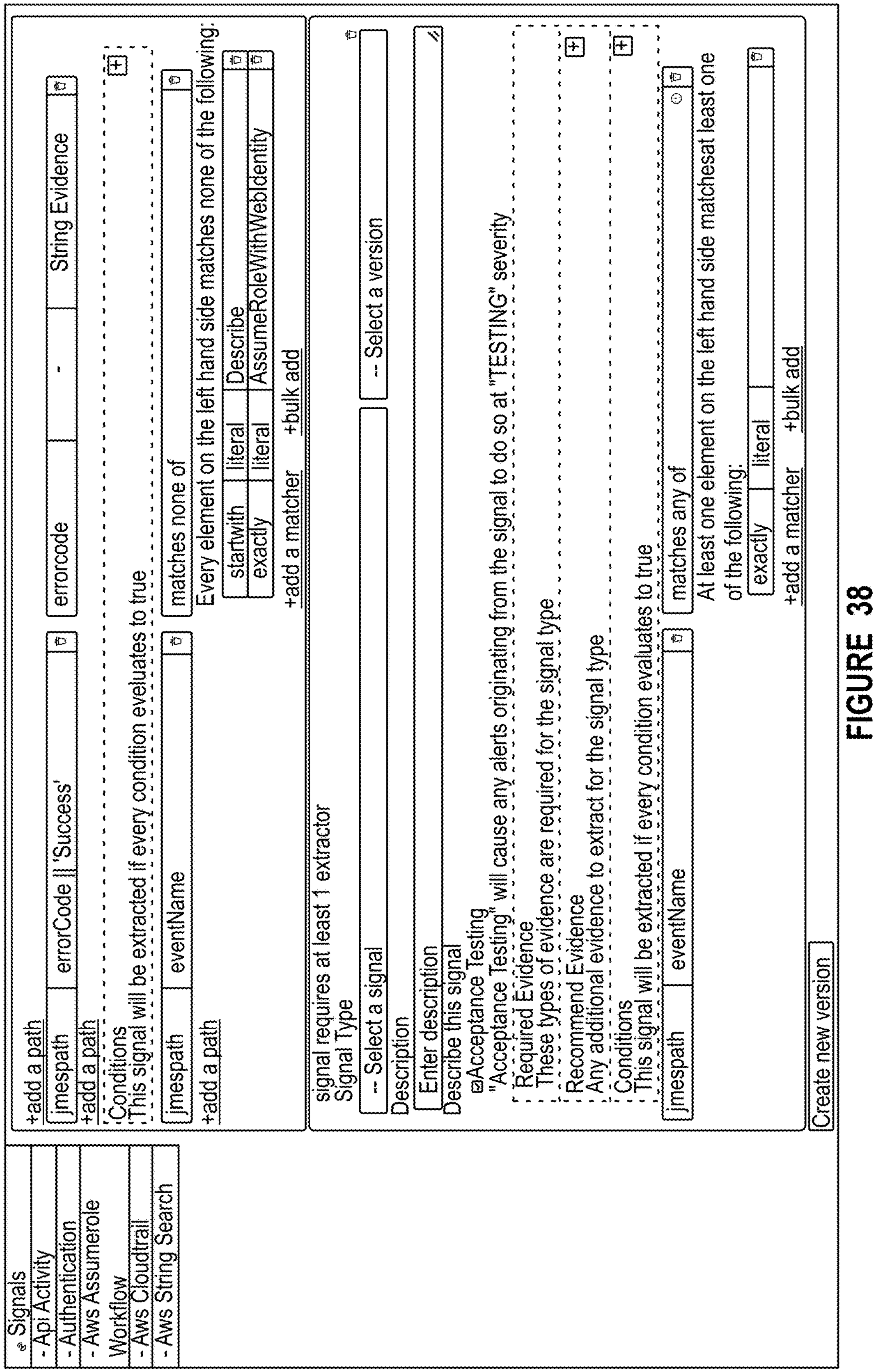

Thus, in one or more embodiments, the signal-specific data mapping container may further include a version-controlled user interface element (e.g., signal version-controlled user interface element) that, when selected, displays a drop-down menu element of the plurality of signal versions that correspond to or available for the target technology source-agnostic event signal type, as shown generally by way of example in FIG. 33 and FIG. 34.

Accordingly, in one or more additional implementations of such embodiments, a system or service implementing method 200 may function to dynamically instantiate, within the signal-specific data mapping container, a plurality of source-to-target data mapping user interface elements based on receiving a selection of the target technology source-agnostic event signal type from the drop-down menu element of the plurality of technology source-agnostic event signal types and receiving a selection of a target signal version of the target technology source-agnostic event signal type from the drop-down menu element of the plurality of signal versions.

In one or more embodiments, based on or in response to instantiating the technology integration user interface, the technology integration user interface may function to display the integration simulation region that may be used, in part, to simulate and/or test a data integration configured for a target non-integrated technology data source (e.g., currently non-integrated technology data source, third-party security device, or the like). In one or more embodiments, simulating and/or testing the data integration configured for the target non-integrated technology data source may provide a probative indication to a target user, an analyst, or the like on whether the data integration is performing as expected, should be deployed into production, and/or should be reconfigured before implementing into production.

In one or more embodiments, the integration simulation region may include an add event simulation button that, when selected, may add a distinct event simulation template comprising a plurality of user interface elements within the integration simulation region. In such embodiments, the plurality of user interface elements may include one or more of a simulation name text box that is configured to receive an input of a title or description of a target integration simulation, a sample event data field that is configured to receive an input of a raw sample event associated with a target technology data source (e.g., the raw sample event is in a structure defined by the third-party technology data source), and an expected signal outcome data field that is configured to receive an input of one or more technology source-agnostic event signal types in which each technology source-agnostic event signal type included in the expected signal outcome data field is expected to be generated by the cybersecurity event detection and response service in response to the cybersecurity event detection and response service normalizing and processing the raw sample event included in the sample event data field.

For instance, in a non-limiting example, based on receiving an input selecting the add event simulation button, the system or service implementing method 200 may function to add a distinct event simulation template comprising the simulation name text box, the sample event data field, and the expected signal outcome data field within the integration simulation region. In such non-limiting example, based on receiving one or more inputs from a target user at the simulation name data field, the name of the integration simulation may be set as "Base Event Test". Additionally, or alternatively, in such a non-limiting example, based on receiving one or more inputs from a target user at the expected signal outcome data field, the expected signal outcome of the integration simulation may be set as "Kubernetes Control Plane Event". Additionally, or alternatively, in such a non-limiting example, based on receiving one or more inputs from a target user at the sample event data field, a sample (or raw) security event from a target third-party technology data source to which the data integration corresponds may be included within the sample event data field.

Accordingly, in such non-limiting example, based on configuring an integration simulation, the system or service implementing method 200 may function to display a simulation results indicator (on the technology integration user interface) that may indicate whether the sample (or raw) security event was properly normalized and processed by the cybersecurity event detection and response service when compared to the expected outcome data field.

Figure 21:
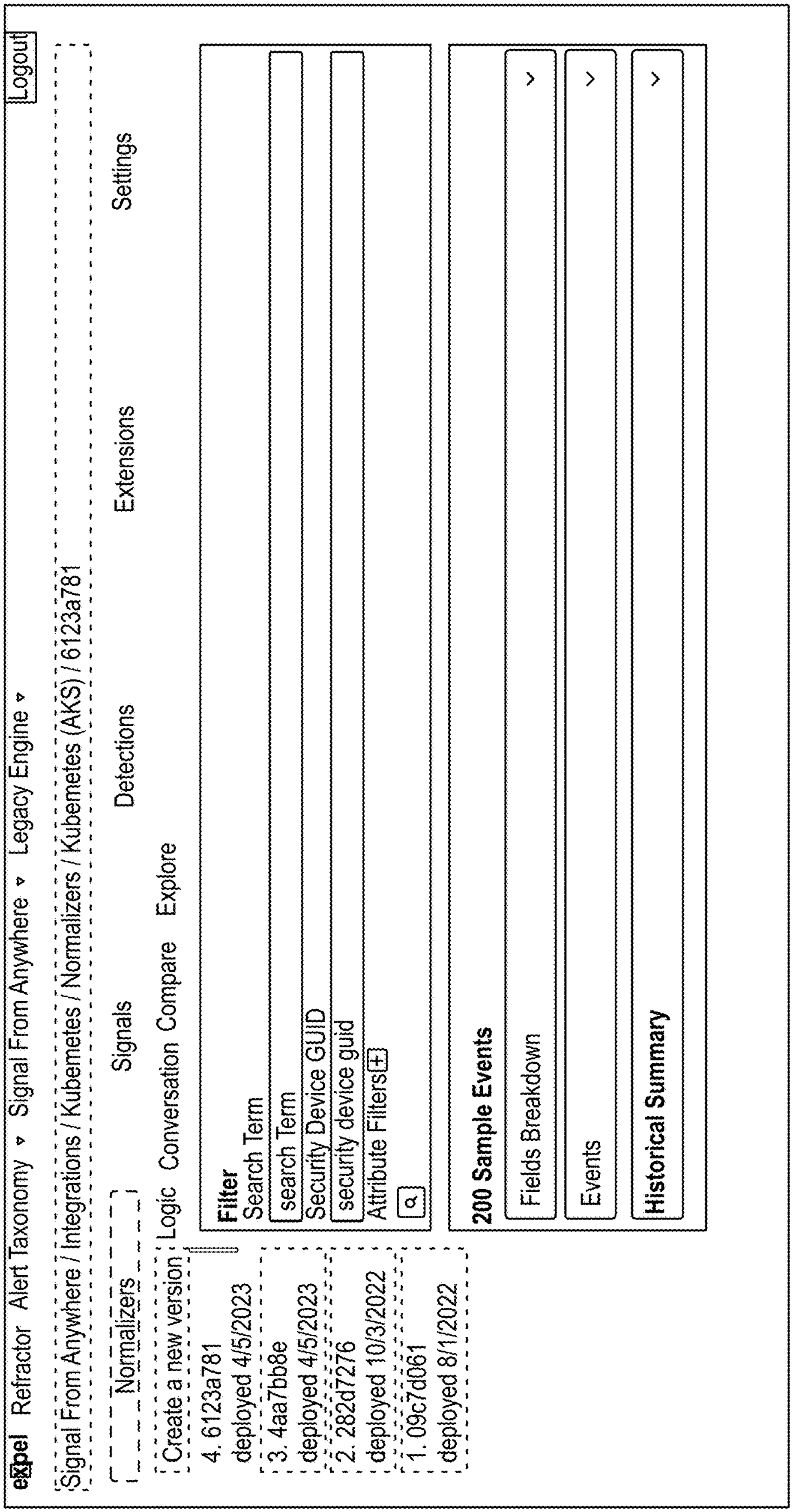
Figure 22:
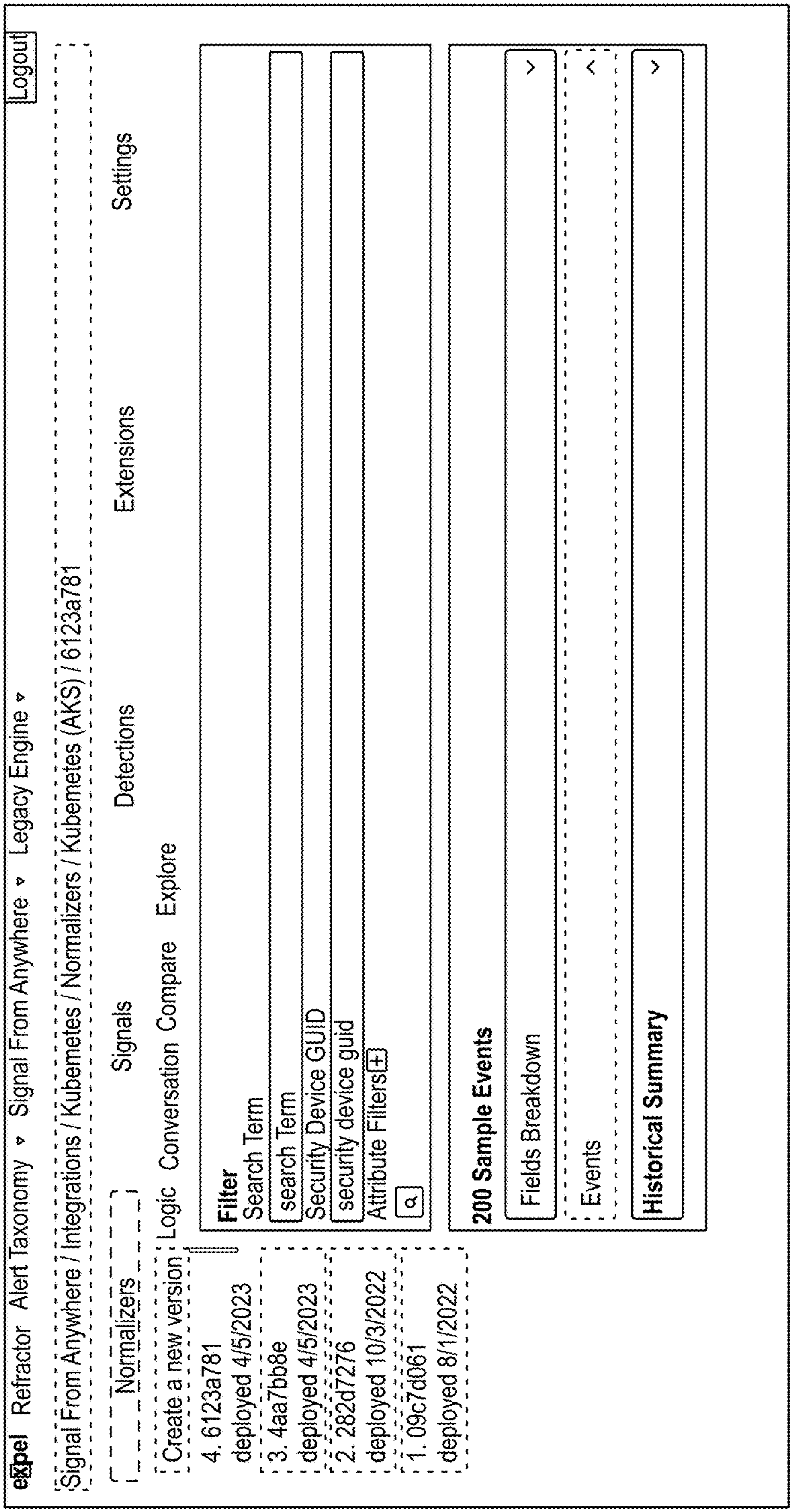
Figure 23:
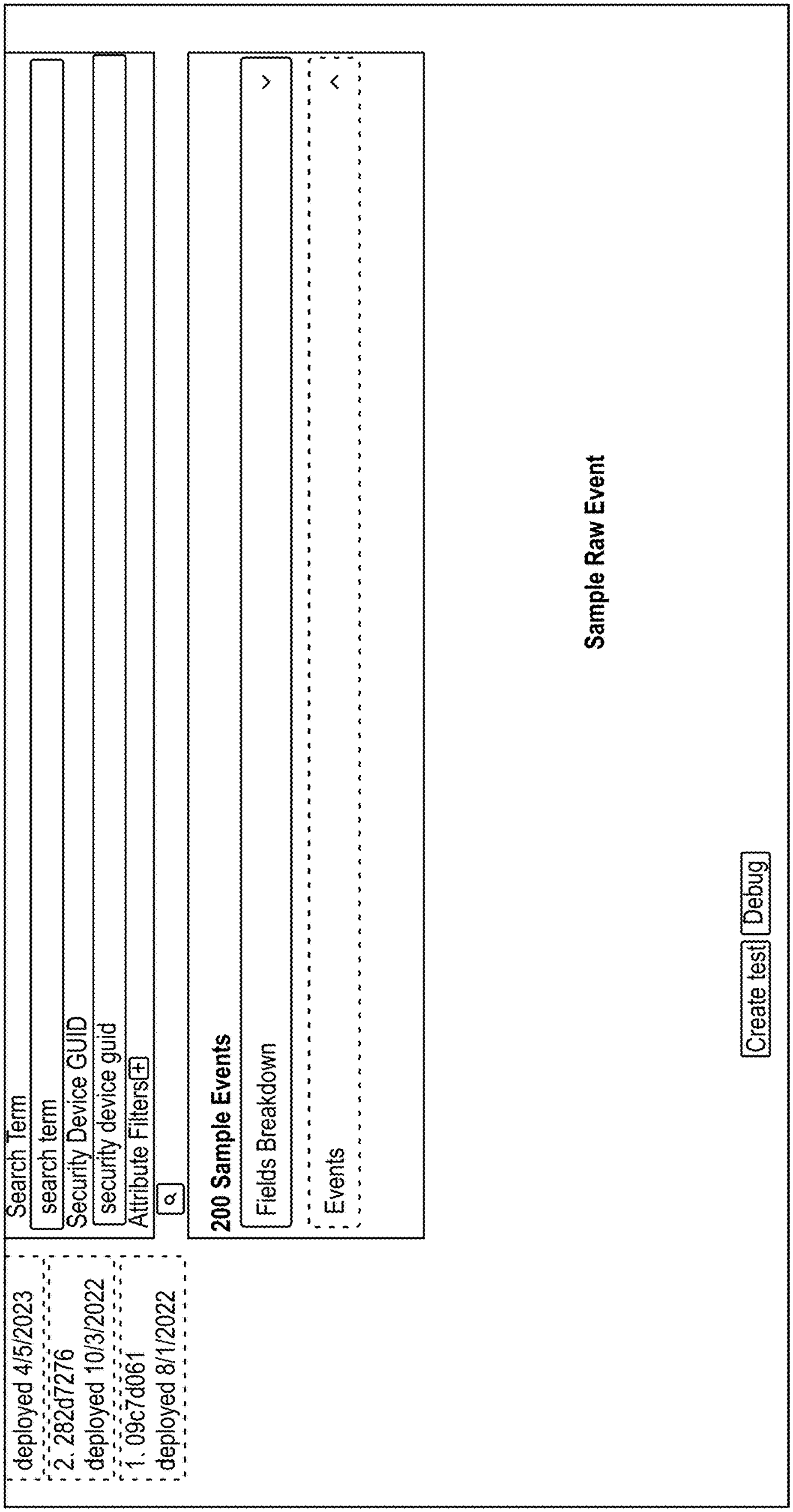

It shall be noted that, in some embodiments, the system or service implementing method 200 may function to add an integration simulation within the technology integration user interface based on receiving an input selecting a create test button on an exploratory data analysis user interface or the like. In such embodiments, the exploratory data analysis user interface may include a plurality of raw events and, in some embodiments, beneath each distinct raw event data sample may be a distinct create test button, as shown generally by way of example in FIGS. 21-23. Accordingly, based on detecting an input selecting a create test button on the exploratory data analysis user interface, the system or service implementing method 200 may function to add a new event simulation template comprising the simulation name text box, the sample event data field, and the expected outcome data field within the integration simulation region of the technology integration user interface. In such embodiments, the sample event data field may be automatically prepopulated with the sample raw event that corresponds with the (selected) create test button. The remainder of the data fields (e.g., the simulation name text box and the expected outcome data field) may receive user input data in analogous ways as described above.

It shall be further noted that the system or service implementing method 200 may function to configure additional, fewer, or different integration simulations in analogous ways as described above.

Additionally, or alternatively, in one or more embodiments, based on receiving a set of inputs selecting a simulation addition control button, a plurality of distinct raw event simulation containers may be instantiated within the graphical user interface (e.g., the data integration building user interface). In other words, the graphical user interface may include a plurality of distinct raw event simulation containers that are instantiated based on receiving a set of inputs selecting a simulation addition control button of the graphical user interface. In such embodiments, each distinct raw event simulation container of the plurality of distinct raw event simulation containers may be configured to receive an input of a distinct raw event generated by a target third-party security service (e.g., the third-party security service for which the data integration is being constructed) and an expected technology source-agnostic event signal (or expected technology source-agnostic event signal type) for validating that the corresponding in-development security integration accurately translates the distinct raw event to the expected technology source-agnostic event signal (or the expected technology source-agnostic event signal type) using mapping instructions (e.g., the set of computer-executable data mapping instructions) specified by one of the plurality of signal-specific data mapping containers of the graphical user interface.

Additionally, or alternatively, in one or more embodiments, the graphical user interface may include a distinct simulation outcome user interface indicator for each distinct raw event simulation of a plurality of raw event simulation containers displayed on the graphical user interface. It shall be noted that, in such embodiments, each distinct simulation outcome user interface indicator may be configured to indicate a simulation outcome or simulation result that corresponds to a subject raw event simulation container of the plurality of raw event simulation containers.

Figure 28:
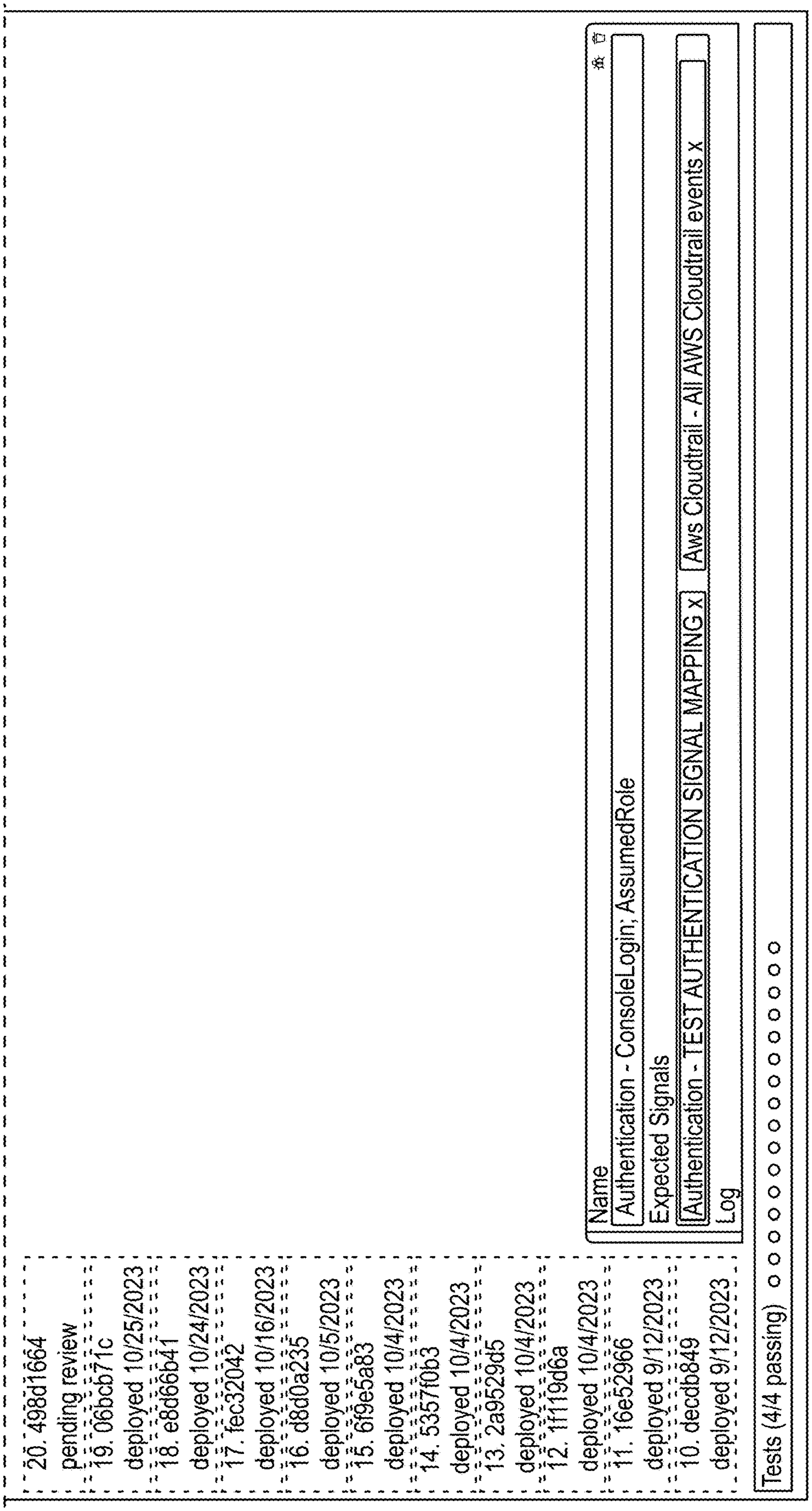
Figure 29:
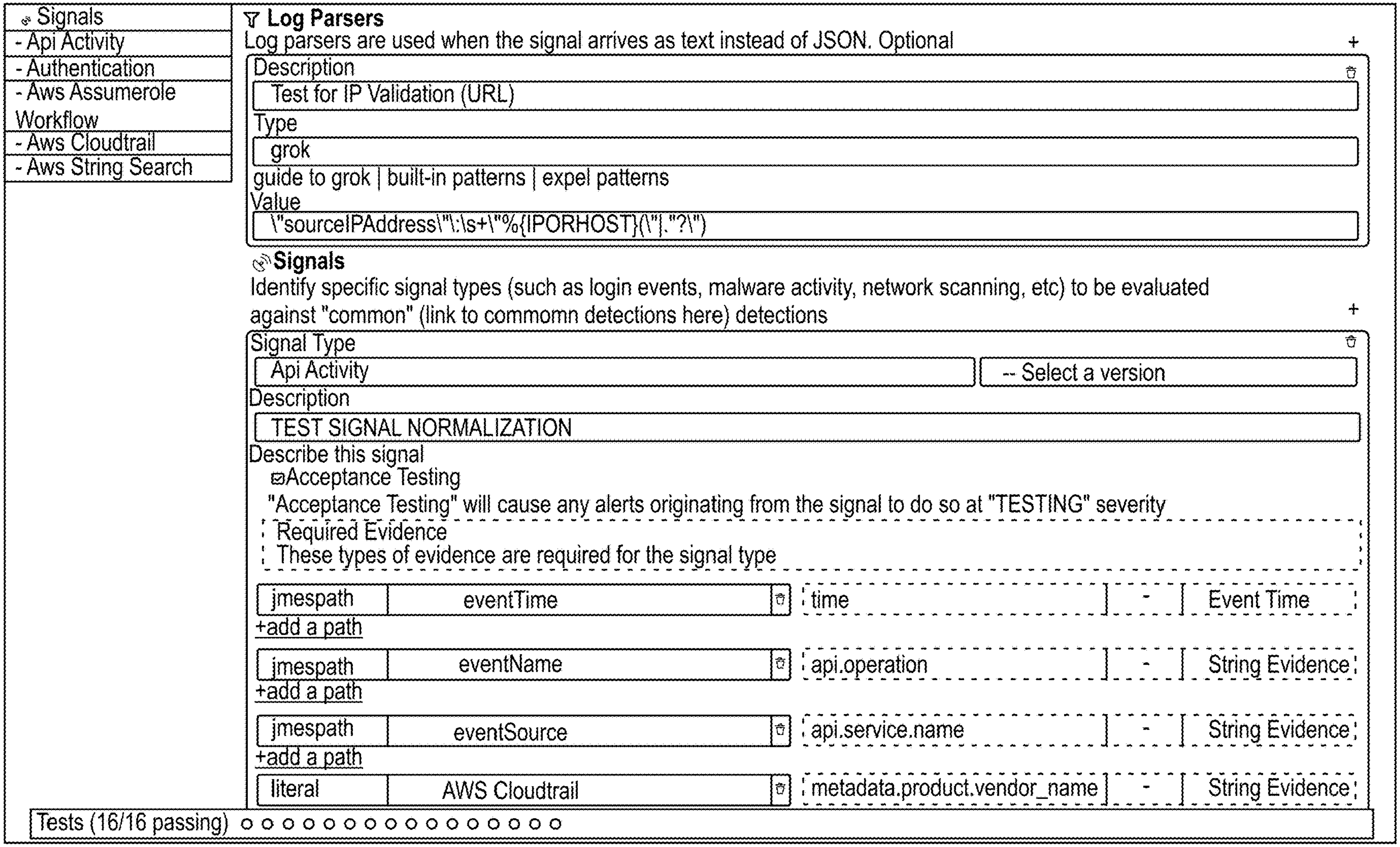
Figure 30:
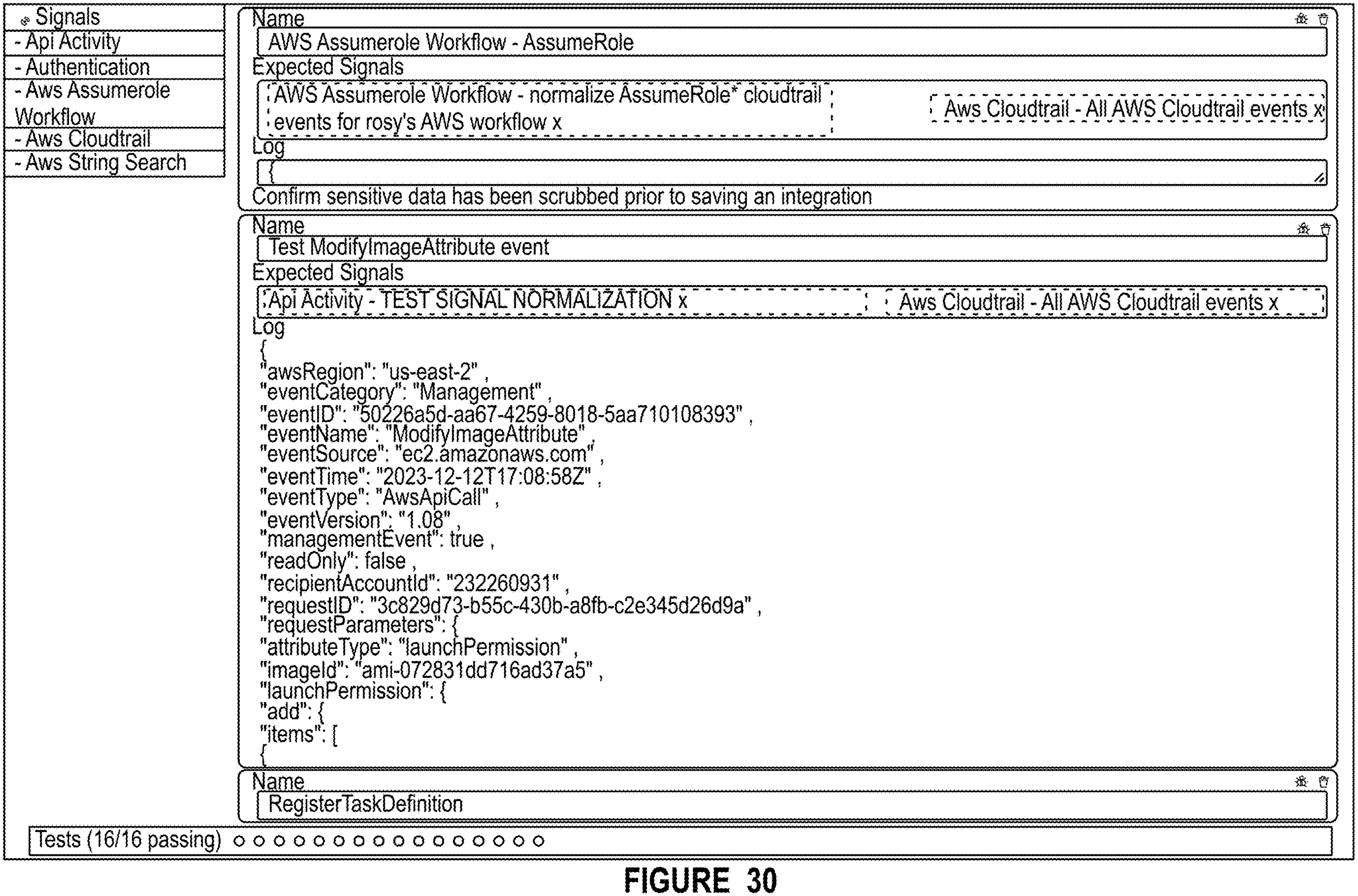
Figure 31:
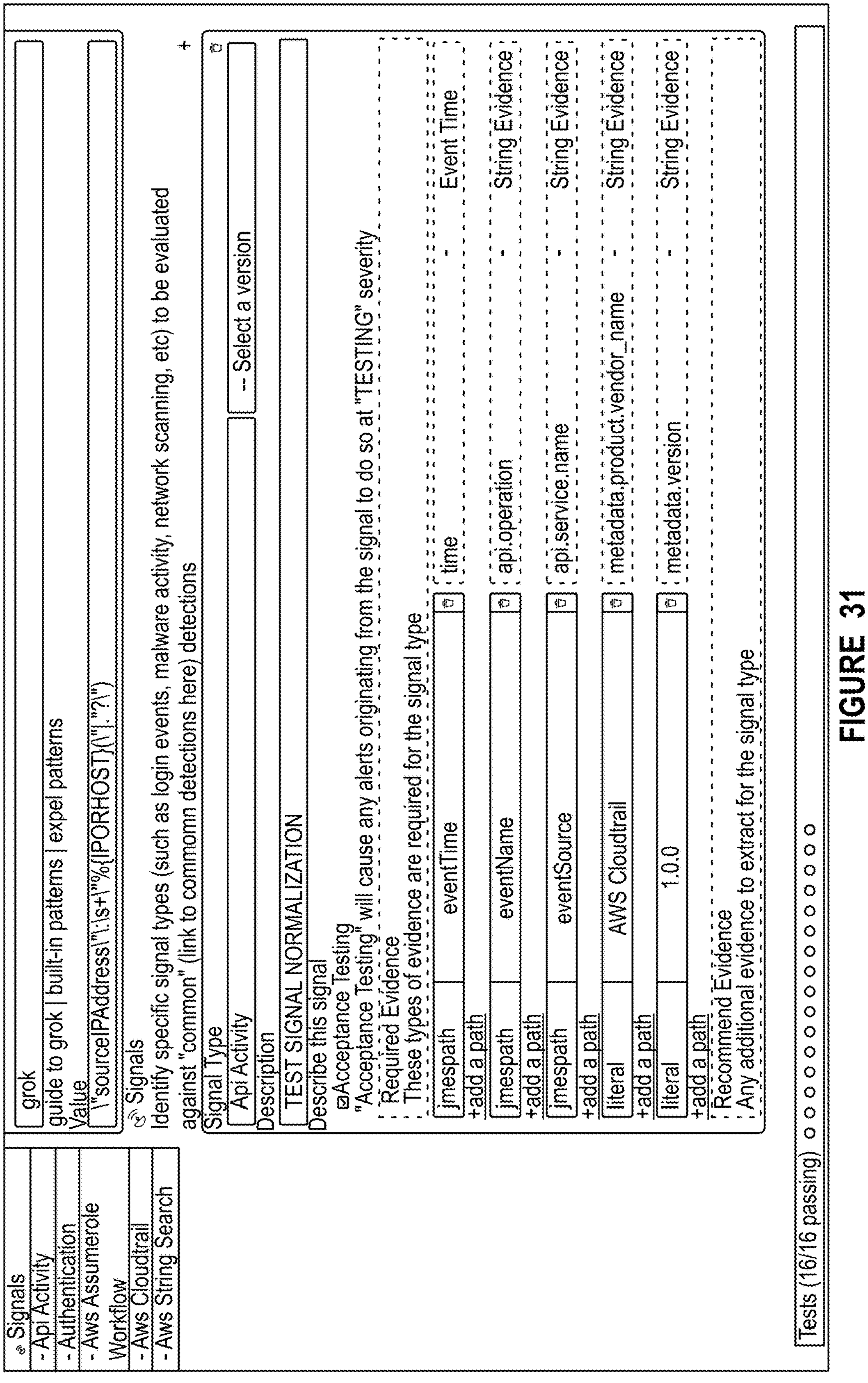
Figure 32:
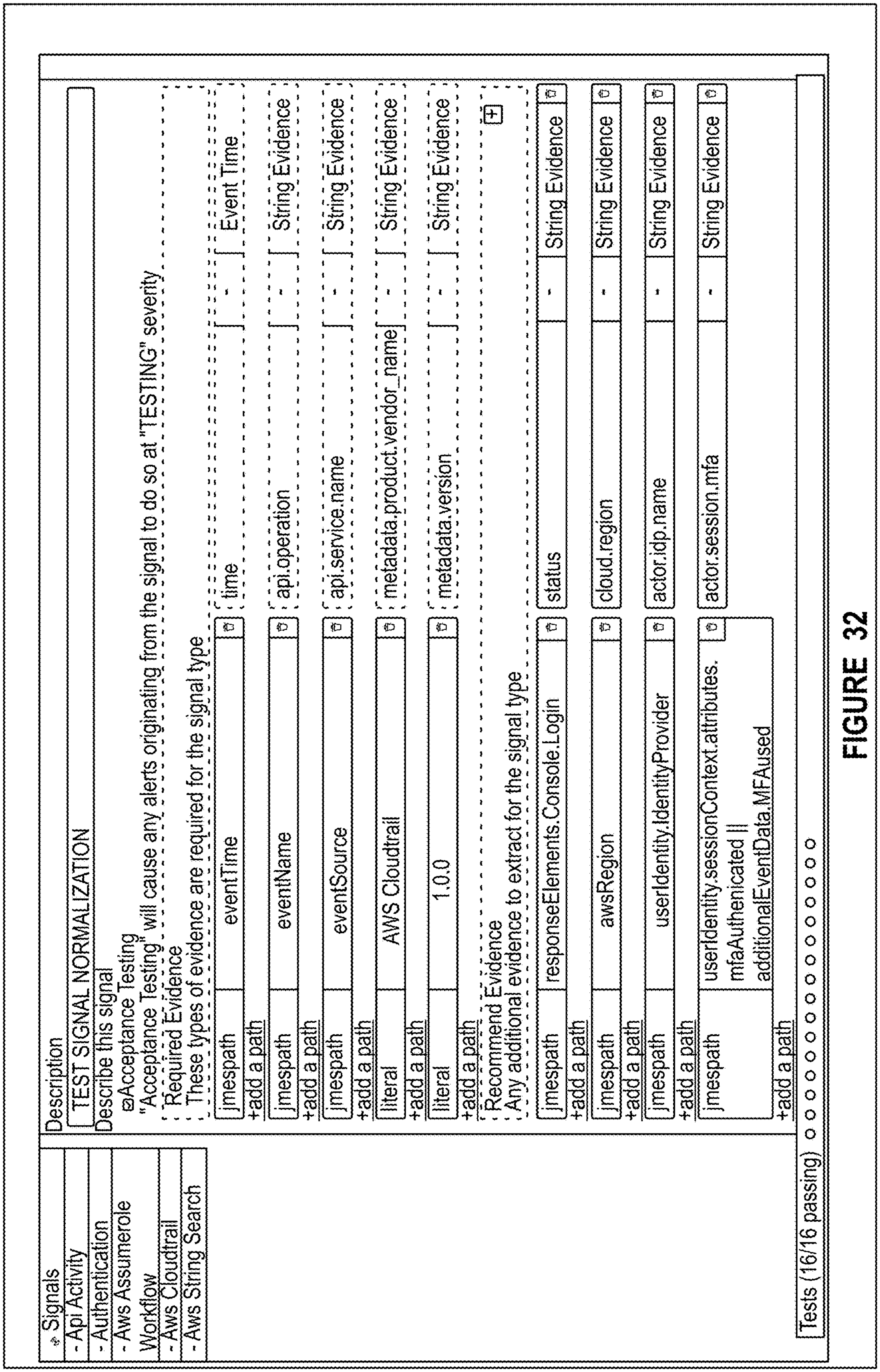

For instance, in a non-limiting example, a subject simulation outcome user interface indicator (e.g., a first simulation outcome user interface indicator) may correspond to a subject raw event simulation container (e.g., a first raw event simulation container). In such a non-limiting example, the first simulation outcome user interface indicator may include a first raw event and a first expected technology source-agnostic event signal type for simulating if the in-development security integration accurately translates the first raw event to a technology source-agnostic signal of the first expected technology source-agnostic event signal type. In one or more embodiments, the first simulation outcome user interface indicator that corresponds to the first raw event simulation container may be of a first color (e.g., green) when a successful translation of the first raw event to a technology source-agnostic signal of the first expected technology source-agnostic event signal type occurs. In one or more embodiments, the first simulation outcome user interface indicator that corresponds to the first raw event simulation container may be of a second color (e.g., red) different from the first color (e.g., green) when an unsuccessful translation of the first raw event to a technology-source agnostic signal (e.g., normalized security event) of the first expected technology source-agnostic event signal type occurs, as shown generally by way of example in FIG. 28.

In one or more embodiments, a system or service implementing method 200 may function to deploy a data integration using the technology integration user interface. In one or more embodiments, via the technology integration user interface, the system or service implementing method 200 may function to deploy the data integration associated with a target technology data source based on and/or in response to determining that each of the one or more integration simulations associated with the target technology data source were successful (e.g., satisfying simulation criteria or the like.).

Stated another way, in one or more embodiments, the in-development security integration for a third-party security service, when deployed, may define an integration nexus between the third-party security service and the cybersecurity event detection and response service.

In one or more embodiments, using the technology integration user interface, the cybersecurity event detection and response service implementing method 200 may provide a target user a capability of fast-implementing and/or fast-deploying a data integration using the technology integration user interface. In such embodiments, based on the system or service implementing method 200 deploying the data integration for a non-integrated technology data source, the cybersecurity event detection and response service may convert and/or recognize the non-integrated technology data source as an integrated technology data source.

For instance, in a non-limiting example, the system or service implementing method 200 may function to implement and/or deploy a data integration in a production mode of operation based on receiving an input from the target user selecting a save integration button, an add integration button, or the like displayed on the technology integration user interface to which the data integration corresponds.

Stated another way, in one or more embodiments, the graphical user interface (e.g., data integration building user interface) may include an integration deployment control element that, when operated, transitions a corresponding in-development security integration to a corresponding deployed security integration. In one or more embodiments, transitioning the corresponding in-development security integration to the corresponding deployed security integration may include installing, via one or more computers, the mapping instructions (e.g., the set of computer-executable data mapping instructions) defined by the in-development security integration (e.g., security data integration) into a database or repository storing a plurality of previously deployed security integrations.

In one or more embodiments, a security alert engine (e.g., the security alert engine 110) may function to receive a plurality of raw security events from a plurality of distinct, integrated technology data sources. Accordingly, the security alert engine may function to process each of the raw security events through an event normalization layer that, in turn, normalizes the raw security events into a subset of technology source-agnostic event signals (e.g., normalized security events). For instance, based on the security alert engine receiving a raw security event associated with a third-party technology data source, the security alert engine may function to process the security event in accordance with the data integration configured for the third-party technology data source and, in turn, generate one or more distinct technology source-agnostic event signals (e.g., one or more normalized security events) based on the processing. It shall be noted that, in embodiments in which the security alert engine generates a technology source-agnostic event signal based on receiving a raw security event, the technology source-agnostic event signal may be routed to an event queue or the like when the technology source-agnostic event signal satisfies routing/alerting criteria of at least one of the one or more event detection and response heuristics mapped to the technology source-agnostic event signal. Conversely, in embodiments in which the security alert engine generates a technology source-agnostic event signal based on receiving a raw security event, the technology source-agnostic event signal may not be routed to an event queue or the like if the technology source-agnostic event signal fails to satisfy routing/alerting criteria of at least one of the one or more event detection and response heuristics mapped to the technology source-agnostic event signal.

Figure 24:
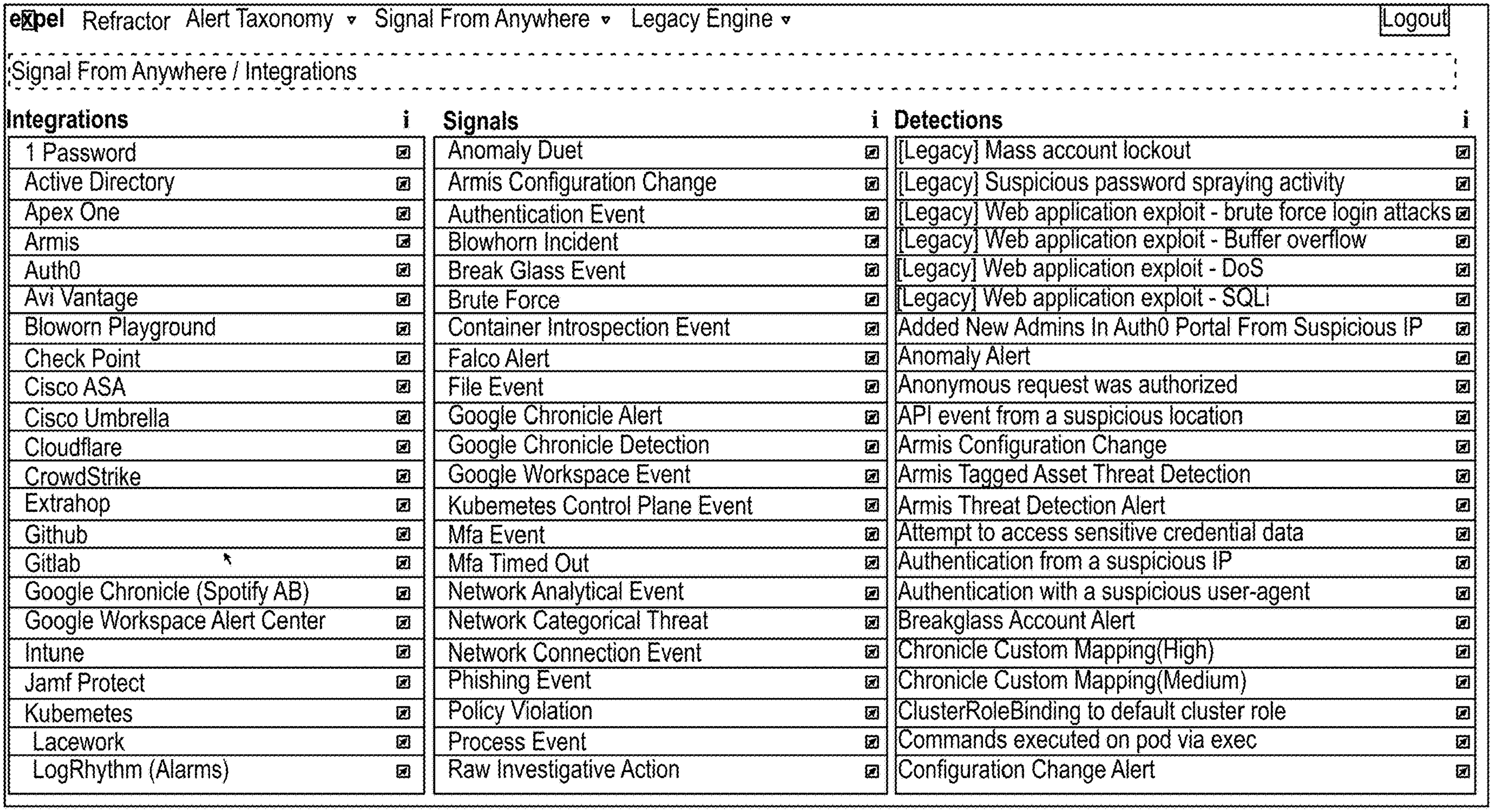

At least one technical benefit of the security alert engine generating one or more distinct technology source-agnostic event signals based on receiving a raw security alert from a third-party data source may enable the cybersecurity event detection and response service to apply a detection layer over technology source-agnostic event signals rather than security alert data received from third-party data sources. Thereby, preventing detecting logic (e.g., detection rules, computable-executable detection heuristics, and/or the like) being constructed for each distinct technology data source to which the cybersecurity event detection and response integrates therewith. Stated another way, event detection and response logic (e.g., detection rules, computable-executable detection heuristics, and/or the like) are mapped to technology source-agnostic event signals rather than third-party technology data sources, as shown generally by way of example in FIG. 24.

It shall be noted that, in one or more embodiments, a plurality of distinct event detection and response heuristics may be mapped to each of a plurality of distinct technology source-agnostic event signals (or a plurality of distinct technology source-agnostic event signal types), in this way, when the security alert engine generates a technology source-agnostic event signal of a given type, the event detection and response heuristics that correspond to the given type of the technology source-agnostic event signal may be evaluated against the generated technology source-agnostic event signal to identify one or more of a likely threat severity (e.g., critical threat severity, high threat severity, medium threat severity, low threat severity, tuning threat severity, and/or the like) of the generated technology source-agnostic event signal, a likely event class (e.g., suspicious authentication, phishing, etc.) of the generated technology source-agnostic event signal, if the generated technology source-agnostic event signal should be routed to an event escalation queue based on satisfying escalation criteria of one or more of the event detection and response rules, if the generated technology source-agnostic event signal should be routed to an event disposal queue based on satisfying disposal criteria of the one or more event detection and response rules, etc.

In one or more embodiments, a system or service implementing method 200 may function to receive, via one or more computers, a third-party event and, in turn, identify, within a database or repository storing a plurality of previously deployed security data integrations, a target security data integration (e.g., target security device integration or the like) that corresponds to the third-party event based on a type of the third-party event (e.g., identify a CloudTrail integration based on the third-party event being a CloudTrail-type event). Accordingly, in such embodiments, the system or service implementing method 200 may function to generate a technology source-agnostic event signal using mapping instructions defined by the target security data integration (e.g., target security device integration or the like), as described in U.S. Patent Application No. 63/555,853, filed 20 Feb. 2024, titled SYSTEMS AND METHODS FOR AUTOMATICALLY CREATING NORMALIZED EVENTS IN A CYBERSECURITY THREAT DETECTION AND MITIGATION PLATFORM, which is incorporated herein in its entirety by this reference.

Additionally, or alternatively, in one or more embodiments, in response to generating the technology source-agnostic event signal, the system or service implementing method 200 may function to identify, via the one or more computers, a selective subset of automated detection decisioning workflows of a plurality of automated detection decisioning workflows digitally mapped to the technology source-agnostic event signal based on a signal type of the technology source-agnostic event signal (e.g., if technology source-agnostic event signal is of an AWS CloudTrail signal type, obtain all automated detection decisioning workflows digitally mapped to the AWS CloudTrail signal type, if the technology source-agnostic event signal is of a technology source-agnostic file event signal type, obtain all automated detection decisioning workflows digitally mapped to the technology source-agnostic file event signal type). Accordingly, in such embodiments, the system or service implementing method 200 may function to evaluate, via the one or more computers, the technology source-agnostic event signal against the selective subset of automated detection decisioning workflows, as described in U.S. patent application Ser. No. 18/793,483, filed 17 Aug. 2023, titled SYSTEMS, METHODS, AND GRAPHICAL USER INTERFACES FOR CONFIGURING AND IMPLEMENTING COMPUTER-EXECUTABLE DETECTION INSTRUCTIONS IN A CYBERSECURITY THREAT DETECTION AND MITIGATION PLATFORM, which is incorporated herein in its entirety by this reference.

Instantiating a Detection-Building Graphical User Interface

In one or more embodiments, the method 200 may further include obtaining raw security events, transforming raw security events to technology source-agnostic security event signals, assessing technology source-agnostic security event signals, and routing service-validated security alerts. The method optionally includes generating automated detection decisioning workflows (e.g., a computer-executable detection instruction).

In one or more embodiments, a system or service implementing method 200 may function to obtain raw security event data and/or raw security alert data from one or more third-party technology data sources (e.g., a third-party security device or the like) associated with a subject subscriber. A third-party technology data source, as generally referred to herein, may relate to a cloud-based security device that may be configured to protect cloud-based infrastructure, applications, and/or data of a subject subscriber; a security information and event management (SIEM) security device that may function to collect and analyze event data occurring at or within a digital environment of the subject subscriber; and/or any other suitable technology device (or source) that may be capable of providing real-time monitoring of digital assets of the subject subscriber. It shall be recognized that the third-party technology data source may relate to different types of technology devices, security devices, and/or the like without departing from the scope of the disclosure.

In one or more embodiments, based on one or more third-party security devices (e.g., Okta™, Crowdstrike™, O365™, Palo Alto XDR™ or the like) of a subject subscriber being in operable communication with the cybersecurity event detection and response service, the system or service implementing method 200 may function to obtain, in real-time or near real-time, raw security events from each of the one or more third-party security devices. In such embodiments, the raw security events obtained by the system or service implementing method 200 may relate to third-party alerts, third-party events, event logs, raw events, raw alerts, security policy alerts, and/or activity occurring at, within, and/or involving internal computing networks or resources of the subject subscriber (e.g., one or more computing resources of the subject subscriber, one or more computing network resources of the subject subscriber, one or more cloud-based resources of the subject subscriber, any computer-accessible digital entity or device of the subject subscriber, and/or the like). It shall be recognized, in one or more embodiments, each distinct raw security event obtained by the system or service implementing method 200 may include a plurality of distinct pieces of event data (e.g., hostname data, IP address data, username data, domain data, etc.).

In a non-limiting example, the system or service implementing method 200 may function to receive a raw security event (that includes a plurality of distinct pieces of event data) from a cloud-based security device. For example, in one or more embodiments, the system or service implementing method 200 may function to receive a raw security event from a cloud-based security device (e.g., Google Cloud Platform®, Amazon Web Services®, etc.) that is hosting one or more cloud environments of a subject subscriber to the system 100 (e.g., cybersecurity event detection and response service).

Additionally, or alternatively, in such a non-limiting example, the system or service implementing method 200 may function to receive a raw security event (that includes a plurality of distinct pieces of event data) from a security information and event management (SIEM) security device. For example, in one or more embodiments, the system or service implementing method 200 may function to receive a raw security event (that includes a plurality of distinct pieces of event data) from a SIEM device (e.g., Sumo Logic Cloud SIEM®) of a subject subscriber to the system 100 (e.g., cybersecurity event detection and response service).

Additionally, or alternatively, in such a non-limiting example, the system or service implementing method 200 may function to receive a raw security alert (e.g., a vendor alert or the like) from a target third-party technology data source or third-party security device. For example, in one or more embodiments, the system or service implementing method 200 may function to receive a raw security alert from a target third-party security device or data source (e.g., Crowdstrike®, Elastic Security®, Duo®, 1Password®, etc.) of a subject subscriber to the system 100 (e.g., cybersecurity event detection and response service).

It shall be noted that, in one or more embodiments, the system or service implementing method 200 may function to periodically request or generate application programming interface (API) calls to one or more third-party technology data sources of a plurality of distinct third-party technology data sources that, in turn, provides raw event data (e.g., raw security events, logs, etc.) to a system or service implementing method 200. Additionally, or alternatively, the system or service implementing method 200 may function to receive automatic pushes of raw event data (e.g., raw security events, logs, etc.) from the one or more third-party technology data sources of the plurality of distinct third-party technology data sources. It shall be further noted, in one or more embodiments, internal user activity and/or external third-party activity occurring within a subscriber environment that may deviate from a subscriber security policy may cause a raw security event and/or raw security alert to be generated.

At least one technical advantage of obtaining raw security event data (e.g., raw security events, raw events, etc.) may enable the cybersecurity event detection and response service to assess, in real-time or near real-time, a likely cybersecurity threat of a subject raw security event that may involve a computing or digital asset of a subject subscriber, as described in more detail herein.

It shall be noted that "real-time" or "near real-time" as used herein may refer to output within strict time constraints. For example, in one or more embodiments, real-time output may be understood to be instantaneous, on the order of milliseconds, or on the order of minutes. Of course, depending on the particular temporal nature of the system in which an embodiment is implemented, other appropriate timescales may be considered acceptable for real-time or near real-time processing.

In one or more embodiments, the system or service implementing method 200 may function to transform each raw security event obtained by the system or service implementing method 200 to a corresponding technology source-agnostic security event signal (e.g., normalized security event). A technology source-agnostic security event signal, as generally referred to herein, may be a transformed representation of a raw security event, obtained by the system or service implementing method 200, that is in a form understandable and/or processable by the cybersecurity event detection and response service irrespective of a third-party technology data source that identified the raw security event. It shall be recognized that the phrase "technology source-agnostic security event signal" may also be interchangeably referred to herein as a "normalized security event signal", an "event signal", a "system-standardized security event signal", and/or the like.

In one or more embodiments, the system or service implementing method 200 may function to automatically generate, via one or more processing devices, a technology source-agnostic security event signal based on a given raw security event or raw log data obtained from a third-party security device of a subscriber to the cybersecurity event detection and response service. In other words, a technology source-agnostic security event signal may be in any one of a plurality of standardized event signal schemas that enables the cybersecurity event detection and response service to automatically analyze and respond to raw security events across a diverse range of third-party security devices (e.g., third-party security events from third-party security devices) without needing to adapt computer-executable detection instructions to account for any of the third-party security devices within the diverse range of third-party security devices, as described in more detail herein.

In one or more embodiments, each distinct technology source-agnostic security event signal (e.g., normalized security event) of a plurality of distinct technology source-agnostic security event signals may correspond to a distinct technology source-agnostic security event signal type (e.g., normalized security event type). For instance, in a non-limiting example, a first technology source-agnostic security event signal may correspond to a first technology source-agnostic security event signal type, a second technology source-agnostic security event signal may correspond to a second technology source-agnostic security event signal type, a third technology source-agnostic security event signal may correspond to a third technology source-agnostic security event signal type, and n-number of technology source-agnostic security event signals may correspond to n-number of technology source-agnostic security event signal types, respectively. Stated another way, in one or more embodiments, a technology source-agnostic authentication event signal may correspond to a technology source-agnostic authentication event signal type, a technology source-agnostic phishing event signal may correspond to a technology source-agnostic phishing event signal type, a technology source-agnostic file event signal may correspond to a technology source-agnostic file event signal type, and a technology source-agnostic policy violation event signal may correspond to a technology source-agnostic policy violation event signal type.

In one or more embodiments, using an event normalization engine (e.g., an event normalization service or the like), the system or service implementing method 200 may function to automatically convert or transform, in real-time or near real-time, an inbound raw security event to a technology source-agnostic security event signal, as shown generally by way of example in FIG. 40, FIG. 41, FIG. 42, and FIG. 47. Stated another way, each inbound raw security event may be processed through an event normalization layer that, in turn, transforms a subject raw security event into a corresponding technology source-agnostic security event signal, as described in U.S. Patent Application No. 63/555,853, titled SYSTEMS AND METHODS FOR AUTOMATICALLY CREATING NORMALIZED EVENTS IN A CYBERSECURITY THREAT DETECTION AND MITIGATION PLATFORM, which is incorporated in its entirety by this reference.

It shall be noted that, in one or more embodiments, the system or service implementing method 200 may function to normalize (e.g., convert, transform, and/or the like), a subject raw security event (of a third-party technology data source) to a technology source-agnostic security event based on a set of raw security event-to-technology source-agnostic security event signal instructions constructed for the third-party technology data source, as described in U.S. patent application Ser. No. 18/749,222, titled SYSTEMS, METHODS, AND GRAPHICAL USER INTERFACES FOR ACCELERATING A CONSTRUCTION OF A DATA INTEGRATION FOR A NON-INTEGRATED TECHNOLOGY DATA SOURCE, which is incorporated in its entirety by this reference.

For instance, in a non-limiting example, based on receiving a raw security event from a (first) third-party security device, the system or service implementing method 200 may function to assess and/or search, via one or more processors, an integration database that includes a corpus of raw security event-to-technology source-agnostic security event signal instructions using an identifier of the (first) third-party security device as a search parameter. In such a non-limiting example, based on the assessment or search, the system or service implementing method 200 may function to identify a set of raw security event-to-technology source-agnostic security event signal instructions (e.g., a set of computer-executable data mapping instructions) that correspond to the (first) third-party security device. Accordingly, using the set of raw security event-to-technology source-agnostic security event signal instructions, the system or service implementing method 200 may function to normalize (e.g., convert, transform, etc.) the raw security event (e.g., raw security event data) to a technology source-agnostic security event signal (e.g., normalized security event).

Additionally, or alternatively, in such a non-limiting example, based on receiving a raw security event from another third-party security device, the system or service implementing method 200 may function to assess and/or search an integration database that includes a corpus of raw security event-to-technology source-agnostic security event signal instructions using an identifier of the another third-party security device as a search parameter. In such a non-limiting example, based on the assessment or search, the system or service implementing method 200 may function to identify a set of raw security event-to-technology source-agnostic security event signal instructions that correspond to the another third-party security device. Accordingly, using the set of raw security event-to-technology source-agnostic security event signal instructions (e.g., the set of computer-executable data mapping instructions, etc.), the system or service implementing method 200 may function to normalize (e.g., convert, transform, etc.) the raw security event (e.g., raw security event data) to a technology source-agnostic security event signal (e.g., normalized security event).

Stated another way, in one or more embodiments, based on the system or service implementing method 200 receiving a raw security event (e.g., raw security event data) associated with a third-party technology data source (e.g., third-party security device or the like), the system or service implementing method 200 may function to automatically process the raw security event in accordance with a data integration (e.g., security data integration) configured for the third-party technology data source and, in turn, generate one or more distinct technology source-agnostic security event signals (e.g., at least one normalized security event) based on the processing. Stated differently, in one or more embodiments, third-party security events from any third-party security vendor, third-party security device, or the like in communication with a system or service implementing method 200 may be transformed, generated, or converted into a corresponding technology-source agnostic security event signal of a corresponding type. This may enable the system or service implementing method 200 to respond to security threats in a standardized manner, regardless of the original source or format of a raw security event or the like.

It shall be recognized that, in one or more embodiments, a system or service implementing method 200 may have a plurality of predetermined or predefined technology source-agnostic event signal types including, but not limited to, a technology source-agnostic authentication-type signal, a technology source-agnostic file event-type signal, a technology source-agnostic multi factor authentication-type signal, a technology source-agnostic detection finding-type signal, a technology source-agnostic policy violation-type signal, a technology source-agnostic break glass event-type signal, a technology source-agnostic threat intel event-type signal, a technology source-agnostic vendor alert-type signal, a technology source-agnostic anomaly duet-type signal, a technology source-agnostic security finding-type signal, a technology source-agnostic email activity-type signal, a technology source-agnostic brute force-type signal, a technology source-agnostic network categorical threat-type signal, a technology source-agnostic blowhorn incident-type signal, a technology source-agnostic API activity-type signal, a technology source-agnostic web application firewall event-type signal, a technology source-agnostic phishing event-type signal, a technology source-agnostic SIEM event-type signal, a technology source-agnostic vendor event-type signal, a technology source-agnostic network connection-type signal, and a technology source-agnostic process event-type signal.

In one or more embodiments, the system or service implementing method 200 may function to automatically assess, via one or more processing devices of the cybersecurity event detection and response service, each distinct technology source-agnostic security event signal generated by the system or service implementing method 200. In one or more embodiments, based on the automatic assessment of a subject technology source-agnostic security event signal, the system or service implementing method 200 may function to automatically determine if a prospective security alert, service-validated security alert or the like should be generated. It shall be noted that there are many technical benefits associated with assessing technology source-agnostic security event signals as will become more apparent throughout the remainder of this disclosure.

Figure 42:
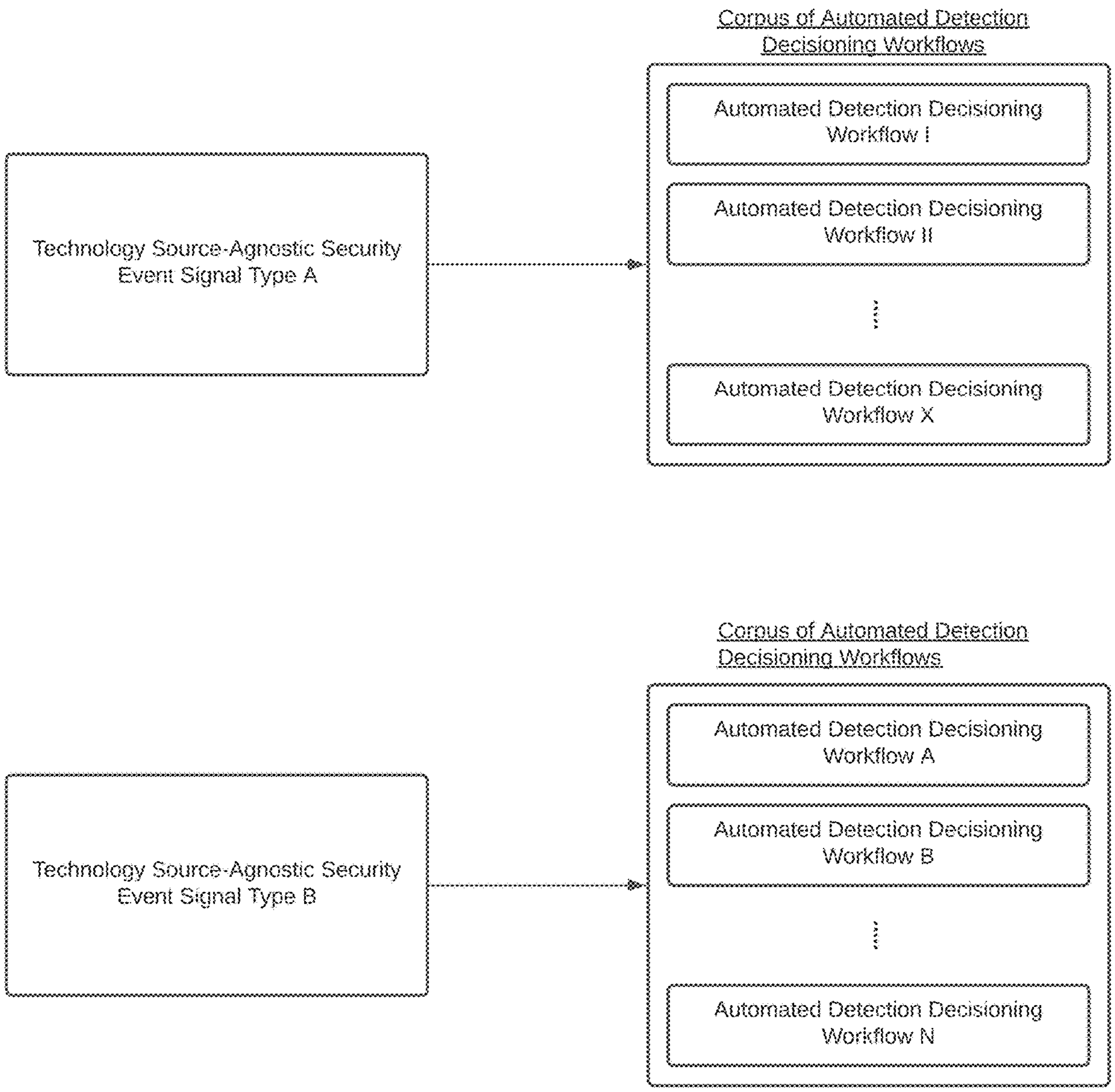
FIG. 42 illustrates an example representation of a digitally mapping between technology source-agnostic security event signal types and corpora of automated detection decisioning workflows in accordance with one or more embodiments of the present application.
Figure 58:
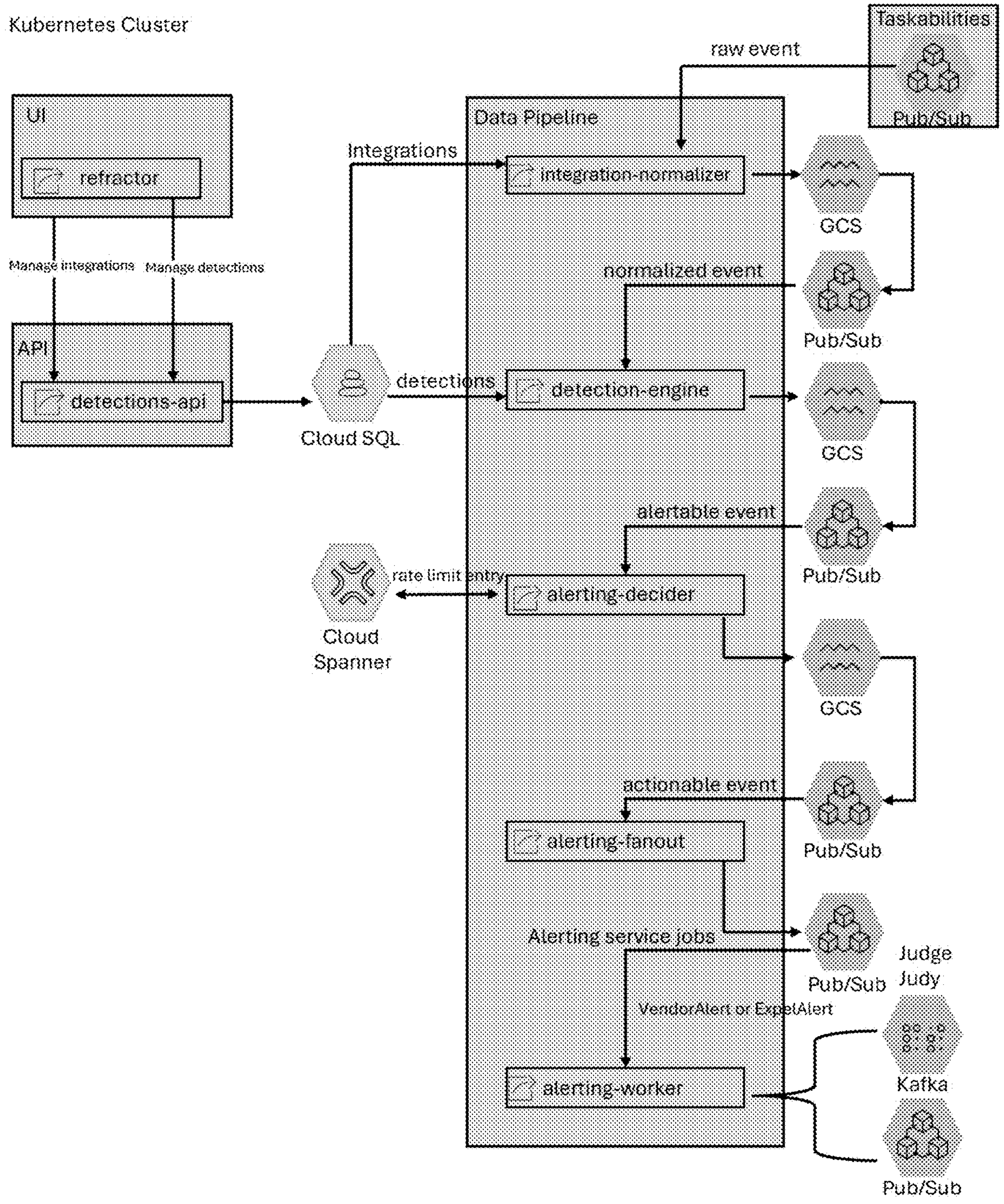
FIGS. 58-59 illustrate example schematics of a system or service implementing method 200 in accordance with one or more embodiments of the present application.
Figure 59:
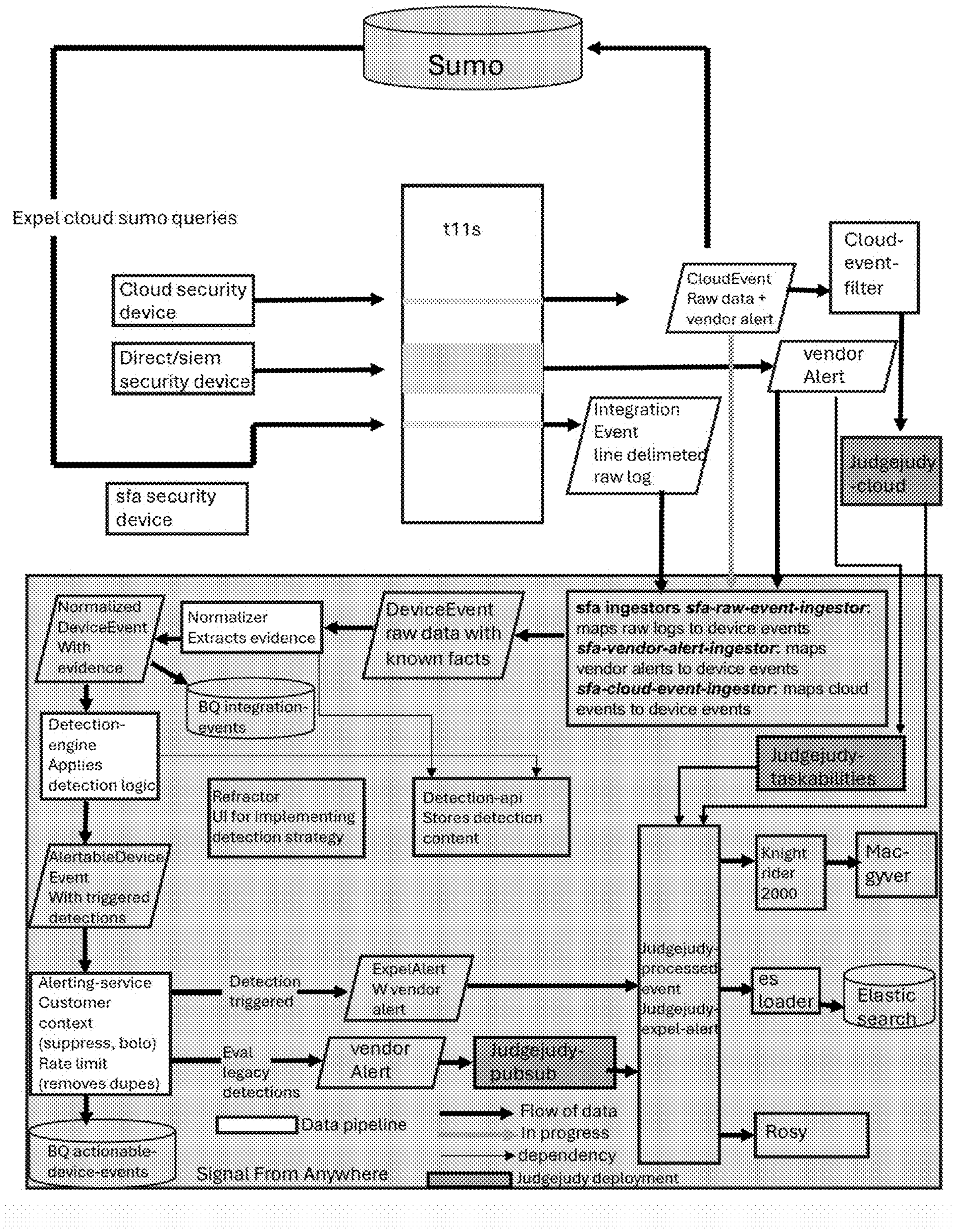

In one or more embodiments, each distinct technology source-agnostic security event signal type of the cybersecurity event detection and response service may be mapped to a distinct corpus of automated detection decisioning workflows (e.g., a distinct corpus of computer-executable detection instructions), as shown generally by way of example in FIG. 42. Stated another way, a plurality of distinct corpora of automated detection decisioning workflows (e.g., a plurality of distinct corpora of computer-executable detection instructions) may be mapped to a plurality of distinct technology source-agnostic security event signal types, respectively. In this way, event response logic (e.g., detection rules, computer-executable detection heuristics, detection instructions, threat response instructions, and/or the like) may be digitally mapped to technology source-agnostic security event signals rather than third-party technology data sources. Therefore, at least one technical benefit of implementing such mapping may enable the cybersecurity event detection and response service to apply a detection layer over technology source-agnostic security event signals rather than raw security alert/event data received from third-party data sources (e.g., third-party security devices, etc.), as shown generally by way of example in FIG. 58 and FIG. 59. Thereby, preventing detection logic (e.g., detection rules, computer-executable detection heuristics, automated detection decisioning workflows and/or the like) being constructed for each distinct third-party technology data source to which the cybersecurity event detection and response service integrates therewith.

That is, in one or more embodiments, each unique type of technology-independent security event signal (e.g., technology source-agnostic security event signal) may be digitally linked to a unique set of automated detection workflows (e.g., computer-executable detection instructions), allowing the system or service implementing method 200 to apply detection logic (e.g., detection rules, computer-executable detection heuristics, detection instructions, and/or the like) to technology-independent security event signals instead of raw event data from third-party sources, thereby avoiding the need to create detection logic for each separate third-party data source. In other words, the cybersecurity event detection and response service does not need to develop and deploy separate detection logic for each individual third-party data source, but rather may define computer-executable detection instructions per each type of technology source-agnostic security event signal.

Stated another way, in one or more embodiments, each distinct technology source-agnostic security event signal type of the cybersecurity event detection and response service may be digitally coupled to a distinct corpus of computer-executable detection instructions. Each distinct corpus of computer-executable detection instructions, in one or more embodiments, may include a plurality of computer-executable detections instructions (e.g., heuristics-based computer-executable detection instructions, machine learning-based computer-executable detection instructions that use one or more machine learning models, etc.) that may be configured to assess technology source-agnostic security event signals of a target type. In other words, a corpus of computer-executable detection instructions digitally coupled or mapped to a first technology source-agnostic security event signal type (e.g., authentication-type signal) may only include computer-executable detection instructions that are configured to evaluate subject technology source-agnostic security event signals of the first technology source-agnostic security event signal type (e.g., authentication-type signal), a corpus of computer-executable detection instructions digitally coupled or mapped to a second technology source-agnostic security event signal type (e.g., phishing-type signal) may only include computer-executable detection instructions that are configured to evaluate subject technology source-agnostic security event signals of the second technology source-agnostic security event signal type (e.g., phishing-type signal), and so forth for each technology source-agnostic security event signal type defined by the system or service implementing method 200. As a result, in one or more embodiments, the system or service implementing method 200 may maintain a higher level of adaptability and responsiveness, providing targeted defenses against diverse threats, regardless of the originating technology source. It shall be further recognized, in one or more embodiments, a machine learning-based detection instruction may use one or more machine learning models, often reducing false positives in alerting, while heuristic-based detection instructions may be quicker to implement.

Figure 43:
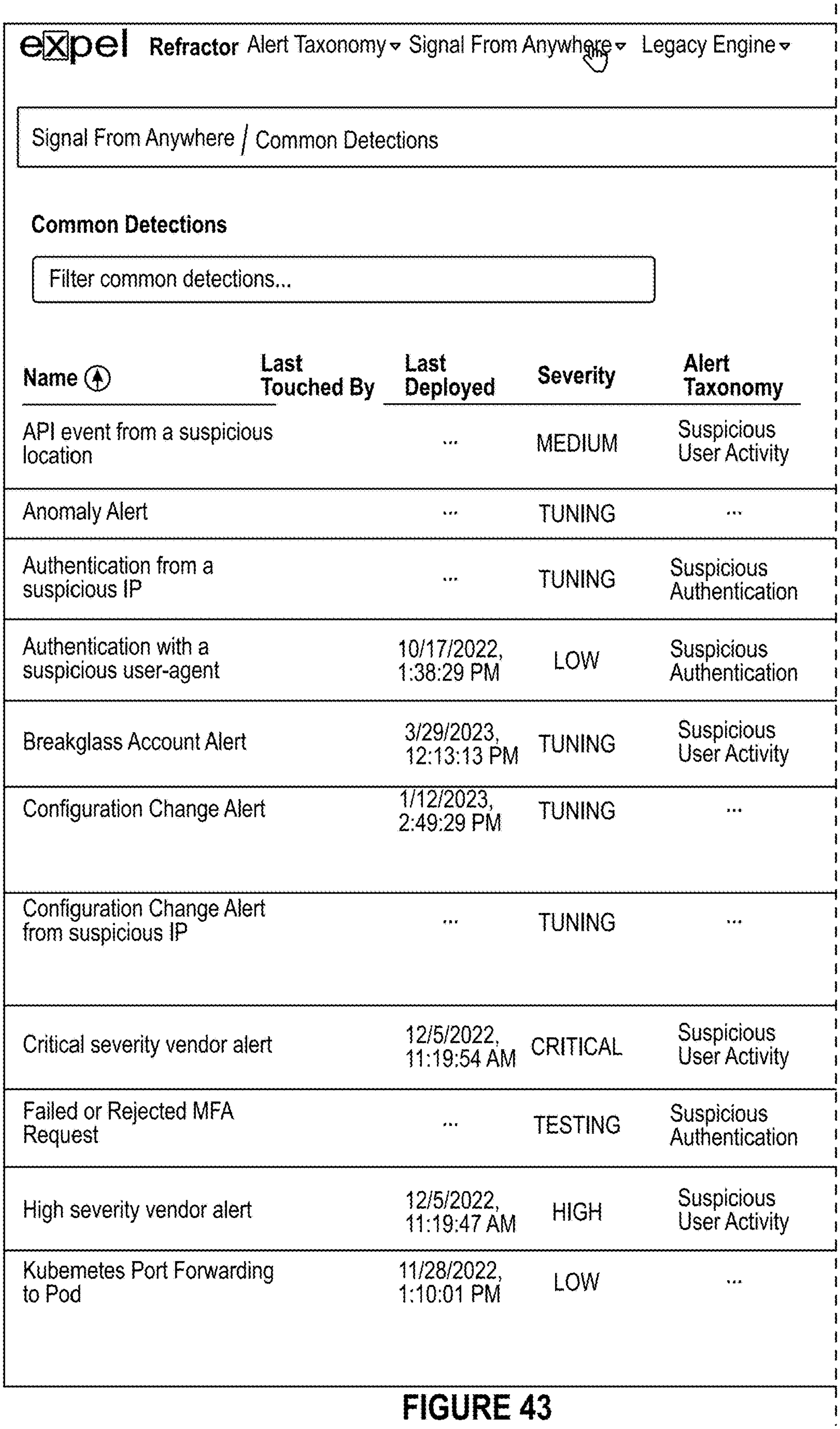
FIGS. 43-46 illustrate example graphical user interfaces of configuring automated detection decisioning workflows in accordance with one or more embodiments of the present application.
Figure 49:
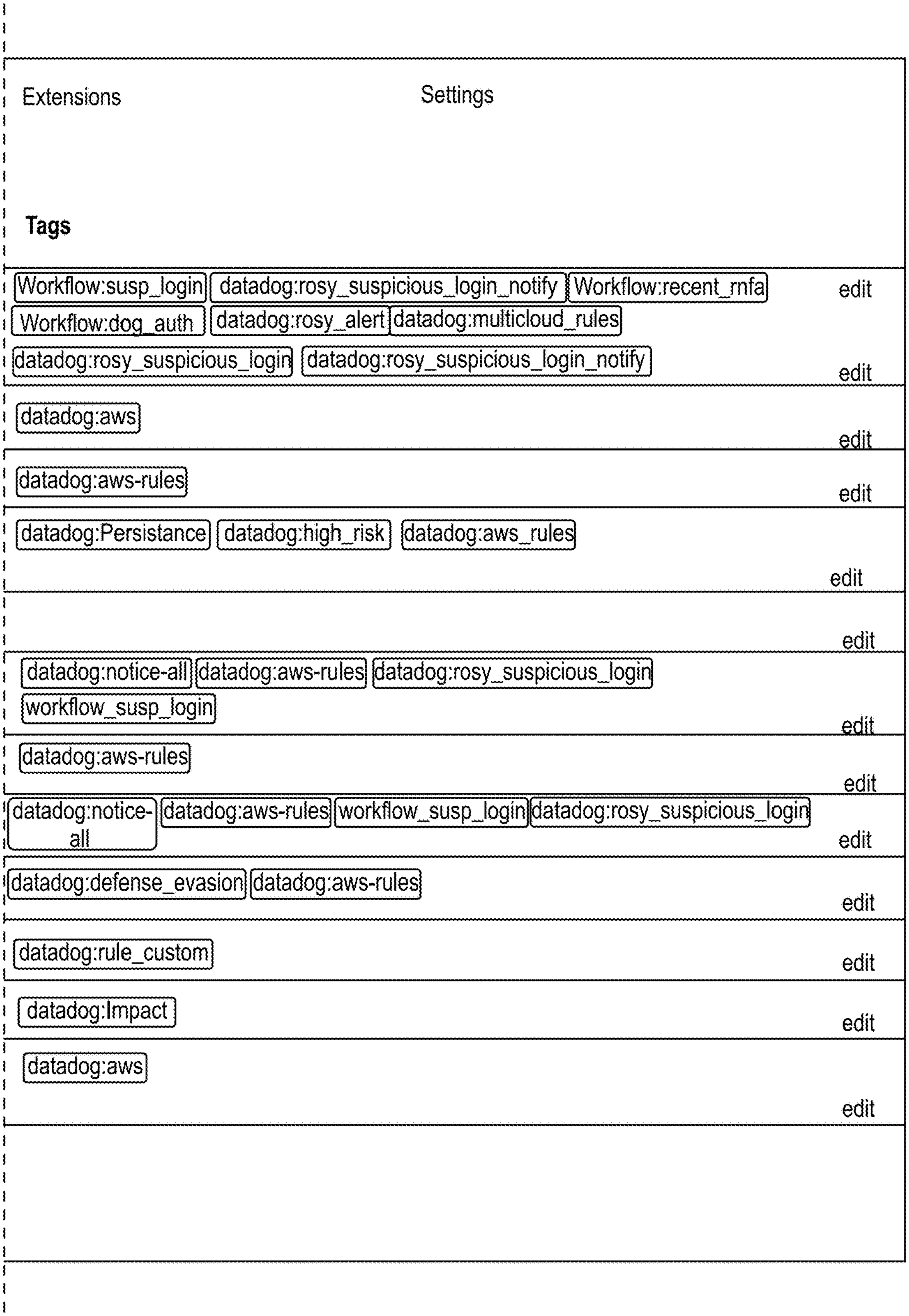
FIG. 49 illustrates an example of a graphical user interface displaying a plurality of representations of computer-executable detection instructions in accordance with one or more embodiments of the present application.
Figure 50:
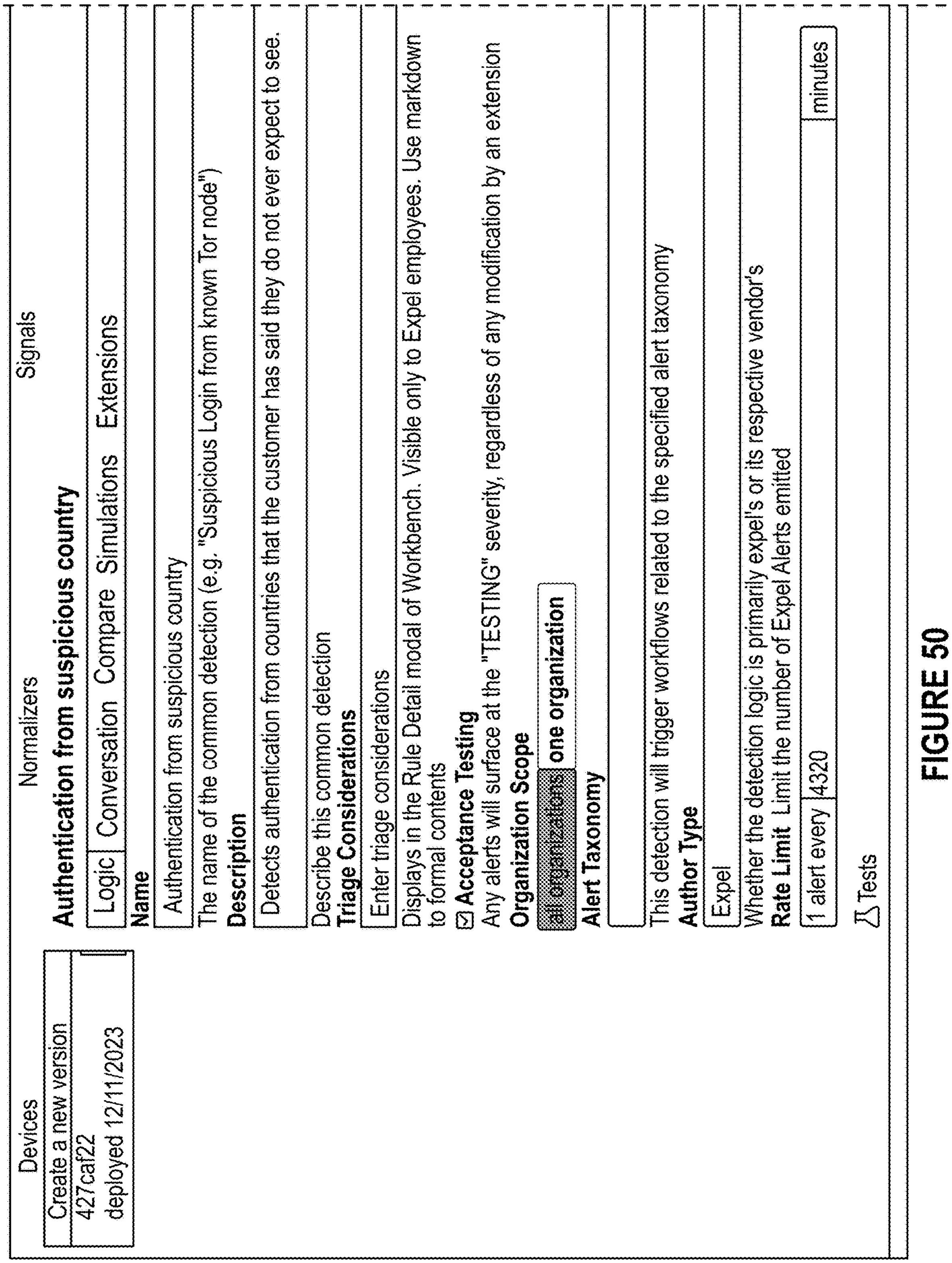
FIGS. 50-57 illustrate example graphical user interfaces for configuring computer-executable detection instructions in accordance with one or more embodiments of the present application.
Figure 51:
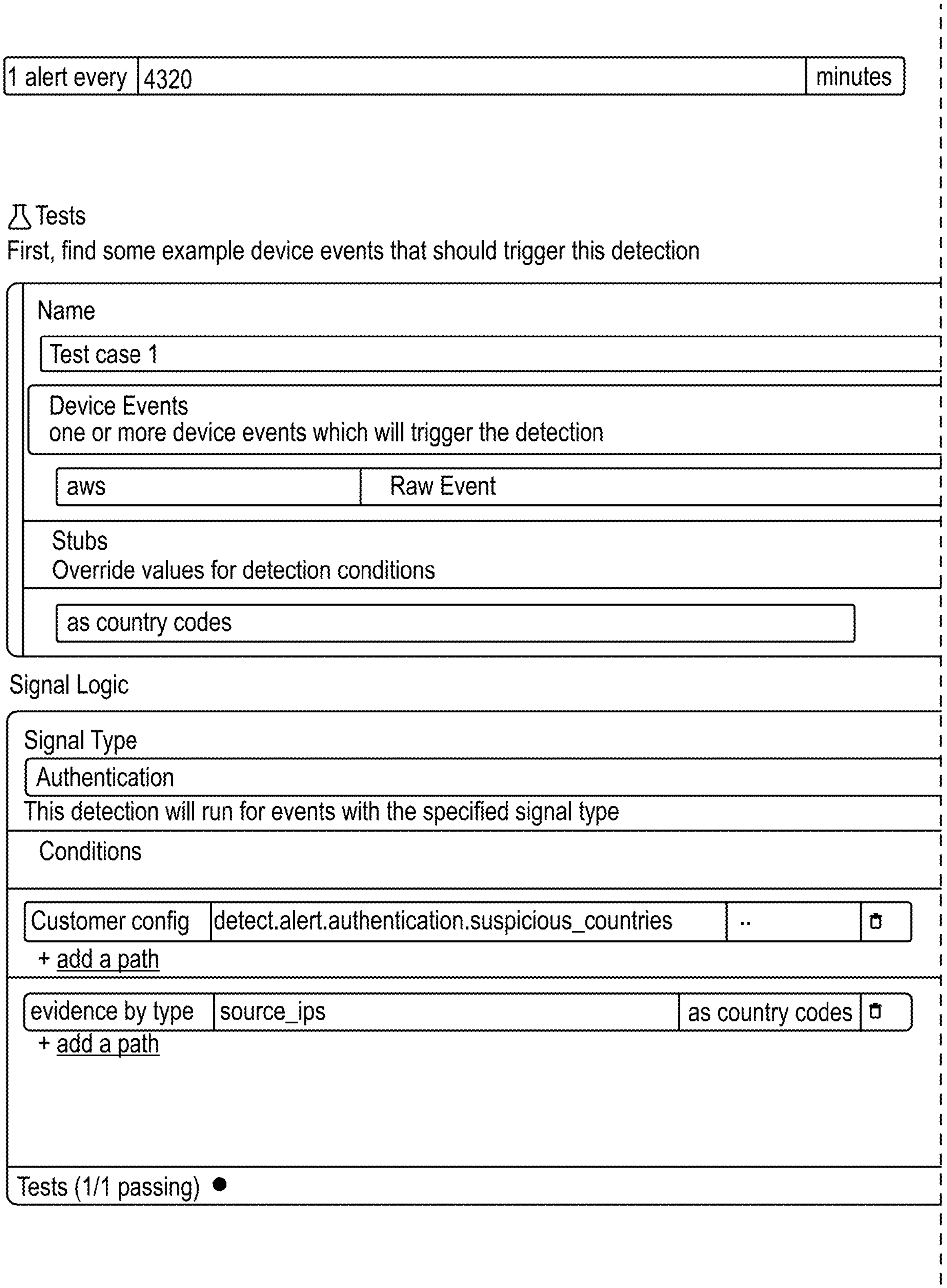
Figure 52:
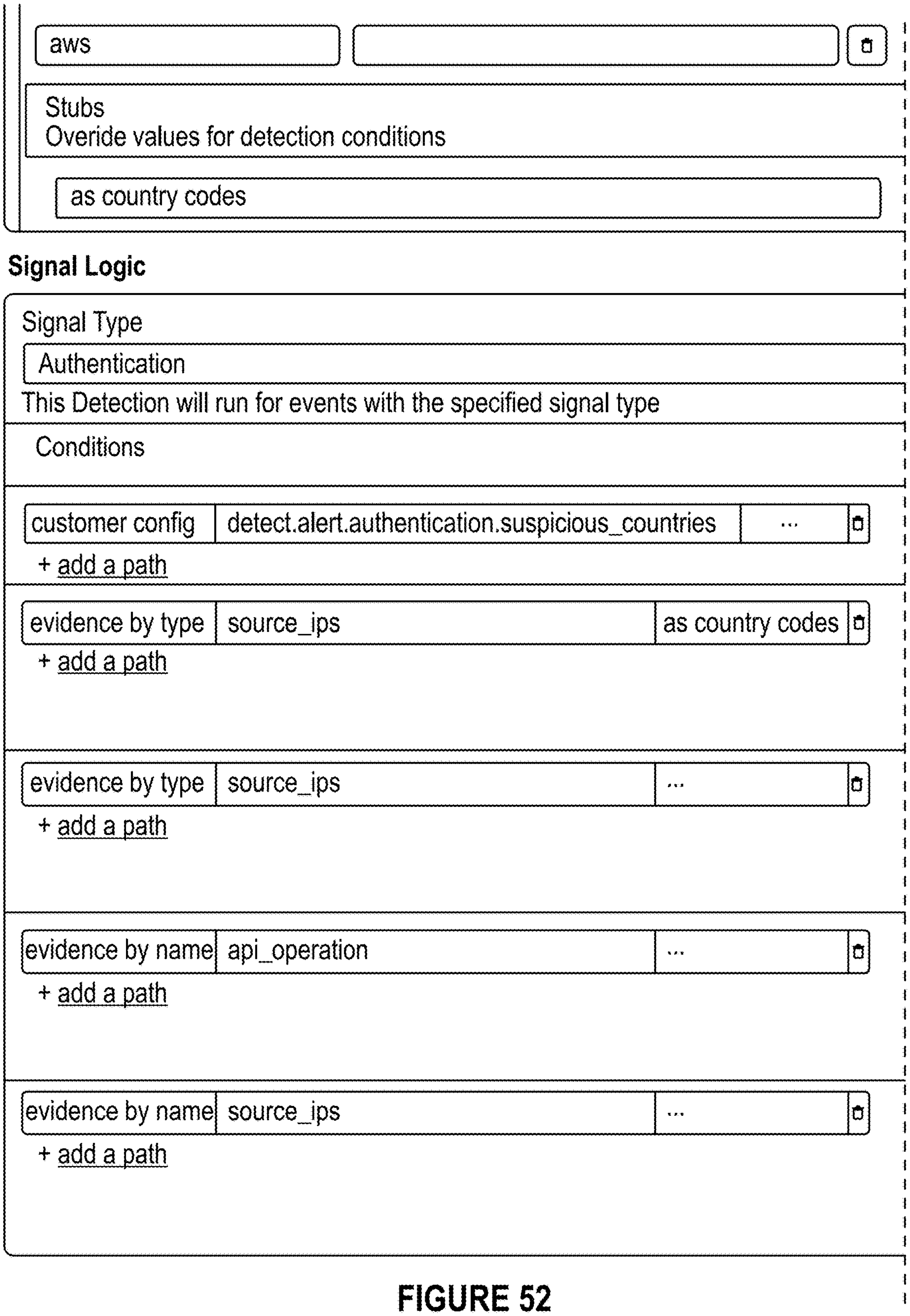
Figure 53:
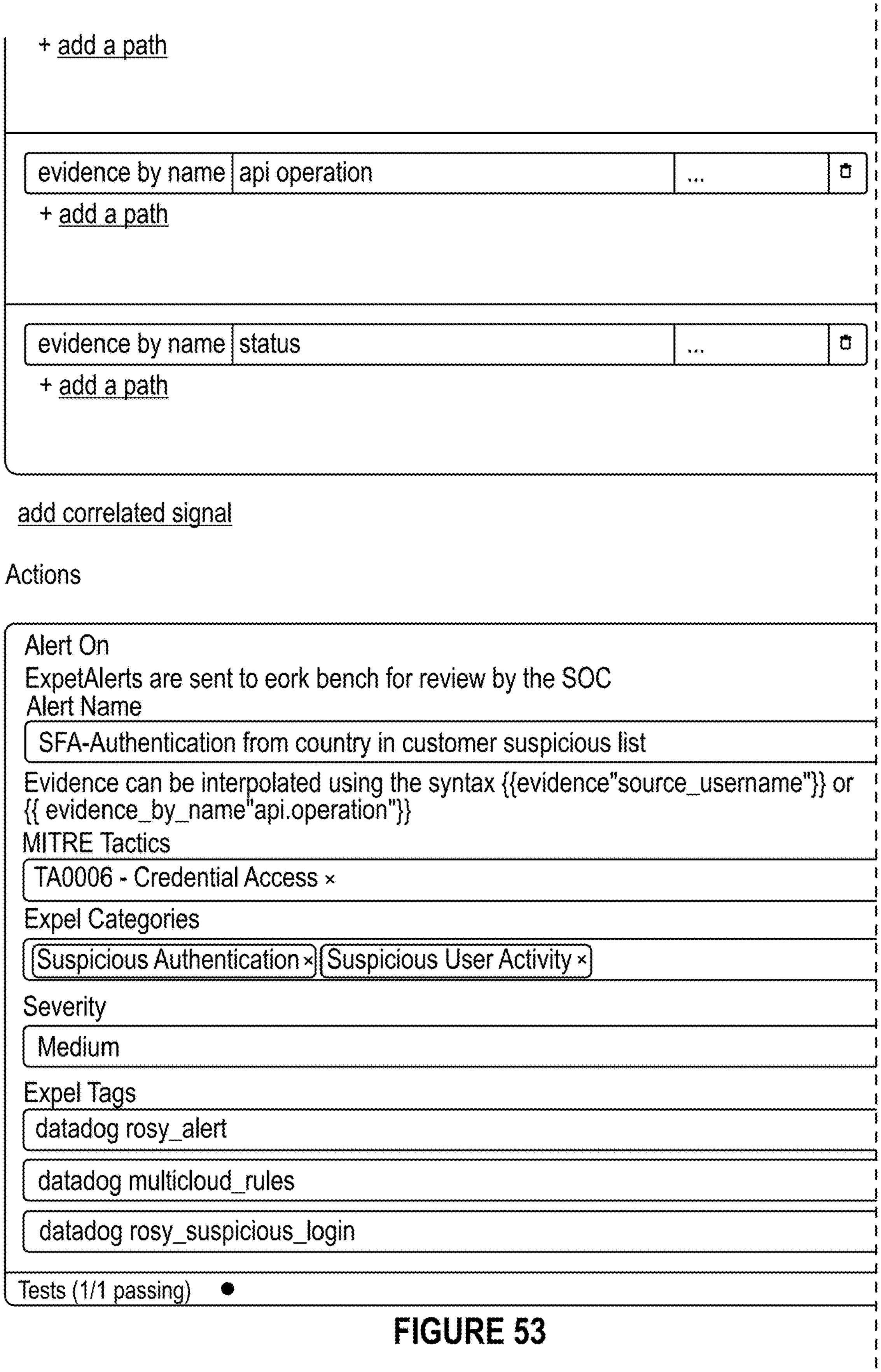
Figure 54:
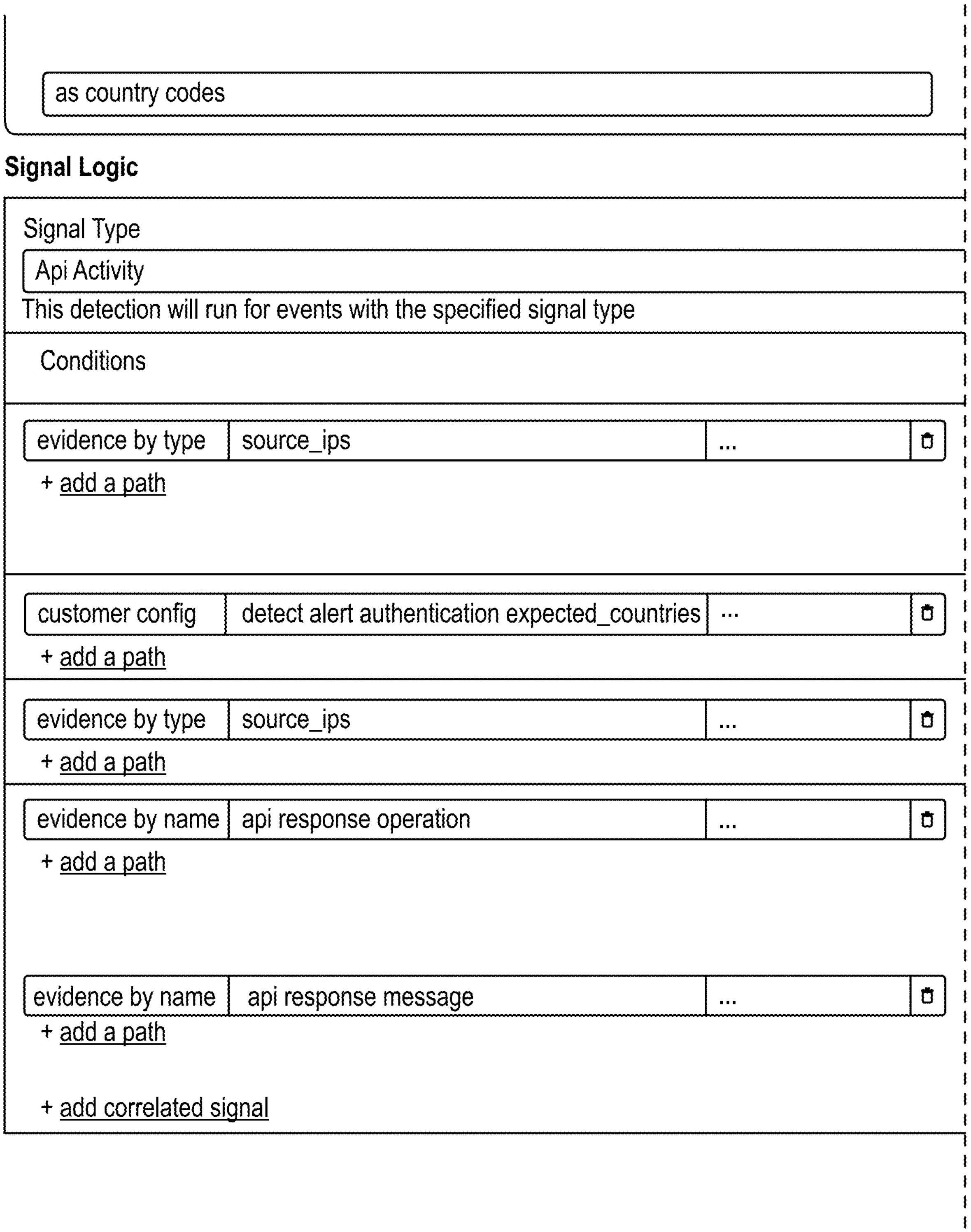
Figure 55:
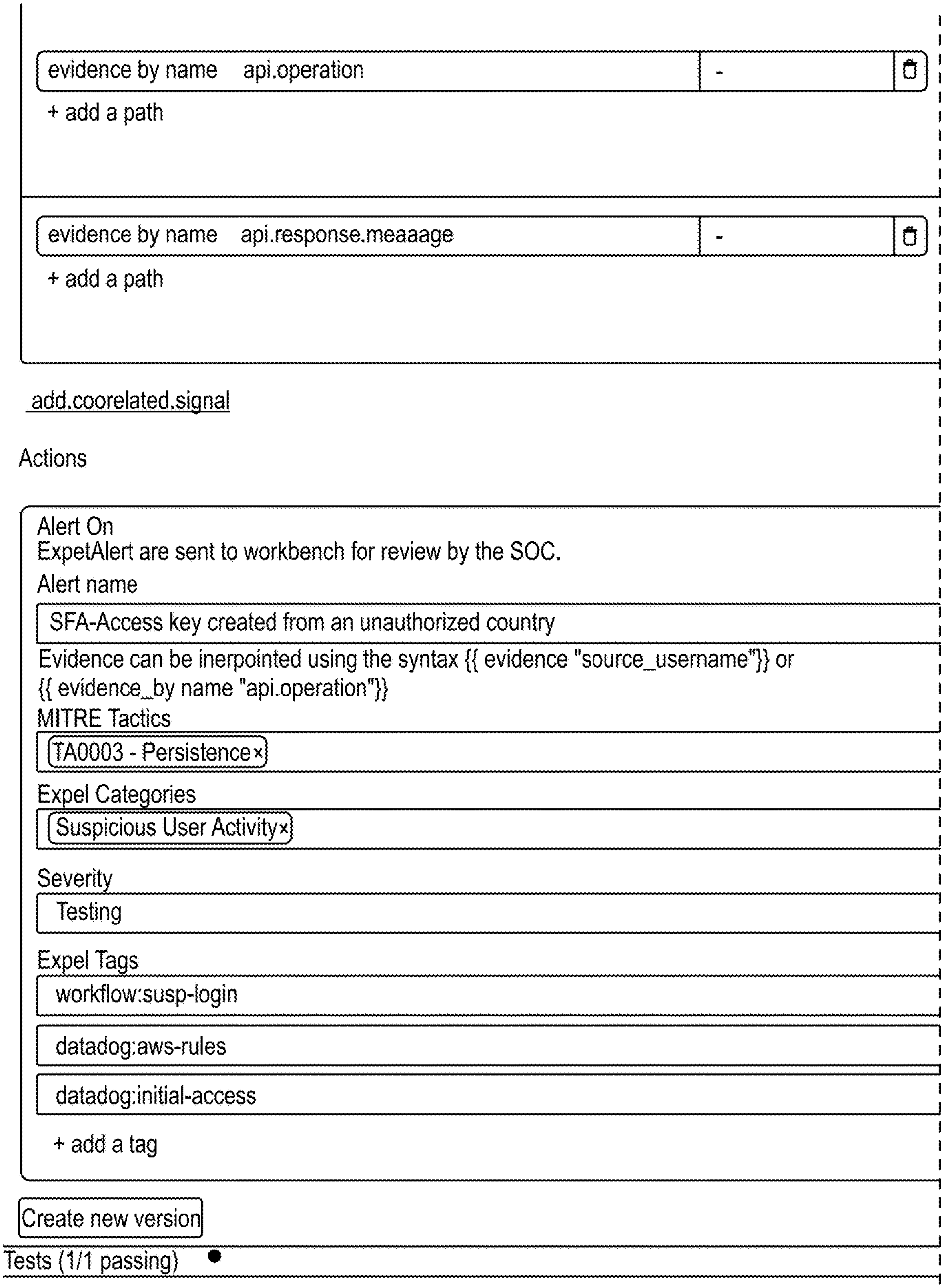
Figure 56:
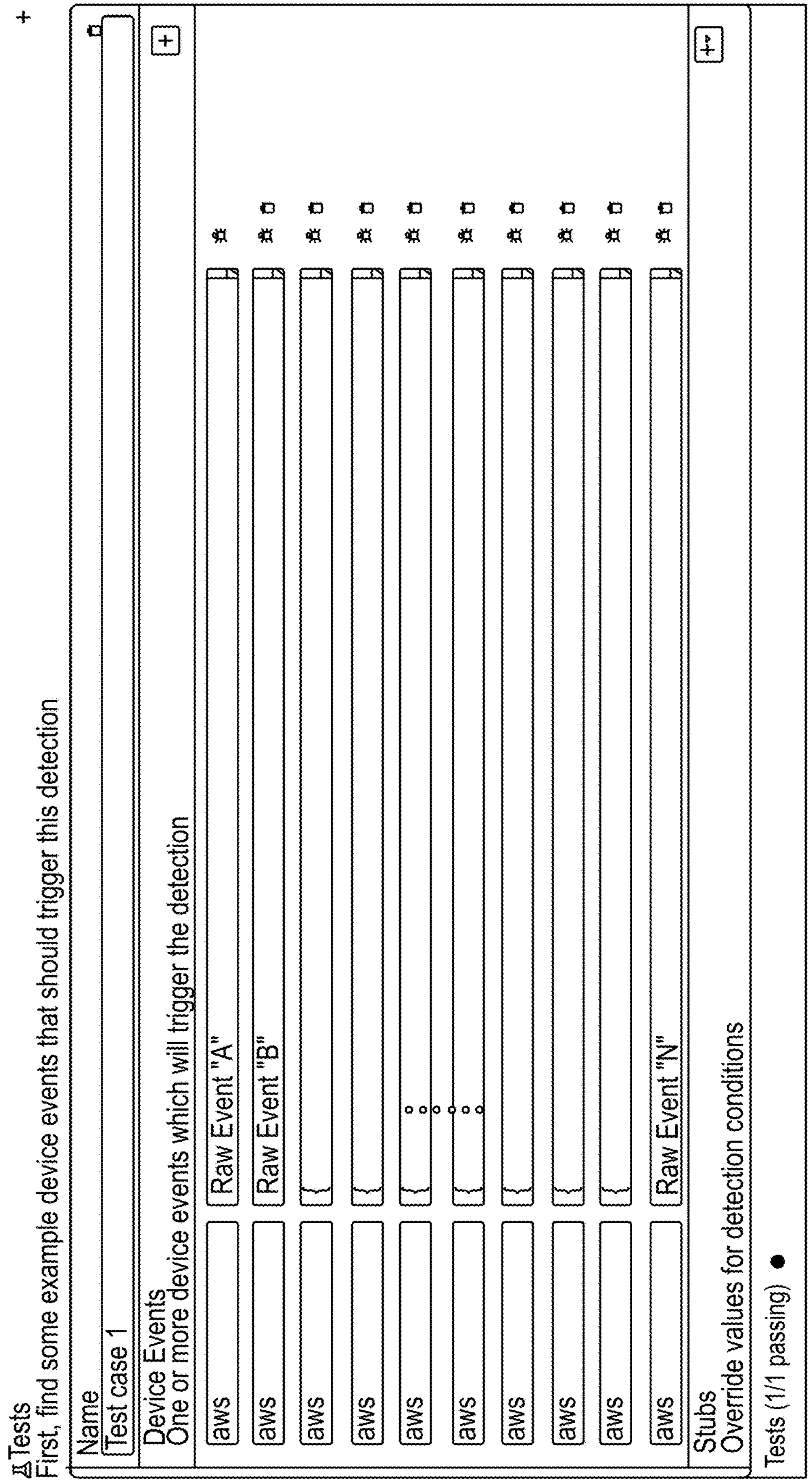
Figure 57:
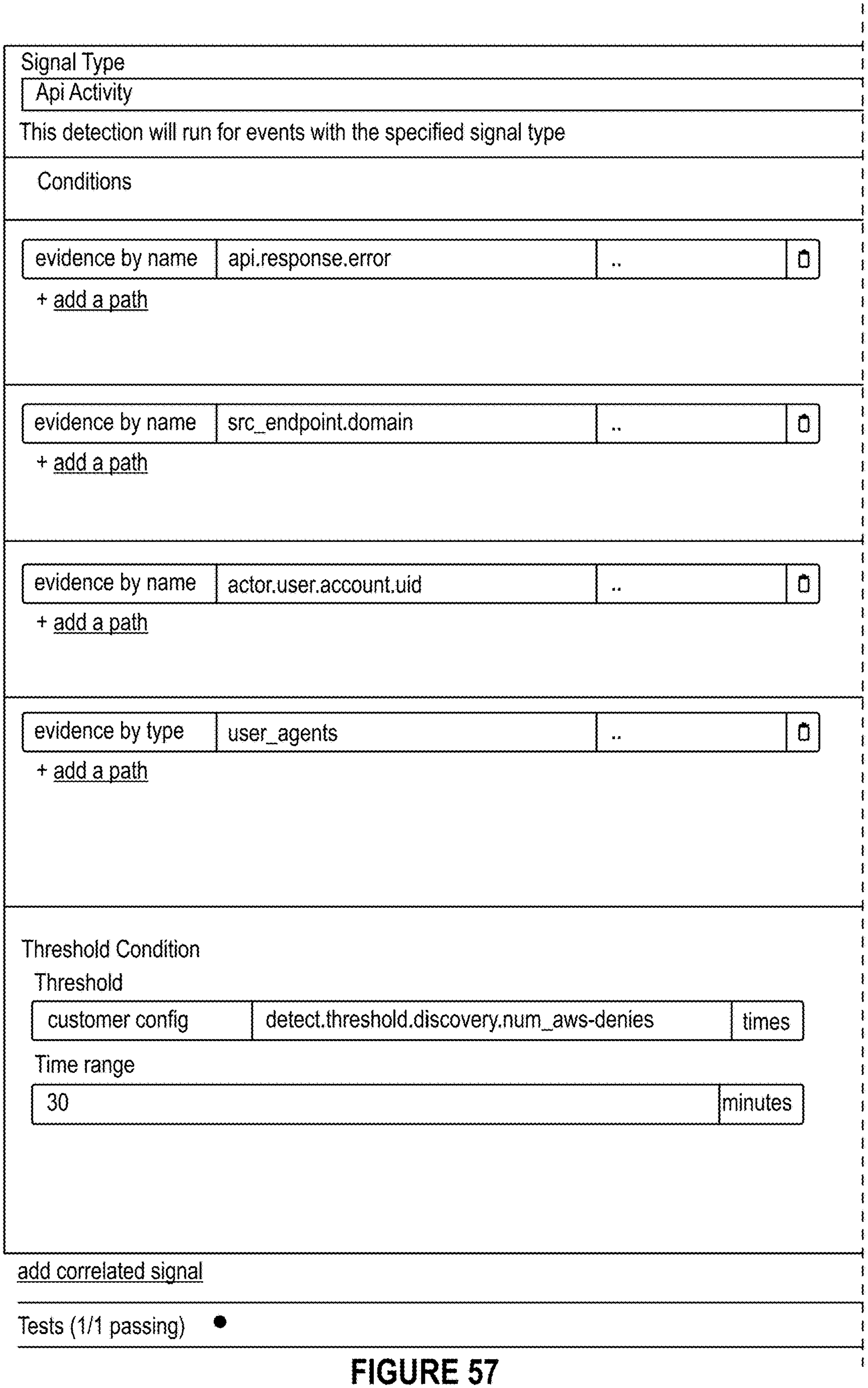

Additionally, or alternatively, in one or more embodiments, a first type of automated detection decisioning workflow (e.g., an authentication from a suspicious IP workflow, a first computer-executable detection instruction, etc.) may be digitally linked to a technology source-agnostic authentication event signal type, a second type of automated detection decisioning workflow (e.g., a failed or rejected multi-factor authentication request workflow, a second computer-executable detection instruction, etc.) may be digitally linked to the technology source-agnostic authentication event signal type, a third type of automated detection decisioning workflow (e.g., authentication from a suspicious user-agent workflow, a third computer-executable detection instruction, etc.) may be digitally linked to the technology source-agnostic authentication event signal type, and/or any suitable number of automated detection decisioning workflows may be digitally linked to the technology source-agnostic authentication event signal type, as shown generally by way of example in FIG. 42, FIG. 43, and FIG. 49. Stated another way, each of the plurality of automated detection decisioning workflows (e.g., computer-executable detection instructions, etc.) digitally mapped to the technology source-agnostic authentication event signal type may be specifically configured to process and/or evaluate a likely threat of inbound technology source-agnostic security event signals of the technology source-agnostic authentication event signal type.

Additionally, or alternatively, in such a non-limiting example, a fourth type of automated detection decisioning workflow (e.g., a critical severity vendor alert workflow) may be digitally linked to a technology source-agnostic vendor alert signal type, a fifth type of automated detection decisioning workflow may be digitally linked to the technology source-agnostic vendor alert signal type, etc. That is, each of the plurality of automated detection decisioning workflows digitally mapped to the technology source-agnostic vendor alert signal type may be specifically configured to process and/or evaluate technology source-agnostic security event signals of the technology source-agnostic vendor alert signal type.

Figure 44:
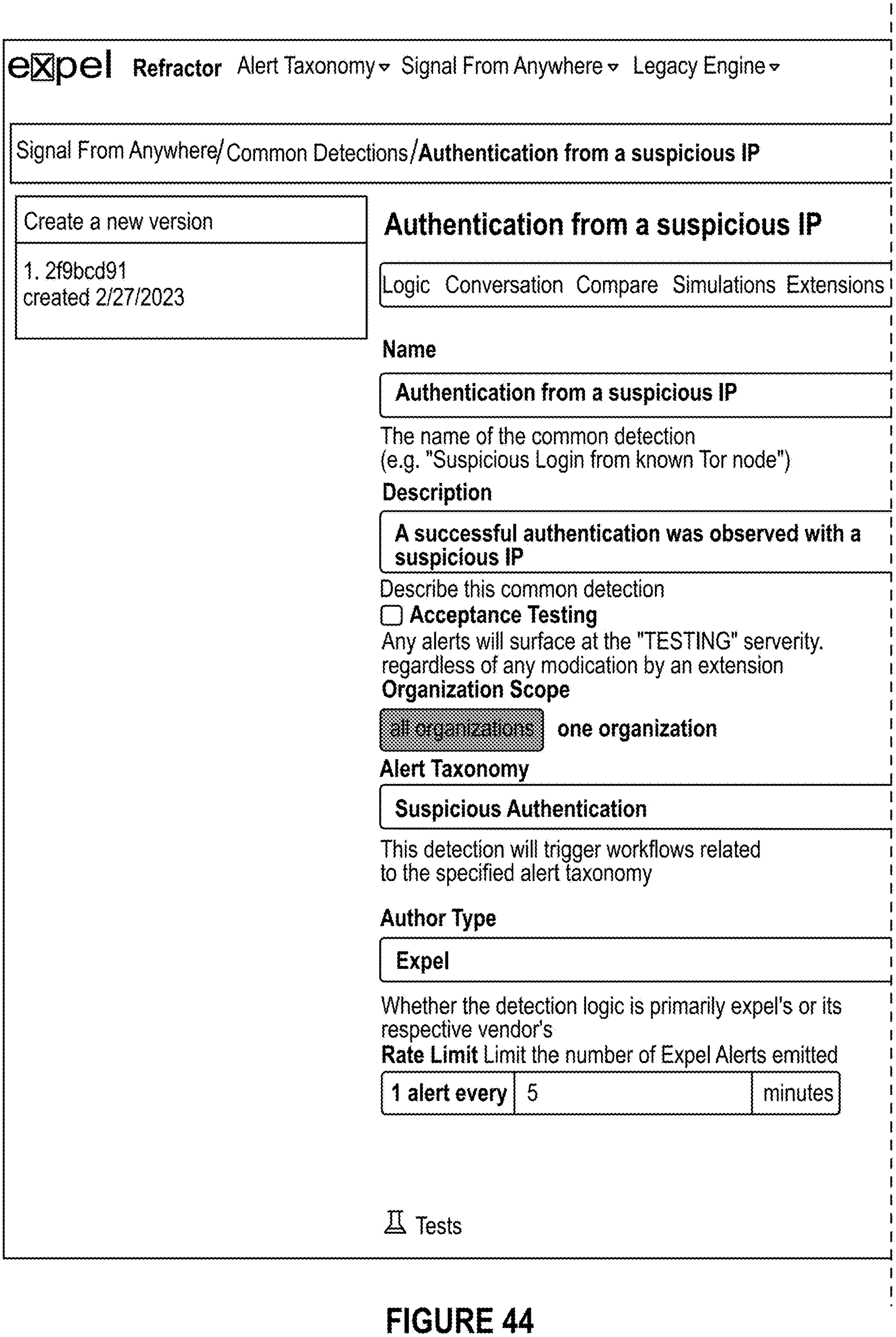
Figure 45:
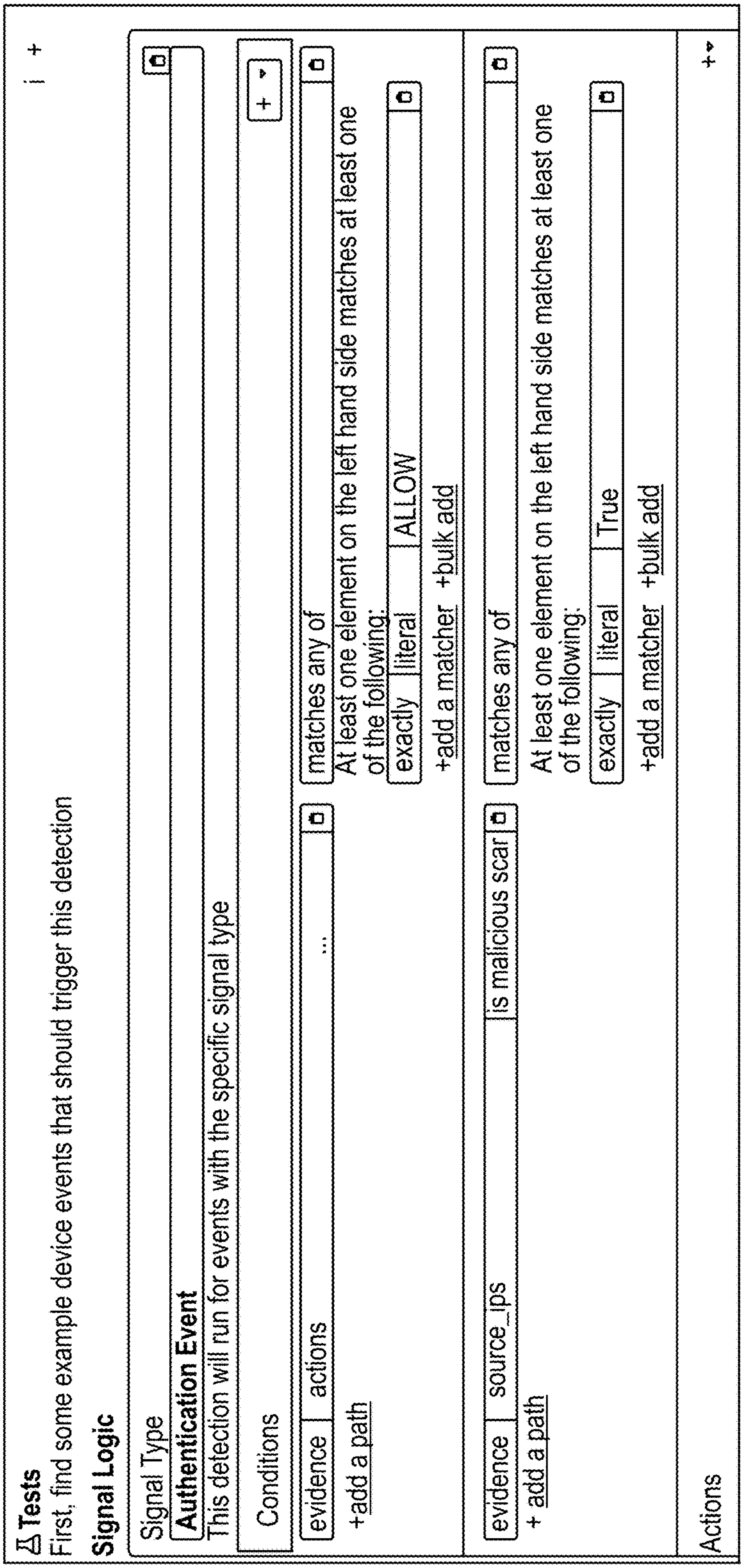
Figure 46:
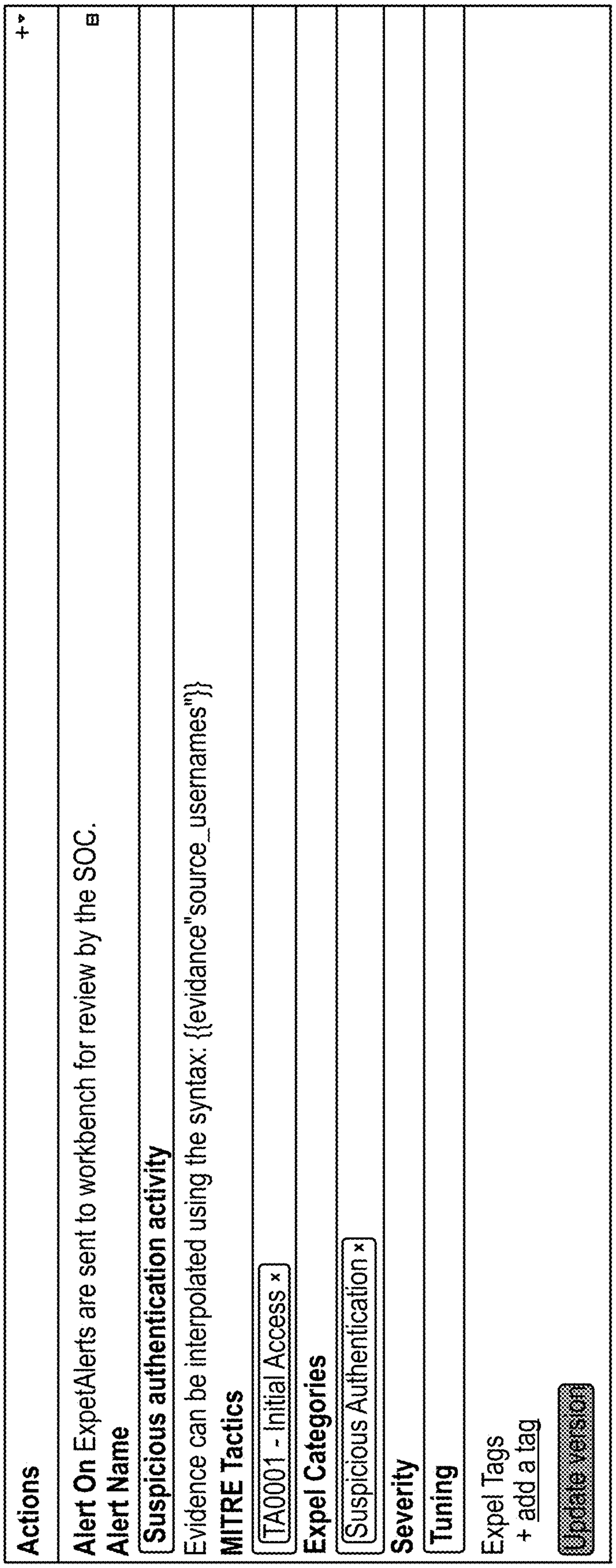
Figure 47:
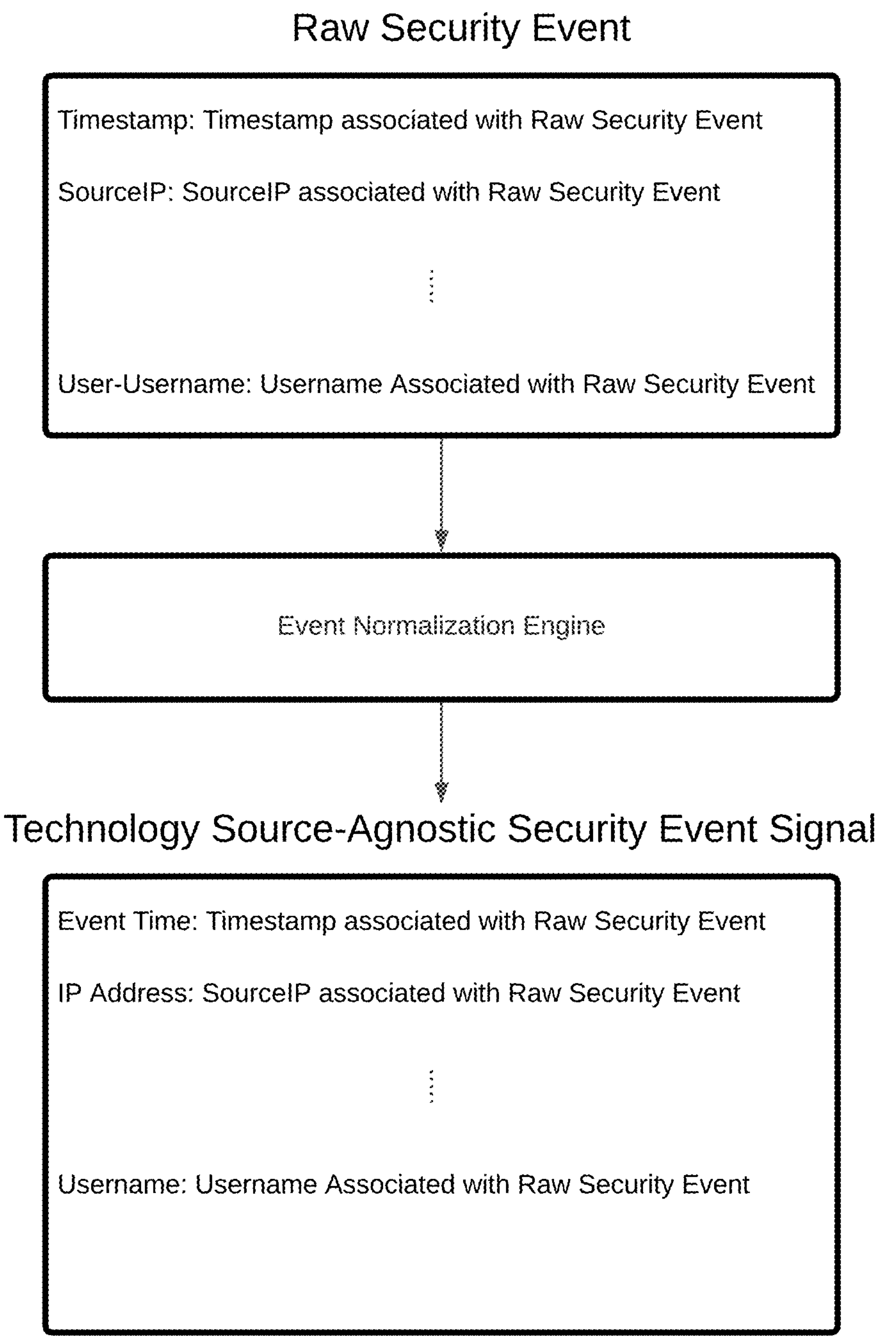
FIG. 47 illustrates an example of normalizing a raw security event to a technology source-agnostic security event signal in accordance with one or more embodiments of the present application.

In one or more embodiments, each automated detection decisioning workflow may define alerting conditions (e.g., service-defined alerting criteria, etc.) for which a service-validated security alert (e.g., prospective security alert or the like) may be generated, as shown generally by way of example in FIGS. 44-46. In one or more embodiments, a service-validated security alert (e.g., prospective security alert or the like) may be generated when the cybersecurity event detection and response service determines that a subject technology source-agnostic security event signal appears malicious, requires further investigation, and/or appears suspicious.

For instance, in a non-limiting example, an automated detection decisioning workflow (e.g., an authentication from a suspicious IP) digitally linked to the technology source-agnostic authentication event signal type may include computer-executable instructions that may cause a creation of a service-validated security alert (e.g., prospective security alert or the like) when a subject technology source-agnostic security event signal of the technology source-agnostic authentication event signal type has a source internet protocol (IP) address that matches one of a plurality of suspicious (IP) addresses included in a corpus of suspicious (IP) addresses.

Additionally, or alternatively, in such a non-limiting example, a subject automated detection decisioning workflow digitally linked to the technology source-agnostic vendor alert signal type may include computer-executable instructions that may cause a creation of a service-validated security alert when a subject technology source-agnostic security event signal of the technology source-agnostic vendor alert signal type satisfies alerting conditions (e.g., service-defined alerting criteria, etc.) defined by the subject automated detection decisioning workflow.

It shall be noted that, in one or more embodiments, each technology source-agnostic vendor alert signal, when generated, by the cybersecurity event detection and response service may be assigned a corresponding threat severity level (e.g., low threat severity, medium threat severity, high threat severity, critical threat severity, and/or the like) and/or tagged with a service-specific label (e.g., suspicious authentication) and MITRE label (e.g., TA0001-Initial Access), as described in more detail herein.

It shall be recognized that, in one or more embodiments, the total number of computer-executable detection instructions may vary from one corpus of computer-executable detection instructions to another corpus of computer-executable detection instructions. For example, in some embodiments, a first corpus of computer-executable detection instructions digitally mapped or coupled to a first technology source-agnostic security event signal type may include a first plurality of computer-executable detection instructions, and a second corpus of computer-executable detection instructions digitally mapped to a second technology source-agnostic security event signal type may include a second plurality of computer-executable detection instructions. In such embodiments, a total number of computer-executable detection instructions included in the first corpus of computer-executable detection instructions may be different from a total number of computer-executable detection instructions included in the second corpus of computer-executable detection instructions.

It shall be further recognized that, in some embodiments, the same computer-executable detection instruction may be present or occur in more than one corpus of computer-executable detection instructions. For instance, with reference to the above non-limiting example, the same computer-executable detection instruction may be in both the first corpus of computer-executable detection instructions and the second corpus of computer-executable detection instructions. In such a non-limiting example, the computer-executable detection instruction (e.g., the same computer-executable detection instruction) may be configured to generate a prospective security alert of a first distinct type when a subject technology source-agnostic security event signal satisfies a first distinct set of alerting conditions of the computer-executable detection instruction and a prospective security alert of a second distinct type when a subject technology source-agnostic security event signal satisfies a second distinct set of alerting conditions of the computer-executable detection instruction.

It shall be further recognized that, in one or more embodiments, each distinct computer-executable detection instruction of a subject corpus of computer-executable detection instructions digitally mapped to a target technology source-agnostic security event signal type may be configured to assess inbound technology source-agnostic security event signals of the target technology source-agnostic security event signal type against a distinct set of alerting conditions. Furthermore, in such embodiments, each distinct computer-executable detection instruction of the subject corpus of computer-executable detection instructions may be configured to generate a corresponding prospective security alert based on satisfying the distinct set of alerting conditions associated with that distinct computer-executable detection instruction.

For instance, in a non-limiting example, the subject corpus of computer-executable detection instructions digitally mapped or linked to the target technology source-agnostic security event signal type may include a first computer-executable detection instruction that may be configured to automatically generate a first type of prospective security alert based on a technology source-agnostic security event signal satisfying the distinct set of predefined alerting conditions of the first computer-executable detection instruction. Additionally, or alternatively, in such a non-limiting example, the subject corpus of computer-executable detection instructions digitally mapped or linked to the target technology source-agnostic security event signal type may include a second computer-executable detection instruction that may be configured to automatically generate a second type of prospective security alert based on the technology source-agnostic security event signal satisfying the distinct set of predefined alerting conditions of the second computer-executable detection instruction. Additionally, or alternatively, in such a non-limiting example, the subject corpus of computer-executable detection instructions digitally mapped or linked to the target technology source-agnostic security event signal type may include a third computer-executable detection instruction that may be configured to automatically generate a third type of prospective security alert based on the technology source-agnostic security event signal satisfying the distinct set of predefined alerting conditions of the third computer-executable detection instruction. It shall be recognized that, in some embodiments, the first type of prospective security alert, the second type of prospective security alert, and third type of prospective security alert may each correspond to a distinct type of prospective security alert.

In one or more embodiments, in response to a system or service generating a technology source-agnostic security event signal based on a raw event associated with a third-party security service, the system or service may function to identify a technology source-agnostic security event signal type that corresponds to the technology source-agnostic security event signal. Accordingly, in such embodiments, the system or service may function to automatically retrieve, via one or more processors, a corpus of computer-executable detection instructions (or a representation of the corpus of computer-executable detection instructions) digitally linked to the technology source-agnostic security event signal type based on querying a detection instructions database storing each computer-executable detection instruction of the system or service. For instance, in a non-limiting example, the system or service may function to automatically construct an API call that includes the technology source-agnostic security event signal type as a search parameter and, in turn, receive all computer-executable detection instructions digitally linked or mapped to the technology source-agnostic security event signal type (e.g., the corpus of computer-executable detection instructions digitally linked to the technology source-agnostic security event signal type) based on executing the API call.

Accordingly, in one or more embodiments, after retrieving the computer-executable detection instructions digitally linked or mapped to the technology source-agnostic security event signal type, the system or service implementing method 200 may function to assess the technology source-agnostic security event signal against each computer-executable detection instructions of the retrieved computer-executable detection instructions. Based on the number of computer-executable detection instructions satisfied (e.g., satisfying the alerting conditions specified by the computer-executable detection instructions), the system or service may function to generate one or more distinct prospective security alerts (e.g., one prospective security alert, two distinct prospective security alerts, etc.). In other words, if alerting conditions of two distinct computer-executable detection instructions of the retrieved computer-executable detection instructions are satisfied, the system or service implementing method 200 may function to generate two distinct prospective security alerts, respectively.

It shall be recognized that, in one or more embodiments, the system or service implementing method 200 may function to automatically assess, via one or more processors, a likely threat of a subject technology source-agnostic security event signal of a first distinct technology source-agnostic security event signal type using a corpus of computer-executable detection instructions digitally mapped to the first distinct technology source-agnostic security event signal type. Additionally, or alternatively, in such an embodiment, the system or service implementing method 200 may function to automatically assess, via one or more processors, a likely threat of a subject technology source-agnostic security event signal of a second distinct technology source-agnostic security event signal type using a corpus of computer-executable detection instructions digitally mapped to the second distinct technology source-agnostic security event signal type.

In one or more embodiments, the system or service implementing method 200 may function to instantiate a detection-building graphical user interface that may provide a capability of configuring and/or building one or more automated detection decisioning workflows (e.g., computer-executable detection instructions or the like). In one or more embodiments, based on or in response to instantiating the detection-building graphical user interface, a target user may use the detection-building graphical user interface to configure (e.g., construct and simulate) an automated detection decisioning workflow and digitally map the automated detection decisioning workflow (e.g., computer-executable detection instruction or the like) to one or more target technology source-agnostic security event signal types (e.g., one target technology source-agnostic security event signal type, two technology source-agnostic security event signal types, three technology source-agnostic security event signal types, etc.) of the plurality of distinct technology source-agnostic security event signal types of the cybersecurity event detection and response service. It shall be noted that, in one or more embodiments, each automated detection decisioning workflow generated by the system or service implementing method 200 may be digitally linked, mapped, and/or associated with one or more of a plurality of technology source-agnostic security event signal types (e.g., one technology source-agnostic security event signal type, two technology source-agnostic security event signal types, three technology source-agnostic security event signal types, or any other suitable number of technology source-agnostic security event signal types).

In one or more embodiments, a layout or arrangement of the detection-building graphical user interface may enable a target user, who may have limited-to-no experience in constructing automated detection decisioning workflows, to intuitively construct one or more automated detection decisioning workflows that may underpin a subject technology source-agnostic security event signal type. Stated another way, users may build automated detection decisioning workflows through a graphical user interface without writing any code (e.g., no-code, instead using visual tools and pre-built components, etc.), as shown generally by way of examples in FIGS. 50-57.

In one or more embodiments, a system or service implementing method 200 may function to instantiate, via one or more processors, a detection-building graphical user interface for constructing a target automated detection instruction (e.g., a subject computer-executable detection instruction or the like) based on receiving a request from a user. The request from the user, in one or more embodiments, may be received based on (or in response to) a user selecting a user interface object that, when selected, instantiates the detection-building graphical user interface that may enable the user to build, design, construct, and/or the like a new computer-executable detection instruction.

In one or more embodiments, based on or in response to instantiating the detection-building graphical user interface, the detection-building graphical user interface may function to display an overview region. The overview region of the detection-building graphical user interface may be used, in part, to construct at least a portion of a target automated detection decisioning workflow (e.g., computer-executable detection instruction), as shown generally by way of example in FIG. 44. The overview region, in one or more embodiments, may include one or more user interface elements that may provide a target user a capability of defining precursory data associated with a target automated detection decisioning workflow (e.g., name of automated detection decisioning workflow, description of automated detection decisioning workflow, etc.).

Additionally, or alternatively, in one or more embodiments, the overview region may include one or more selectable user interface objects that controls whether the target automated detection decisioning workflow, when deployed into a production environment of the cybersecurity event detection and response service, is implemented for only a target subscriber (e.g., Subscriber "A" or Subscriber "B") or is implemented for all subscribers to the cybersecurity event detection and response service, as shown generally by way of example in FIG. 44.

Additionally, or alternatively, in one or more embodiments, the overview region may include an event/alert taxonomy data field that may be configured to receive event/alert taxonomy data (e.g., Suspicious Authentication) that may cause an execution of additional automated detection decisioning workflows (e.g., suspicious authentication automated detection decisioning workflows) digitally mapped to the event/alert taxonomy (e.g., Suspicious Authentication) when the target automated detection decisioning workflow is executed.

Stated another way, in one or more embodiments, the overview region of the detection-building graphical user interface may include a plurality of detection-identifying user interface input elements that may be configured to receive, from a user, one or more strings of text that characterize a target computer-executable detection instruction (e.g., a computer-executable detection instruction being built by a user, an automated detection instruction being built by the user, etc.). For example, in one or more embodiments, the overview region of the detection-building graphical user interface may include a detection name data field that may be configured to receive, as input, one or more text strings that may indicate a name of the target computer-executable detection instruction (e.g., authentication from a suspicious IP).

Additionally, or alternatively, in one or more embodiments, the overview region of the detection-building graphical user interface may include a detection description data field that may be configured to receive, as input, one or more text strings that may indicate a description of the target computer-executable detection instruction (e.g., a successful authentication was observed with a suspicious IP).

Additionally, or alternatively, in one or more embodiments, the overview region of the detection-building graphical user interface may include a set of user interface buttons, that when operated, is configured to control whether the target computer-executable detection instruction is used or implemented for only a target subscriber or across all subscribers subscribing to a cybersecurity event detection and response service. For instance, in such an embodiment, when a system or service receives, from the user, a selection of the "all organizations" button, a system or service may deploy the target computer-executable detection instruction for all organizations or subscribers of the system or service. Alternatively, in such an embodiment, when a system or service receives, from the user, a selection of the "one organization" button, a system or service may deploy the target computer-executable detection instruction for a target organization or subscriber based on receiving the selection that indicates which organization or subscriber for which the target computer-executable detection instruction should be implemented.

Additionally, or alternatively, in one or more embodiments, the overview region of the detection-building graphical user interface may include an automated investigations control button that, when selected, is configured to display a drop-down menu element of a plurality of predetermined alert taxonomies. In such an embodiment, the system or service may function to receive a selection of the automated investigations control button and, in turn, display the drop-down menu element of the plurality of alert taxonomies. Accordingly, the system or service may function to receive, from a user, a selection of one of the plurality of alert taxonomies displayed in the drop-down menu element and, in turn, the target automated detection instruction is configured to execute a set of automated investigation workflows digitally mapped to the one of the plurality of alert taxonomies based on receiving the selection of the one of the plurality of alert taxonomies. Each automated investigation workflow may be configured to automatically investigate a subject technology source-agnostic security event signal, as described in U.S. patent application Ser. No. 17/488,800, titled SYSTEMS AND METHODS FOR INTELLIGENT CYBER SECURITY THREAT DETECTION AND MITIGATION THROUGH AN EXTENSIBLE AUTOMATED INVESTIGATIONS AND THREAT MITIGATION PLATFORM, which is incorporated in its entirety by this reference. In other words, the target automated detection instruction, when executed, may function to execute a plurality of distinct automated investigation workflows that automatically gather and/or fetch data related to the subject technology source-agnostic security event signal from a plurality of external and/or internal data sources of the cybersecurity event detection and response service and, in turn, analyze the data.

In one or more embodiments, based on or in response to instantiating the detection-building graphical user interface, the detection-building graphical user interface may function to display an automated detection testing/simulation region. The automated detection testing/simulation region of the detection-building graphical user interface may be used, in part, to test or simulate the target computer-executable detection instruction. The automated detection testing/simulation region, in one or more embodiments, may include one or more user interface elements that may provide a target user a capability of defining a test or a simulation for the target computer-executable detection instruction.

In one or more embodiments, the system or service implementing method 200 may function to instantiate, via the detection-building graphical user interface, a detection instructions simulation container based on receiving an input, from a user, selecting a detection simulation addition control button of the detection-building graphical user interface. In such embodiments, the detection instruction simulation container may be configured to receive, from the user, input of a sample raw event generated by a target third-party security service or a third-party security application for validating that the target automated detection instruction (e.g., target computer-executable detection instruction or the like) is executed and/or executed correctly in response to normalizing the sample raw event and/or providing the normalized sample raw event to the target automated detection instruction (and/or a detections instructions engine). It shall be noted that, in one or more embodiments, the simulation or test of the target automated detection instruction may be automatically performed in response to receiving the sample raw event.

Additionally, or alternatively, in one or more embodiments, the detection-building graphical user interface may include a distinct simulation outcome user interface indicator that corresponds to the detection instructions simulation container. In such a non-limiting example, the distinct simulation outcome user interface indicator may be of a first color (e.g., green) when the target automated detection instruction was successfully executed (e.g., triggered, etc.) and/or responded as expected (e.g., generated a prospective security alert for the sample raw event based on the corresponding technology source-agnostic security event signal satisfying the corresponding alerting conditions, etc.). In one or more embodiments, the distinct simulation outcome user interface indicator may be of a second color (e.g., red) different from the first color (e.g., green) when the target automated detection instruction was not successfully executed (e.g., not triggered, etc.) nor behaved as expected (e.g., did not generate a prospective security alert for the sample raw event).

Stated another way, in one or more embodiments, the detection instructions simulation container may function to receive, as input, one or more raw events (e.g., a plurality of distinct raw events, etc.) that should cause an execution or trigger of the target computer-executable detection instruction. Accordingly, in one or more embodiments, based on (or in response to) obtaining the one or more raw events, a system or service may function to simulate or test whether each of the one or more raw events actually triggered (or caused an execution) of the target automated detection instruction (e.g., target computer-executable detection instruction or the like).

In one or more embodiments, the automated detection testing/simulation region may be configured to provide users the ability to ensure the target computer-executable detection instruction, or the like is working correctly before implementing the target computer-executable detection instruction into production or operation. For example, users can simulate various security scenarios by inputting different raw events to test whether the detection instruction triggers appropriate alerts or actions. This pre-deployment validation may help in identifying any issues or misconfigurations in the detection instruction, ensuring it performs as intended when integrated into a live environment. By thoroughly testing the instruction in the simulation environment, users can reduce the risk of undetected threats or false positives when the target computer-executable detection instruction is operational (e.g., live).

In one or more embodiments, based on or in response to instantiating the detection-building graphical user interface, the detection-building graphical user interface may function to display an automated detection decisioning execution criteria region. The automated detection decisioning execution criteria region of the detection-building graphical user interface may be used, in part, to construct at least a portion of a target automated detection decisioning workflow, as shown generally by way of example in FIG. 45. The automated detection decisioning execution criteria region, in one or more embodiments, may include one or more user interface elements that may provide a target user a capability of defining one or more execution parameters, that when satisfied, causes an execution (or trigger) of the target automated detection decisioning workflow.

In one or more embodiments, based on receiving one or more user inputs, the automated detection decisioning execution criteria region may digitally map or digitally associate one or more distinct technology source-agnostic security event signal types (e.g., technology source-agnostic authentication event signal) to a target automated detection decisioning workflow. For instance, in a non-limiting example, when the system or service implementing method 200 generates a technology source-agnostic event signal corresponding to one of the one or more distinct technology source-agnostic security event signal types, each automated detection decisioning workflow having execution criteria that includes the one of the one or more distinct technology source-agnostic security event signal types may be automatically executed.

Additionally, in some embodiments, based on receiving one or more user inputs, a set of alerting conditions may be defined for a subject automated detection decisioning workflow. It shall be noted that, in such embodiments, a subject technology source-agnostic event signal may need to satisfy each alert condition (e.g., alert condition A, alert condition B) of the set of alerting conditions prior to the subject automated detection decisioning workflow generating a service-validated security alert.

Stated another way, in one or more embodiments, the system or service implementing method 200 may function to instantiate, via the detection-building graphical user interface, a detection instruction execution container based on receiving an input, from the user, selecting a detection instruction execution control button of the detection-building graphical user interface. The detection instruction execution container, in one or more embodiments, may include a signal type user interface element that, when selected, displays a drop-down menu element of a plurality of technology source-agnostic event signal types provided by the system or service implementing method 200 and/or one or more condition-setting user interface elements being configured to receive inputs of characters that define one or more alert generation conditions that must be satisfied prior to a generation of a subject prospective security alert using the target automated detection instruction (e.g., target computer-executable detection instruction or the like).

For instance, in a non-limiting example, the system or service implementing method 200 may function to receive, from a user, a selection of the detection instruction execution control button of the detection-building graphical user interface and, in turn, instantiate a detection instruction execution container. In such a non-limiting example, the system or service may function to receive, from the user, a selection of the signal type user interface element and, in turn, display the drop-down menu element of a plurality of technology source-agnostic event signal types. Accordingly, in such a non-limiting example, the system or service may function to receive, from the user, a selection of a first technology source-agnostic event signal type (e.g., a technology source-agnostic event "Api Activity" signal type) from the plurality of technology source-agnostic event signal types. It shall be recognized that, in one or more embodiments, after receiving the selection of the first technology source-agnostic event signal type (e.g., a technology source-agnostic event "Api Activity" signal type), the target automated detection instruction (e.g., target computer-executable detection instruction or the like) may be configured to trigger or cause an execution of the target automated detection instruction for subject technology-source agnostic security event signals of only the first technology source-agnostic event signal type (e.g., a technology source-agnostic event "Api Activity" signal type).

Furthermore, in one or more embodiments, the detection instruction execution container may provide the user with the capability to define further specific conditions or parameters associated with the selected signal type (e.g., a technology source-agnostic event "Api Activity" signal type).

For example, in one or more embodiments, based on receiving, from the user, a selection of an "add condition" control button, a set of condition-setting user interface input elements may be instantiated. In such a non-limiting example, the set of condition-setting user interface input elements may allow the user to define further specific conditions and criteria that must be satisfied prior to a triggering or an execution of the target automated detection instruction (e.g., target computer-executable detection instruction or the like).

Accordingly, with reference to the above non-limiting example, if the user wants the target automated detection instruction (e.g., target computer-executable detection instruction or the like) to only execute or trigger on technology source-agnostic security event signals of the first technology source-agnostic event signal type (e.g., a technology source-agnostic event "Api Activity" signal type) when the technology source-agnostic security event signals have an application programming interface (API) response error of access denied, the system or service may receive, from the user, specific inputs into the set of condition-setting user interface input elements defining such conditions.

Accordingly, with reference to the above non-limiting example, if the user further wants the target automated detection instruction (e.g., target computer-executable detection instruction or the like) to only execute or trigger on technology source-agnostic security event signals of the first technology source-agnostic event signal type (e.g., a technology source-agnostic event "Api Activity" signal type) when the technology source-agnostic security event signals have an application programming interface (API) response error of access denied and have a source endpoint domain of ".amazonaws.com", the system or service may receive, from the user, specific inputs into an additional set of condition-setting user interface input elements defining such conditions. The additional set of condition-setting user interface input elements may be instantiated based on receiving, from the user, an additional selection of an "add condition" control button.

It shall be noted that, in one or more embodiments, a user may function to define an execution condition based on subscriber-specific features or attributes. For instance, in a non-limiting example, if the user wants to define an execution condition that specifies executing a target computer-executable detection instruction when there is an authentication attempt from countries where the subject subscriber does not operate, the detection instruction may be configured to access the relevant dataset (of the subject subscriber) containing this information and receive specific inputs from the user into a set of condition-setting user interface input elements defining such conditions. This allows the system to tailor detection instructions to the unique operating characteristics of a subscriber.

It shall be further noted that, in one or more embodiments, the user may define more, different, or fewer conditions without departing from the scope of the disclosure such as count-based conditions, Boolean conditions, time-based conditions, or any other suitable condition.

In one or more embodiments, based on or in response to instantiating the detection-building graphical user interface, the detection-building graphical user interface may function to display an automated detection decisioning response region. The automated detection decisioning response region of the detection-building graphical user interface may be used, in part, to construct at least a portion of a target automated detection decisioning workflow, as shown generally by way of example in FIG. 46. The automated detection decisioning response region, in one or more embodiments, may include one or more user interface elements that may provide a target user a capability of defining response criteria of the target automated detection decisioning workflow when each of the alerting conditions of the target automated detection decisioning workflow is satisfied.

For instance, in a non-limiting example, based on a subject technology-source agnostic event signal satisfying alerting conditions of a subject automated detection decisioning workflow, the subject automated detection decisioning workflow may generate a service-validated security alert (e.g., security alert, prospective security alert or the like). Stated another way, in one or more embodiments, based on receiving one or more user inputs at the automated detection decisioning response region, the response criteria of the subject automated detection decisioning workflow may provide instructions for generating a service-validated security alert having an alert name (e.g., suspicious authentication activity), an alert threat severity (e.g., low threat severity), a MITRE Tactic category (e.g., TA0001-Initial Access), and a service-specific alert category (e.g., suspicious authentication) when alerting conditions of the subject automated detection decisioning workflow is satisfied.

Accordingly, in such embodiments, based on the subject technology-source agnostic event signal satisfying one or more alerting conditions of the subject automated detection decisioning workflow, the cybersecurity event detection and response service may function to generate a service-validated security alert (e.g., security alert) having at least an alert name (e.g., suspicious authentication activity), a corresponding MITRE Tactic category (e.g., TA0001-Initial Access), a corresponding service-specific alert category (e.g., suspicious authentication), and/or a corresponding threat severity (e.g., low threat severity).

Additionally, or alternatively, in one or more embodiments, the system or service implementing method 200 may function to instantiate, via the detection-building graphical user interface, a detection instruction response container based on receiving an input, from the user, selecting a detection instruction response control button of the detection-building graphical user interface. The detection instruction response container, in one or more embodiments, may include a set of user interface input elements configured to receive user input specifying alert attributes when creating a subject prospective security alert. For instance, the set of user interface input elements may include a first user interface input element configured to receive an input of an alert name that is assigned to the subject prospective security alert when the one or more alert generation conditions of the target automated detection instruction are satisfied, a second user interface input element configured to receive an input of a degree of threat severity that is assigned to the subject prospective security alert when the one or more alert generation conditions of the target automated detection instruction are satisfied, and a third user interface input element configured to receive an input of a security threat classification or attack strategy that is assigned to the subject prospective security alert when the one or more alert generation conditions of the target automated detection instruction are satisfied.

In other words, the target automated detection instruction (e.g., target computer-executable detection instruction) generated via the aforementioned detection-building graphical user interface will always generate a subject prospective security alert of the same degree of threat severity, alert name, and the security threat classification or attack strategy metadata for each technology source-agnostic security event signal that satisfies the conditions of the target automated detection instruction (e.g., if a subject technology source-agnostic security event signal satisfies the set of alerting conditions of the target automated detection instruction, generate a prospective security alert with these alert attributes as specified in the detection instruction response container). It shall be further recognized, in one or more embodiments, a system or service implementing method 200 may function to implement or deploy the target automated detection instruction (e.g., target computer-executable detection instruction) into one or more production environments based on receiving an input, from the user, selecting a “deploy detection instruction” user interface element (or the like) on the detection-building graphical user interface.

In one or more embodiments, the system or service implementing method 200 may function to route each service-validated security alert generated by the cybersecurity event detection and response service to one of an alert handling queue and an alert disposal queue. It shall be recognized that the phrase “service-validated security alert” may also be referred to herein as a “prospective security alert” or the like.

In one or more embodiments, based on the cybersecurity event detection and response service, generating a service-validated security alert, the cybersecurity event detection and response service may function to assess the service-validated security alert against a corpus of computing environment-informative data of a target subscriber (e.g., a corpus of subscriber context data) to which the service-validated security alert (e.g., prospective security alert) corresponds. The corpus of computing environment-informative data may include alert suppression instructions associated with non-critical digital assets of the subscriber, alert escalation instructions associated with critical digital assets of the subscriber, etc., as described in U.S. patent application Ser. No. 18/095,754, titled SYSTEMS AND METHODS FOR INTELLIGENTLY GENERATING CYBERSECURITY CONTEXTUAL INTELLIGENCE AND GENERATING A CYBERSECURITY INTELLIGENCE INTERFACE and U.S. patent application Ser. No. 18/129,638, titled SYSTEMS AND METHODS FOR INTELLIGENT CONFIGURATION AND DEPLOYMENT OF ALERT SUPPRESSION PARAMETERS IN A CYBERSECURITY THREAT DETECTION AND MITIGATION PLATFORM, which are incorporated in their entities by this reference.

Figure 48:
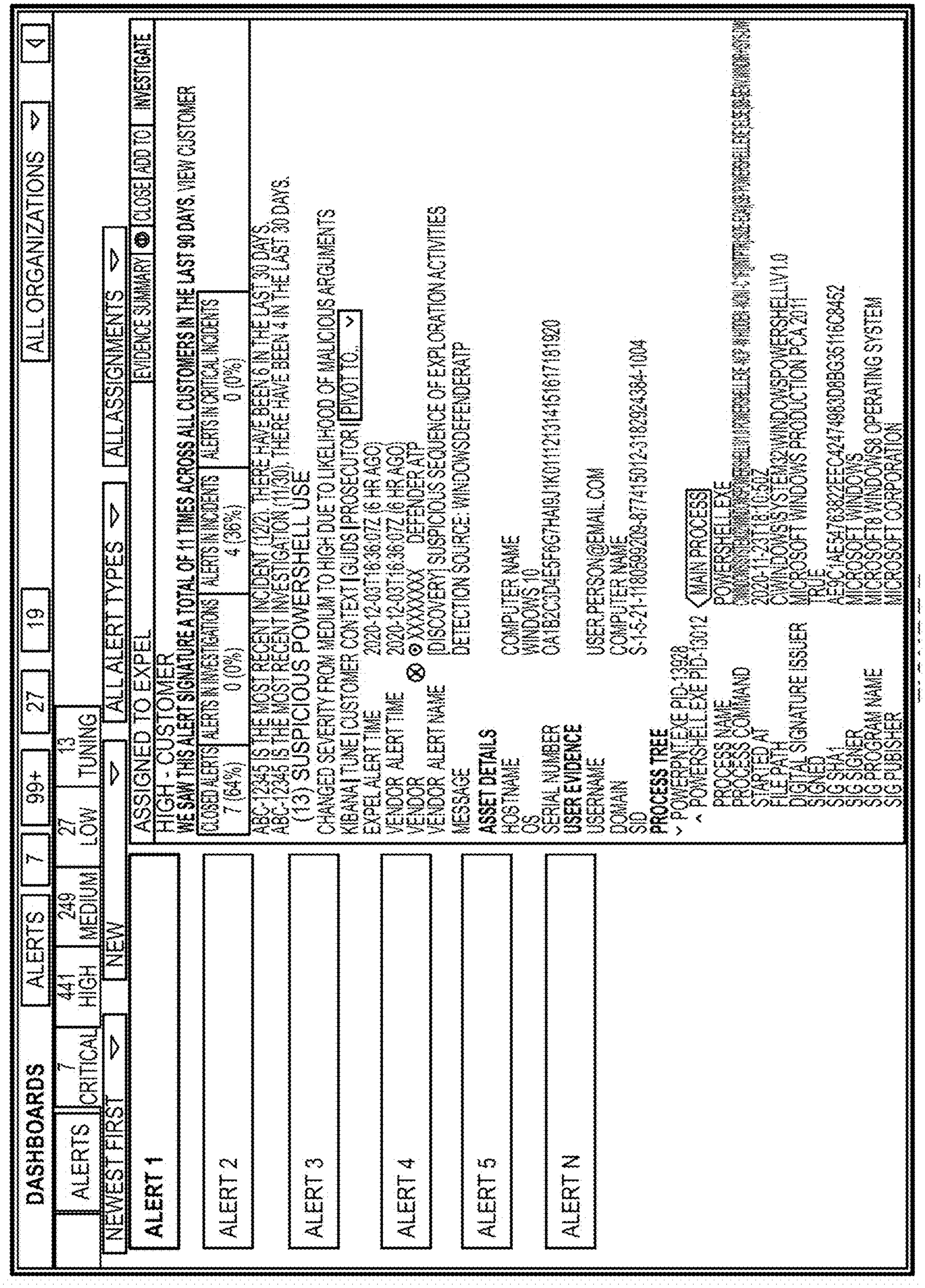
FIG. 48 illustrates an example representation of an alert handling queue displayed on a graphical user interface in accordance with one or more embodiments of the present application.

In one or more embodiments, based on a determination that the service-validated security alert (e.g., prospective security alert or the like) is associated with one of the critical digital assets of the corpus of computing environment-informative data of the target subscriber, the system or service implementing method 200 may function to automatically route the service-validated security alert to an alert handling queue. It shall be noted that, in one or more embodiments, a representation of the alert handling queue may be displayed on a graphical user interface, as shown generally by way of example in FIG. 48.

In one or more embodiments, based on a determination that the service-validated security alert includes alert data associated with one of the non-critical digital assets of the corpus of computing environment-informative data of the target subscriber, the system or service implementing method 200 may function to automatically route the service-validated security alert to an alert disposal queue.

It shall be noted, in some embodiments, the system or service implementing method 200 may function to automatically route a subject service-validated security alert (e.g., security alert or the like) to the alert handling queue (e.g., bypassing an assessment of a corpus of computing environment-informative data against the subject service-validated security alert).

At least one technical advantage of evaluating service-validated security alerts against one or more corpora of computing environment-informative data is that it may prevent a display or surfacing of service-validated security alerts that may be deemed irrelevant (e.g., noise) by a subject subscriber to which the service-validated security alert corresponds.

Stated another way, in one or more embodiments, the system or service implementing method 200 may function to obtain, via one or more processors, a third-party security event that involves a digital asset or computing asset of a subscriber. Additionally, in such an embodiment, the system or service implementing method 200 may function to generate, via the one or more processors, a technology source-agnostic security event signal for the third-party security event based on routing the third-party security event to an event normalization service. Additionally, in such an embodiment, the system or service implementing method 200 may function to identify, via the one or more processors, a technology source-agnostic security event signal type that corresponds to the technology source-agnostic security event signal in response to generating the technology source-agnostic security event signal. Additionally, in such an embodiment, the system or service implementing method 200 may function to retrieve, via the one or more processors, a corpus of computer-executable detection instructions digitally mapped to the technology source-agnostic security event signal type based on querying a detection instructions retrieval application programming interface (API). Additionally, in such an embodiment, the system or service implementing method 200 may function to assess, via the one or more processors, the technology source-agnostic security event signal against each computer-executable detection instruction included in the corpus of computer-executable detection instructions. Additionally, in such an embodiment, the system or service implementing method 200 may function to generate, via the one or more processors, a prospective security alert based on the technology source-agnostic security event signal satisfying a set of alerting conditions of one of the computer-executable detection instructions of the corpus of computer-executable detection instructions.

Accordingly, in one or more embodiments, the system or service implementing method 200 may function to assess, via the one or more processors, the prospective security alert against a corpus of computing environment data of the subscriber, determine, via the one or more processors, the prospective security alert involves a critical computing asset of the subscriber based on assessing the prospective security alert against the corpus of computing environment data of the subscriber, and/or route, via the one or more processors, the prospective security alert to an alert queue based on the prospective security alert being a valid security alert.

Accordingly, in one or more embodiments, the system or service implementing method 200 may function to assess, via the one or more processors, the prospective security alert against one or more alert suppression instructions configured for the subscriber, identify, via the one or more processors, the prospective security alert as a suppressible alert based on the prospective security alert satisfying one of the one or more alert suppression instructions, and/or route, via the one or more processors, the prospective security alert to an alert disposal queue based on the prospective security alert being identified as the suppressible alert.

3. Computer-Implemented Method and Computer Program Product

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

The system and methods of the preferred embodiment and variations thereof can be embodied and/or implemented at least in part as a machine configured to receive a computer-readable medium storing computer-readable instructions. The instructions are preferably executed by computer-executable components preferably integrated with the system and one or more portions of the processors and/or the controllers. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that similar to a method with contingent steps, a system or computer readable storage medium can repeat the steps of a method as many times as are needed to ensure that all of the contingent steps have been performed.

Although omitted for conciseness, the preferred embodiments include every combination and permutation of the implementations of the systems and methods described herein.

As a person skilled in the art will recognize from the previous detailed description and from the figures and claims, modifications and changes can be made to the preferred embodiments of the invention without departing from the scope of this invention defined in the following claims.

We claim:

1. A computer-implemented method comprising:

at a cybersecurity service implemented by a network of distributed computers:

obtaining raw event data from a third-party security device of a subscriber;

automatically generating a pre-normalized security event that includes the raw event data in a first structured data object in response to executing an automated event ingestion instruction, wherein:

the pre-normalized security event includes a set of un-normalized evidence data fields extracted from the raw event data;

automatically transforming the pre-normalized security event to at least one normalized security event, wherein automatically transforming the pre-normalized security event to the at least one normalized security event includes:

converting the set of un-normalized evidence data fields of the pre-normalized security event to a set of normalized evidence data fields using a set of computer-executable data mapping instructions included in a security data integration created for the third-party security device;

automatically assessing a corpus of computer-executable detection instructions against the at least one normalized security event;

generating a security alert based on the at least one normalized security event satisfying a set of alerting conditions of a subject computer-executable detection instruction of the corpus of computer-executable detection instructions; and executing a threat mitigation response that mitigates a security threat associated with the security alert.

2. The computer-implemented method according to claim 1, wherein:

the automated event ingestion instruction corresponds to a first automated event ingestion instruction that is configured to translate the raw event data obtained from the third-party security device to the pre-normalized security event when the raw event data is of a first type, the automated event ingestion instruction corresponds to a second automated event ingestion instruction that is configured to translate the raw event data obtained from the third-party security device to the pre-normalized security event when the raw event data is of a second type, and the automated event ingestion instruction corresponds to a third automated event ingestion instruction that is configured to translate the raw event data obtained from the third-party security device to the pre-normalized security event when the raw event data is of a third type.

3. The computer-implemented method according to claim 1, wherein:

the subject computer-executable detection instruction is constructed using a detection-building graphical user interface, and constructing the subject computer-executable detection instruction includes instantiating, the detection-building graphical user interface based on receiving a request from a user, wherein the detection-building graphical user interface includes a set of user interface buttons, that when operated, is configured to control whether the subject computer-executable detection instruction is used for only the subscriber or across all subscribers subscribing to the cybersecurity service.

4. The computer-implemented method according to claim 3, wherein:

the detection-building graphical user interface further includes an automated investigations control button that, when selected, is configured to display a drop-down menu element of a plurality of alert taxonomies, the automated investigations control button is configured to receive a selection, from the user, of one of the plurality of alert taxonomies, and the subject computer-executable detection instruction, when executed, is configured to execute a set of automated investigation workflows digitally mapped to the one of the plurality of alert taxonomies based on receiving the selection of the one of the plurality of alert taxonomies from the user.

5. The computer-implemented method according to claim 3, wherein:

instantiating the detection-building graphical user interface further includes instantiating a detection instruction simulation container on the detection-building graphical user interface based on receiving an input, from the user, selecting a detection simulation addition control button of the detection-building graphical user interface, and the detection instruction simulation container is configured to receive, from the user, input of a historical raw event generated by the third-party security device for validating that the subject computer-executable detection instruction is executed in response to normalizing the historical raw event.

6. The computer-implemented method according to claim 3, wherein:

instantiating the detection-building graphical user interface further includes instantiating a detection instruction execution container on the detection-building graphical user interface based on receiving an input, from the user, selecting a detection instruction execution control button of the detection-building graphical user interface, the detection instruction execution container includes a signal type user interface element that, when selected, displays a drop-down menu element of a plurality of technology source-agnostic event signal types provided by the cybersecurity service, and the detection instruction execution container further includes one or more condition-setting user interface elements being configured to receive inputs of characters that define one or more alert generation conditions that must be satisfied prior to generating the security alert using the subject computer-executable detection instruction.

7. The computer-implemented method according to claim 6, wherein:

instantiating the detection-building graphical user interface further includes instantiating a detection instruction response container on the detection-building graphical user interface based on receiving an input, from the user, selecting a detection instruction response control button of the detection-building graphical user interface, and the detection instruction response container includes a set of user interface input elements configured to receive user input specifying alert attributes, wherein the set of user interface input elements include:

a first user interface input element configured to receive an input of an alert name that is assigned to the security alert when the one or more alert generation conditions are satisfied, a second user interface input element configured to receive an input of a degree of threat severity that is assigned to the security alert when the one or more alert generation conditions are satisfied, and a third user interface input element configured to receive an input of a security threat classification or attack strategy that is assigned to the security alert when the one or more alert generation conditions are satisfied.

8. The computer-implemented method according to claim 1, further comprising:

obtaining, from one or more data sources external to the cybersecurity service, one or more additional pieces of evidence based on metadata extracted from the raw event data, wherein:

the one or more additional pieces of evidence were absent or not included in the raw event data, and the pre-normalized security event and the at least one normalized security event further includes the one or more additional pieces of evidence.

9. The computer-implemented method according to claim 1, wherein:

the raw event data includes a network host of the subscriber, the security alert includes the network host, and executing the threat mitigation response that mitigates the security threat associated with the security alert includes automatically terminating existing network connections on the network host and preventing new network connections from digitally communicating with the network host of the subscriber in response to detecting the network host of the subscriber as compromised.

10. The computer-implemented method according to claim 1, wherein:

the raw event data includes a user account of the subscriber, the security alert includes the user account, and executing the threat mitigation response that mitigates the security threat associated with the security alert includes automatically disabling the user account to temporarily prevent or permanently prevent unauthorized access to a target environment of the subscriber in response to detecting the user account of the subscriber as compromised.

11. The computer-implemented method according to claim 1, wherein:

the raw event data relates to a cloud computing environment of the subscriber, the security alert includes information associated with the cloud computing environment, and executing the threat mitigation response that mitigates the security threat associated with the security alert includes automatically suspending or automatically ceasing digital events from occurring on the cloud computing environment of the subscriber in response to detecting the cloud computing environment of the subscriber as compromised.

12. The computer-implemented method according to claim 1, wherein:

the raw event data includes a cloud access key of the subscriber, the security alert includes the cloud access key, and executing the threat mitigation response that mitigates the security threat associated with the security alert includes automatically disabling or automatically modifying the cloud access key of the subscriber in response to detecting the cloud access key of the subscriber as compromised.

13. The computer-implemented method according to claim 1, wherein:

the raw event data indicates that an application with a respective hash signature was executed, the security alert includes information associated with the application and the respective hash signature, and executing the threat mitigation response that mitigates the security threat associated with the security alert includes automatically blocking the respective hash signature to prevent the application associated with the respective hash signature from being re-executed in a digital environment of the subscriber in response to detecting the respective hash signature as malicious.

14. A method comprising:

at a cybersecurity service implemented by a network of distributed computers:

obtaining raw event data from a third-party security device of a subscriber;

automatically generating a pre-normalized security event that includes the raw event data in a first structured data object in response to executing an automated event ingestion instruction, wherein:

the pre-normalized security event includes a set of un-normalized evidence data fields extracted from the raw event data;

automatically transforming the pre-normalized security event to at least one normalized security event, wherein automatically transforming the pre-normalized security event to the at least one normalized security event includes:

converting the set of un-normalized evidence data fields of the pre-normalized security event to a set of normalized evidence data fields using a set of computer-executable data mapping instructions included in a security data integration created for the third-party security device;

automatically assessing a corpus of computer-executable detection instructions against the at least one normalized security event;

generating a security alert based on the at least one normalized security event satisfying a set of alerting conditions of a subject computer-executable detection instruction of the corpus of computer-executable detection instructions; and executing a threat mitigation response that mitigates a security threat associated with the security alert.

15. The method according to claim 14, wherein:

the security data integration is created using a data integration building user interface, wherein the data integration building user interface includes:

a plurality of integration-identifying user interface input elements configured to receive one or more strings of text for specifying a set of integration identification parameters characterizing the security data integration, a signal-specific data mapping container configured to receive inputs of characters to create the set of computer-executable data mapping instructions, wherein the inputs of characters map technology-specific data attributes of the third-party security device to technology source-agnostic data attributes required by a target technology source-agnostic event signal type; and a raw event simulation container configured to receive input of:

a historical raw event generated by the third-party security device, and an expected technology source-agnostic event signal type for validating that the security data integration accurately translates the historical raw event to a corresponding normalized security event of the expected technology source-agnostic event signal type using the set of computer-executable data mapping instructions specified by the signal-specific data mapping container.

16. The method according to claim 15, further comprising:

installing the set of computer-executable data mapping instructions of the security data integration into a computer database of the cybersecurity service in response to receiving an input from a user selecting an integration deployment control element displayed on the data integration building user interface.

17. The method according to claim 15, wherein:

the signal-specific data mapping container includes a signal type user interface element that, when operated, displays a drop-down menu element of a plurality of predetermined technology source-agnostic event signal types provided by the cybersecurity service, and the method further includes:

dynamically instantiating, within the signal-specific data mapping container, a plurality of source-to-target data mapping user interface elements based on receiving a selection of the target technology source-agnostic event signal type from the drop-down menu element of the plurality of predetermined technology source-agnostic event signal types.

18. The method according to claim 17, wherein:

each distinct source-to-target data mapping user interface element of the plurality of source-to-target data mapping user interface elements includes:

a target data attribute user interface element that indicates a technology source-agnostic data attribute required by the target technology source-agnostic event signal type, and a source data attribute user interface input element configured to receive an input of a technology-specific data attribute of the third-party security device that corresponds to the technology source-agnostic data attribute.

19. The method according to claim 15, wherein:

the signal-specific data mapping container includes a signal type user interface element that, when selected, displays a drop-down menu element of a plurality of technology source-agnostic event signal types provided by the cybersecurity service, and the signal-specific data mapping container further includes a version-controlled user interface element that, when selected, displays a drop-down menu element of a plurality of distinct signal versions that correspond to a respective technology source-agnostic event signal type.

20. The method according to claim 19, further comprising:

receiving, from a user, a selection of the target technology source-agnostic event signal type from the drop-down menu element of the plurality of technology source-agnostic event signal types;

receiving, from the user, a selection of a target signal version of the target technology source-agnostic event signal type from the drop-down menu element of the plurality of distinct signal versions; and dynamically instantiating, within the signal-specific data mapping container, a plurality of source-to-target data mapping user interface elements that corresponds to the selection of the target technology source-agnostic event signal type and the selection of the target signal version of the target technology source-agnostic event signal type.

* * * * *